US012737536B2

(12) United States Patent
Dvorak

(10) Patent No.: US 12,737,536 B2
(45) Date of Patent: Sep. 15, 2026

(54) METHOD AND SYSTEM FOR SPREADSHEET ERROR IDENTIFICATION AND AVOIDANCE

(71) Applicant: Adaptam Inc., Palo Alto, CA (US)

(72) Inventor: Robert E. Dvorak, Portola Valley, CA (US)

(73) Assignee: Adaptam Inc., Palo Alto, CA (US)

( * ) Notice: Subject to any disclaimer, the term of this patent is extended or adjusted under 35 U.S.C. 154(b) by 289 days.

(21) Appl. No.: 18/656,523

(22) Filed: May 6, 2024

(65) Prior Publication Data

US 2024/0362408 A1 Oct. 31, 2024

Related U.S. Application Data

(63) Continuation of application No. 17/752,814, filed on May 24, 2022, now Pat. No. 11,977,835.

(60) Provisional application No. 63/192,475, filed on May 24, 2021.

(51) Int. Cl.
*G06F 3/0482* (2013.01)
*G06F 40/18* (2020.01)

(52) U.S. Cl.
CPC ............ *G06F 40/18* (2020.01); *G06F 3/0482* (2013.01)

(58) Field of Classification Search
CPC ................................................ G06F 3/048–05
See application file for complete search history.

(56) References Cited

U.S. PATENT DOCUMENTS

| | | |
|---|---|---|
| 5,815,421 A | 9/1998 | Dulong et al. |
| 6,038,567 A | 3/2000 | Young |
| 6,317,750 B1 | 11/2001 | Tortolani et al. |
| 6,985,895 B2 | 1/2006 | Witkowski et al. |
| 6,988,241 B1 | 1/2006 | Guttman et al. |
| 7,099,890 B2 | 8/2006 | Cahill et al. |

(Continued)

FOREIGN PATENT DOCUMENTS

| | | |
|---|---|---|
| JP | 2004078375 A | 3/2004 |

OTHER PUBLICATIONS

"Parts of an Algebraic Expression", Nelson Mathematics Secondary Year Two, Cycle One, 2009, Nelson Education Ltd., 4 pages.

(Continued)

*Primary Examiner* — Daniel Rodriguez
(74) *Attorney, Agent, or Firm* — HAYNES BEFFEL & WOLFELD LLP; Ernest J. Beffel, Jr.

(57) ABSTRACT

Disclosed is a method of as you type error checking of a spreadsheet formula as a user types the formula in a cell, including analyzing, as you type, the cell contents of the spreadsheet formula and throwing an error message when the cell contents are not valid in the formula being typed. The error message identifies/emphasizes a token or group of tokens that cause the error. Also disclosed is selecting and populating into a spreadsheet formula a formulaic data field to be evaluated, starting from a position in the spreadsheet formula where the formulaic data field to be evaluated is to be populated, and responding to typed inputs and/or UI selection by displaying a list of selectable formulaic data fields with additional information that contains (non-data derived) human generated values. Upon selection among the fields, the method includes automatically populating into the starting position in the spreadsheet formula.

25 Claims, 117 Drawing Sheets
(116 of 117 Drawing Sheet(s) Filed in Color)

(56) References Cited

U.S. PATENT DOCUMENTS

| | | | | |
|---|---|---|---|---|
| 7,117,435 | B1 | 10/2006 | Kotler et al. | |
| 7,120,866 | B2 | 10/2006 | Kotler et al. | |
| 7,155,667 | B1 | 12/2006 | Kotler et al. | |
| 7,302,444 | B1 | 11/2007 | Dunmore et al. | |
| 7,350,141 | B2 | 3/2008 | Kotler et al. | |
| 7,370,274 | B1 | 5/2008 | Stuple et al. | |
| 7,412,645 | B2 | 8/2008 | Kotler et al. | |
| 7,506,242 | B2 | 3/2009 | Kotler et al. | |
| 7,506,243 | B2 | 3/2009 | Kotler et al. | |
| 7,523,390 | B2 | 4/2009 | Kotler et al. | |
| 7,546,533 | B2 | 6/2009 | Sareen et al. | |
| 7,549,115 | B2 | 6/2009 | Kotler et al. | |
| 7,673,227 | B2 | 3/2010 | Kotler et al. | |
| 7,702,997 | B2 | 4/2010 | Kotler et al. | |
| 7,702,998 | B2 | 4/2010 | Kotler et al. | |
| 7,810,032 | B2 | 10/2010 | Bauchot et al. | |
| 8,140,549 | B2 | 3/2012 | Barinaga | |
| 8,286,072 | B2 | 10/2012 | Chamberlain et al. | |
| 8,312,371 | B2 | 11/2012 | Ording | |
| 8,341,512 | B2 | 12/2012 | Sol et al. | |
| 8,726,143 | B2 | 5/2014 | Simkhay et al. | |
| 9,092,412 | B2 | 7/2015 | Salch et al. | |
| 9,305,176 | B2 | 4/2016 | Gloski et al. | |
| 9,436,637 | B2 | 9/2016 | Kommanaboyina | |
| 9,558,232 | B1 | 1/2017 | Taylor et al. | |
| 9,727,989 | B2 | 8/2017 | Garg et al. | |
| 9,990,349 | B2 | 6/2018 | Campbell et al. | |
| 10,019,758 | B2 | 7/2018 | Bartolucci | |
| 10,140,352 | B2 | 11/2018 | Hariharan et al. | |
| 10,409,892 | B2 | 9/2019 | Rothschiller et al. | |
| 10,685,174 | B2 | 6/2020 | Bastide et al. | |
| 11,036,929 | B2 | 6/2021 | Dvorak | |
| 2002/0036662 | A1 | 3/2002 | Gauthier et al. | |
| 2002/0152255 | A1 | 10/2002 | Smith et al. | |
| 2002/0169799 | A1 | 11/2002 | Voshell | |
| 2003/0009411 | A1 | 1/2003 | Ram et al. | |
| 2003/0110191 | A1 | 6/2003 | Handsaker et al. | |
| 2003/0212953 | A1 | 11/2003 | Serraf | |
| 2004/0100502 | A1* | 5/2004 | Ren | G06F 9/451 715/802 |
| 2004/0158557 | A1 | 8/2004 | Welcker et al. | |
| 2005/0015379 | A1 | 1/2005 | Aureglia et al. | |
| 2005/0044496 | A1 | 2/2005 | Kotler et al. | |
| 2006/0069635 | A1 | 3/2006 | Ram et al. | |
| 2006/0129809 | A1 | 6/2006 | Battagin et al. | |
| 2006/0129929 | A1* | 6/2006 | Weber | G06F 40/18 715/267 |
| 2006/0131383 | A1 | 6/2006 | Battagin et al. | |
| 2007/0005635 | A1 | 1/2007 | Martinez et al. | |
| 2007/0136666 | A1 | 6/2007 | Khen et al. | |
| 2008/0027914 | A1* | 1/2008 | Caputo | H04L 65/1069 |
| 2008/0126983 | A1* | 5/2008 | Keohane | G06F 40/274 715/810 |
| 2008/0168341 | A1* | 7/2008 | Payette | G06F 40/18 715/267 |
| 2009/0031205 | A1 | 1/2009 | Aureglia et al. | |
| 2009/0031206 | A1 | 1/2009 | Aureglia et al. | |
| 2009/0044090 | A1* | 2/2009 | Gur | G06F 40/177 715/212 |
| 2009/0044091 | A1* | 2/2009 | Gur | G06F 40/18 715/212 |
| 2009/0044094 | A1* | 2/2009 | Rapp | G06F 40/174 715/220 |
| 2009/0228776 | A1 | 9/2009 | Folting et al. | |
| 2009/0276692 | A1* | 11/2009 | Rosner | G06F 16/2456 715/227 |
| 2010/0058163 | A1* | 3/2010 | Garcia-Molina | G06F 40/149 715/220 |
| 2010/0211862 | A1 | 8/2010 | Parish et al. | |
| 2011/0314415 | A1* | 12/2011 | Fitzmaurice | G06F 3/0481 715/810 |
| 2012/0110001 | A1 | 5/2012 | Young | |
| 2013/0013994 | A1 | 1/2013 | Handsaker et al. | |
| 2013/0021377 | A1 | 1/2013 | Doll | |
| 2013/0073939 | A1 | 3/2013 | Honsowetz | |
| 2013/0073940 | A1* | 3/2013 | Honsowetz | G06F 40/18 715/220 |
| 2013/0091419 | A1 | 4/2013 | Caliman et al. | |
| 2014/0372854 | A1* | 12/2014 | Otero | G06F 40/18 715/219 |
| 2015/0081727 | A1* | 3/2015 | Zarras | G06F 40/30 707/755 |
| 2015/0082137 | A1 | 3/2015 | Zarpas | |
| 2015/0149893 | A1 | 5/2015 | Lukic et al. | |
| 2015/0169530 | A1* | 6/2015 | Otero | G06F 40/106 715/219 |
| 2015/0169532 | A1 | 6/2015 | Otero et al. | |
| 2015/0199328 | A1 | 7/2015 | Danziger et al. | |
| 2015/0254226 | A1 | 9/2015 | Renshaw et al. | |
| 2016/0055139 | A1 | 2/2016 | Creason et al. | |
| 2016/0124932 | A1 | 5/2016 | Chen et al. | |
| 2016/0142488 | A1 | 5/2016 | Adler et al. | |
| 2016/0371249 | A1 | 12/2016 | Chilakamarri et al. | |
| 2017/0004125 | A1 | 1/2017 | Honsowetz | |
| 2017/0124046 | A1 | 5/2017 | Campbell et al. | |
| 2017/0124049 | A1 | 5/2017 | Campbell et al. | |
| 2017/0124053 | A1* | 5/2017 | Campbell | G06F 40/18 |
| 2017/0124054 | A1 | 5/2017 | Campbell et al. | |
| 2017/0124142 | A1 | 5/2017 | Becker et al. | |
| 2019/0012305 | A1 | 1/2019 | Dvorak | |
| 2019/0012306 | A1 | 1/2019 | Dvorak | |
| 2019/0215172 | A1* | 7/2019 | Hite | H04L 12/1822 |
| 2019/0340219 | A1 | 11/2019 | Schoedl | |
| 2019/0340252 | A1* | 11/2019 | Huyghe | G06F 16/438 |
| 2020/0034415 | A1 | 1/2020 | Gordon et al. | |
| 2020/0167321 | A1 | 5/2020 | Sheehan et al. | |
| 2020/0184149 | A1 | 6/2020 | Honsowetz et al. | |
| 2020/0257852 | A1 | 8/2020 | Canton et al. | |
| 2020/0285694 | A1 | 9/2020 | Nield | |
| 2020/0302013 | A1* | 9/2020 | Stegmaier | G06F 3/0482 |
| 2021/0209296 | A1 | 7/2021 | Prakash et al. | |

OTHER PUBLICATIONS

"Apply multiple styles to single text selection", Microsoft Community , answers.microsoft, com, Apr. 9, 2018, 3 pages (accessed Apr. 21, 2020 at https://answers.microsoft.com/en-us/msoffice/forum/msoffice_word-mso_mac-mso_mac2011/apply-multiple-styles-to-single-text-selection/654ca4ad-a202-43aa-b7e1-b4c7cdea5acb).

Understanding Styles in Microsoft Word—A Tutorial in the Intermediate Users Guide to Microsoft Word, last edited by Charles Kenyon on Apr. 30, 2017, retrieved from http://www.addbalance.com/usersguide/styles.htm, archived on Jun. 30, 2017, 55 pages.

"Copying Formulas and using Relative and Absolute Cell References Tutorial", Mar. 16, 2016, www.teststeststests. com, pp. 1-13 (Year: 2016).

"How to create and share custom Stylesheets in Microsoft Word", PC World Magazine, Sep. 14, 2014, 13 pages (downloaded from https://web.archive.org/web/20140914082635/https://www.pcworld.com/article/2156364/how-to-create-and-share-custom-style-sets.html Jan. 6, 2021).

Sartain, JD, "How to create and share custom Style Sheets in Wordand PowerPoint", PC World Magazine, Aug. 8, 2018, 11 pages (downloaded from https://www.pcworld.com/article/2156364/how-to-create-and-share-custom-style-sets.html 1/62021).

Mynda Treacy, Excel Vlookup Multiple Sheets, Nov. 21, 2012, My Online Training Hub, pp. 1-7 (Year: 2012).

Microsoft Support—Turn on or off automatic bullets or numbering (downloaded from https://support.microsoft.com/en-us/office/turn-on-or-off-automatic-bullets-or-numbering-ac3d9d00-0bb6-4421-92a6-f73e564ce71e>.

Microsoft Support—Define new bullets, numbers, and multilevel lists (downloaded from https://support.microsoft.com/en-us/office/define-new-bullets-numbers-and-multilevel-lists-6c06ef65-27ad-4893-80c9-0b944cb81f5f#style <https://support.microsoft.com/

(56) References Cited

OTHER PUBLICATIONS en-us/office/define-new-bullets-numbers-and-multilevel-lists-6c06ef65-27ad-4893-80c9-0b944cb81f5f> >. ).

* cited by examiner

Example
File Edit View Inse
A1
=10*(A5
250 ×
A
B
=10*(A5
25
90
dog
332
343
353
335
326
A1
=10*(A5+A7
=10*(A5+A7
25
90
dog
355
345
338
329
A1
=10*(A5+A7)
=10*(A5+A7)
25
90
dog
365
374
384
A1
=10*(A5+A7))
#ERROR!
25
90
dog
387
388
A1
=10*(A5+A7))
#ERROR!
Error
Formula parse error.
25
90
dog 432
423
433
A1
=1+B1
A
B
1
2
=1+B1
dog
441
442
435
436
427
448
A1
=1+B1
A
B
C
D
#VALUE!
Error
Function ADD parameter 2 expects number values. But 'dog' is a text and cannot be coerced to a number.
463
467
A1
=1+dog
=1+dog
472
A1
=1+dog
#NAME?
Error
Unknown range name: 'DOG'.
475
476
488

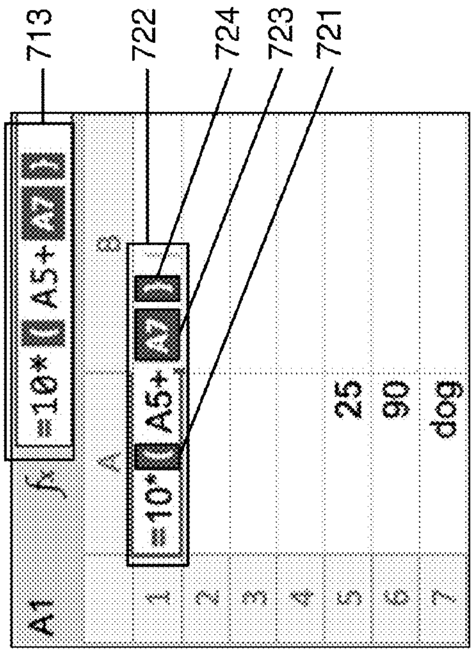
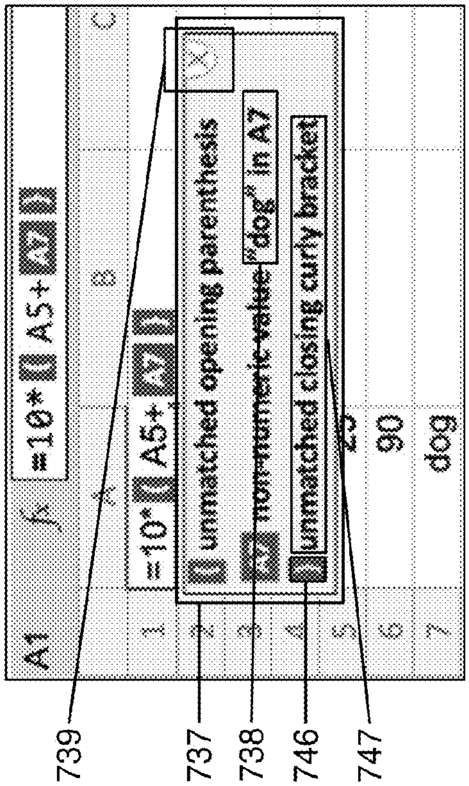
FIG. 7A
FIG. 7C
FIG. 7B
FIG. 7D
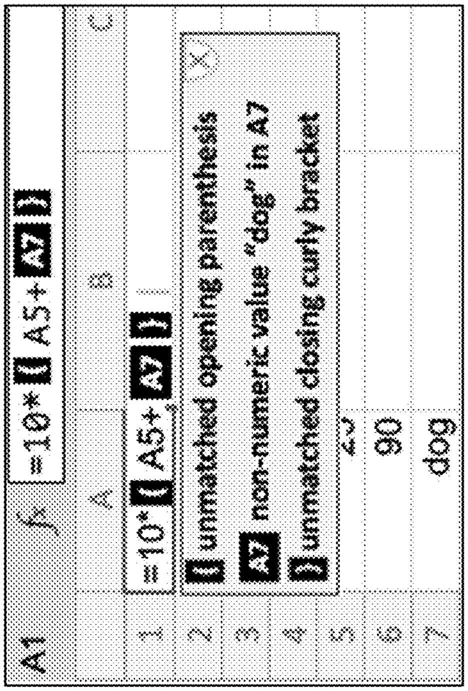
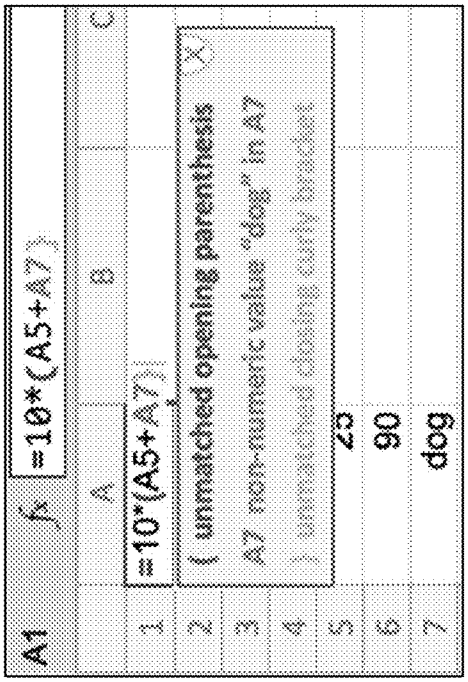

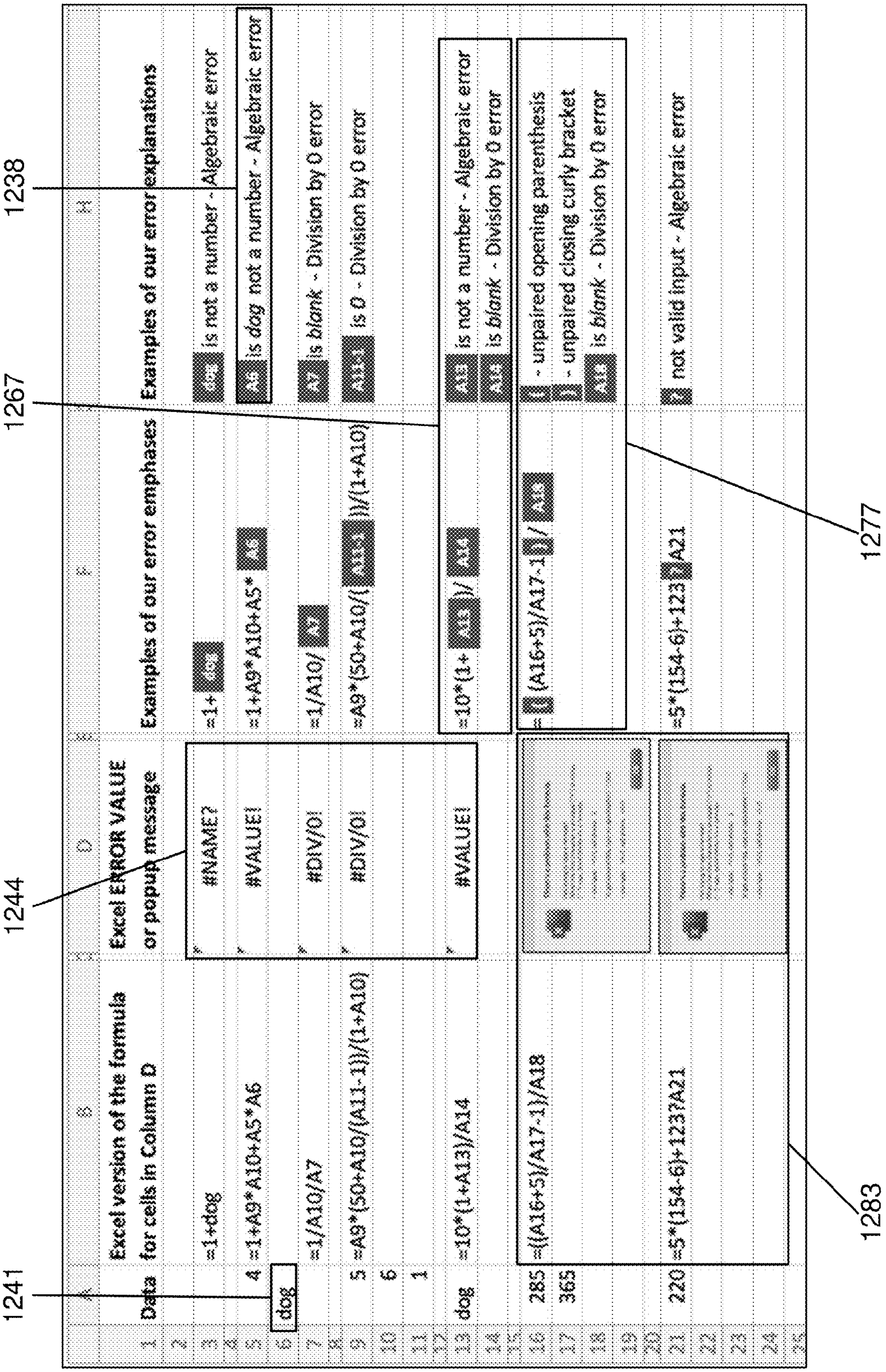

FIG. 12

| | A | B | D | F | H |
|---|---|---|---|---|---|
| 1 | Data | Excel version of the formula for cells in Column D | Excel ERROR VALUE or popup message | Examples of our error emphases | Examples of our error explanations |
| 2 | | | | | |
| 3 | | =1+dog | #NAME? | =1+ dog | dog is not a number - Algebraic error |
| 4 | | | | | |
| 5 | 4 | =1+A9*A10+A5*A6 | #VALUE! | =1+A9*A10+A5* A6 | A6 is *dog* not a number - Algebraic error |
| 6 | dog | | | | |
| 7 | | =1/A10/A7 | #DIV/0! | =1/A10/ A7 | A7 is *blank* - Division by 0 error |
| 8 | | | | | |
| 9 | 5 | =A9*(50+A10/(A11-1))/(1+A10) | #DIV/0! | =A9*(50+A10/( A11-1 ))/(1+A10) | A11-1 is *0* - Division by 0 error |
| 10 | 6 | | | | |
| 11 | 1 | | | | |
| 12 | | | | | |
| 13 | dog | =10*(1+A13)/A14 | #VALUE! | =10*(1+ A13 )/ A14 | A13 is not a number - Algebraic error<br>A14 is *blank* - Division by 0 error |
| 14 | | | | | |
| 15 | | | | | |
| 16 | 285 | =((A16+5)/A17-1}/A18 | | =( (A16+5)/A17-1 } / A18 | ( - unpaired opening parenthesis<br>} - unpaired closing curly bracket<br>A18 is *blank* - Division by 0 error |
| 17 | 365 | | | | |
| 18 | | | | | |
| 19 | | | | | |
| 20 | | | | | |
| 21 | 220 | =5*(154-6)+123?A21 | | =5*(154-6)+123 ? A21 | ? not valid input - Algebraic error |
| 22 | | | | | |
| 23 | | | | | |
| 24 | | | | | |
| 25 | | | | | |

FIG. 15A
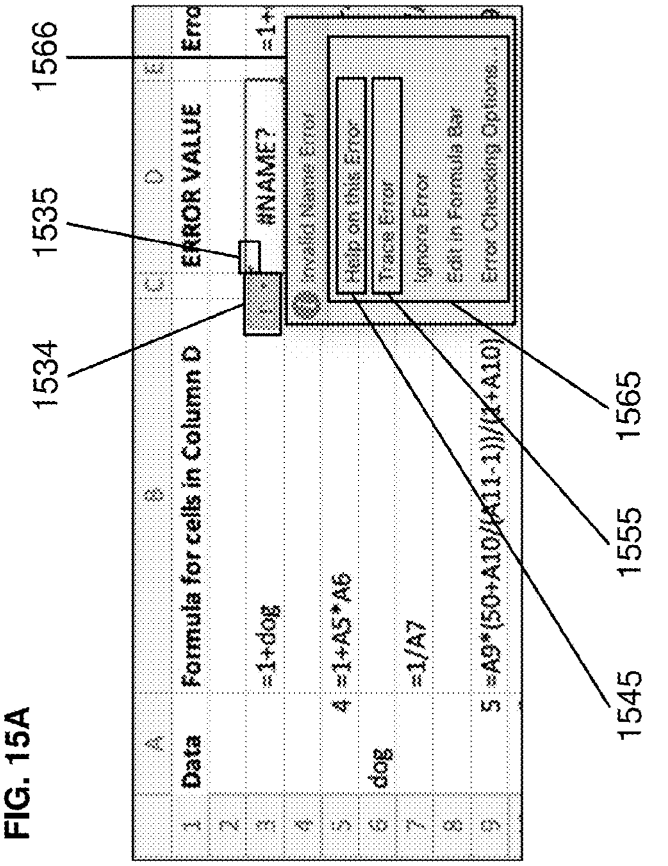
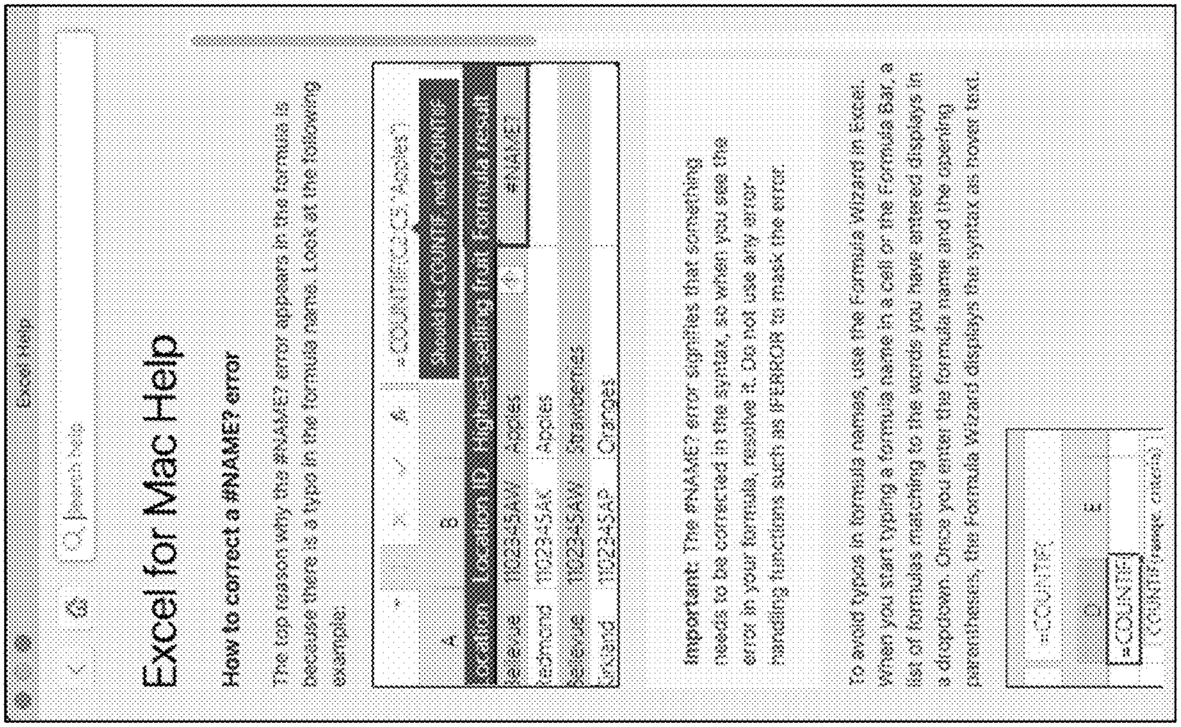
FIG. 15B
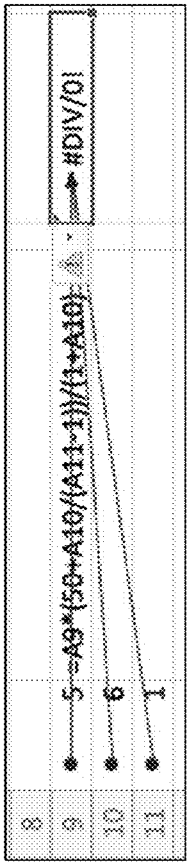
FIG. 15C

A1
=3*(10*(A5+A7)-0.095*(A5/C5+A7/C7)+2*(B6-0.91*C6)}
1716

=3*(10*(A5+A7)-0.095*(A5/C5+A7/C7)+2*(B6-0.91*C6)}
1724
1734
1744
Matching
Donat
A
B
A
Error!
=3*(10*(A5+A7)-0.095*(
unmatched opening parenthesis
1746
A5/C5+A7/C7)+2*(B6-0.91*C6)
0 in C5 causing #DIV/0 error
}
unmatched closing curly bracket
1747
Cancel
A1
=3*(10*(A5+A7)-0.095*(A5/C5+A7/C7)+2*(B6-0.91*C6)}
1756
=3*(10*(A5+A7)-0.095*(A5/C5+A7/C7)+2*(B6-0.91*C6)}
1764
1787
Matching
Donat
Error!
1774
=3*(10*(A5+A7)-0.095*(A5/C5+A7/C7)+
2*(B6-0.91*C6)}
1778
1776
1775
1783
unmatched opening parenthesis
1786
1784
0 in C5 causing #DIV/0 error
1793
unmatched closing curly bracket
Cancel
1785

1816
1815
1814
1822
1824
1834
1832
1835
1842
1844
B1
=10*(1+ A1 )/ A2
A
B
C
D
dog
#VALUE!
1
2
3
4
Sheet1 Sheet2 Sheet3 Chart1 Data
B1:
A1 is 'dog' not a number - Algebraic text error
A2 is blank - Division by 0 error
1856
1862
1863
1864
1873
1874
1875
1882
1884
1892
1894
1885
B1
=10*(1+A1)/A2
A
B
C
D
dog
#VALUE!
=10*(1+ A1 )/ A2
A1 is 'dog' not a number – Algebraic text error
A2 is blank – Division by 0 error
1
2
3
4
5
6
7

2232
2223
2245
2255
2276
2265
Formula Builder
Show All Functions
IF
2249
2248
2247
2258
2268
Formula Builder
Show All Functions
IF
Logical_test = #VALUE!
B3.C3
Value_if_true = any
Value_if_false = any
2288
Formula Builder
Show All Functions
IF
Logical_test = #VALUE!
B3.C3
Value_if_true = "B greater than C"
"B greater than C"
Value_if_false =
"C greater than B
2284
2291
IF
=IF(B3.C3)
A
B
=IF(B3.C3)

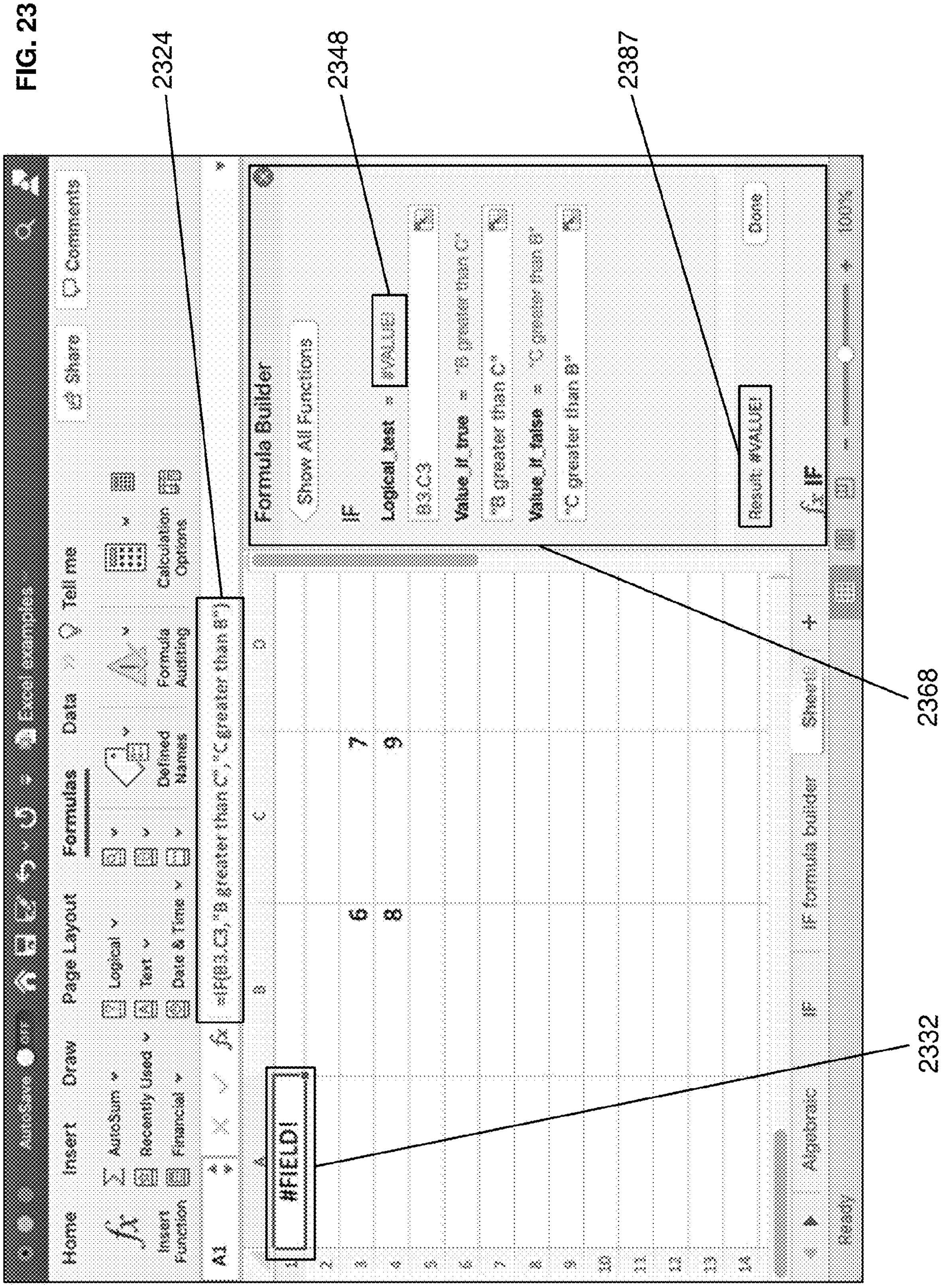

FIG. 23
2324
2348
2387
2332
2368
AutoSave
Excel examples
Home
Insert
Draw
Page Layout
Formulas
Data
Tell me
Share
Comments
Insert Function
AutoSum
Recently Used
Financial
Logical
Text
Date & Time
Defined Names
Formula Auditing
Calculation Options
A1
=IF(B3.C3,"B greater than C","C greater than B")
#FIELD!
6
7
8
9
Formula Builder
Show All Functions
IF
Logical_test = #VALUE!
B3.C3
Value_if_true = "B greater than C"
"B greater than C"
Value_if_false = "C greater than B"
"C greater than B"
Result: #VALUE!
Done
fx IF
Algebraic
IF
IF formula builder
Ready
100%

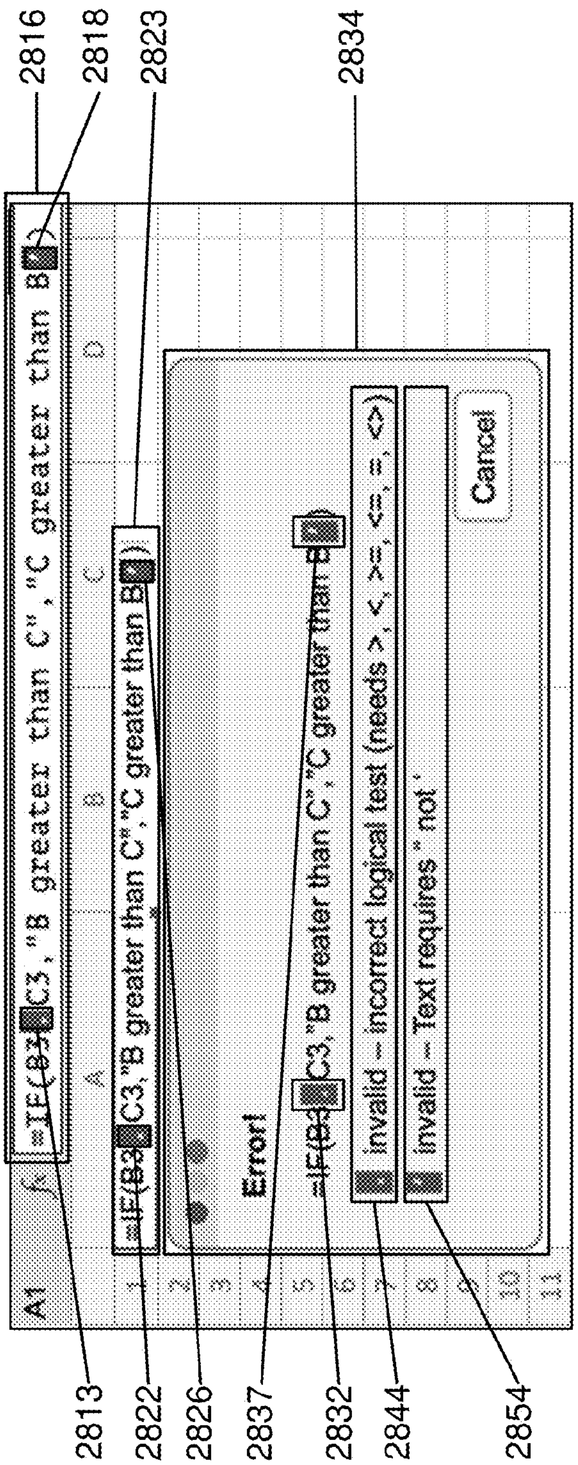

FIG. 28A
2816
2818
2823
2834
=IF(B3 C3, "B greater than C", "C greater than B'
=IF(B3 C3,"B greater than C","C greater than B
Error!
=IF(B3 C3,"B greater than C","C greater than B
invalid – incorrect logical test (needs >, <, >=, <=, =, <>)
invalid – Text requires " not '
Cancel
A1
A
B
C
D
2813
2822
2826
2837
2832
2844
2854

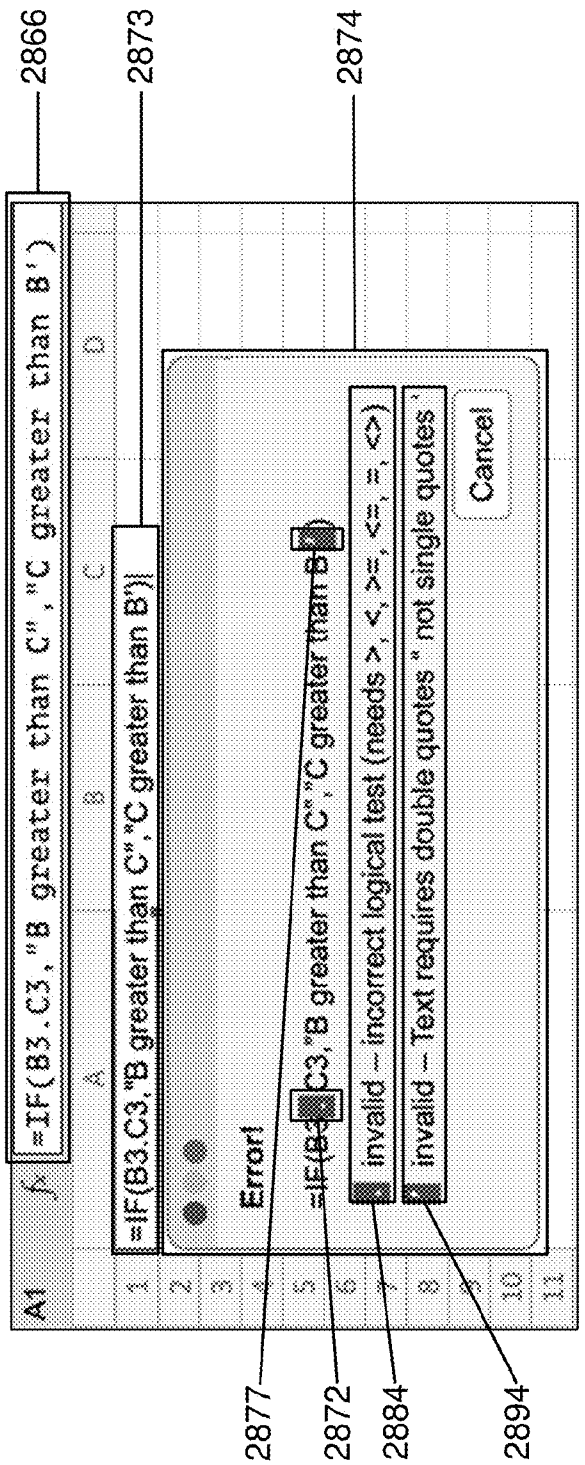

FIG. 28B
2866
2873
2874
=IF(B3,C3,"B greater than C","C greater than B')
=IF(B3,C3,"B greater than C","C greater than B')
Error!
=IF(B3 C3,"B greater than C","C greater than B
invalid – incorrect logical test (needs >, <, >=, <=, =, <>)
invalid – Text requires double quotes " not single quotes '
Cancel
2877
2872
2884
2894

C4
=donation{ donor_num{ B3 },!-1 )
3115
3112
A B C D E
LARGEST DONATION
Donor name
Donor num
Largest donation
Christian Elmont
10001
= donation{ donor_num{ B3 },!-1 )
3136
Incomplete formulaic data field donation{
3145
donor_num{} needs a number B3 is text 'Donor num'
3146
) unmatched closing parenthesis

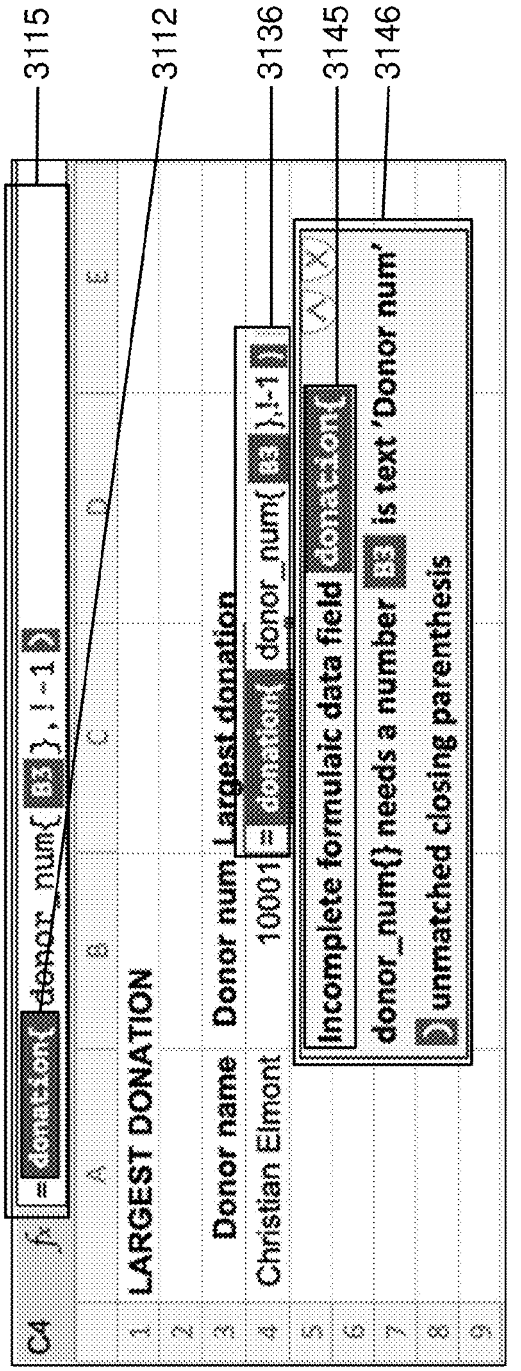

FIG. 31A
C4
=donation{donor_num{B3},!-1)
3165
LARGEST DONATION
Donor name
Donor num
Largest donation
Christian Elmont
10001
=donation{donor_num{B3},!-1)
3175
= donation{ donor_num{ B3 },!-1 )
3174
Incomplete formulaic data field donation{
3186
donor_num{} needs a number B3 is text 'Donor num'
3196
) unmatched closing parenthesis

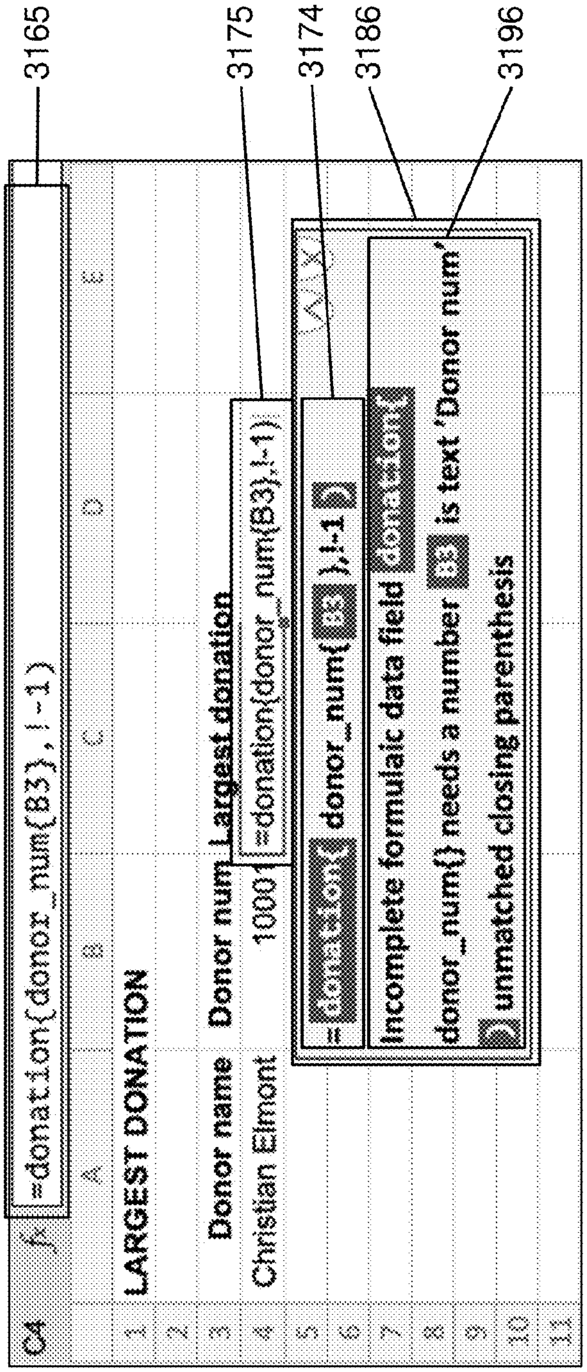

FIG. 31B

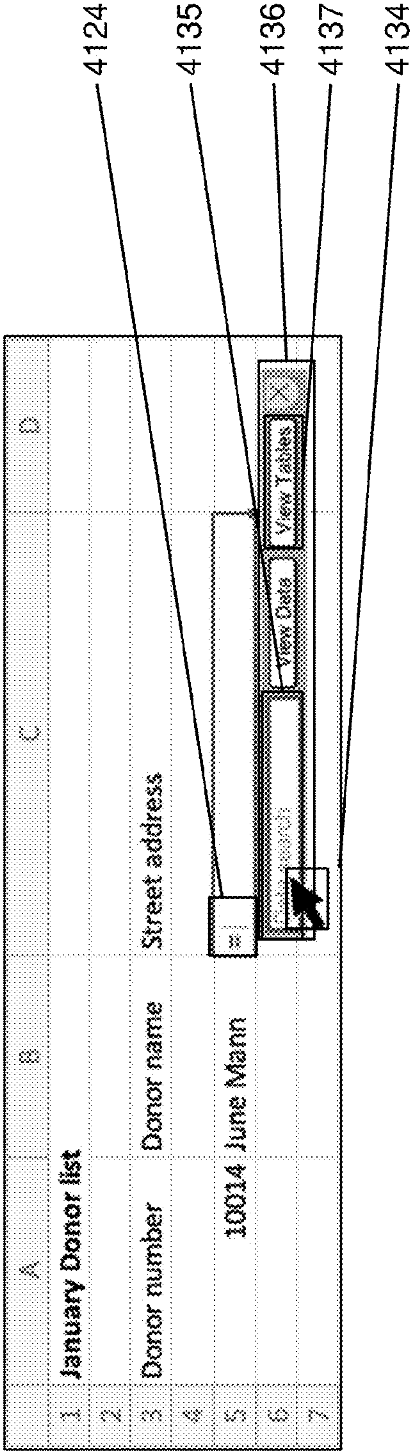

FIG. 41A
A
B
C
D
1 January Donor list
3 Donor number
Donor name
Street address
5 10014 June Mann
View Data
View Tables
4124
4135
4136
4137
4134

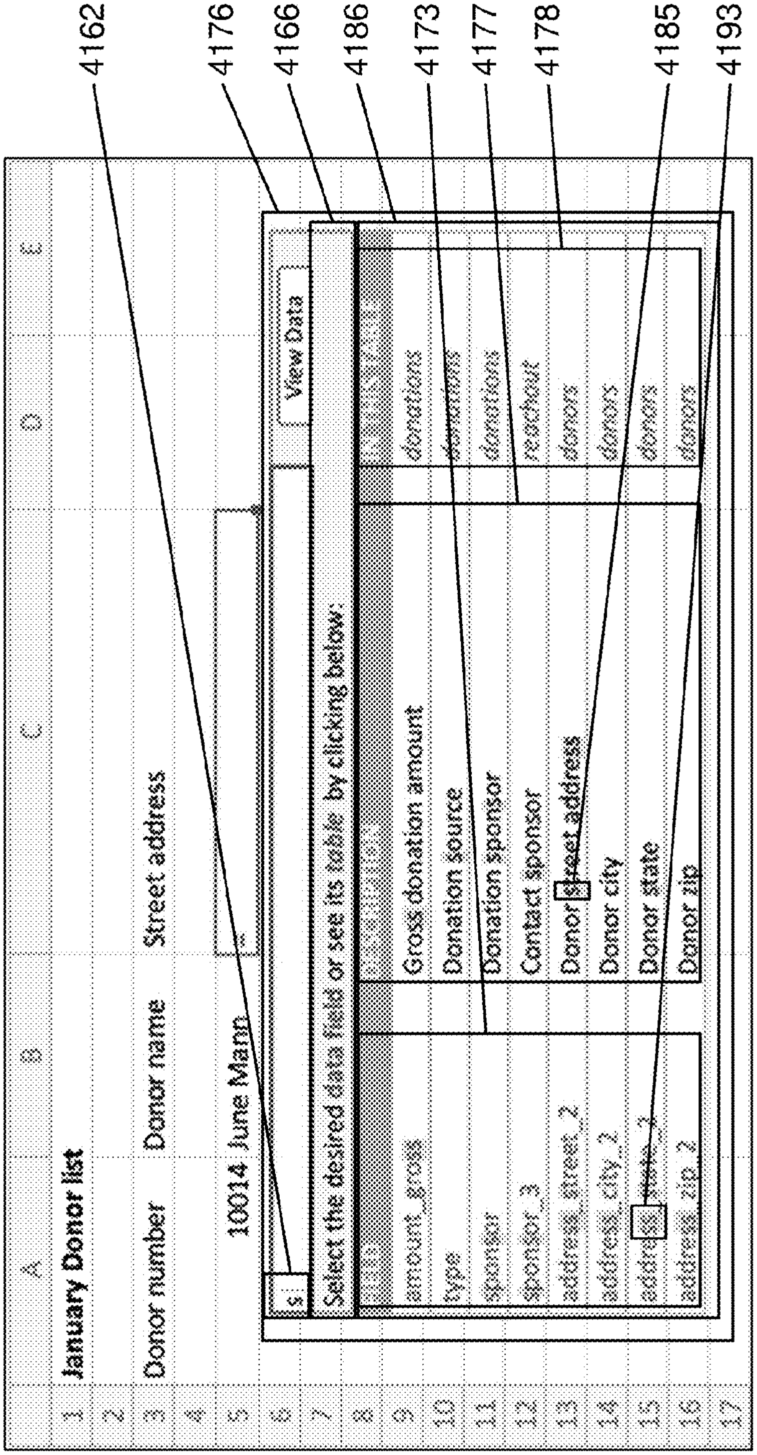

FIG. 41B
A
B
C
D
E
1 January Donor list
3 Donor number
Donor name
Street address
5 10014 June Mann
View Data
Select the desired data field or see its table by clicking below:
amount_gross
type
sponsor
sponsor_3
address_street_2
address_city_2
address_zip_2
Gross donation amount
Donation source
Donation sponsor
Contact sponsor
Donor street address
Donor city
Donor state
Donor zip
donations
reachout
donors
4162
4176
4166
4186
4173
4177
4178
4185
4193

A
B
C
D
E
January Donor list
Donor number
Donor name
Street address
10014
June Mann
=
s
View Data
Select the desired data field or see its table by clicking below:
FIELD
DESCRIPTION
IN THIS TABLE
amount_gross
Gross donation amount
donations
type
Donation source
donations
sponsor
Donation sponsor
donations
sponsor_3
Contact sponsor
reachout
Donor street address
donors
Donor city
donors
address_state_2
Donor state
donors
address_zip_2
Donor zip
donors
4263
4262

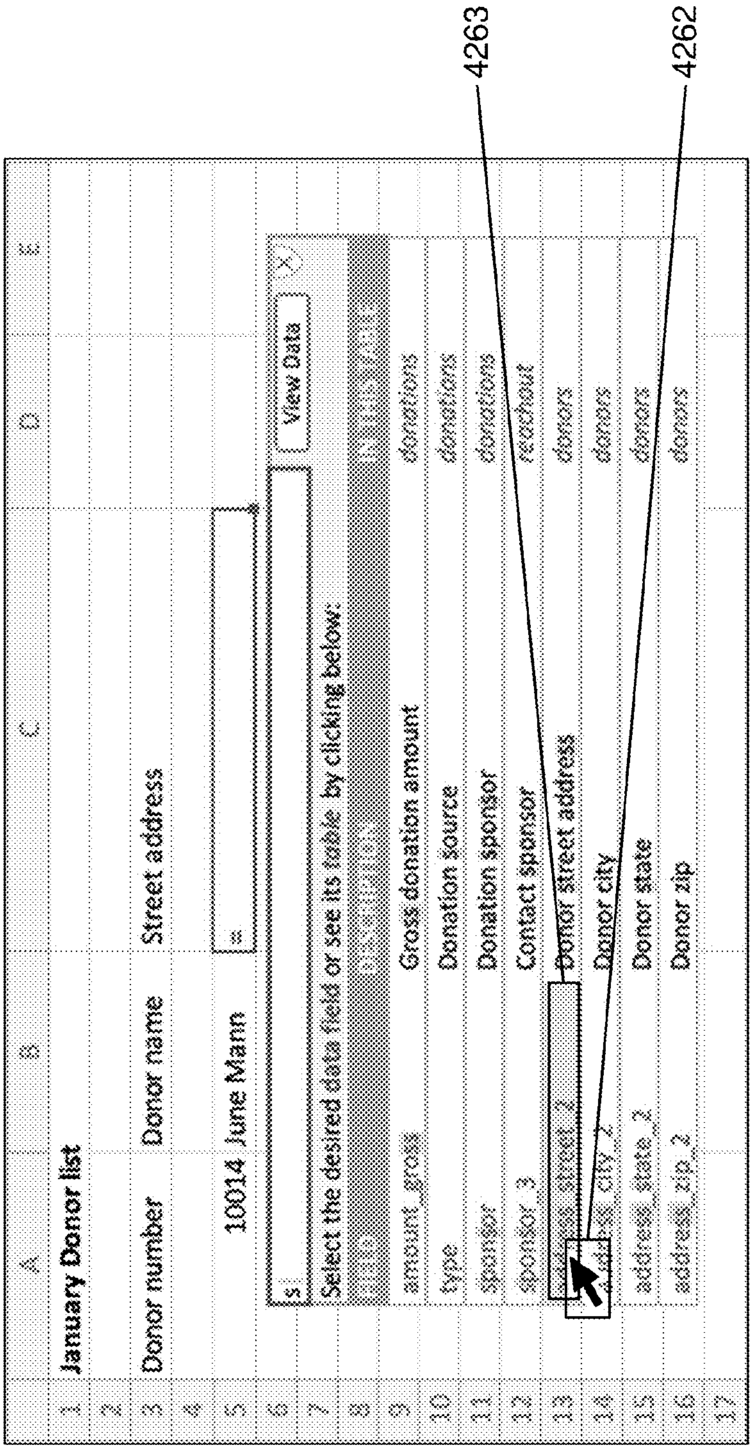

FIG. 42A
A
B
C
D
January Donor list
Donor number
Donor name
Street address
10014
June Mann
=address_street_2( )
4295

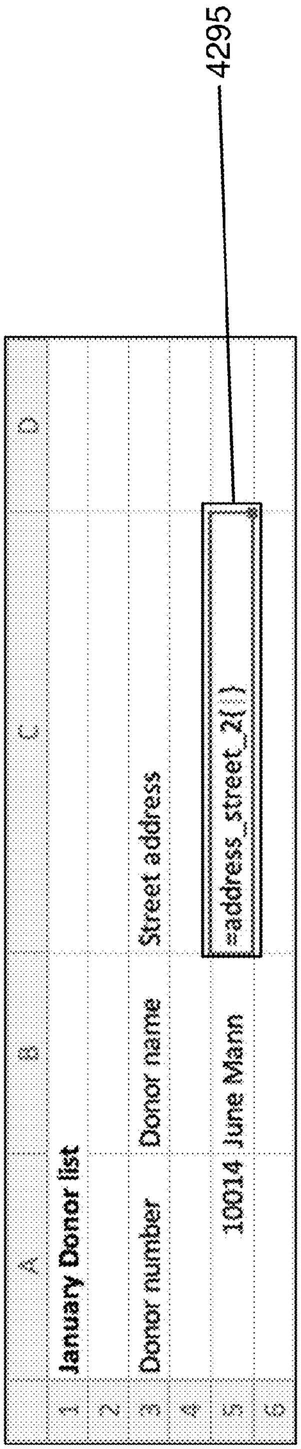

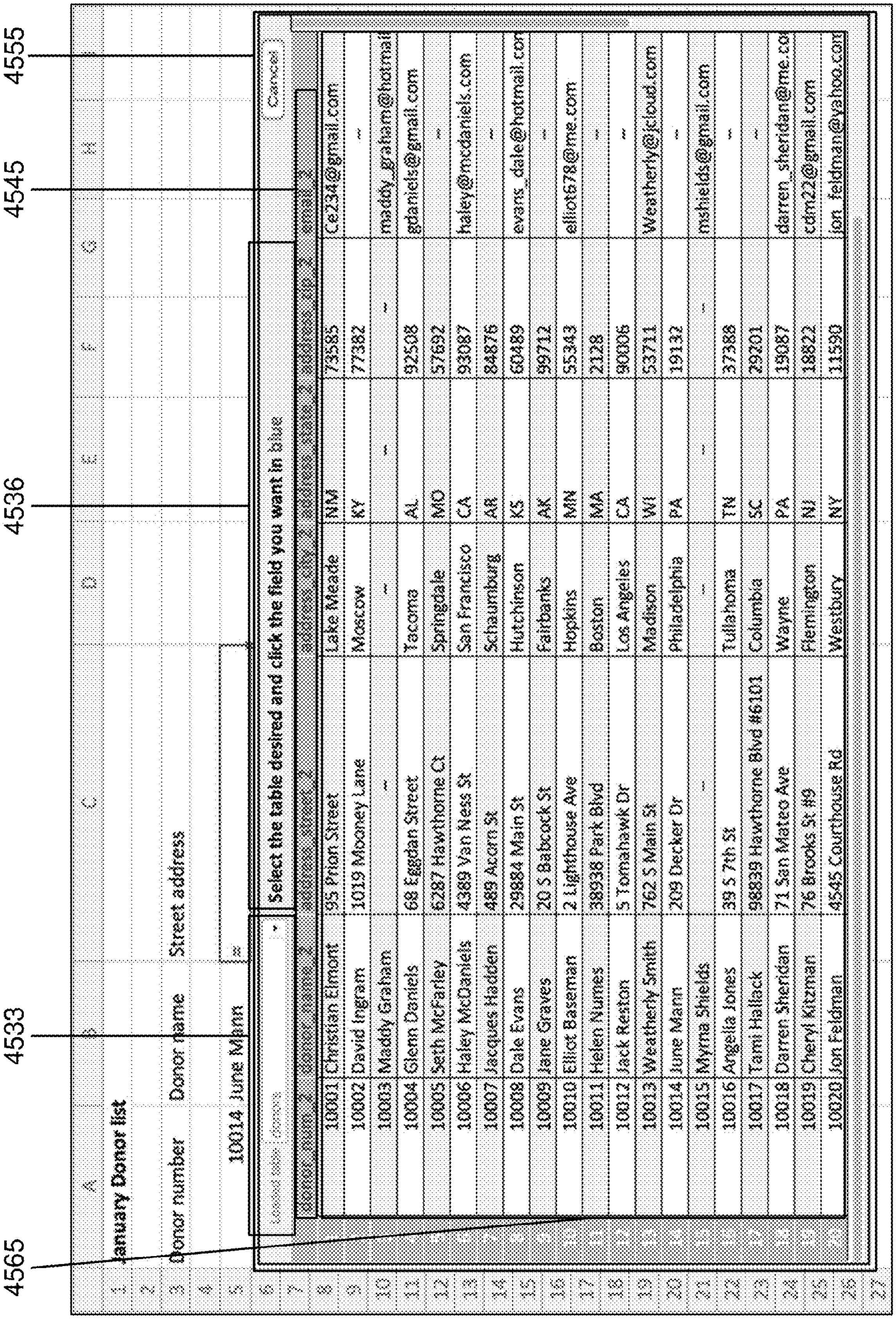

| donor_num_2 | donor_name_2 | address_street_2 | address_city_2 | address_state_2 | address_zip_2 | email_2 |
|---|---|---|---|---|---|---|
| 10001 | Christian Elmont | 95 Prion Street | Lake Meade | NM | 73585 | Ce234@gmail.com |
| 10002 | David Ingram | 1019 Mooney Lane | Moscow | KY | 77382 | – |
| 10003 | Maddy Graham | – | – | – | – | maddy_graham@hotmail |
| 10004 | Glenn Daniels | 68 Eggdan Street | Tacoma | AL | 92508 | gdaniels@gmail.com |
| 10005 | Seth McFarley | 6287 Hawthorne Ct | Springdale | MO | 57692 | – |
| 10006 | Haley McDaniels | 4389 Van Ness St | San Francisco | CA | 93087 | haley@mcdaniels.com |
| 10007 | Jacques Hadden | 489 Acorn St | Schaumburg | AR | 84876 | – |
| 10008 | Dale Evans | 29884 Main St | Hutchinson | KS | 60489 | evans_dale@hotmail.com |
| 10009 | Jane Graves | 20 S Babcock St | Fairbanks | AK | 99712 | – |
| 10010 | Elliot Baseman | 2 Lighthouse Ave | Hopkins | MN | 55343 | elliot678@me.com |
| 10011 | Helen Numes | 38938 Park Blvd | Boston | MA | 2128 | – |
| 10012 | Jack Reston | 5 Tomahawk Dr | Los Angeles | CA | 90006 | – |
| 10013 | Weatherly Smith | 762 S Main St | Madison | WI | 53711 | Weatherly@jcloud.com |
| 10014 | June Mann | 209 Decker Dr | Philadelphia | PA | 19132 | – |
| 10015 | Myrna Shields | – | – | – | – | mshields@gmail.com |
| 10016 | Angelia Jones | 39 S 7th St | Tullahoma | TN | 37388 | – |
| 10017 | Tami Hallack | 98839 Hawthorne Blvd #6101 | Columbia | SC | 29201 | – |
| 10018 | Darren Sheridan | 71 San Mateo Ave | Wayne | PA | 19087 | darren_sheridan@me.co |
| 10019 | Cheryl Kitzman | 76 Brooks St #9 | Flemington | NJ | 18822 | cdm22@gmail.com |
| 10020 | Jon Feldman | 4545 Courthouse Rd | Westbury | NY | 11590 | jon_feldman@yahoo.com |

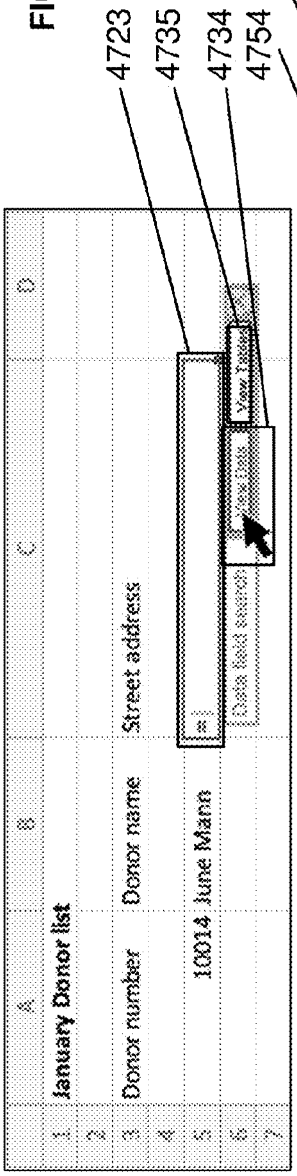

FIG. 47A
4723
4735
4734
January Donor list
Donor number
Donor name
Street address
10014 June Mann
Data field search

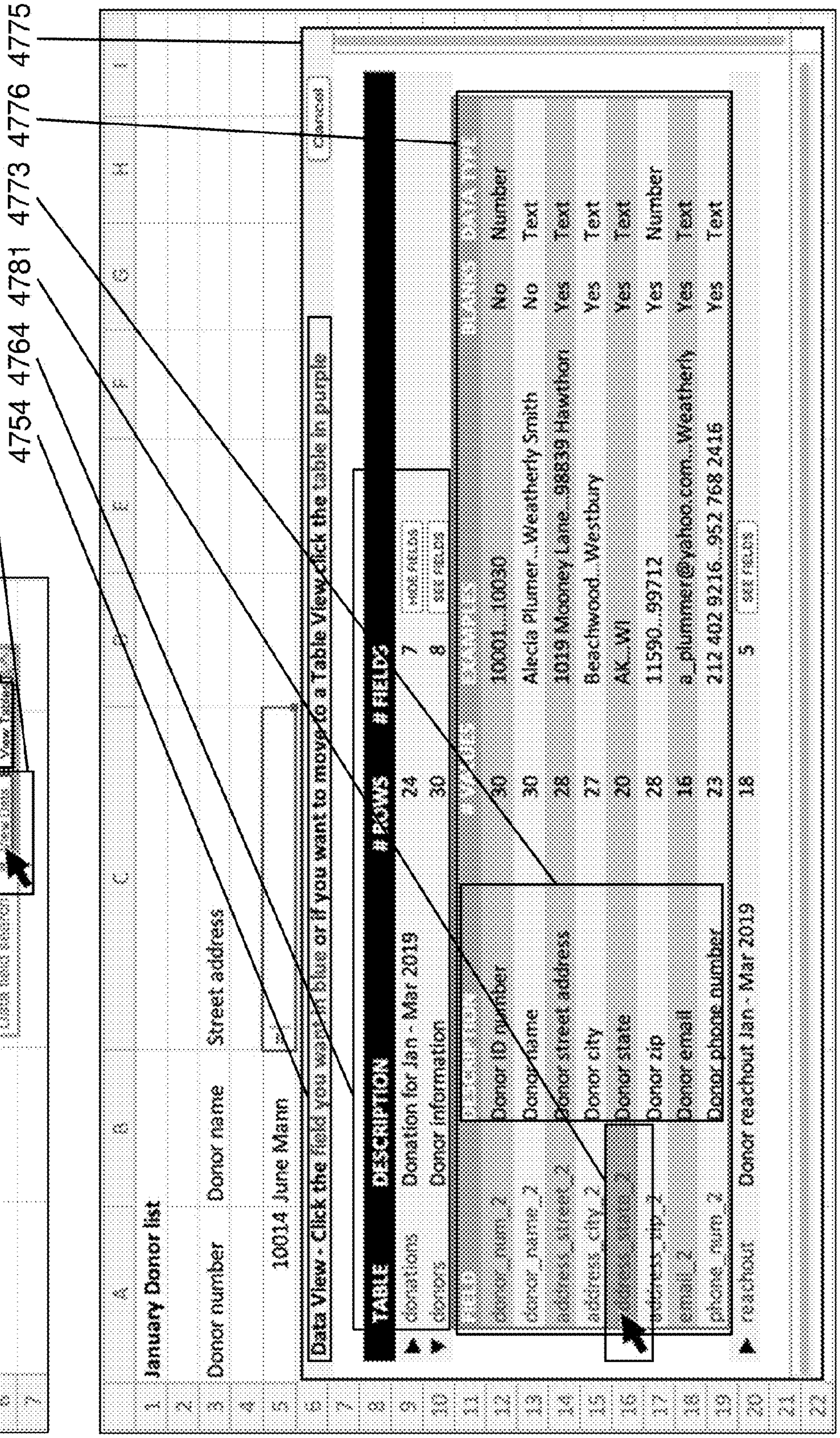

FIG. 47B
4754 4764 4781 4773 4776 4775
January Donor list
Donor number
Donor name
Street address
10014 June Mann
Data View - Click the field you want in blue or if you want to move to a Table View click the table in purple
Cancel
TABLE
DESCRIPTION
ROWS
FIELDS
donations
Donation for Jan - Mar 2019
24
7
HIDE FIELDS
donors
Donor information
30
8
SEE FIELDS
donor_num_2
Donor ID number
30
10001...10030
No
Number
donor_name_2
Donor name
30
Alecia Plumer...Weatherly Smith
No
Text
address_street_2
Donor street address
28
1019 Mooney Lane...98839 Hawthon
Yes
Text
address_city_2
Donor city
27
Beachwood...Westbury
Yes
Text
Donor state
20
AK...WI
Yes
Text
address_zip_2
Donor zip
28
11590...99712
Yes
Number
email_2
Donor email
16
a_plummer@yahoo.com...Weatherly
Yes
Text
phone_num_2
Donor phone number
23
212 402 9216...952 768 2416
Yes
Text
reachout
Donor reachout Jan - Mar 2019
18
5
SEE FIELDS B2
= SUM( amount_gross( date(
7913
= SUM( amount_gross( date(
7923
Can constrain date to one of the following:
7932
1/3/19 Earliest date date
3/28/19 Latest date date
See more values...
[1 or {} Earliest date date (changes as data changes)
[-1 Latest date date (changes as data changes)
All date dates within the specified date range
See matching fields in other tables
See more...

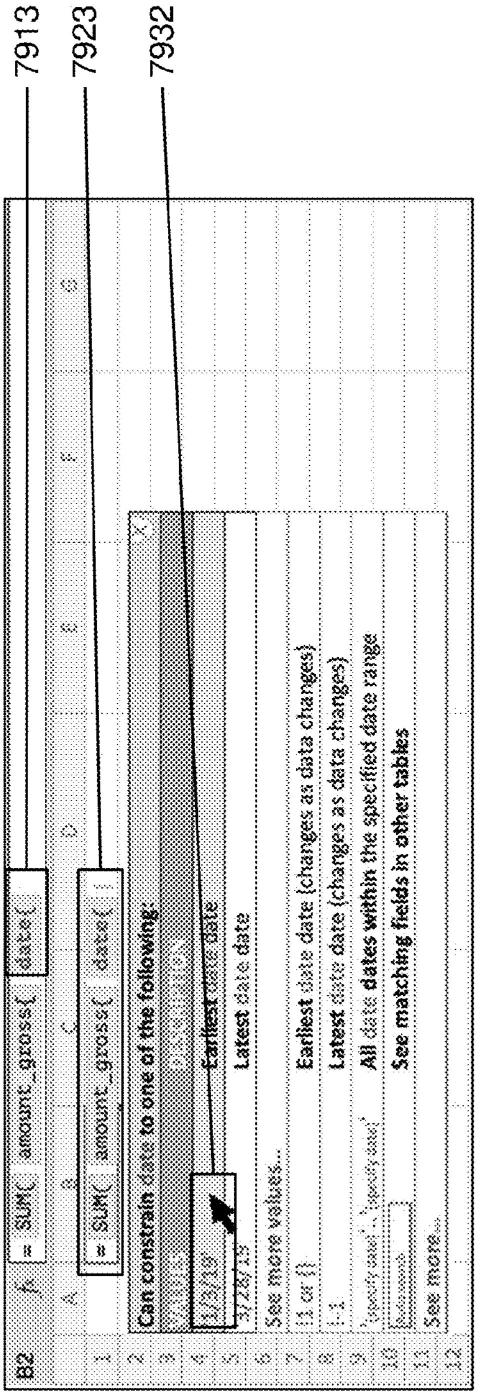

FIG. 79A
= SUM( amount_gross( date('1/3/19')
= SUM( amount_gross( date('1/3/19')
7964
SUM(
Can select or further constrain amount_gross through one of the below:
{ } or !ALL All remaining amount_gross values
All remaining amount_gross values greater than specified value
See more...
15 To SUM all remaining 15 values (lowest value)
1900 To SUM all remaining 1900 values (highest value)
See more values...
7985

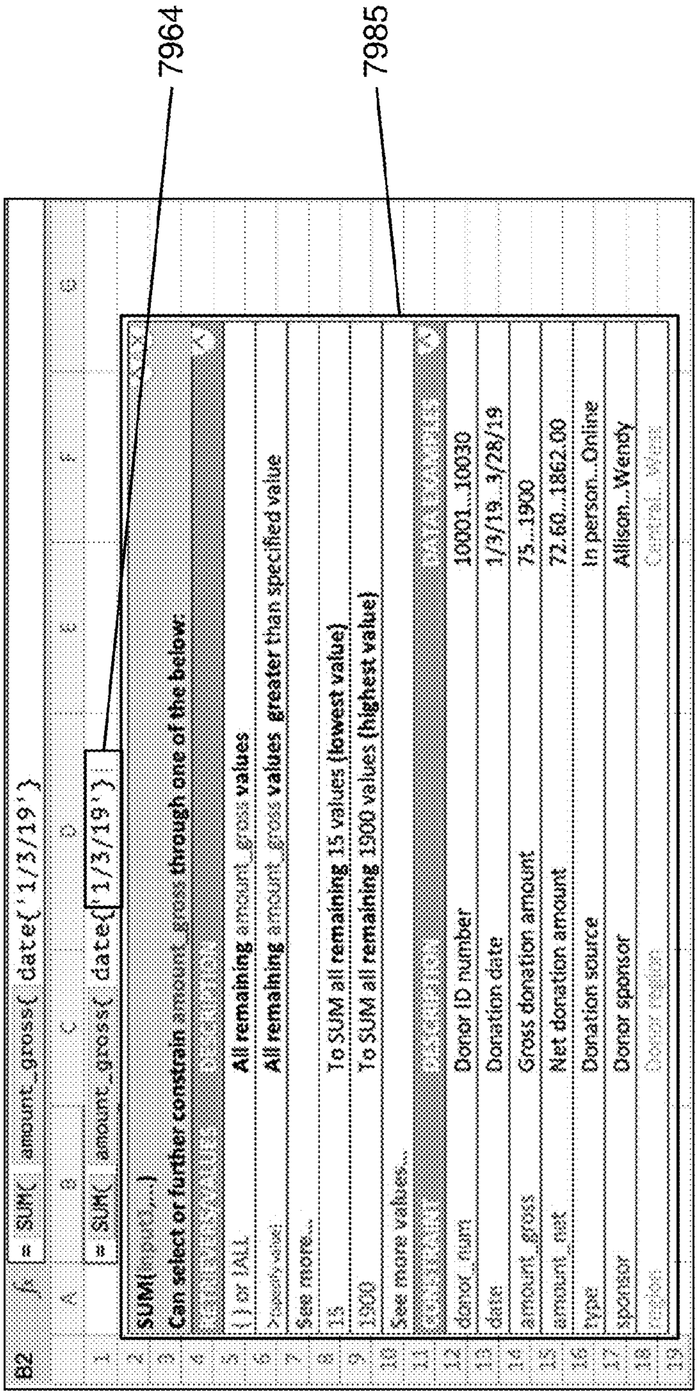

FIG. 79B
donor_num Donor ID number 10001...10030
date Donation date 1/3/19...3/28/19
amount_gross Gross donation amount 75...1900
amount_net Net donation amount 72.60...1862.00
type Donation source In person...Online
sponsor Donor sponsor Allison...Wendy D4
= SUM()
A
B
C
D
E
F
TOTAL DONATIONS FOR SPECIFIED REGION AND DATE
Region
Date
Total amount_gross
West
1/18/19
= SUM()
View Data
View Tables
9625
9637
9635

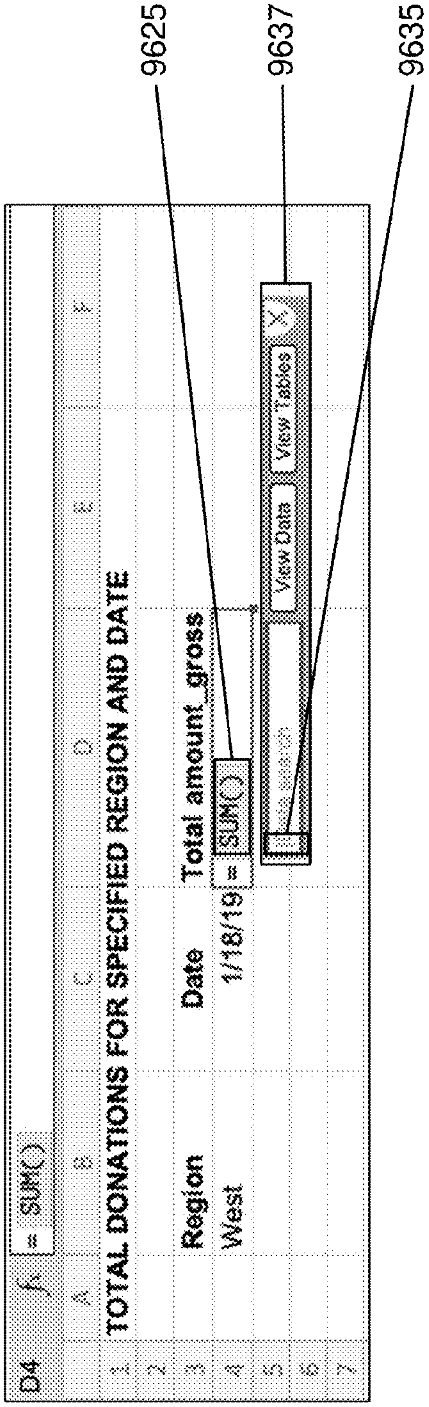

FIG. 96A
9651
9664
D4
= SUM()
A
B
C
D
E
F
TOTAL DONATIONS FOR SPECIFIED REGION AND DATE
Region
Date
Total amount_gross
West
1/18/19
= SUM()
dona
View Data
View Tables
Select the desired data field or see its table by clicking one below:
FIELD
DESCRIPTION
IN THIS TABLE
Gross donation amount
75...1900
donations
amount_net
Net donation amount
72.6...1862
donations
RESULT OF HITTING ENTER = MISSING ARUGUMENT ERROR
SUM() Missing function argument

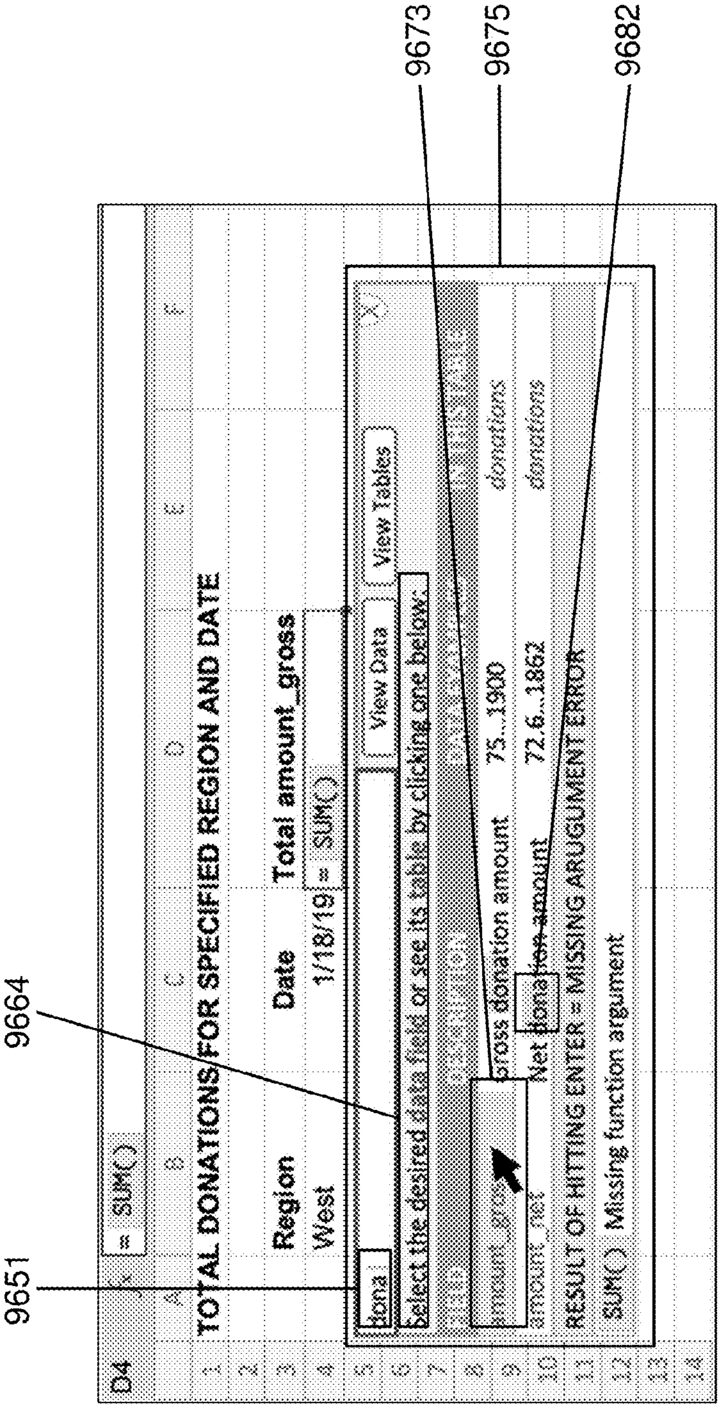

FIG. 96B
9673
9675
9682

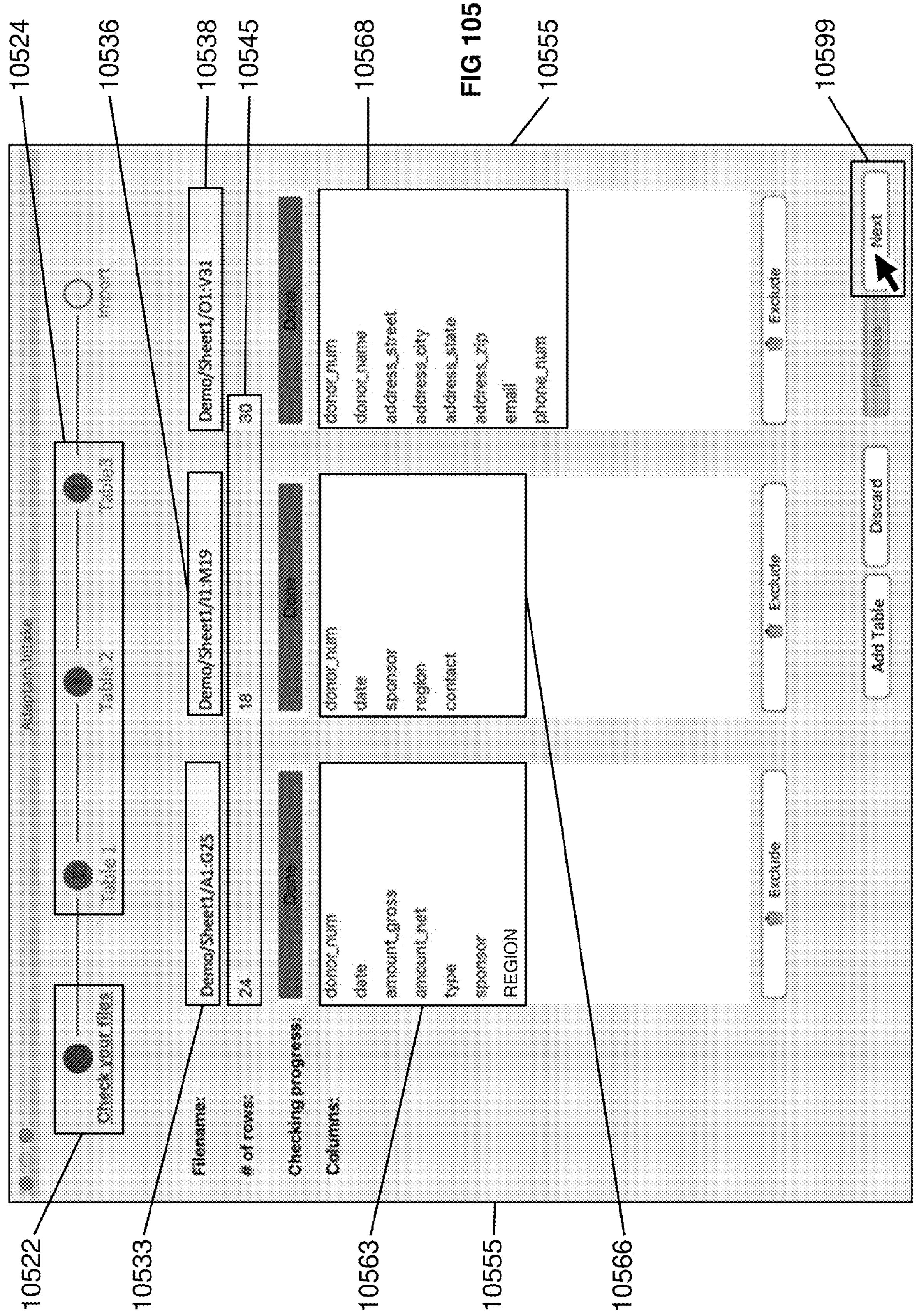

FIG 105
10522
10524
10533
10536
10538
10545
10555
10563
10566
10568
10599
Check your files
Table 1
Table 2
Table3
Filename:
# of rows:
Checking progress:
Columns:
Demo/Sheet1/A1:G25
Demo/Sheet1/I1:M19
Demo/Sheet1/O1:V31
24
18
30
donor_num
date
amount_gross
amount_net
type
sponsor
REGION
donor_num
date
sponsor
region
contact
donor_num
donor_name
address_street
address_city
address_state
address_zip
email
phone_num
Exclude
Exclude
Exclude
Add Table
Discard
Next FIG 108A
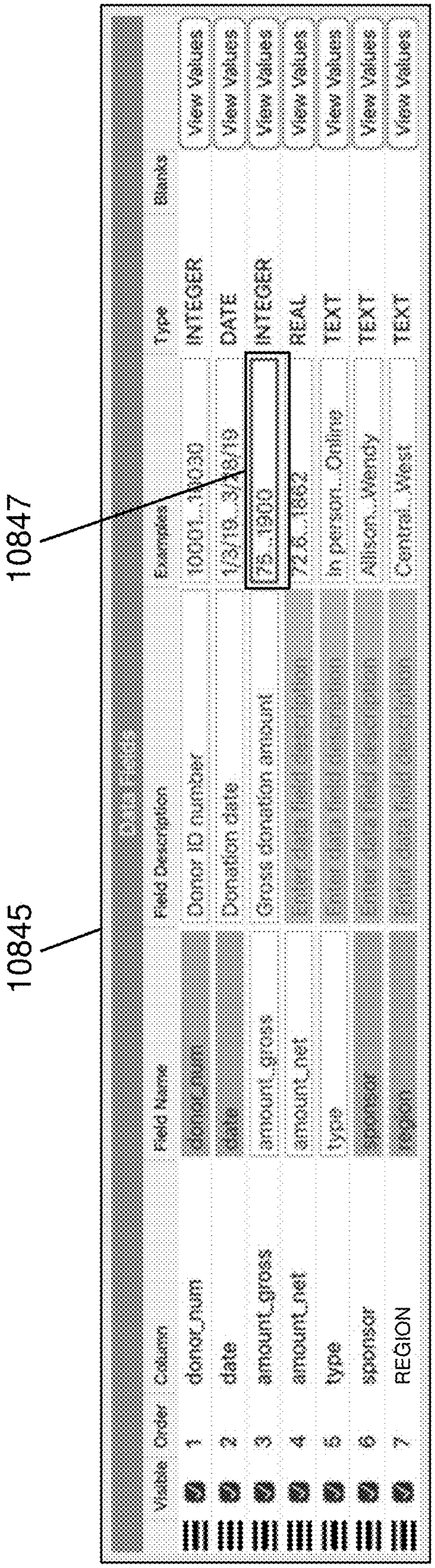
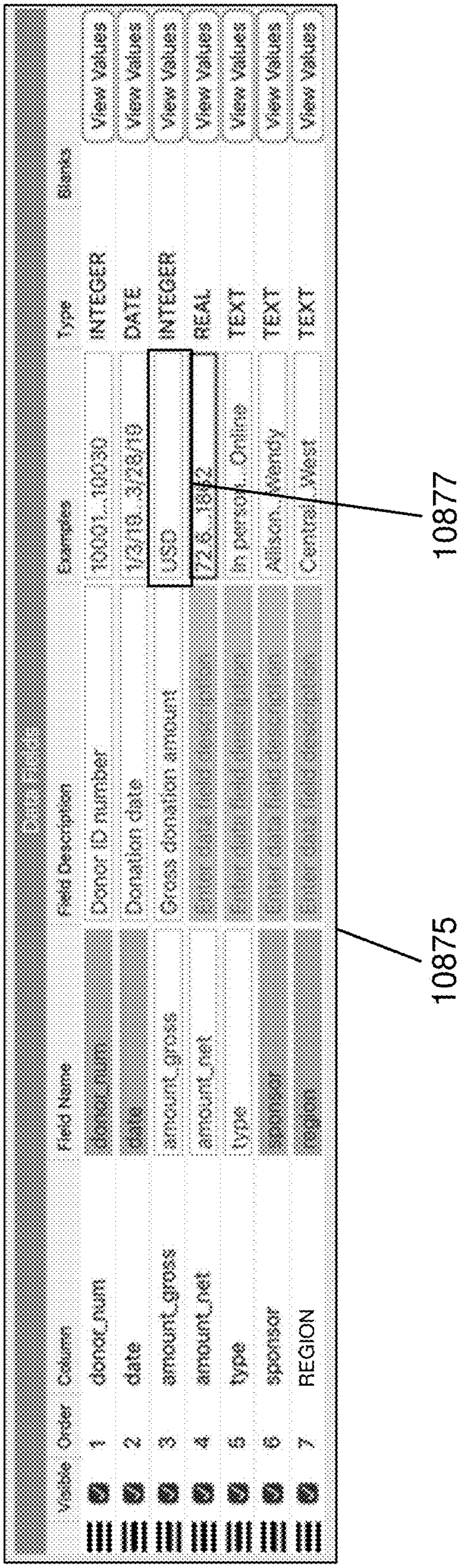
FIG 108B

| | donor_num | date | amount_gross | amount_net | type | sponsor | region |
|---|---|---|---|---|---|---|---|
| 1 | 10002 | 2/12/19 | 1200 | 1176.00 | In person | Sandy | South |
| 2 | 10008 | 2/15/19 | 1900 | 1862.00 | In person | Allison | Central |
| 3 | 10014 | 1/18/19 | 950 | 931.00 | In person | Julie | East |
| 4 | 10021 | 3/20/19 | 350 | 343.00 | In person | Julie | East |
| 5 | 10026 | 1/6/19 | 1600 | 1568.00 | In person | Harold | West |
| 6 | 10012 | 1/3/19 | 150 | 145.20 | mail | Wendy | West |
| 7 | 10012 | 2/4/19 | 150 | 145.20 | mail | Wendy | West |
| 8 | 10012 | 3/3/19 | 150 | 145.20 | mail | Wendy | West |
| 9 | 10018 | 1/25/19 | 475 | 459.80 | mail | Julie | East |
| 10 | 10019 | 1/29/19 | 75 | 72.60 | mail | Amy | East |
| 11 | 10019 | 2/27/19 | 75 | 72.60 | mail | Amy | East |
| 12 | 10019 | 3/28/19 | 75 | 72.60 | mail | Amy | East |
| 13 | 10028 | 1/29/19 | 125 | 121.00 | mail | Sandy | South |
| 14 | 10029 | 2/27/19 | 125 | 121.00 | mail | Sandy | South |
| 15 | 10030 | 2/16/19 | 400 | 387.20 | Mail | Allison | Central |
| 16 | 10030 | 3/28/19 | 125 | 121.00 | mail | Sandy | South |
| 17 | 10001 | 1/18/19 | 175 | 167.13 | Online | Wendy | West |
| 18 | 10003 | 1/30/19 | 100 | 95.50 | Online | none | Unknown |
| 19 | 10003 | 2/27/19 | 100 | 95.50 | Online | none | Unknown |
| 20 | 10003 | 3/28/19 | 100 | 95.50 | Online | none | Unknown |
| 21 | 10010 | 1/4/19 | 500 | 477.50 | Online | James | Central |
| 22 | 10015 | 3/2/19 | 250 | 238.75 | Online | none | Unknown |
| 23 | 10023 | 3/3/19 | 340 | 324.70 | Online | Julie | East |
| 24 | 10039 | 1/4/19 | 100 | 95.50 | Online | Harold | West |

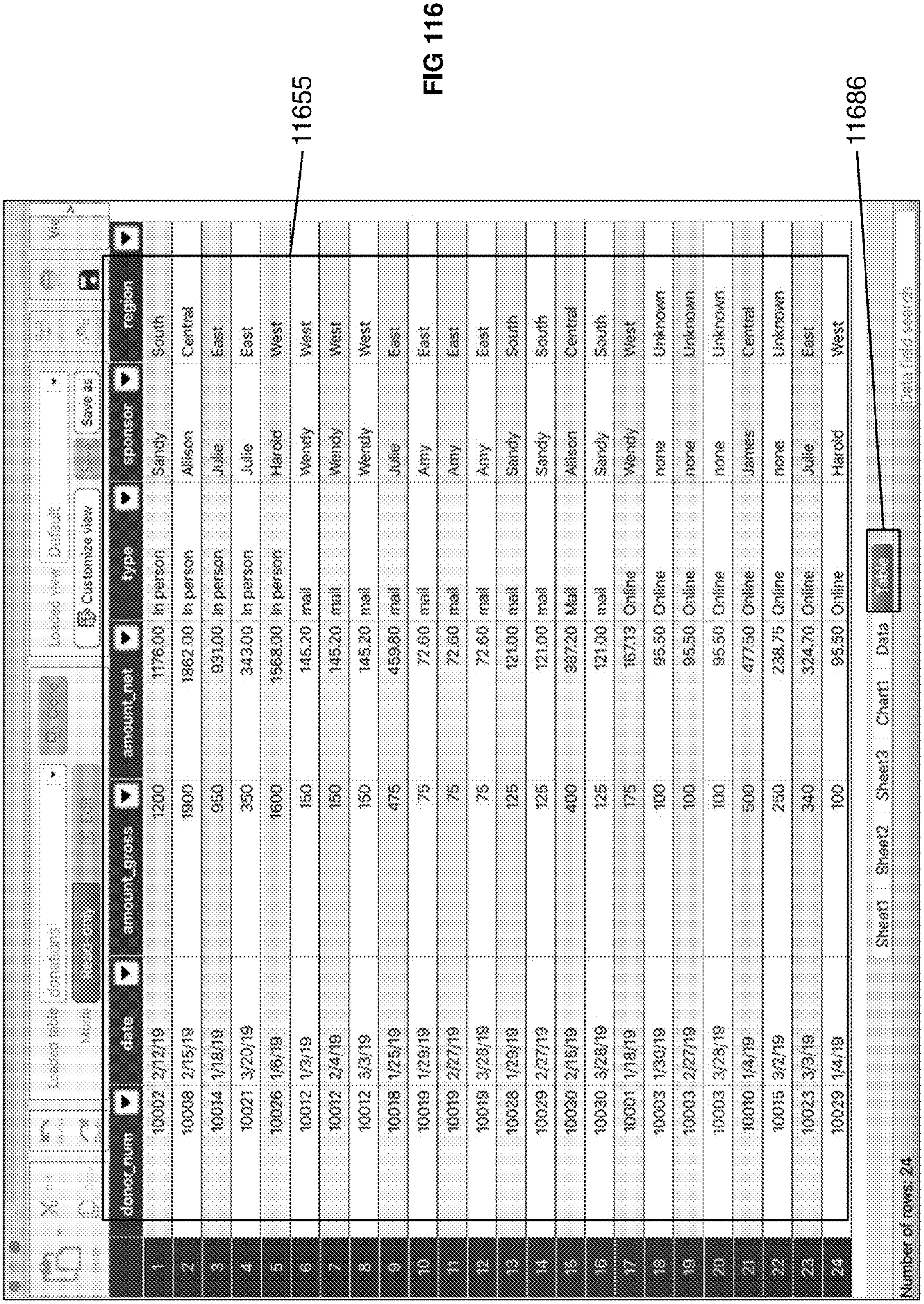

FIG 116

11700
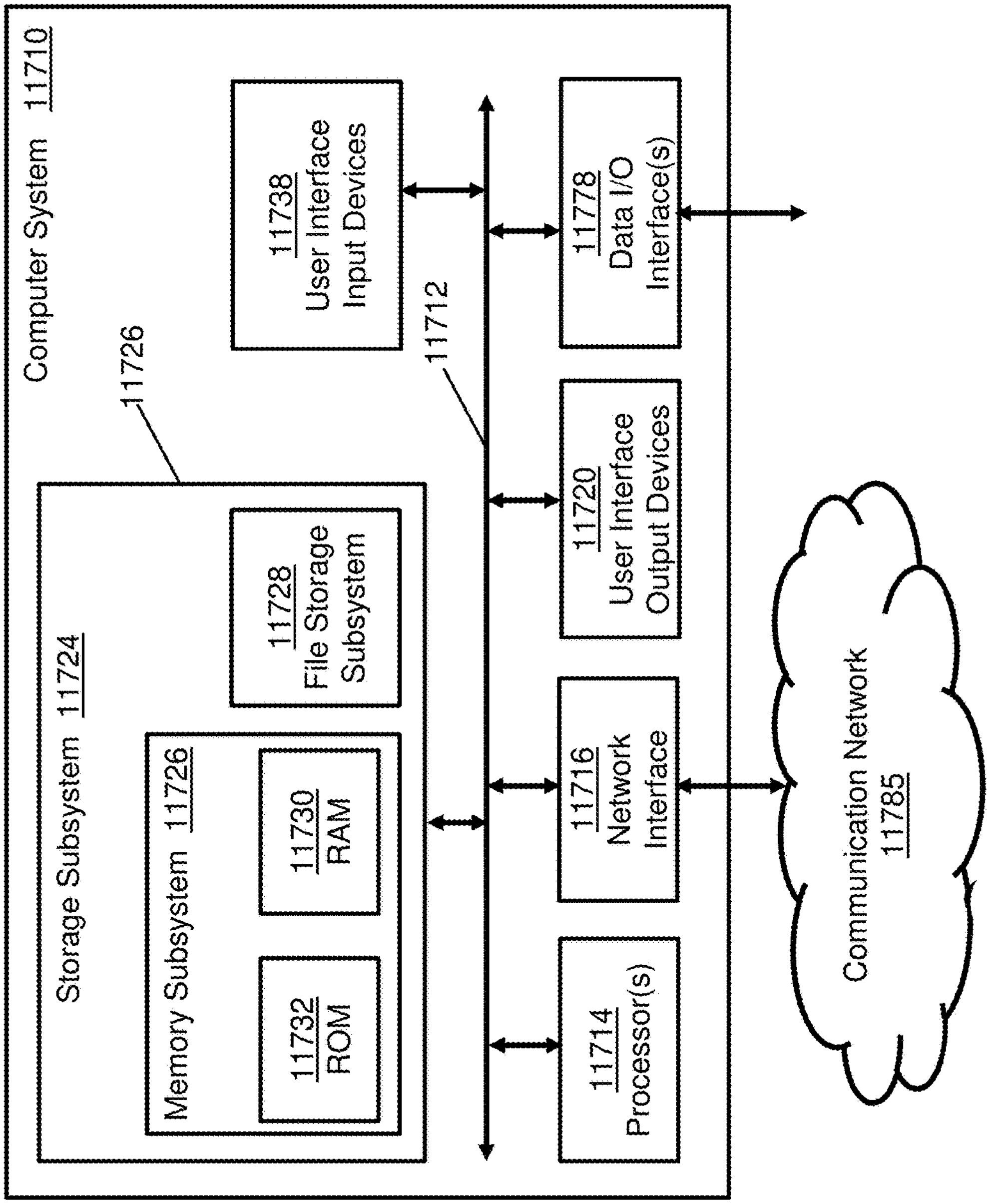
Fig. 117 Computer System

METHOD AND SYSTEM FOR SPREADSHEET ERROR IDENTIFICATION AND AVOIDANCE

PRIORITY APPLICATION

This application is a continuation of U.S. application Ser. No. 17/752,814 titled "Method and System for Spreadsheet Error Identification and Avoidance," filed 24 May 2022, now U.S. Pat. No. 11,977,835, issued 7 May 2024 which claims the benefit of and priority to U.S. Provisional Application No. 63/192,475, filed 24 May 2021.

RELATED APPLICATIONS

This application is related to and incorporates by reference the following applications:

U.S. application Ser. No. 16/031,339, titled "Methods and Systems for Providing Selective Multi-Way Replication and Atomization of Cell Blocks and Other Elements in Spreadsheets and Presentations", filed 10 Jul. 2018, which claims the benefit of U.S. Provisional Application No. 62/530,835, filed 10 Jul. 2017, U.S. application Ser. No. 16/031,379, titled "Methods and Systems for Connecting a Spreadsheet to External Data Sources with Formulaic Specification of Data Retrieval", filed 10 Jul. 2018, which claims the benefit of U.S. Provisional Application No. 62/530,786, filed 10 Jul. 2017, U.S. application Ser. No. 16/031,759, titled "Methods and Systems for Connecting a Spreadsheet to External Data Sources with Temporal Replication of Cell Blocks", filed 10 Jul. 2018, which claims the benefit of U.S. Provisional Patent Application No. 62/530,794, filed on 10 Jul. 2017, and U.S. application Ser. No. 16/191,402, titled "Methods and Systems for Connecting a Spreadsheet to External Data Sources with Ordered Formulaic Specification of Data Retrieved" filed 14 Nov. 2018, which claims the benefit of U.S. Provisional Patent Application No. 62/586,719," filed on 15 Nov. 2017.

U.S. application Ser. No. 17/359,430, titled, "Methods and Systems for Constructing a Complex Formula in a Spreadsheet Cell," filed 25 Jun. 2021 which claims the benefit of U.S. Application No. 63/044,990, filed 26 Jun. 2020.

U.S. application Ser. No. 17/359,418 titled "Methods and Systems for Presenting DropDown, Pop-Up or Other Presentation of a Multi-Value Data Set in a Spreadsheet Cell," filed 25 June which claims the benefit of U.S. Application No. 63/044,989, filed 26 Jun. 2020.

U.S. application Ser. No. 17/384,404 titled "Method and System for Improved Spreadsheet Charts", filed 23 Jul. 2021 which claims the benefit of U.S. Application No. 63/055, 581, filed 23 Jul. 2020.

U.S. application Ser. No. 17/359,418 titled "Method and System for Improved Spreadsheet Analytical Functioning," filed 13 Jul. 2021, which claims the benefit of U.S. Application No. 63/051,280, filed 13 Jul. 2020

U.S. Application No. 63/051,283, titled "Method and System for Improved Ordering of Output from Spreadsheet Analytical Functions", filed 13 Jul. 2020.

BACKGROUND

Today's spreadsheets have a broad range of capabilities, but on the critical activity of writing correct cell formulas they have few capabilities to inform users about errors and almost nothing to stop them from making errors. The leading spreadsheet, Microsoft Excel has no in-cell or formula bar indication of a formula error until the user evaluates the formula. Similarly, Google Sheets only occasionally flags that a formula has an error prior to evaluation. In these and other spreadsheets, once a user evaluates a formula with one or more errors, they get either an Error Value or an Error message popup typically giving a categorical error identification (i.e., one that applies to many possible errors). In situations with more than one error, they do not get multiple different error messages. The error messages generated do not automatically trace problems through cell references and give specific error explanations. Other than a few Excel FUNCTION arguments with a fixed set of input selections, current spreadsheets do nothing to stop users from erroneous formula inputs. Users spend lots of time finding and fixing cell formula typos, matching unmatched parentheses, missing or incorrect Function syntax etc.

Accordingly, an opportunity arises to make writing correct cell formulas much easier through specifically identifying each error and giving a specific explanation of the error as the user creates their formula so that they can immediately fix it and not have wait until after they evaluate the formula to see they have an error. An even bigger opportunity exists to pre-empt creating errors by situationally providing the user with correct options for their formula with the ability to click to select options where the spreadsheet takes care of syntax requirements and displays the next set of options. Imagine the advantage of creating formulas with no typos, no incorrect arguments and always with the right syntax. Further imagine an externally fed data spreadsheet with point and click access to well described external data, where after the first data field selection, only correct data constraints/filters, values and matches/joins are displayed for use. No incorrectly specified data and no need to remember any of the data relationships. The technology disclosed makes the before mentioned spreadsheet opportunities a reality thereby making writing correct spreadsheet cell formulas dramatically easier.

SUMMARY

The disclosed technology creates spreadsheet capabilities for messaging formula errors as the user types the formula. It is capable of separately messaging for more than one error. It works for algebraic formulas, predefined (built-in) spreadsheet functions, our formulaic data and their combinations. Another capability of the disclosed technology pre-empts errors by automatically providing hints displaying a list of error free formula options for population into the formula. Embodiments of the technologies combine the hint with displaying any error messages for the formula, so the user knows whether their formula is error free. A further capability provides the user with results as they type the formula. In situations using our formulaic data, a plain language recitation of what the formulaic data is doing to provide the result is provided. The hint option selection capabilities largely eliminate formula typos, syntax mistakes and function and formulaic data argument mistakes. The error identification/emphasis and error explanation capabilities proactively identify errors as the user types, can identify more than one error, and provides messages that make fixing them easy. The combination makes writing all types of error free spreadsheet formulas dramatically easier for users. Another capability of our disclosed technology supports the setup of spreadsheet cell data as formulaic data which can then support all the preceding capabilities as our Non-spreadsheet Cell (NSC) formulaic data does.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIGS. 7A, 7B, 7C and 7D examples different embodiments of the error identifications/emphases and/or error explanations of our technology.

FIG. 12 further examples how the error explanations from our technology differ from error values or error messages of Microsoft Excel.

FIGS. 15A, 15B, and 15C examples the additional help users can get from an Excel error value.

FIG. 23 examples inconsistent error values between the Microsoft Excel function Formula Builder and the formula's cell.

FIG. 28A and FIG. 28B example the use of our technology delivering post evaluation (hitting ENTER) popup error messages for a spreadsheet function (i.e., IF).

FIG. 31A and FIG. 31B example different embodiments of our technology for the error identifications/emphases and error explanations for the formula in FIG. 30A.

FIGS. 41A, 41B, 42A and 42B examples a user initiating in our technology a character/group of characters search of the formulaic data fields and formulaic data field descriptions and then selecting the field of their choice to populate the formula.

FIG. 45 examples the table view formulaic data selector.

FIG. 47A and FIG. 47B example the formulaic data field selection from our data view hint.

FIGS. 78A, 78B, 79A, 79B, 80 and 81 examples how our hint technology tailors actions to deliver the syntax needed and avoid user created errors.

FIGS. 94A, 94B, 95, 96A, 96B, 97, 98, 99, 100, 101 and 102 examples building a combination function and formulaic data field formula with multiple data field constraints from start-to-finish using our technologies.

FIGS. 103, 104, 105, 106, 107, 108A, 108B, 109, 110, 111, 112, 113 and 114 example setting up in our technology in-spreadsheet cell data for use as formulaic data for all our precedingly described technologies.

FIG. 115 and FIG. 116 example the Data tab and Table tab views from the in-cell spreadsheet sourced data and how they have been made indistinguishable from comparable data sourced from Non-spreadsheet cell (external) data.

FIG. 117 depicts an example computer system that can be used to implement aspects of the technology disclosed.

DETAILED DESCRIPTION

Figure 1B:
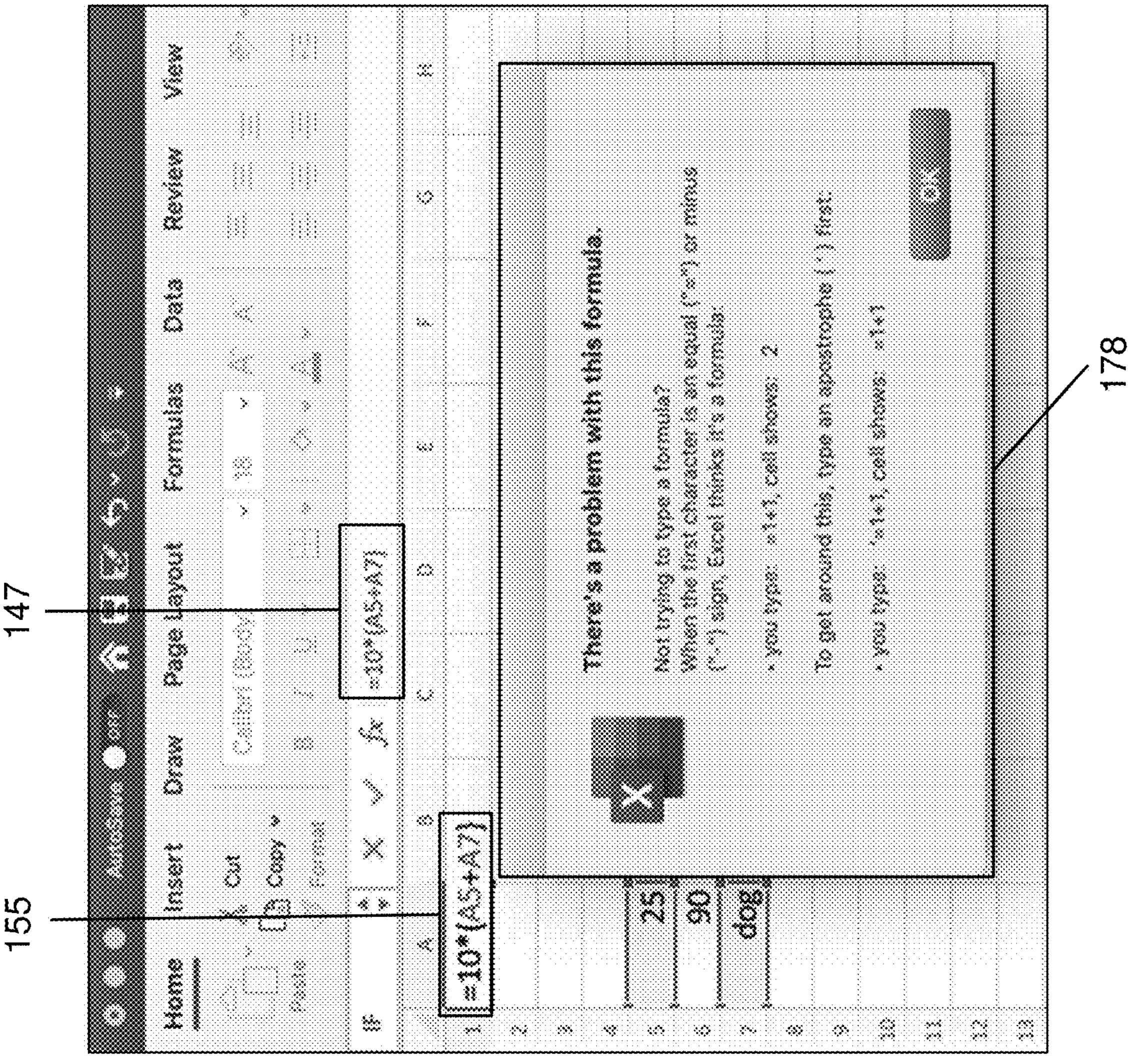
FIGS. 1A, 1B, 2, 3A, 3B, 3C, 3D, 3E, 4A, 4B, 4C 4D, 5A, 5B, 5C, 5D and 6 examples what the most widely used current spreadsheets do in error identification/emphasis and error explanations while typing and then after a user evaluates (hits ENTER) the cell formula.

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now are used for much larger data sets and a much larger range of calculations. Spreadsheet providers like Microsoft Excel and Google Sheets cater to the specialized needs of users through many capabilities including vast numbers of spreadsheet functions (e.g., built in predefined formulas including SUM, COUNT and MIN). For example, Microsoft Excel includes more than four hundred and fifty built-in functions and Google Sheets over four hundred. And while these capabilities were put in place to avoid having to learn a programming language to answer problems, they have brought their own complexities.

In programming users frequently write many lines of code to get a single answer and frequently use Integrated Development Environments (IDEs) to help them avoid errors in writing their code. They then often use Read-eval-print loop (REPL) or debuggers to run the code to further find problems created by the data usage which the IDEs (even with extensions) do not see because they do not run the code (and thereby do not see data created problems). However, these capabilities are not combined into one because the processes of checking the writing of the code and running the code are very different. Also, the REPLs or debuggers find the first problem but do not move beyond that to find and explain any additional problems. So, finding multiple code and data problems is not a capability that exists, and certainly does not exist in spreadsheets.

Spreadsheets face these problems and the further complications driven by their single line formulas. This requirement that the single line formula in a spreadsheet cell must contain everything required to compute the cell value (and cannot be spread out over many lines of indented code as in programming), can result in spreadsheet formulas that are dramatically more complicated than a programming line of code. Spreadsheet functions, more than one of which may be in a spreadsheet cell, can add further complexity as they effectively replace what would be many lines of code in many programming languages with their predefined arguments/parameters. All of this makes it very easy for users to make multiple mistakes in a single spreadsheet cell formula which none of todays' spreadsheets separately identify, apply emphasis in the cell or formula bar formula and give separate error explanations while users type. Even once the user submits the cell formula for calculation for evaluation by hitting ENTER (or RETURN on a Mac), none of todays' spreadsheet give an explanation for more than one of the errors in the formula and in many cases the user does not even get a specific identification of the first error and explanation of it.

Therefore, there is a need for a technology that identifies and separately emphasizes each of multiple errors in in a spreadsheet cell/formula bar formula while the user types, sometimes referred to as as you type. There is value to very visibly pointing out (emphasizing) each error in the formula so users see them as they type, and can correct them, before they evaluate the formula.

As You Type Error Identification—Algebraic Formulas

Our technology identifies/separately emphasizes the complete list of multiple errors which are coding driven (which an IDE would identify/emphasize for a user) and data driven (which an REPL or debugger would identify/emphasize the first of, but not additional errors) that no comparable programming tool and certainly no spreadsheet does. Embodiments of our technology also give a highly visual list of each of the multiple error explanations that are specific to the error and not general error values (e.g., groups of errors sharing a single value like #NAME? or #VALUE!) or the non-specific error messages frequently provided by spreadsheet error popups. As the embodiments below will example those error emphases and error explanations can be seen as the user types each token of a cell/formula bar formula or in an error message after they hit ENTER (or RETURN on a Mac) to evaluate the formula.

Figure 1A:
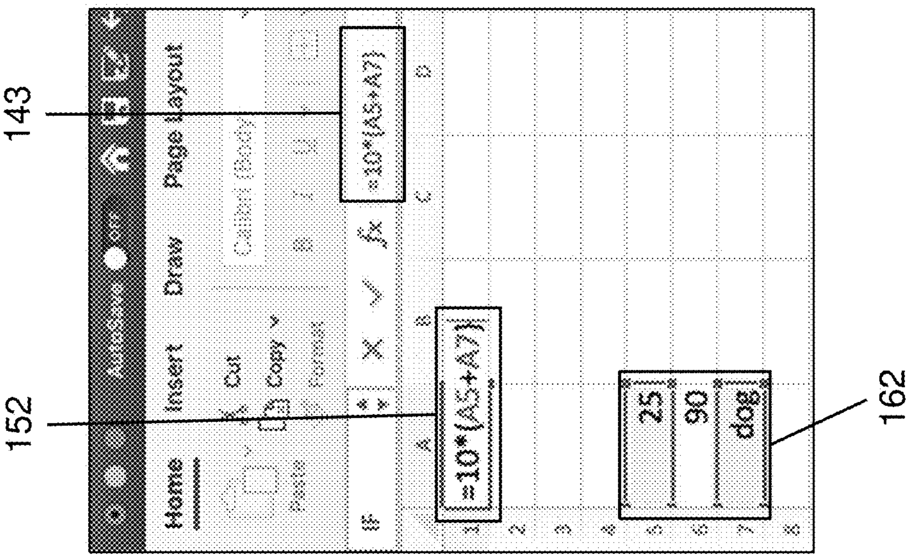

FIG. 1A through FIG. 6 examples how the most widely used current spreadsheets lack error identification/emphasis and error explanations while typing and then what they display after a user evaluates (hits ENTER) the cell formula. FIG. 1A shows how Microsoft Excel does no identification/emphasis of problems in its algebraic formulas as the user types the formula. There is no identification of the unmatched opening parenthesis and unmatched closing curly bracket errors in either the cell formula 152 or the formula bar formula 143. In this formula the only identification/emphasis in the formula is the color coding of the cell references in the cell formula 152 matching the color of the reference boxes in the cells 162. There is no identification/emphasis of any formula errors as the user types and only once they hit ENTER do users get an indication of an error shown in popup 178 in FIG. 1B. That error popup does not tell the user they have two problems in the formula and there is no identification/emphasis of either problem in the in-cell formula 155 or the formula bar formula 147. That popup 178 tells the user that "There's a problem with this formula." without giving the user any information about the unmatched parenthesis and unmatched curly bracket. It does not identify and explain either of the problems in the formula.

Figure 2:
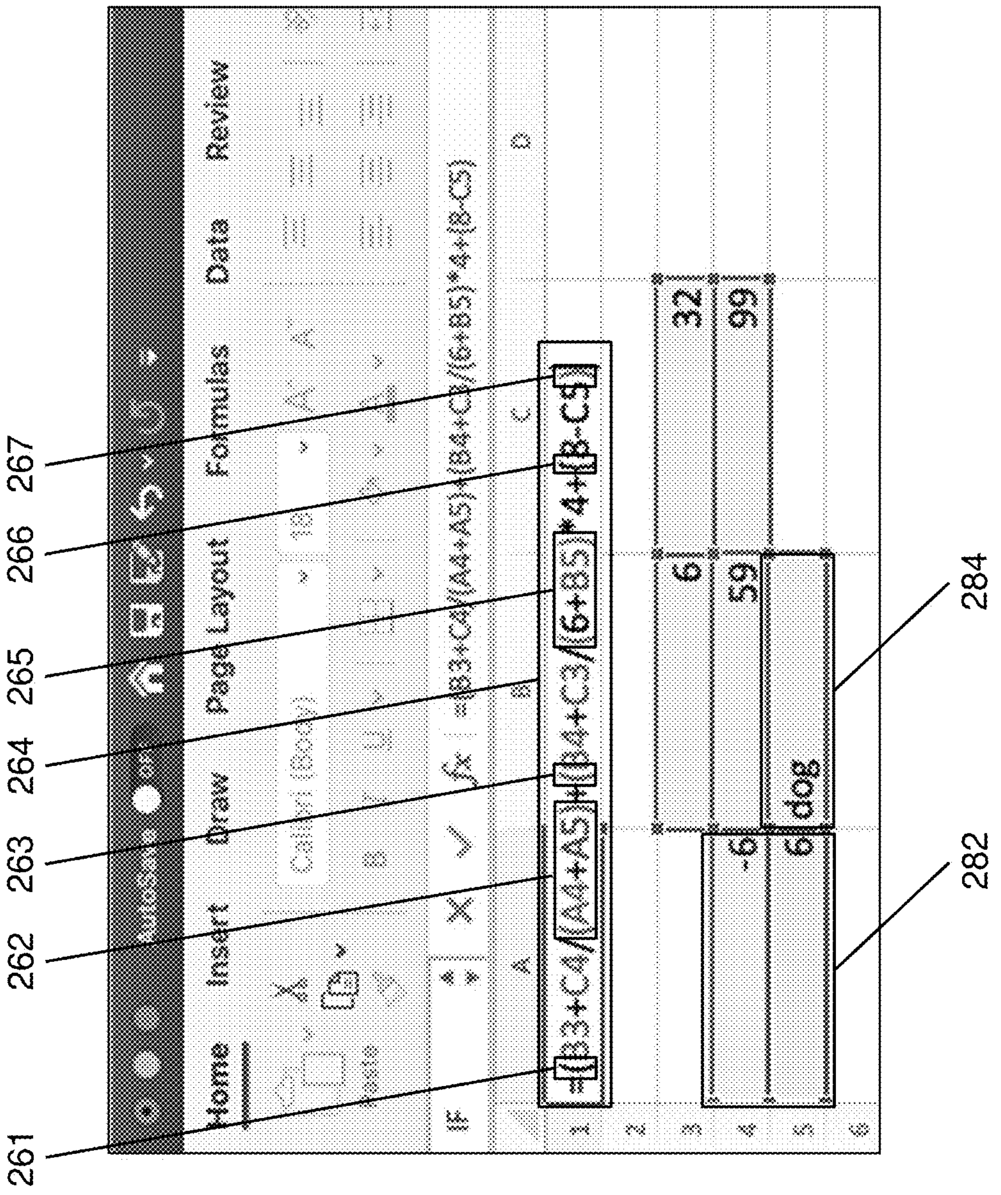

None of Excel's error messages identify multiple errors and Excel has no identification/emphasis (e.g., bolding, color coding, background fill) of an error in its in-cell and formula bar formulas. Beyond the cell color referencing, Excel has one additional color referencing in the active formula (formula with cursor). It is color coding of the levels of parentheses exampled in FIG. 2. In FIG. 2 the first level of parentheses is black 261, while the second level of parentheses is red as shown in 262, 263 and 267. The third level of parentheses is purple as shown in 265. Normal sized in the application these colored parentheses can be difficult to distinguish as they are narrow, tightly spaced in most fonts used (i.e., as most users do not used fixed width fonts), and repeat colors used for cell references which can be next to them in the formulas. They may help users see unmatched parentheses errors if they look very carefully but there is no unambiguous indication of errors in the formula despite this formula having four errors. The first error is the unpaired opening parenthesis 261, the second is '(A4+A5)' using the values 282 that evaluate to 0 resulting in a divide by 0 error, the third is 'B5' in 265 adds 'dog' 284 giving a non-numeric value error and finally the opening curly bracket '{' 266 gives a non-algebraic operator error in our technology. So, Excel has no unambiguous identification/emphasis of an error as you type formulas in either in-cell or formula bar formula and it does not separately identify multiple errors.

Figures 3A, 3B, 3C, 3D, 3E:
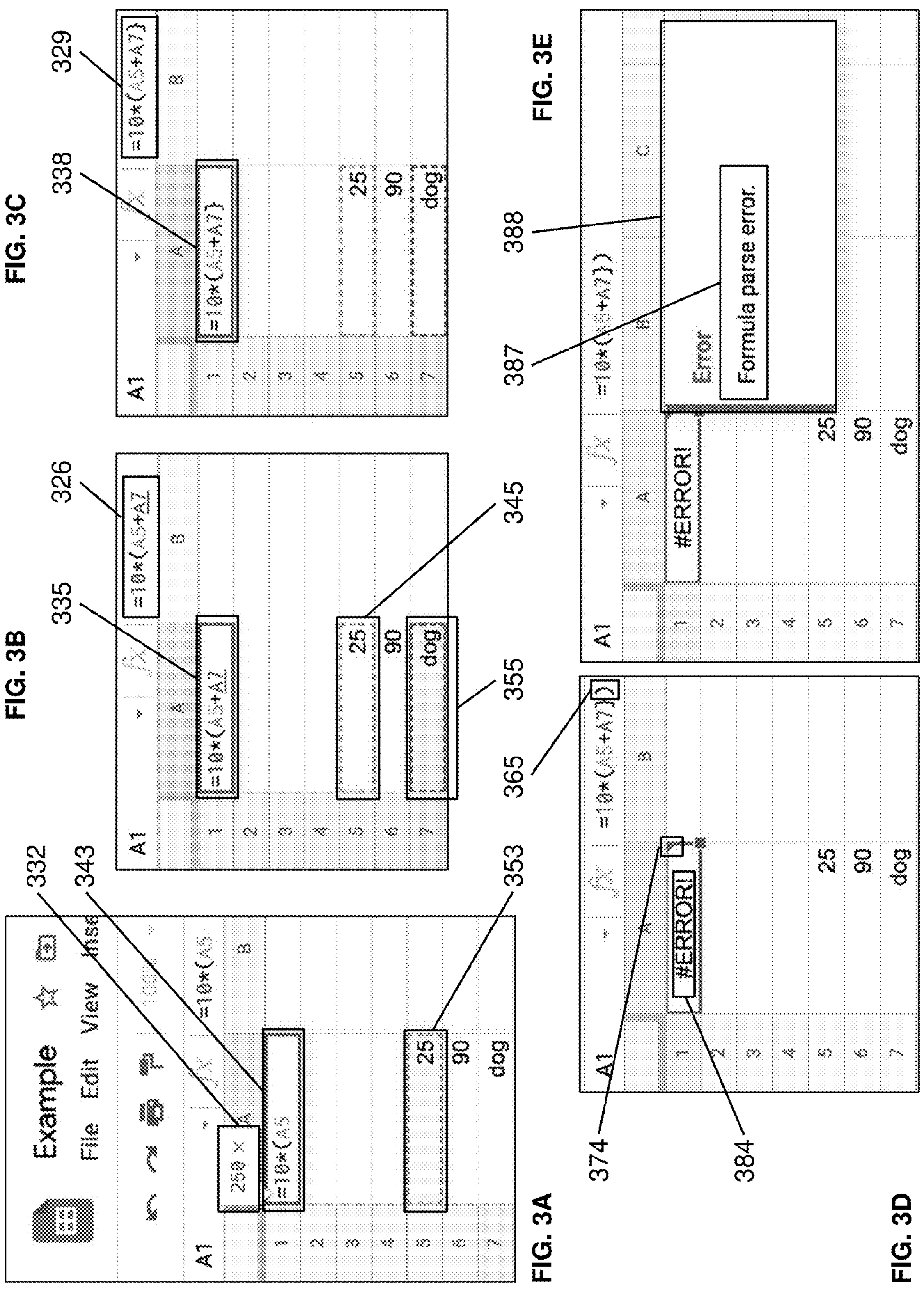

Google Sheets does do more to identify a user's first error, sometimes directly and in other cases indirectly. FIG. 3A through FIG. 3E example the indirect clue to the formula having an error and the generation of an error value and error message. As the user creates the algebraic formula Sheets evaluates the formula showing its calculated value. FIG. 3A examples that where the formula in cell 'A1' 343 is evaluated and its value shown in the popup 332. Sheets actually evaluates that formula despite the fact that the formula as currently written '=10*(A5' 343 has an unmatched parenthesis—therefore the result 332 is not a reliable indicator of whether the formula as typed has no errors. That evaluation disappears in FIG. 3B when the math operator '+' and then 'A7' (shown in the cell formula 335 and the formula bar formula 326). Its disappearance is an indirect clue that the formula has a problem, in this example the addition of a non-numeric value 'dog' 355 in cell A7. In this example the Sheets spreadsheet gives the user no direct identification/emphasis of an error and when an additional error is added in FIG. 3C by the user typing a closing curly bracket '}' into the formula (shown in 338 and 329), there is still no direct identification of the multiple errors. When the user hits ENTER they get the result in FIG. 3D where Sheets has attempted to fix the formula by adding a closing parenthesis ')' 365, however that does not solve either of the problems and the user gets an error value ' #ERROR!' 384 in cell A1. They can then open an error message by clicking on the red triangle 374 in the upper left corner of the cell to get the error message 388 in FIG. 3E. That message of 'Formula parse error' 387 may be of some use to programmers but is very broad and general and of little value to a typical spreadsheet user to understand what is wrong with the formula.

Figures 4A, 4B, 4C, 4D:
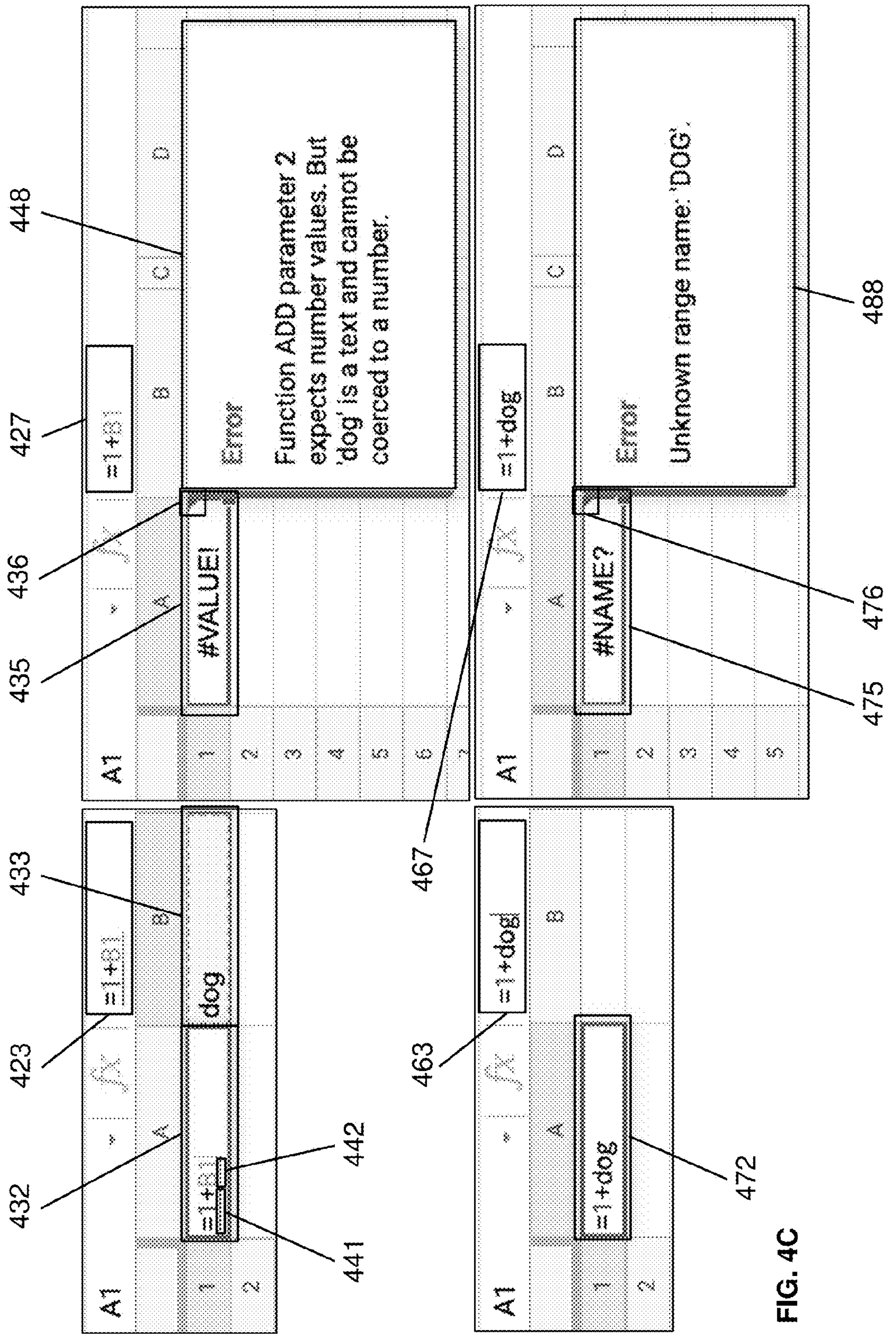

FIG. 4A and FIG. 4B example the identification of an error directly by Google Sheets. When the user types or clicks on cell 'B1' 433 populating it into the formula (432 and 423) it gives a red underline 441 in the formula up to the yellow underline 442 under the cell reference 'B1' that created the non-numeric value in an algebraic formula error. The as you type (or click a cell reference) red underline error identification/emphasis actually marks the part of the formula which has no error as the erroneous entry is underlined in the cell reference yellow. So, an indication of an error but not a clear direct visual identification of the formula token or tokens that created the error. And as we will show in a later example and have verified with other tests, the red line tells the user there is an error in the formula with no visual identification of what specific token or tokens caused the error and absolutely no identification/emphasis of whether there is more than one error. FIG. 4B examples what the user gets if they hit ENTER on the formula in FIG. 4A. They get the error value ' #VALUE!' 435 in cell 'A1' and if they click on the small red triangle 436 in the upper left corner of the cell then they get the error message 448. While that error message is slightly cryptic 'Function ADD parameter 2 expects number values. But 'dog' is a text and cannot be coerced to a number', it does tell the user the formula expects number values and dog is text. It does not tell the user that the dog is from the cell reference 'B1' in the formula, which is not challenging in this setting but in a much longer and more complicated formula the lack of directly tracing the problem would make it difficult for the user to see where the problem is. However further exampling the inconsistency of Sheets in identifying/emphasizing errors in the formulas, FIG. 4C shows how effectively typing the same formula (472 and 463) directly (rather than using the cell reference) does not get the red underline or any other identification of the formula problem. Furthermore, when the user hits ENTER on the formula in FIG. 4C they get a different error value, ' #NAME?' 475 instead of value ' #VALUE!' 435, and in FIG. 4D. They also get a different error message 488 after again clicking the small red triangle 476 in the upper left corner of the cell. This error message 488 does not talk about expecting a number and getting text despite the formula 467 in FIG. 4D evaluating to the same algebraic expression as the formula 427 in FIG. 4B. There is also nothing in either evaluated formulas (427 and 467) indicating in the cell formula bar formula that there is an error and identifying/emphasizing which tokens in the formula cause the error. No visual connection exists between the error messages and the part of the formula contributing the error to make it easy for the user to quickly see the error; thereby creating a need for much more specific and unambiguous identification/emphasis of the token or sets of tokens responsible for errors in the formula and much more specific visual connection with the explanation of the errors to make it easier to know which specific tokens to change and how to change them to fix the error or errors.

Figures 5A, 5B, 5C, 5D:
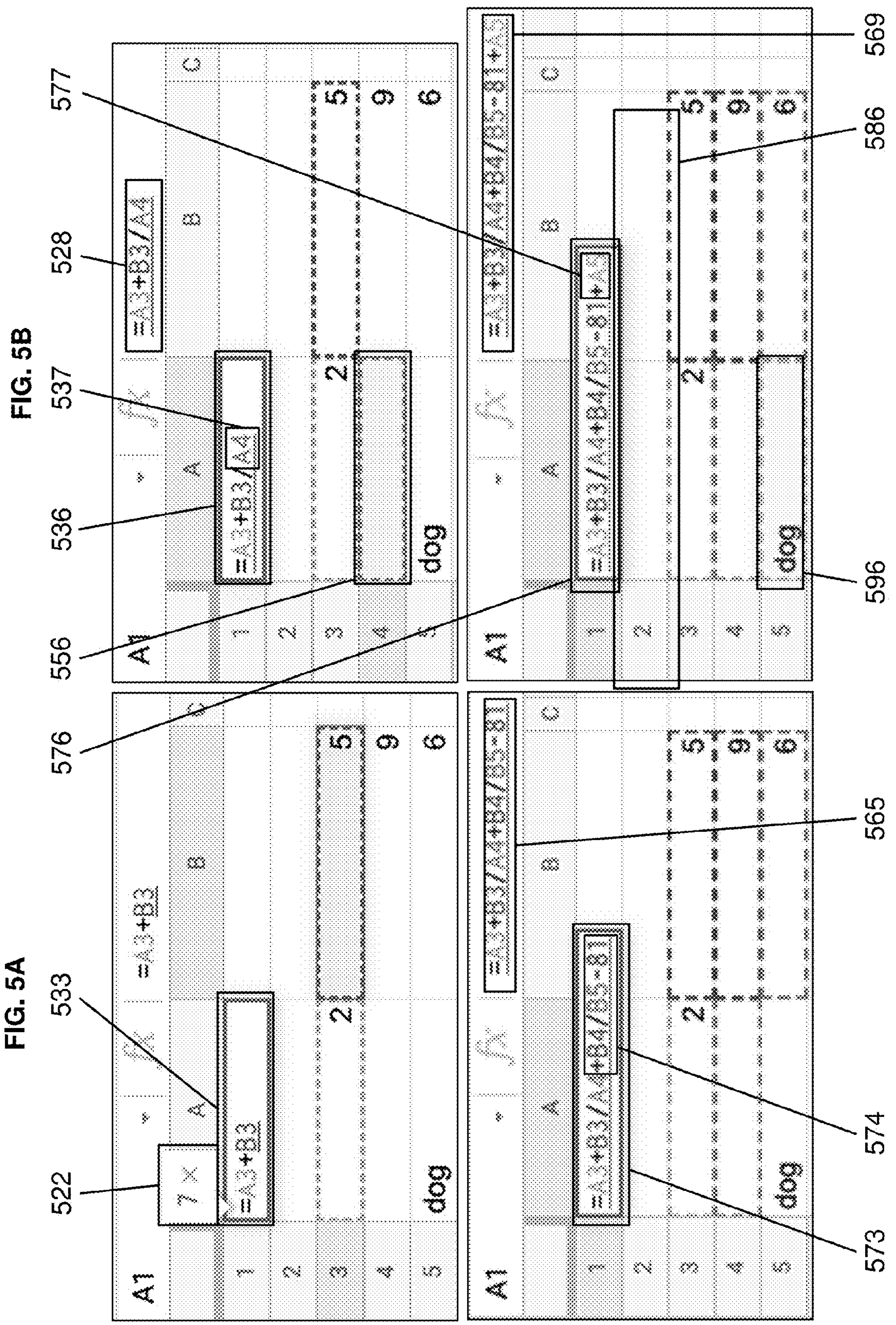
Figure 6:
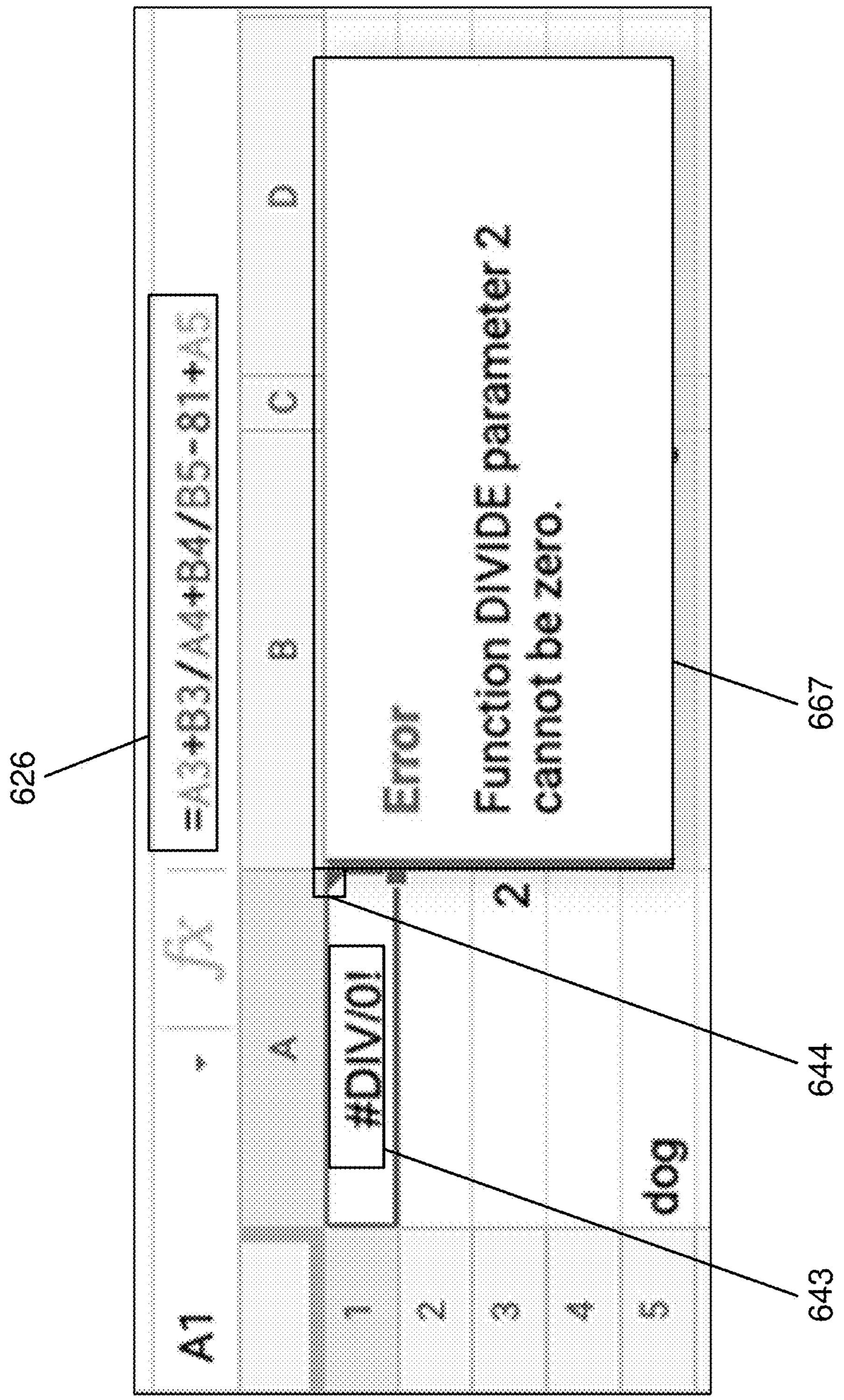

FIG. 5A through FIG. 6 example how Google Sheets only gives an indication of one error in a formula and one evaluation error message in formulas containing more than one error. Also, the error identification/emphasis applies underlining to the entire formula not the specific tokens creating that first error. FIG. 5A examples a formula 533 with no error and a popup result 522. In FIG. 5B when the divide by nothing error is introduced into the formula 536 via typing or clicking on cell 'A4' (537 tracing to 556), the red underline appears under the rest of the formula 536 except the cell reference 'A4' 537 which is underlined in turquoise matching the cell 556. In FIG. 5C the red underline extends in the formula (573 and 565), despite the added terms 574 having no errors in them. The red underline identifying that the formula has an error but not specifically identifying which tokens cause the error. In FIG. 5D the user adds another error by referencing the value in cell 'A5' 596 in the formula (576 and 569). Nothing identifies in the formula that there is a second error, and the click on error message 586 still just gives a message about the first error. The error message does not visually point at where the error is on the formula but instead points at the center of the cell.

FIG. 6 examples the result of hitting ENTER (or RETURN on a Mac) for the formula in FIG. 5D containing two errors. The error message 667 is about the first error but makes no mention of a second error. Sheets requires the user to manually open the error message by clicking on the red triangle 644 in the upper left corner of the cell with the error, not automatically displaying the error message. That cell, 'A1', displays an error value ' # DIV/0!' 643 and the formula bar formula 626 shows no identification of any error, and certainly does not identify specifically the tokens responsible for each error. The error explanation "Function DIVIDE parameter 2 cannot be zero' 667 does not tell the user which of the two 'DIVIDE parameter 2' ('A4' or 'B5') has the problem. One reason the current spreadsheets, as well as programming tools that run the code, do not identify multiple errors is that it requires a very different tool to move beyond the first error to identify all the errors particularly when those errors contain code and data induced problems. It takes a very sophisticated application to move beyond the first data induced error because simply running the code and data will not work as the application has to evaluate the next error having solved or somehow bypassed the first error while retaining the integrity of the code and data in the run. Our technology does that evaluation and therefore can specifically identify/emphasize each formula token or combination of tokens that create the error(s), visually separate/differentiate them even when they are right next each other, does so unambiguously for each error, creates an explanation for each error and visually connects that explanation with the token or combination of tokens that cause it. This makes it very easy for users to see one or more errors in their spreadsheet formulas while they type them or after they hit ENTER and know what caused each error. Thereby making writing complex formulas dramatically easier and overcoming the visual limitations that make many errors hard to see because of the fonts (which poorly differentiate some letters and characters and lack the fixed width spacing) and small font sizes users often employ in their in-cell formulas. Sometimes we use the terms character and combination of characters, and other times we use the terms token and combination of tokens to describe the parts of the formulas.

Our technology also overcomes spreadsheet limitations not found in programming tools designed to help users write and test/debug code. For example, when a user types the formula in the cell (instead of in the formula bar) it uses their selected font, most of which are not fixed width. This makes differentiating many characters difficult (e.g., try differentiating the three different characters 1I1 in the Excel PC default font Calibri or try very quickly differentiating the following buried in a long formula x+5)*8, x+5}*8, x+5] *8). Therefore, embodiments of our technology go beyond typical highlighting to use high visibility unambiguous error identification/emphasis for each error, even if they are side by side. Spreadsheets also have the challenge that all formulas are written in a single cell/formula bar line that does not have automatic row breaks and indentations (e.g., at grouping operators like in an IDE) but instead wraps or requires users to add manual row breaks (not typically done) and no indentations. This makes it much harder to see cause and effect for some types of problems (e.g., unmatched parentheses) and means the formula can lack the space for easy mouse or cursor opening of individual problem error help messages. Therefore, some embodiments of our technology employ visuals explaining the errors, so the error emphases in the formula and the error explanations are simultaneously visible and automatically generated without mouse overs or other user actions. Our error emphases also recognize that simple underlining or highlighting do not sufficiently identify and separate errors that are side by side, so our technology makes the token or token grouping visually separate for each error. Embodiments of our technology are sensitive to color-impaired user needs for unambiguous separation and high visibility highlighting and messaging of each error. We will start exampling how these capabilities work for algebraic expressions before moving onto spreadsheet predefined functions and our Non-spreadsheet cell (NSC) formulaic data or our spreadsheet cell supported formulaic data.

Our technology evaluates the formula as you type determining with each keystroke whether it evaluates correctly or contains and error (from the formula itself or the data used by that formula). Once as spreadsheet user types an '=' and a recognizable algebraic term/operator, function, our Non-spreadsheet cell (NSC) or our spreadsheet cell supported formulaic data field our technology engages its error identification/emphasis as you type capabilities. Some embodiments automatically/simultaneously display error explanations for each identified/emphasized error.

FIG. 7A through FIG. 7D examples different embodiments of the error identifications/emphases and/or error explanations of our technology. FIG. 7A examples our technology separately identifying/emphasizing three different errors (721, 723 and 724) in both the cell formula 722 and the formula bar formula 713. Each of the errors separately identifies the tokens making up the erroneous term, e.g., 'A7' 723, or erroneous algebraic operator, e.g., the unmatched opening parenthesis '(' 721 and the non-algebraic operator closing curly bracket '}' 724. This separation is important in unambiguously distinguishing error emphases that are side by side in the formula like 'A7' 723 and '}' 724 so the user easily sees that there are two errors there. FIG. 7B examples an embodiment combining the error identification/emphases shown in FIG. 7A with the automatic simultaneous display of error explanations 737. In this embodiment each error explanation includes a copy of the error emphasis (e.g., 746) and the text of the explanation (e.g., 747) which explains to the user specifically what the error is and automatically traces data so the user quickly understands the problem, e.g., tracing '"dog" in A7' 738. Users are also given the option to make the explanations disappear 739, so they can select a cell underneath. There are clearly many options for how to visually distinguish/separate error emphases. Color could be eliminated as exampled in FIG. 7C or different colors could be used as exampled in FIG. 7D to identify/emphasize each error and then link them to the error explanations.

Figure 8A:
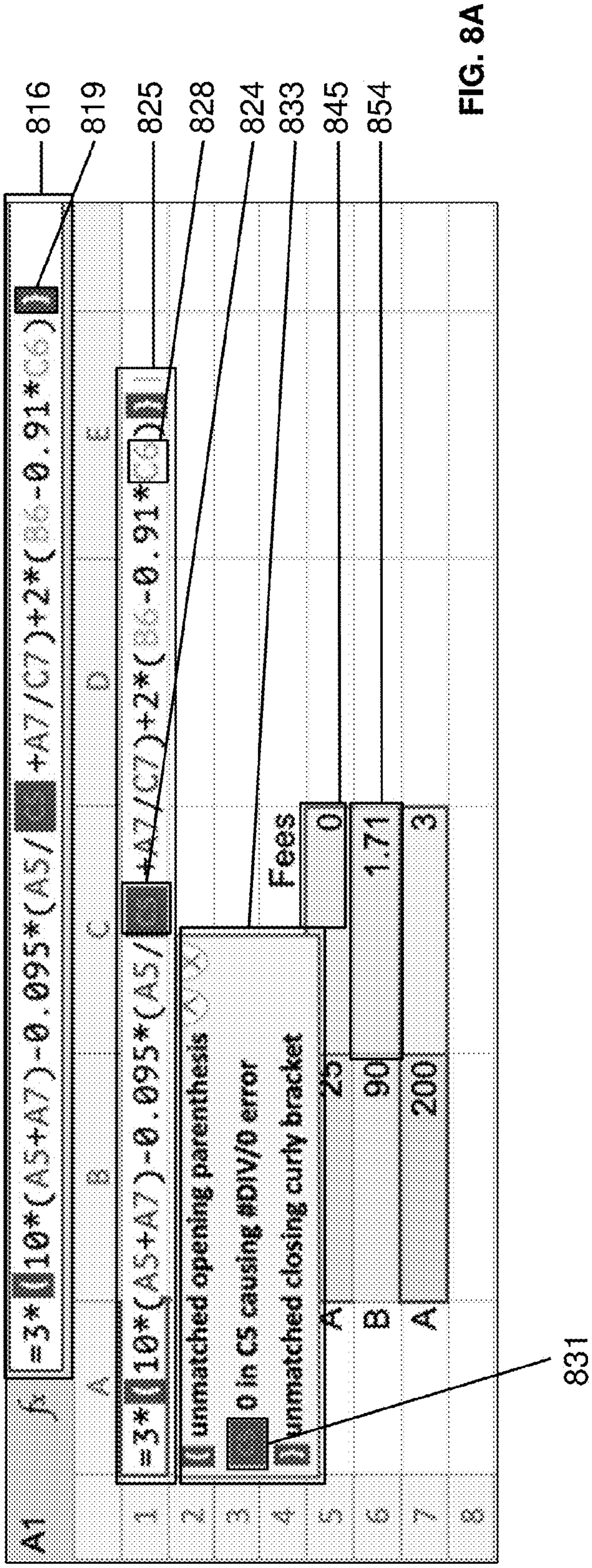
FIG. 8A and FIG. 8B examples embodiments of our technology that are compatible with the typical spreadsheet use of color in the cell formula and/or formula bar formula for the referenced cells or cell ranges.
Figure 8B:
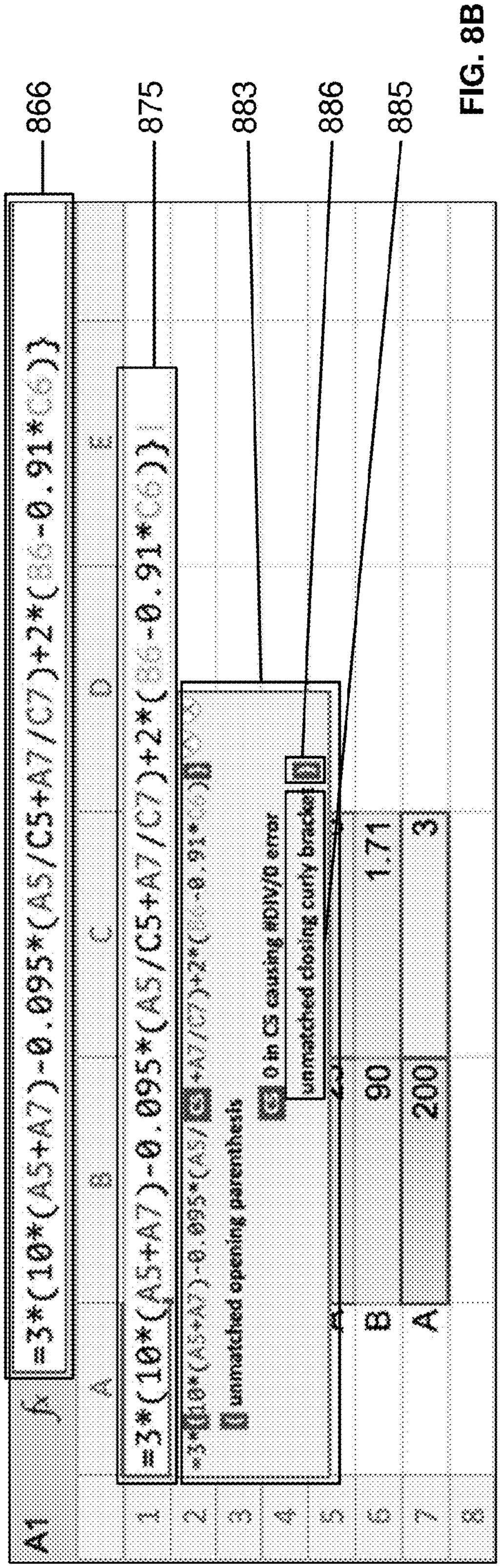

FIG. 8A and FIG. 8B examples embodiments of our technology that are compatible with the typical spreadsheet use of color in the cell formula and/or formula bar formula for the referenced cells or cell ranges. FIG. 8A examples using unambiguous (with other formula token visuals) background highlighting emphasis (e.g., 819) of each error in the cell formula 825 and the formula bar formula 816. This is compatible with the typical spreadsheet color coding of the cell references in the formula (e.g., 828) to the cell it references (e.g., 854) in that it allows the regular color matching and that matching can be extended into the error emphasis as exampled with the green in 'C5' 824 matching the green of the cell C5 845. In this embodiment that color matching is extended into the error explanations 833 as exampled in the green 'C5' 831. Some users may prefer the cell 875 and formula bar 866 formulas to not contain the error emphases and so the embodiment exampled in FIG. 8B places both the error identifications/emphases (e.g., 886) and the error explanations (e.g., 885) in a UI visual popup 883. As exampled in the popup there are different ways to layout the error explanations, with the version in FIG. 8B aligning the popup formula error emphasis with its error explanation.

Figure 9A:
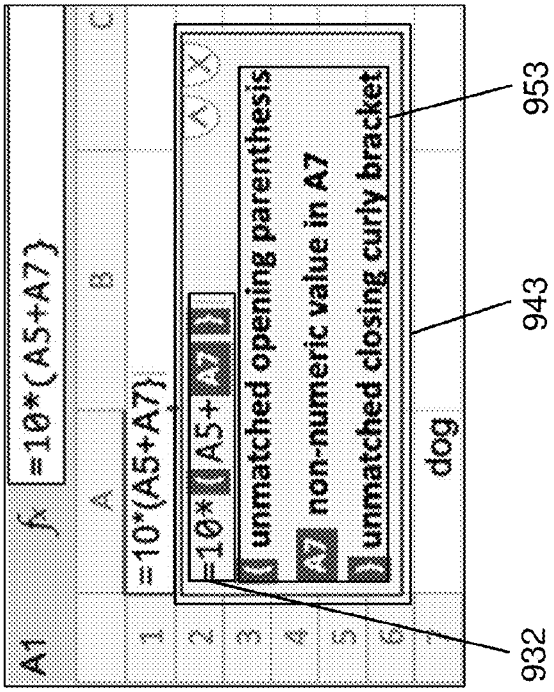
FIG. 9A and FIG. 9B examples other variants of our unambiguously separate error identifications/emphases and their related specific error explanations displayed in UI visual popups.
Figure 9B:
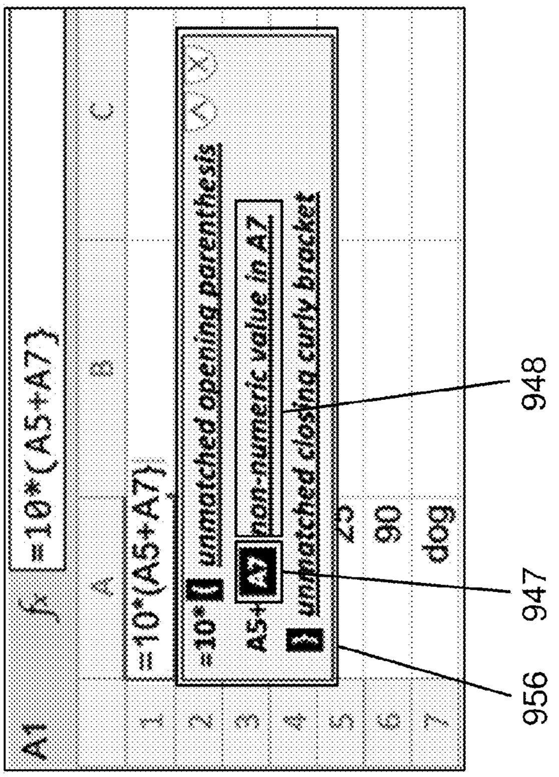

FIG. 9A and FIG. 9B examples other variants of our unambiguously separate error identifications/emphases and their related specific error explanations displayed in UI visual popups. FIG. 9A examples an embodiment where all the error information automatically shows up as the user types in a UI visual popup 943 with nothing shown in the in-cell formula or formula bar formula. The error emphases automatically appear in a replicate formula 932 with the error explanations 953 appearing below the replicate formula in the order of the errors. FIG. 9B examples the UI visual popup 956 with the formula containing the separate error emphases (e.g., 847) and their related error explanations (e.g., 848) intermingled within the formula. Thereby, potentially giving users many different ways to have unambiguous separate error emphases and specific error explanations automatically displayed as they type their formulas.

Figure 9C:
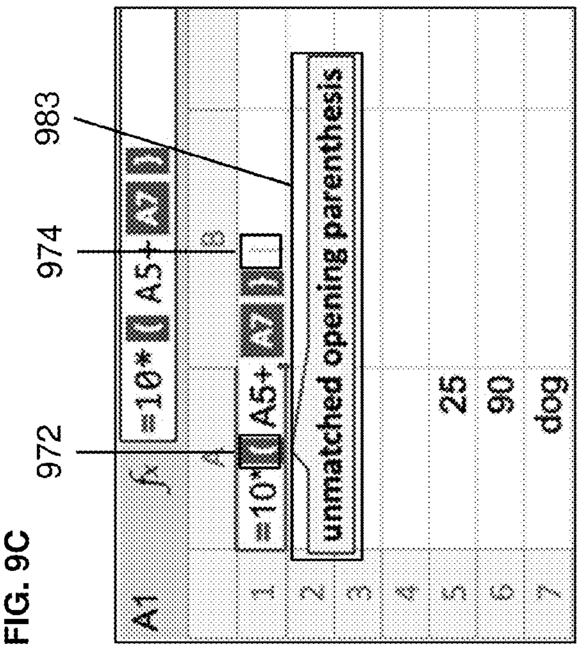
FIG. 9C and FIG. 9D examples an embodiment where the error explanations are mouse over the error identifications/emphases triggered to display the error explanations.
Figure 9D:
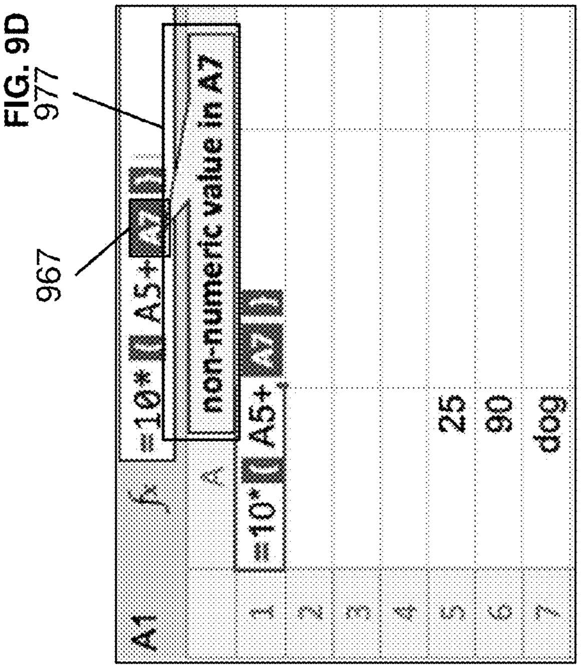

FIG. 9C and FIG. 9D examples an embodiment where the error explanations are mouse over the error identification/emphasis triggered to display the error explanation. FIG. 9C examples the user mousing over the '(' 972 error emphasis to trigger the UI visual 983 displaying its specific error explanation. In this example the user is doing that within the cell formula which has the active cursor 974, although they equally could have moused over the same error emphasis in the formula without the active cursor. FIG. 9D examples the user doing a similar operation but this time over the second error emphasis 'A7' 967 in the formula bar formula to trigger the UI visual 977 displaying its error explanation. In this example the error explanation does not have the automatic tracing of the non-numeric value.

Figure 10A:
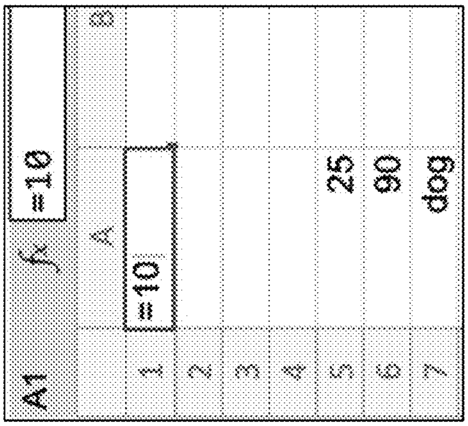
FIGS. 10A, 10B, 10C, 10D, 11A, 11B, 11C and 11D examples the step-by-step workings of the error separate identification/emphasis as a user builds a formula which ends up with three errors.
Figure 10B:
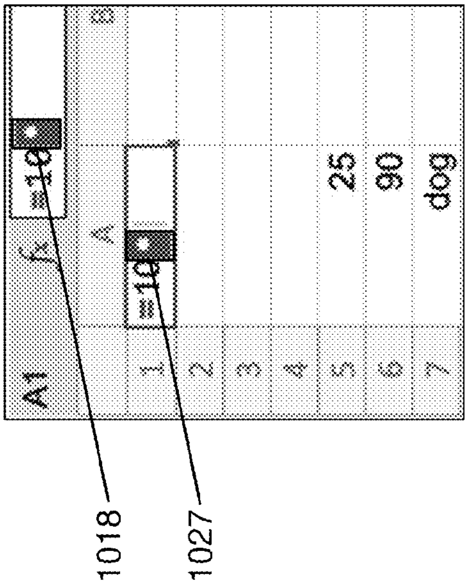
Figure 10C:
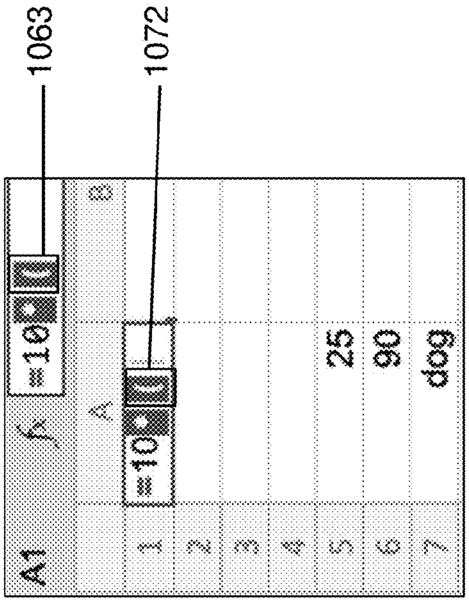

FIG. 10A through FIG. 11D examples the step-by-step workings of the error separate identification/emphasis as a user builds a formula which ends up with three errors. It examples how more errors show up and are resolved automatically during the typing and selecting (cell references) process of creating the formula. In FIG. 10A there is no error identification/emphasis as the formula correctly evaluates, however when the user adds the multiplication sign '*' in FIG. 10B this embodiment separately background highlights it in both the cell formula 1027 and formula bar formula 1018. Doing this because there is no term on the right side of the multiplication sign. In FIG. 10C when the user adds an opening parenthesis '(', our technology separately identifies/emphasizes that as an additional error in both the cell formula 1072 and the formula bar formula 1063. However, when the user clicks (or types) cell 'A5' that shows no error (and in this embodiment is blue to match the cell color) and eliminates the unambiguous error emphasis on the multiplication sign '*' in both the cell formula 1067 and the formula bar formula 1068. This is because despite the unmatched parenthesis, the multiplication now has legitimate terms on both sides of it, terms that with the right data content would evaluate correctly.

Figure 10D:
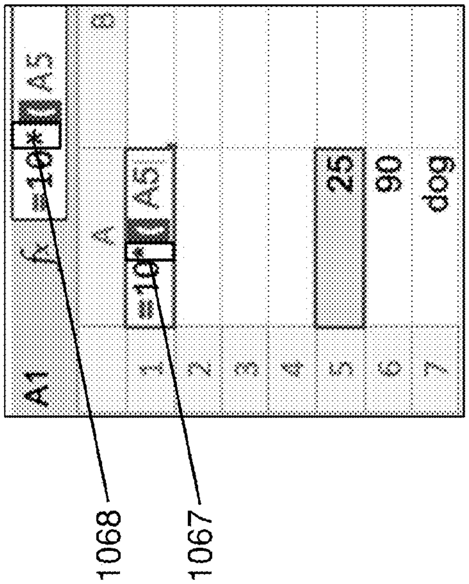
Figure 11A:
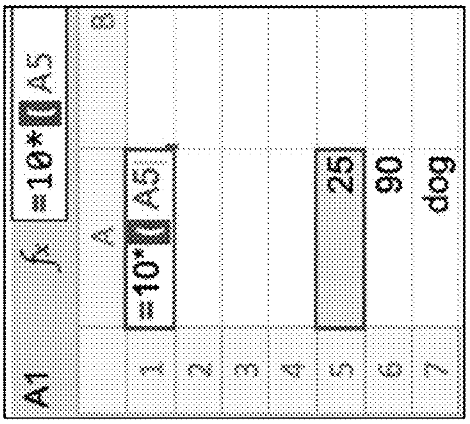
Figure 11B:
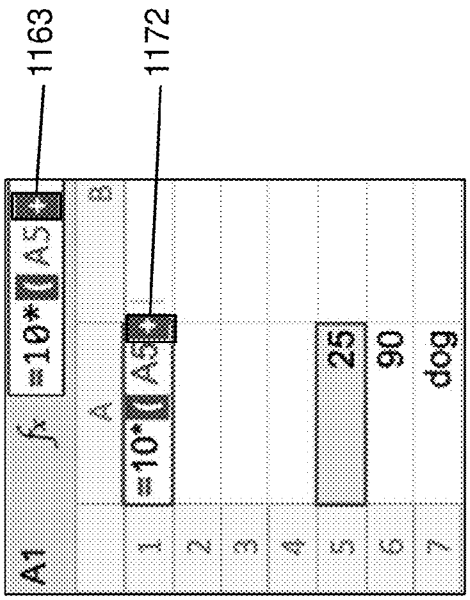
Figure 11C:
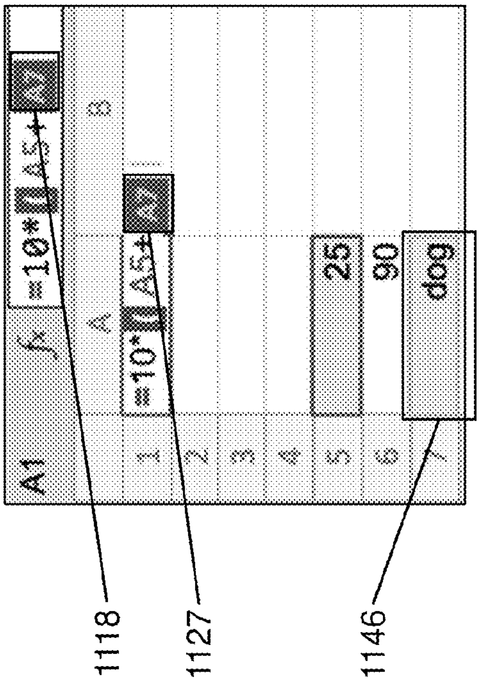
Figure 11D:
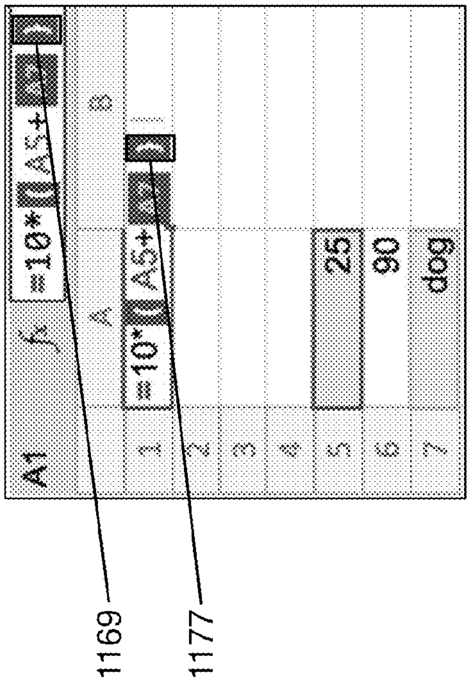

FIG. 11A repeats FIG. 10D to allow easy visual comparison with FIG. 11B where the user has typed an addition operator '+' which is then identified/emphasized as an error in both the cell formula 1172 and the formula bar formula 1163—because it has no legitimate algebraic term to the right of it. In FIG. 11C the user then clicks on cell A7 1146 which populates the formula with 'A7' 1127 eliminating the addition sign error but becoming an identified/emphasized error in both the cell formula 1127 and the formula bar formula 1118. The reason it is an error is cell content 'dog' 1146 which is non-numeric as otherwise the cell reference 1127 is a legitimate algebraic term. This embodiment also retains the cell reference color of light orange in the error emphases. The addition error in FIG. 11B (1163 and 1172) is eliminated despite the data value problem in cell A7 because A7 is a legitimate algebraic term for the addition and the problem is the content. The user then types a curly bracket '}' (shown in 1169 and 1177) instead of a closing parenthesis at the end of the formula and gets the third unambiguous separate error identification/emphasis. In another embodiment all the error explanations would be simultaneously displayed with the typing making it very easy for the user to see each error and understand why it is erroneous. In that embodiment once an error was resolved the error explanation would also disappear.

FIG. 12 further examples how the error explanations from our technology differ from error values or error messages from the existing spreadsheets. As previously discussed, Microsoft Excel only shows algebraic formula error messages once the user hits ENTER to evaluate the formula. So, the comparisons in FIG. 12 are of our as you type error identifications/emphases and error explanations technologies against Excel after formula evaluation post hitting ENTER error values or messages. In many of the situations what Excel generates is error values 1244, e.g., #NAME?, #VALUE! and # DIV/0!, where each error value applies to a set of different error situations not a specific error situation.

Figure 13A:
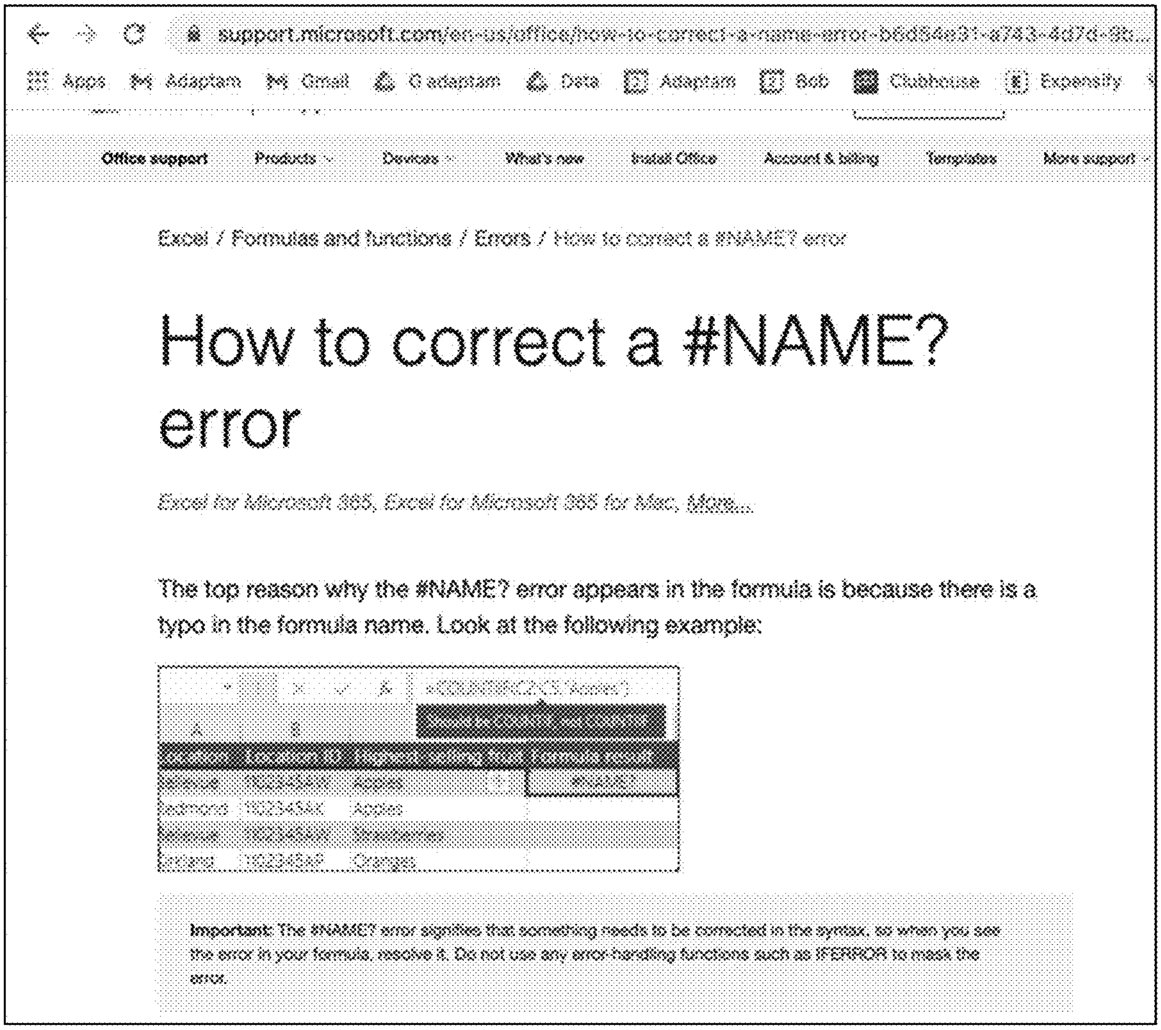
FIG. 13A and FIG. 13B examples how the Microsoft Excel error values are very non-specific via the Microsoft Excel #NAME? error website help suggested problems covered.
Figure 13B:
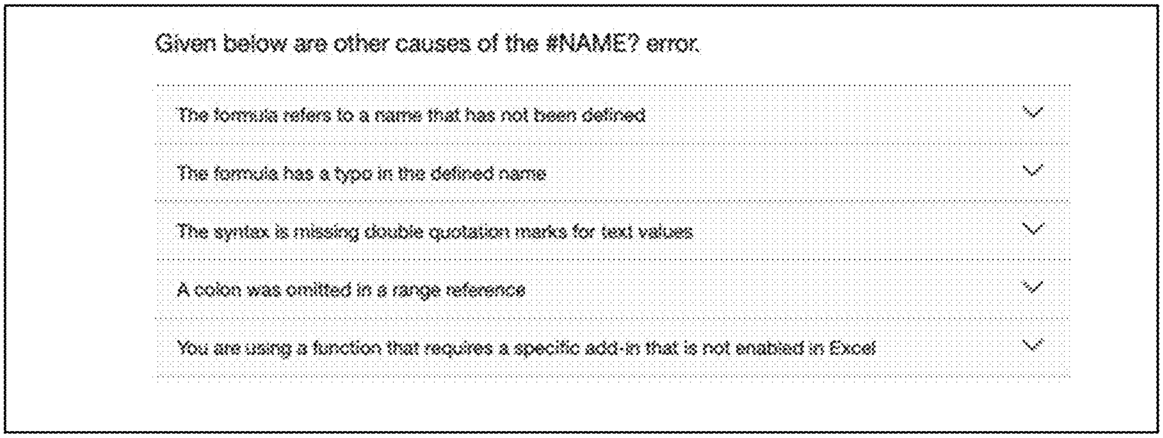
Figure 14:
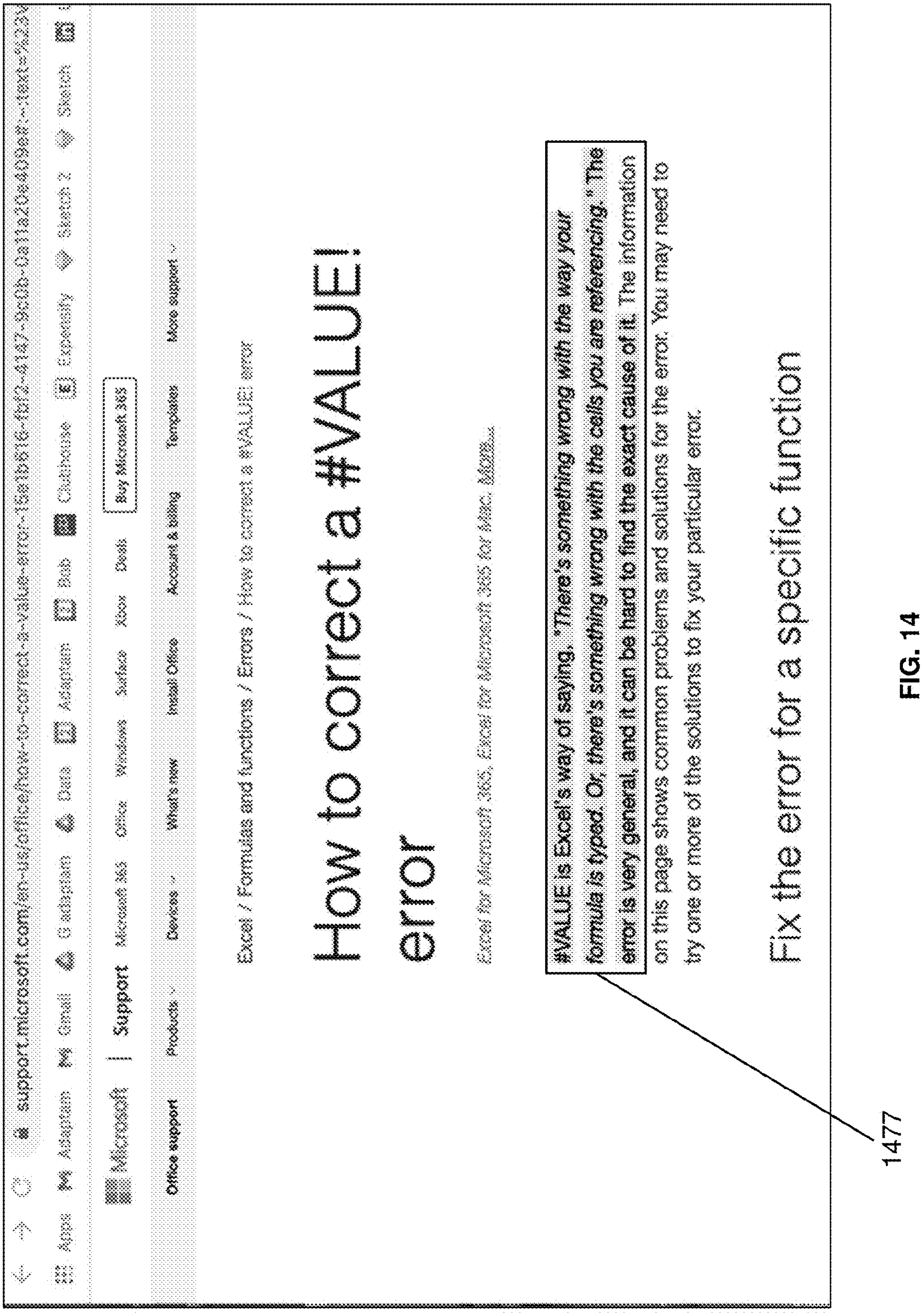
FIG. 14 shows the website help for the #VALUE! error value supplied by Microsoft for Excel.

FIG. 13A and FIG. 13B examples Microsoft's very non-specific Excel #NAME?error description. FIG. 14 shows the help for the #VALUE! error value, to which Microsoft applies yellow highlighting, telling the user ' #VALUE! is Excel's way of saying "There's something wrong with the way your formula is typed Or, there's something wrong with the cells you are referencing." The error is very general, and it can be hard to find the exact cause of it' 1477. Again, these messages do not differentiate across multiple errors, so very different from our technology where identification/emphasis of multiple separate errors appears as you type giving the user a specific error explanation for the cause of each error and identifying and explaining each of multiple errors as exampled in FIG. 12 1267. The other error type generate by Excel is a popup that instead of giving an evaluated cell error value requires the user to fix the error or errors before correctly evaluating the formula. The two examples in FIG. 12 1283 give that form of error message, both generating the same error message 178 shown in FIG. 1B. Again, our technology instead gives users identification/emphasis of multiple separate errors as you type along with a specific error explanation indicating the exact cause of each of the multiple errors as exampled in FIG. 12 1277. FIG. 12 examples the content of each error as you type with separate error identifications/emphases and explanations that can be implemented in any of the previously discussed embodiments or equivalent variations and can supply the content for a post ENTER and formula evaluation error message.

FIG. 15A through FIG. 15C examples the additional help users can get from an Excel error value. If the user clicks on the green triangle 1535 for the error value they get a yellow popup 1534 which they can click (their second click) to get another popup 1566 which then gives the user a number of clickable options. If then on their third click they select 'Help on this error' 1545 they then get the very general help popup shown in FIG. 15B. This, like the web help, gives no specific help and allows a user to scroll down and look at a number of general suggestions on what might be wrong with their formula. If they instead click 'Trace error' 1555 it shows them the cells referenced by the formula as exampled in FIG. 15C but again gives no specific help identifying the error or errors and no specific explanation of the error or errors. The remaining options in the 'Invalid name Error' popup 1566 allow the user to: ignore the error—which here means remove the green triangle 1535 in the upper left corner of the cell or switch the cursor to Edit in the Formula Bar, and finally the Error Checking Options . . . allows the user to remove enable or disable showing many different types of error. However, with lots of clicks the user still does not get specific identification/emphasis of one, let alone many separate errors and specific error explanations for each error that tell what it is and specifically where it is created.

Figure 16:
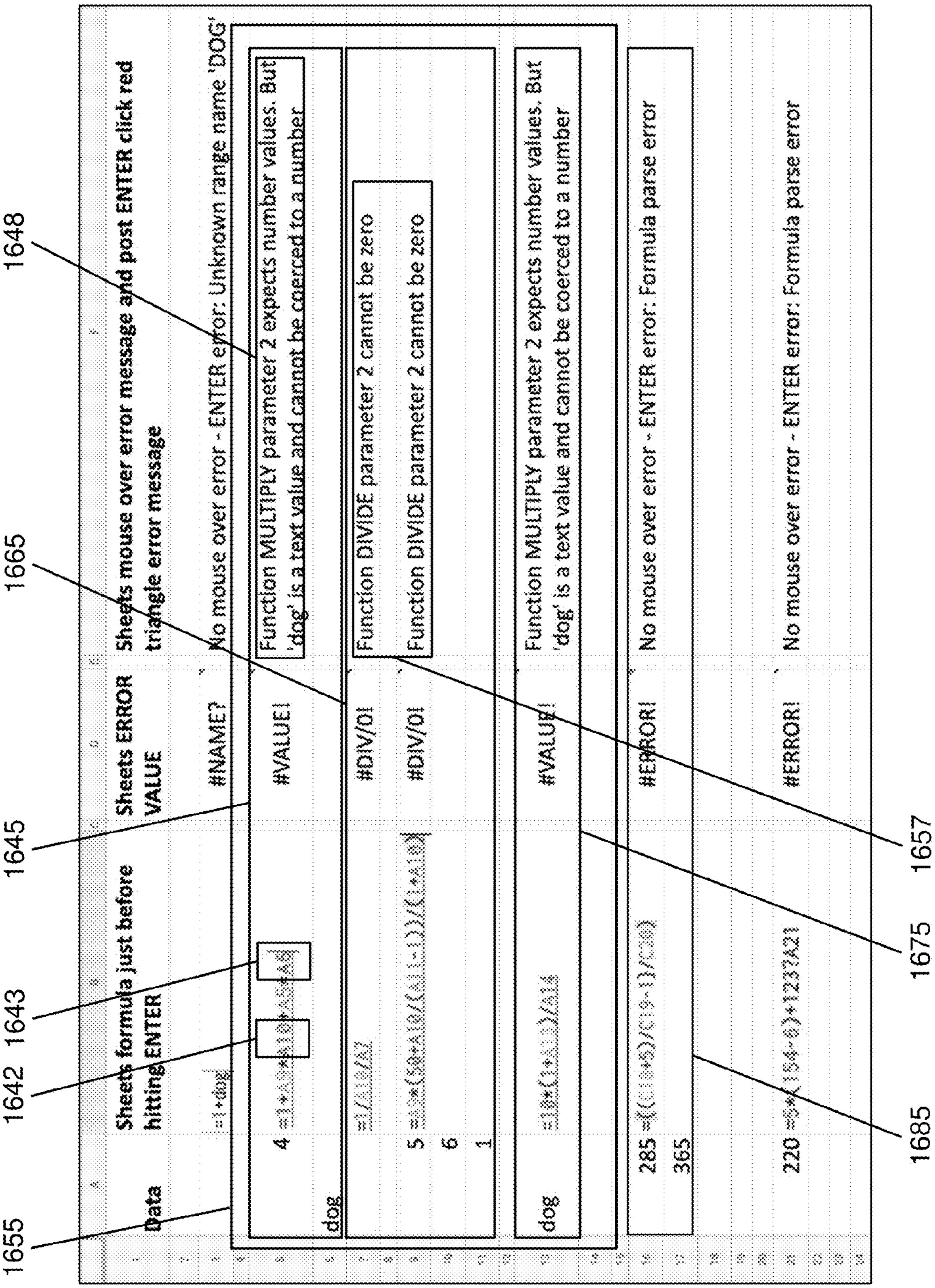
FIG. 16 examples the Google Sheets outcomes for the same set of formulas exampled in FIG. 12 for Excel and our technology.

FIG. 16 examples the Google Sheets outcomes for the same set of formulas exampled in FIG. 12 for Excel and our technology. Sheets does go farther than Excel in that three of the examples 1655, have the previously discussed red underline of the entire formula containing an error. Those red underlined formulas then have a mouse over error message, which displays as shown in FIG. 5D 586 the same message that a user gets post hitting ENTER and then clicking the red triangle in the left corner of the cell as exampled in FIG. 6 644. They only display one error message, not multiple messages in situations with more than one error. The red underlining only indicates that the formula has an error, it does not identify/emphasis for the user what token or set of tokens cause the error. The error messages are more explanatory than those in Excel but not specific as to where the error is. Example 1645 shows this as the error message 'Function MULTIPLY parameter 2 expects number values. But 'dog' is test value and cannot be coerced to a number' 1648, however the error message does not tell the user which of the two parameter 2s ('A10' 1642 or 'A6' 1643) specifically contains the erroneous 'dog' value. So, Sheets does not specifically identify/emphasis the error and the explanation does not trace the cell reference to the value. Both formulas in 1665 with the 'Function DIVIDE parameter 2 cannot be zero' 1657 error message example the same issue of not specifically identifying where the error is. Examples 1675 and 1685 both contain multiple errors but there is no identification of multiple errors in either (and 1685 has no indication of an error at all) as you type and only a single error message from both after the user hits ENTER. So, Google Sheets gives no identification/emphasis of the token or tokens creating an error as you type nor after hitting ENTER. It also does not give a specific error explanation telling the user exactly where the error resides in the formula and then tracing the erroneous value to the cell reference directly. As we previously discussed, Sheets like Excel does not identify/emphasis and explain multiple errors. And finally, the process to get the explanations in both Excel and Sheets requires work by the users clicking cell triangles, dealing with popups and/or cancelling error messages (in Excel) in order to complete a formula—all of which goes away in many of our technology embodiments.

Figure 17A:
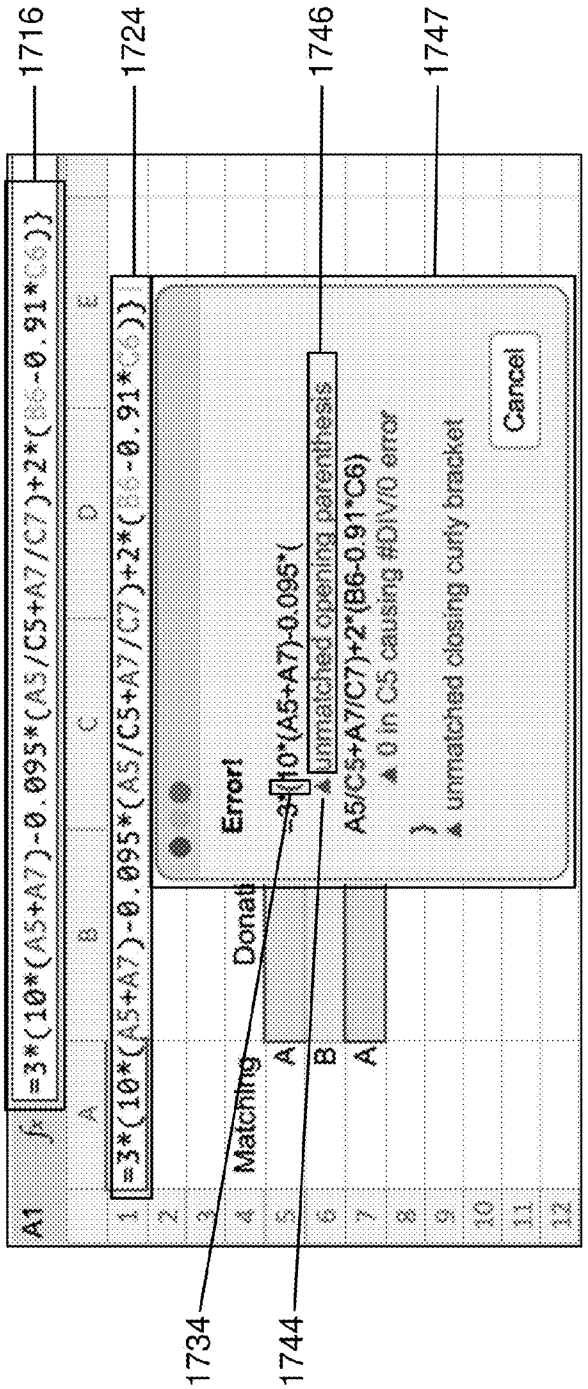
FIG. 17A and FIG. 17B example two different embodiments of our formula completion error messages for three errors.
Figure 17B:
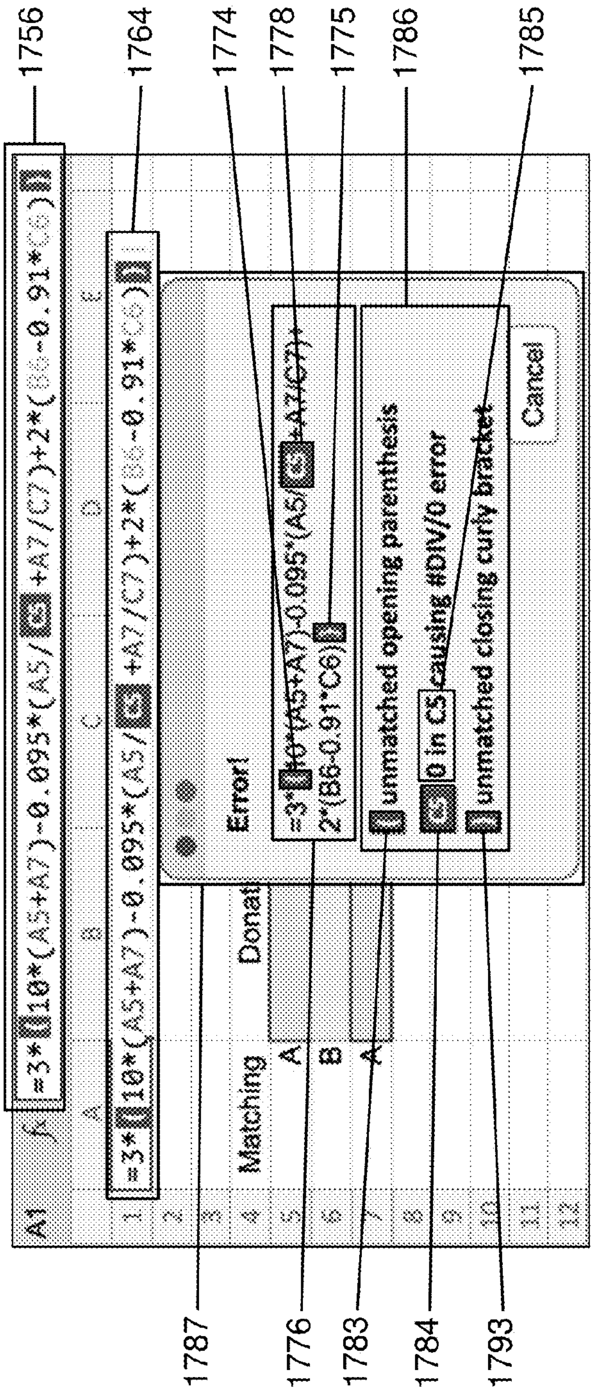

Many of the as you type advantages of our technology also translate into the after ENTER (formula evaluation) popup completion error messages or in-cell error value error messages. FIG. 17A and FIG. 17B example two different embodiments of our formula completion error messages having separate identifications/emphases of the errors in the formula accompanied with specific error messages for each of the errors. The popup 1747 in FIG. 17A examples an embodiment where each error explanation is interspaced with a pointer (e.g., 1744) linking each error explanation (e.g., 1746) with the error identification/emphasis (e.g., 1734). In this example there are three separate errors identified/emphasized each with an error explanation. In this embodiment the unambiguous separate error emphasis can be less elaborate, in this example just red bolding, because breaking to the following line is used to separate errors that are right beside each other. Also, in this example there is no error identification/emphasis in either of the formulas (1716 and 1724). FIG. 17B examples a different embodiment for the formula in FIG. 17A where the error message 1787 formula 1776 and the separate error identifications/emphases (1774, 1778 and 1775) sits above the three error explanations 1786. In this example, each of the error emphases (1783, 1784 and 1793) are repeated as the subject of the specific error explanations (i.e., start each explanation giving a visual connection) making understanding the error easier. Data in-cells is traced and presented as in the '0 in C5' 1785 in the second error explanation. All these capabilities allow the user to easily identify where each error is within the formula and understand from the explanation why it is an error.

Figure 18A:
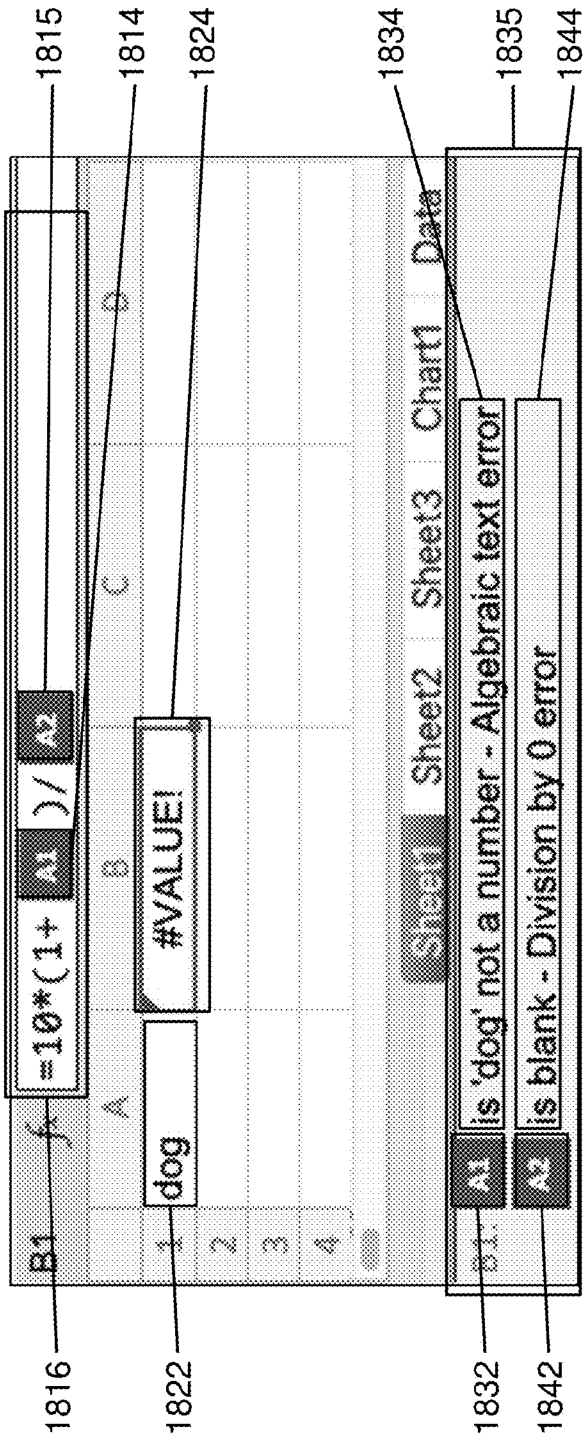
FIG. 18A and FIG. 18B example two embodiments of how our technology delivers error messages that accompany the in-cell error values.
Figure 18B:
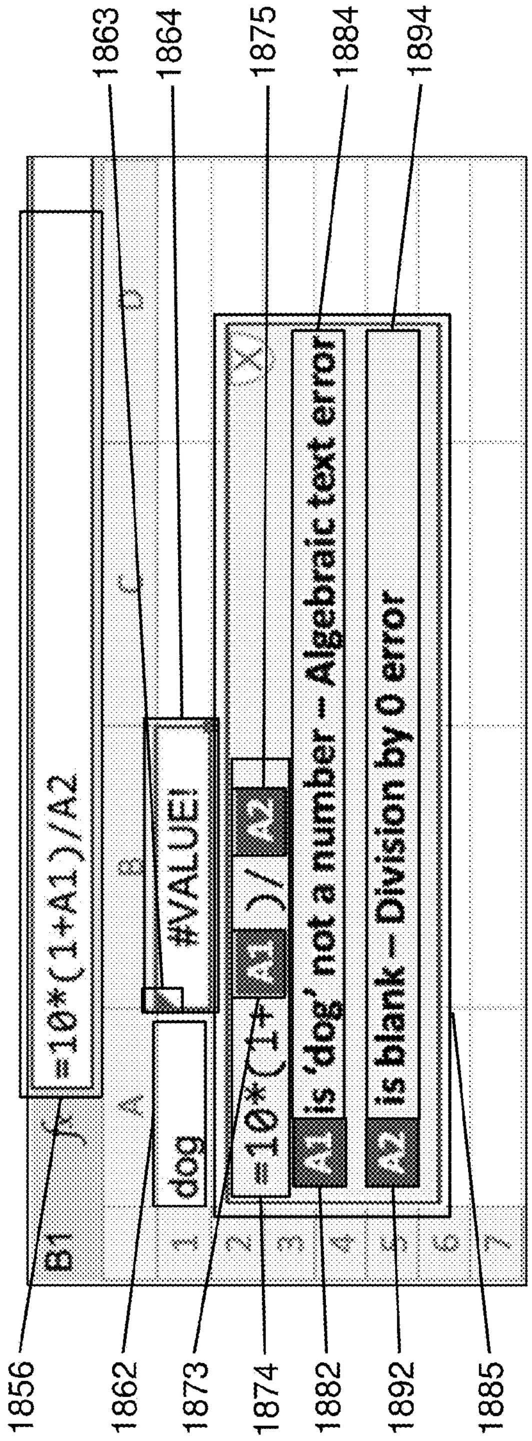

FIG. 18A and FIG. 18B example two embodiments of how our technology delivers error messages that accompany the in-cell error values. FIG. 18A examples where once the formula has evaluated to the in-cell error value, in this example ' #VALUE!' 1824, what the user automatically sees in the formula bar 1816 which is an unambiguous separate error identification/emphasis for each error (1814 and 1815). The corresponding error explanations are automatically shown in what we call the status bar 1835 at the bottom left corner of the spreadsheet. There each separate error identification/emphasis (1832 and 1842) is accompanied by its error explanation (1834 and 1844) to jointly provide the user with a specific explanation telling the user exactly where the error resides in the formula and then trace any information (e.g., 'A2 is blank' 1842 and 1844) required so the user directly knows what the error is and its causes. An advantage of this approach is the user does not need to do anything other than being in the cell to see the errors and their explanations. FIG. 18B examples a more traditional spreadsheet approach where the user clicks on a red triangle 1863 to get a popup error message 1885 which contains the cell formula 1874 with each of the separate error identifications/emphases (1873 and 1875). Below that error formula are the two error explanations, in this embodiment each starting with the error emphasis (1882 and 1892) followed by their respective specific error explanations (1884 and 1894) doing any tracing required.

Whether it is as you type or after users hit ENTER, our technology clearly unambiguously identifies and separately emphases errors, even if they are right next to each other, in the cell formula, formula bar formula and/or error message UI. It does this for multiple errors, whether they are caused by formula coding errors, data usage induced errors in otherwise fine formulas terms or a combination of the problems. It gives very specific error explanations for each error, which can trace errors through cell references and algebraic terms to determine the error. Many embodiments do this so the user is not required to take any additional actions to see the errors and can immediately/automatically see if changes have eliminated an error or errors. The as you type capability allows users to immediately know when they have an error and with the specific explanations what they need to resolve to have a working formula—all of which makes writing complex formula much easier. We are now going to show how our technology makes writing formulas with functions easier.

As You Type Error Identification—Formulas with Predefined Spreadsheet FUNCTIONS

The existing spreadsheet function error handling capabilities largely parallel those previously described for algebraic formulas with a few differences that we will discuss. And as far as analogous programming tools, the same differences apply that the capabilities of our technology could not be reproduced by even a combination of an IDE with database extensions, and a REPL/debugger. And those sets of tools have not been combined because they run in non-compatible ways, Finally, those tools do not have to contend with the single extended line formula limitations that happen in a spreadsheet. This challenge is accentuated with spreadsheet functions because of the multiple different arguments/parameters found next to each other in many of the predefined spreadsheet functions.

Figure 19A:
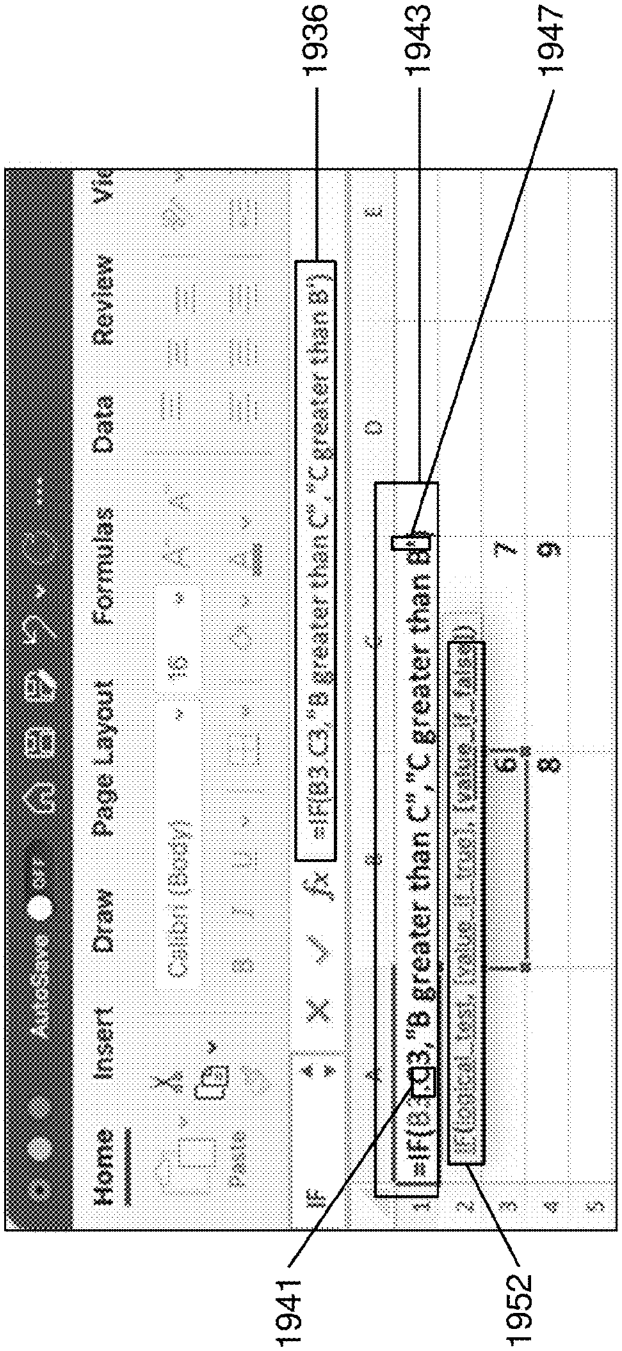
FIG. 19A and FIG. 19B examples an IF function formula in Microsoft Excel and Google Sheets where there is no identification of an error in the cell formula and formula bar formula until the user hits ENTER.
Figure 19B:
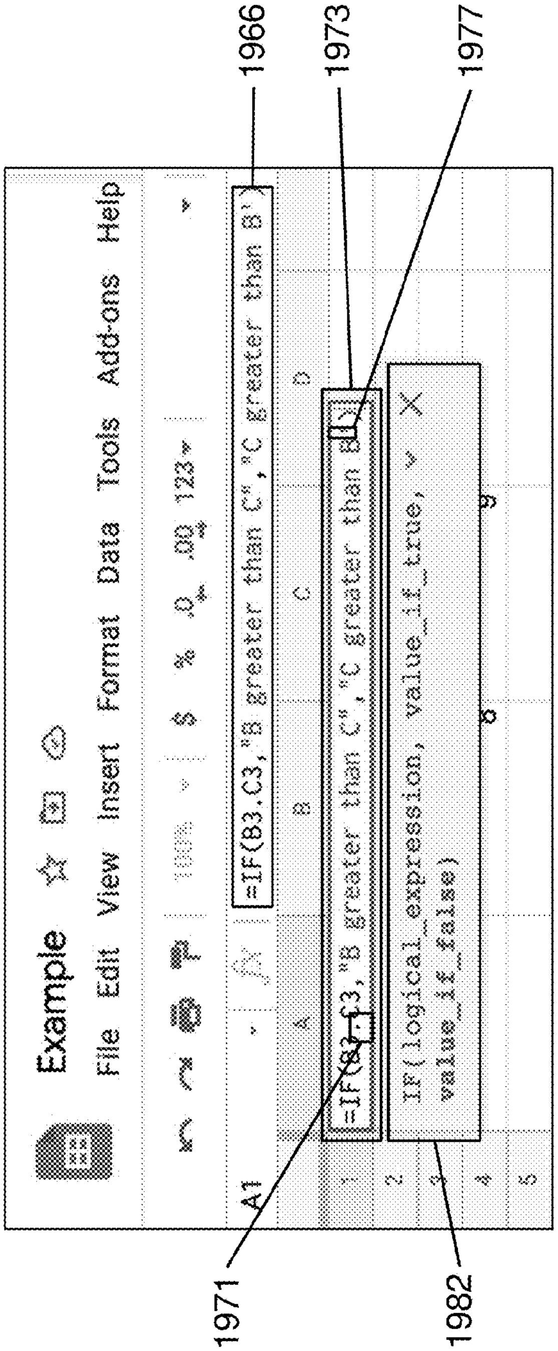

FIG. 19A and FIG. 19B examples an IF function formula in Microsoft Excel and Google Sheets where there is no identification of an error in the cell formula and formula bar formula until the user hits ENTER. This is the situation for all Excel function situations. In Sheets some of the function situations show the red underline as you type after you have inputted all the required arguments/parameters and the closing parenthesis typed—so right before users would typically hit ENTER. Sheets is not giving the user error messages as they type and does not unambiguously identify/emphasis the specific token or tokens causing the error. Excel and Sheets, even after formula evaluation, do not identify and message about more than one error.

FIG. 19A examples an IF function in Excel where the formula has all the required arguments/parameters, as shown in the argument/parameter tracker 1952, and has two errors (the period '.' 1941 and the single quote ''' 1947) but shows no indication of an error in either the cell formula 1943 or the formula bar formula 1936. This is like all the other Excel functions with the only difference that in some situations, typically when something other than the correct comma is used to separate arguments/parameters, the argument/parameter tracker does not progress as the user types more of the formula—however even when this happens there is no indication of an error in the formula in the cell or formula bar. FIG. 19B examples the same IF function formula in Sheets where the formula has all the required arguments/parameters, as shown in the argument/parameter tracker 1982, and has two errors (the period '.' 1971 and the single quote ''' 1977) but shows no indication of an error in either the cell formula 1973 or the formula bar formula 1966. However, as we will discuss next there are some Sheets function formula settings where upon completion of the required arguments/parameters of the function (including the closing parenthesis) it triggers in a red line underline of the entire contents of the function before the user hits ENTER.

Figures 20A, 20B, 20C:
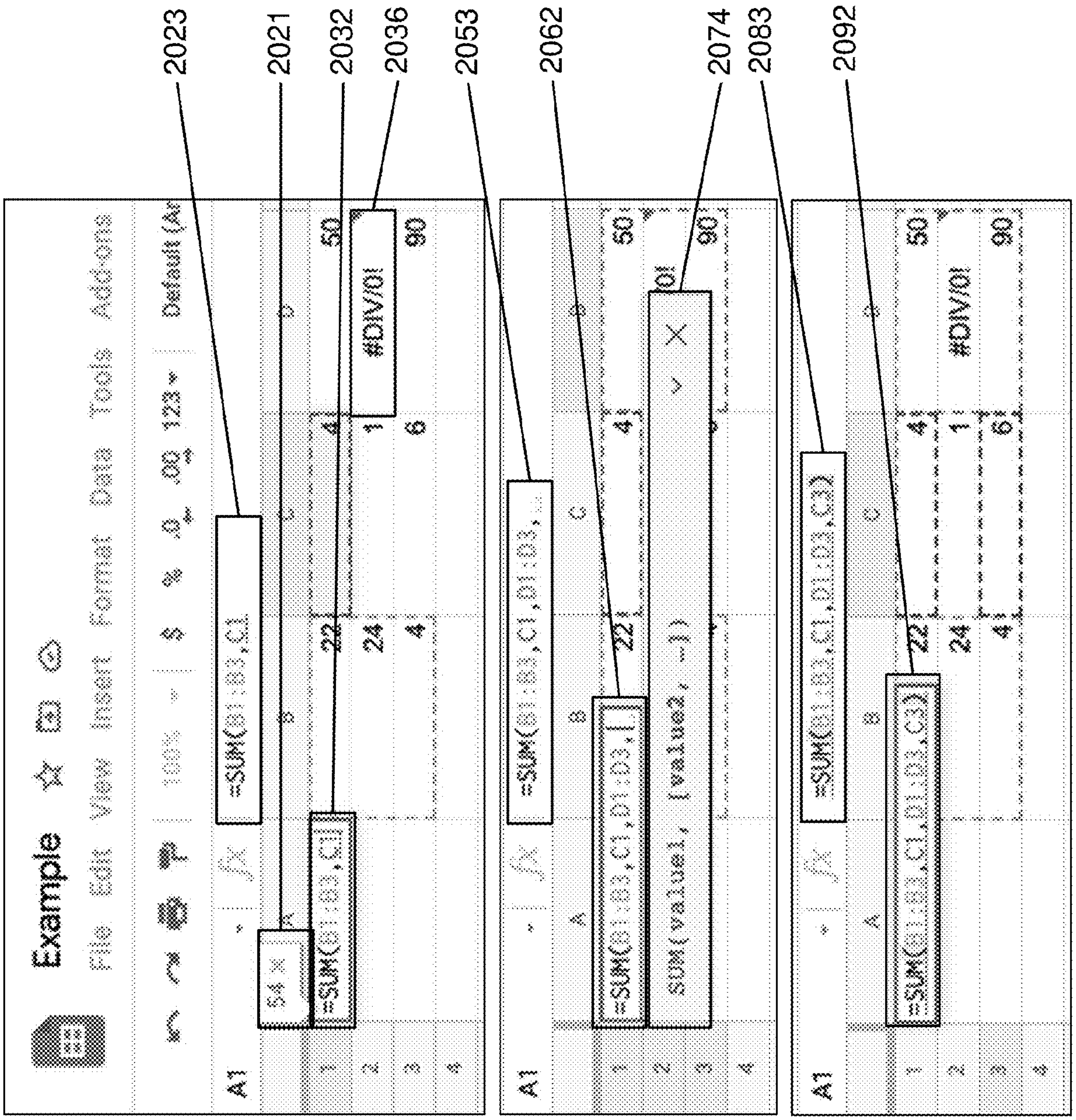
FIGS. 20A, 20B and 20C example a Google Sheets SUM function formula showing the as you type formula evaluation and the only indication of an error coming in the red underline error identification once the formula is complete but before hitting ENTER.

FIG. 20A through FIG. 20C example a Google Sheets SUM function formula showing the as you type formula evaluation and the only indication of an error coming in the red underline error identification once the formula is complete but before hitting ENTER. FIG. 20A examples the evaluation of the function formula 2021 above the active formula, which in this example is in cell 'A1' 2032 but could have been above in the formula bar formula 2023 had that been where the user was building the formula. In FIG. 20B the formula evaluation stops because the user has inputted in the formula a range containing an ' # DIV/0' error 2036 which in this situation is mostly obscured by the argument/parameter tracker 2074. However, nothing in the in-cell 2062 or formula bar 2053 formula identifies that the formula has an error. It is only when the user completes the function formula adding the closing parenthesis, as shown in FIG. 20C, that Sheets identifies there is an error in the function with a red line underlining the entire function in the in-cell formula 2092 and the formula bar function formula 2083. That identification is general for the whole formula not unambiguously identifying/emphasizing the specific token (s) in the formula that cause the error. It is not done as you type each token of the function formula but only when you complete the function just before most people would click ENTER. And as shown in FIG. 19B it does not happen all of the time.

Figure 21A:
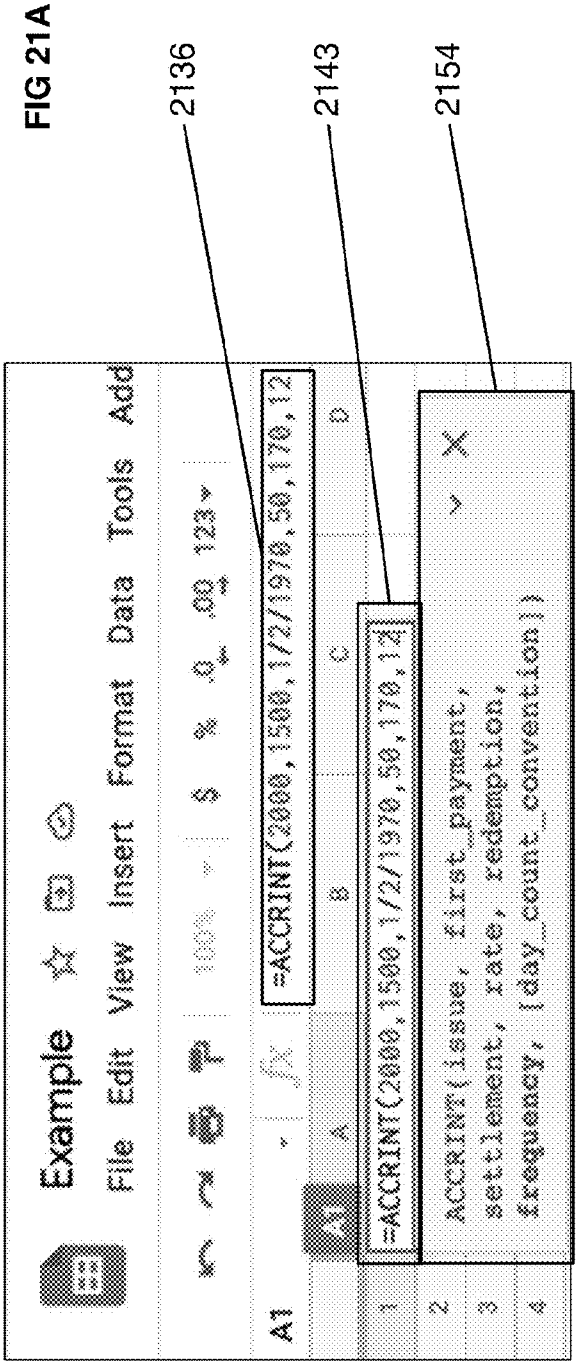
FIG. 21A and FIG. 21B shows a Google Sheets function formula with the red line error identification applied to an example with multiple errors and a single error message mouse over once the formula has its complete syntax (prior to evaluation).
Figure 21B:
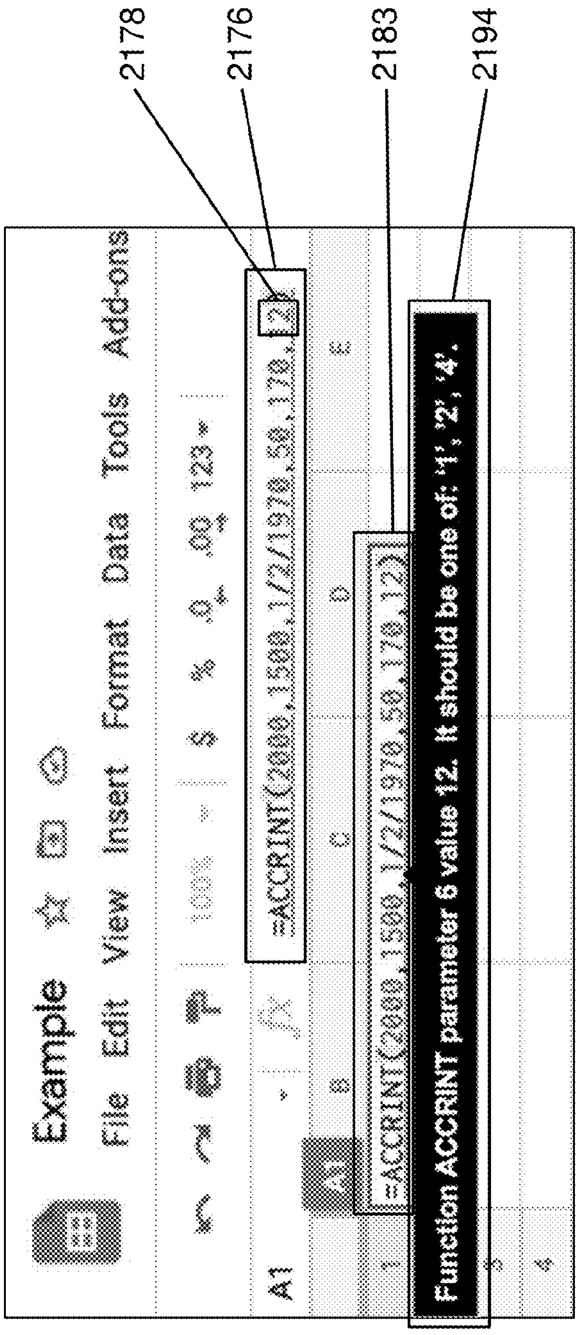

FIG. 21A and FIG. 21B shows a Google Sheets function formula with the red line error identification applied to an example with multiple errors and a single error message mouse over once the formula has its complete syntax (prior to evaluation). FIG. 21A examples a more complicated function, ACCRINT, which has multiple different arguments/parameters with different and related requirements. The formula has three errors in its formula (2143 and 2136), but because the closing parenthesis has not been added shows no indication of an error. In FIG. 21B when the user adds the closing parenthesis both of the formulas in-cell 2183 and in the formula bar 2176 show the entire formula red underline described above. The user can then mouse over and get an error message 2104, which in this situation gives a message for the last parameter ('parameter 6') but not for either the second or third parameter which also contain errors. Thus, the user gets only one error message, no unambiguous separate error identification/emphasis within the formula of any error, let alone three separate identifications/emphases. Had the value of '12' 2178 in the formula instead been provided in a referenced cell the user would have gotten the exact same error message 2194 without any direct reference in the message of the fact that the value 12 was in a specific referenced cell, no tracing.

Figures 22A, 22B, 22C, 22D:
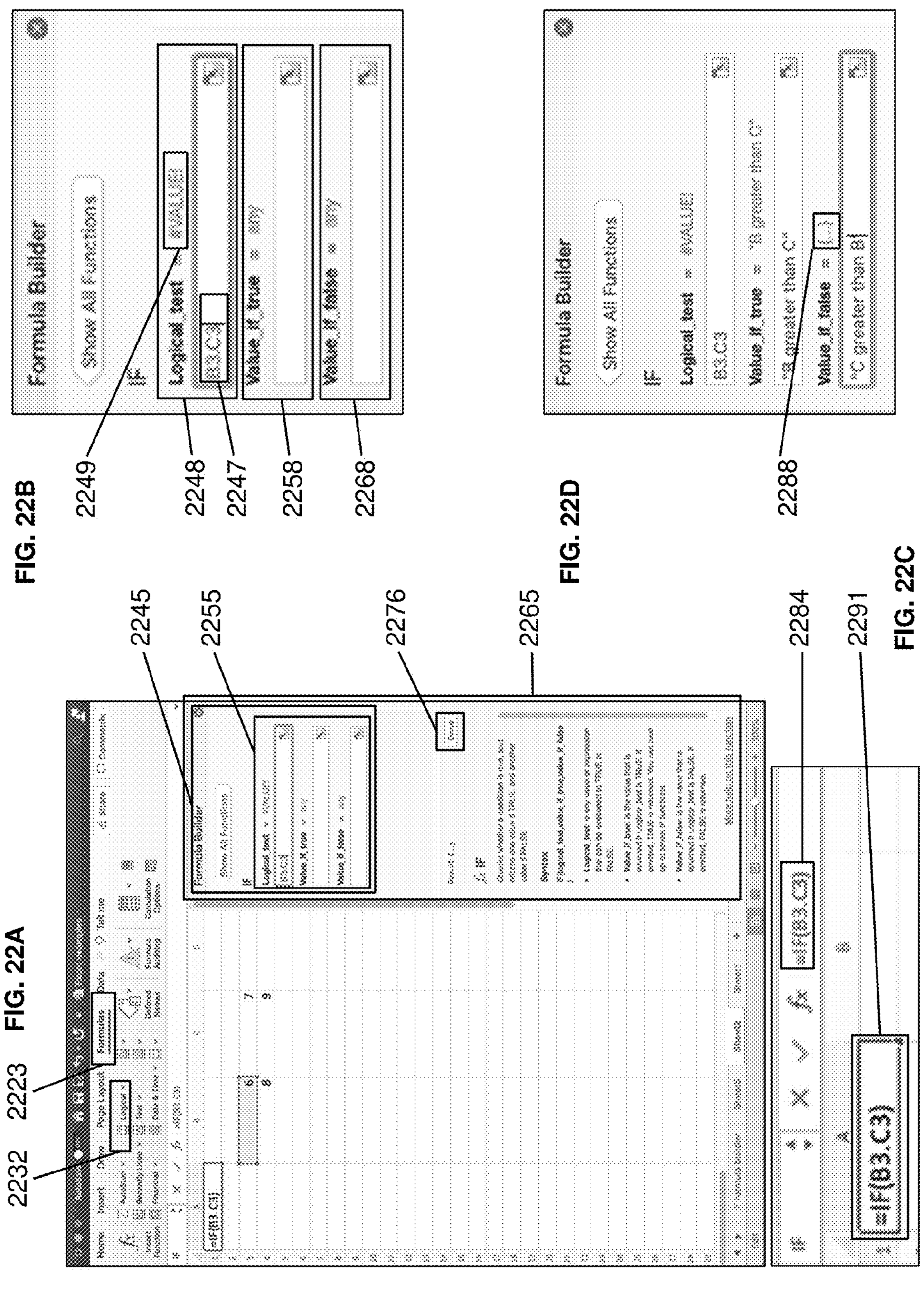
FIGS. 22A, 22B, 22C and 22D shows the Microsoft Excel function Formula Builder.
Figure 24D:
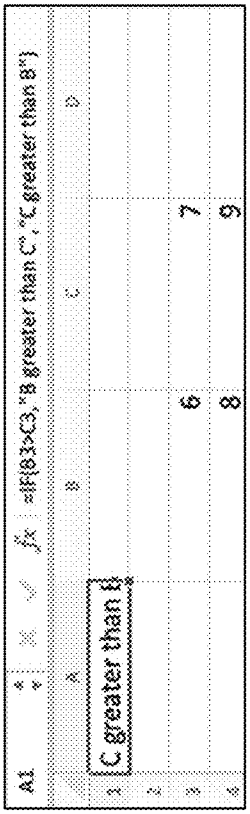
FIGS. 24A, 24B, 24C, 24D, 25A, 25B, 25C, 25D, 26A, 26B, 26C and 26D examples the difference in correcting an in-cell IF function formula with two errors in Microsoft Excel, Google Sheets and our technology.
Figure 24C:
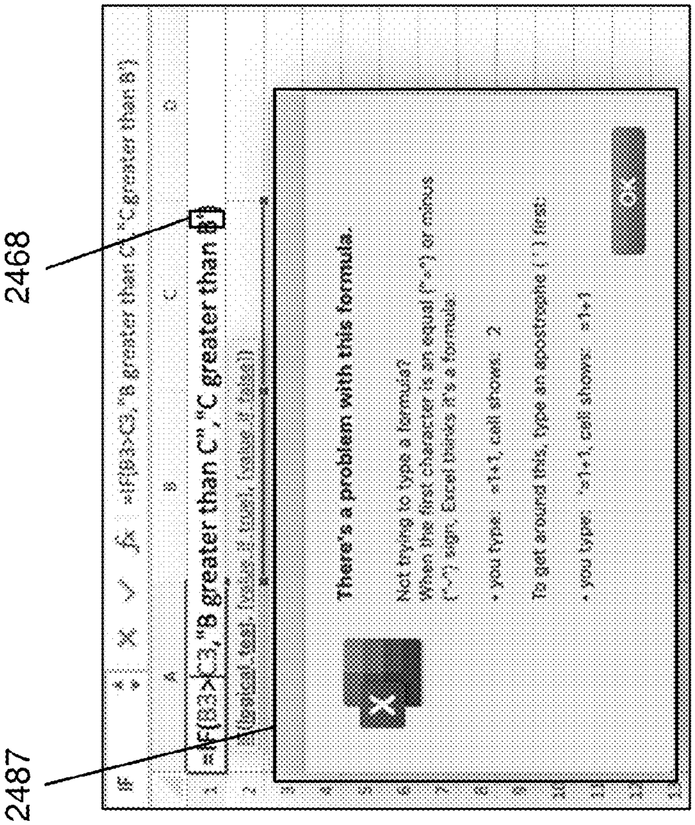
Figure 24A:
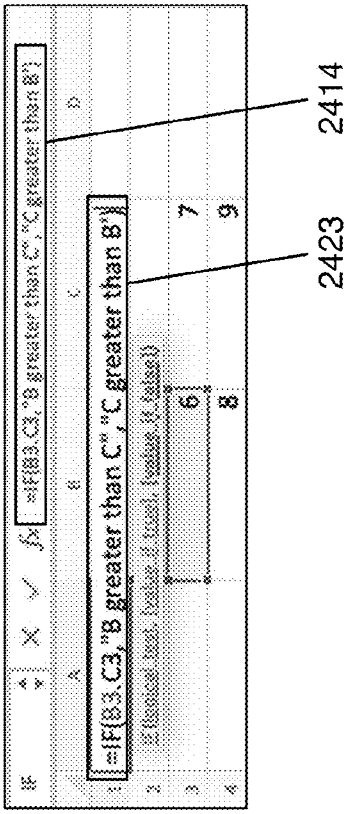
Figure 24B:
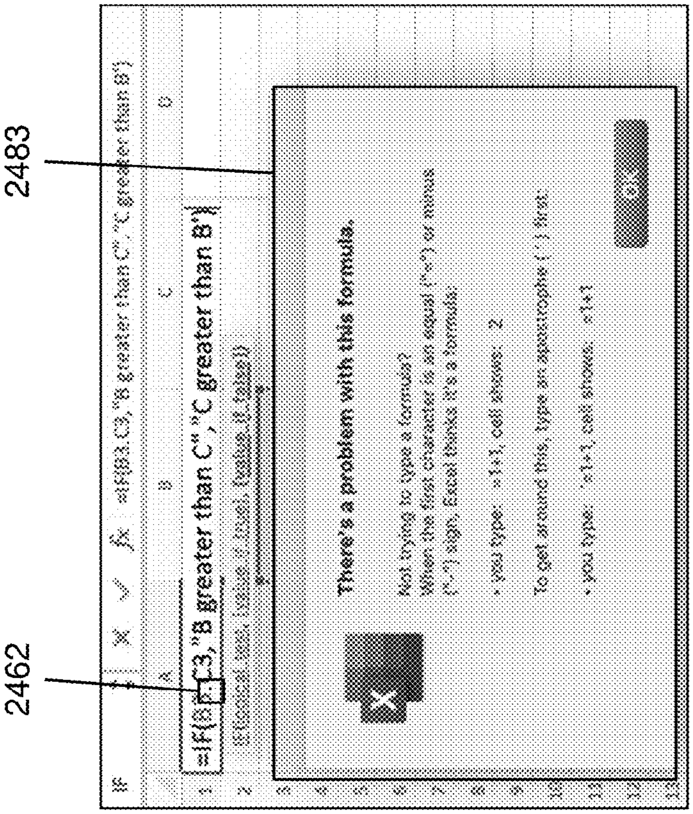
Figures 25A, 25B, 25C, 25D:
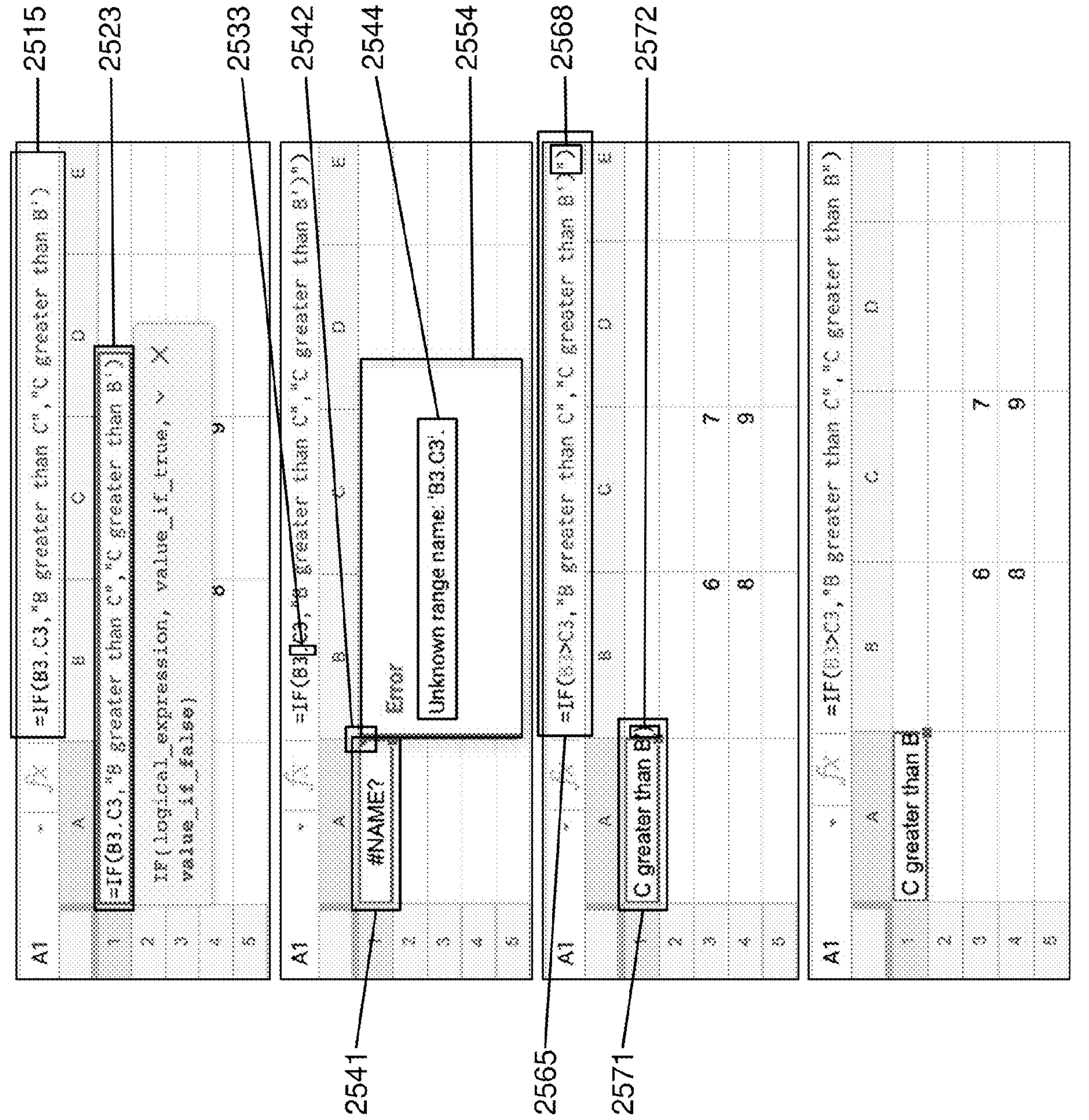

Excel does have an additional capability for building a formula that is composed of only one function. That is exampled in FIG. 22A through FIG. 22D for the IF function. It is accessed from the Formulas tab 2223 by then selecting a type of function, in this example Logical 2232 and then selecting the desired function from a dropdown list. That then brings up the Formula Builder sidebar 2265 in which the function formula is built. That sidebar has a data entry area for each argument/parameter, in this case three 2255. The user types or selects an input or inputs into each of the arguments/parameters (2248, 2258 and 2268) which is blown up in FIG. 22B. Users will then see an evaluated value for each of the inputs and if the argument evaluates to an error value they know the broad category of the error (because almost all error values are general groupings of many different types of errors as previously exampled in FIG. 13A, FIG. 13B and FIG. 14). An example of this is shown for the Logical test 2248 where the input 'B3.C3' 2247 generates the error value ' #VALUE!' 2249 in the Formula Builder sidebar blown up in FIG. 22B (full sidebar shown in FIG. 22A 2265). The Formula Builder generates no identification of what in the argument/parameter 2247 is specifically causing the error (no identification/emphasis of the token or token causing the error), no specific explanation of the error just a broad error value and no indication of any sort of error in the formula bar or in-cell formula blown up and show in FIG. 22C 2284 and 2294. The formula builder does not identify if there is more than one error in an argument/parameter and in situations where the error does not resolve to an error value, as shown in FIG. 22D, the user apparently gets at value of '{ . . . }' 2288 and receives an error popup after hitting the 'Done' button 2276 or hitting ENTER. When the user hits done or ENTER with more than one error in the formula Excel gives a single error message or error value, not a listing of the multiple errors, no unambiguous identification/emphasis of exactly the tokens that caused errors and no multiple explanations of the errors. This formula builder is also limited to working one function at a time and not cascading to functions within an argument/parameter of another function.

FIG. 23 shows that the Excel function Formula Builder error values are not necessarily consistent from the Formula Builder to the spreadsheet cell. In FIG. 23 the 'Result: #VALUE!' 2387 in the formula builder is different from the error value ' #FIELD!' 2332 in the cell A1 holding the formula. Not sure why this is, but as shown here there is no indication of any form in the formula bar formula 2324 of what causes the value ' #FIELD!' 2332 error and why it does not match the 'Logical test=#VALUE!' 2348 above the input and the 'Result: #VALUE!' 2387 in the IF Formula Builder 2368.

Therefore, like in the case of algebraic formulas there is an opportunity to simplify seeing and correcting spreadsheet functions errors caused by typing, selection or data errors by identifying and visually emphasizing the exact tokens creating the errors, doing it so they are visually separated particularly when they are side by side and giving specific (not just general) explanations of the error which trace the data through the formula cell references if applicable. Our technology does all this automatically as the user types so they immediately/automatically see any errors, automatically removes those identifications/emphases and explanations as the errors are resolved and does it for as many errors as the formula has, not just one. It also does it if functions are used within functions. If the user does hit ENTER before resolving errors our technology presents an error message which unambiguously separately identifies/emphasizes each error and gives a specific error explanation tracing data errors through the cell references.

FIG. 24A through FIG. 26D examples the difference in correcting an in-cell IF function formula with two errors in Microsoft Excel, Google Sheets and our technology. We start with Microsoft Excel in FIG. 24A with the formula typed and because there is no indication of an error in-cell 2423 or in the formula bar formula 2414 the user hits ENTER. They then get the error message 2483 in FIG. 24B which gives absolutely no indication of where the error or errors are. So, they look at the formula and see the B3.C3 and realize that they did not hit the shift to get the '>' and instead got '.' 2462, an easy mistake to make. So, they fix that error and hit ENTER to get the error message 2487 in FIG. 24C. They see that it is the same not helpful error message causing them to pause a moment as to whether their change took, but then look a lot harder at the formula and finally see the single quote ''' 2468, which should be a double quote. Another easy to make missed shift mistake. So, finally the user fixes that last error and so after a total of three steps they have what they originally wanted the error free result in FIG. 24D. Not a simple or efficient process as they got virtually no help identifying the problems and explanation of what they were. In a much longer and more complicated formula with more errors this could be a time consuming and frustrating process.

FIG. 25A through FIG. 25D examples the same situation in Sheets. Again, because there is no indication of an error within the in-cell formula 2523 or in the formula bar formula 2515 for the function formula in FIG. 24A in Sheets the user hits ENTER. They then get the error value ' #NAME!' 2541 in FIG. 24B which gives absolutely no indication of where the error or errors are. To get more information the user then has to click on the red triangle 2542 in the cell corner to open the error message 2554. The error message tells the user 'Unknown range name: 'B3.C3'.' 2544 but does not tell them anything about that parameter being a logical expression and more specifics on the issue (e.g., missing comparison operator—>, <, =etc.). However, the user realizes that they did not hit the shift to get the '>' and instead got '.' 2533, as we said before an easy mistake to make. So, they fix that error and hit ENTER to get the result in FIG. 25C 'C greater than B')' 2571 and do not understand where the extra ' ')' 2572 came from. So, they look at the formula bar formula 2565 and realize that Sheets added a ' ')' 2568 to the end of their formula. They then remove the ' ')' 2568 and hit ENTER to get the error free result in FIG. 25D. So, after three plus steps they have what they originally wanted. A different process from Excel but not a simple or efficient process and in much longer and more complicated formulas can be a very time consuming and frustrating process.

Figure 26A:
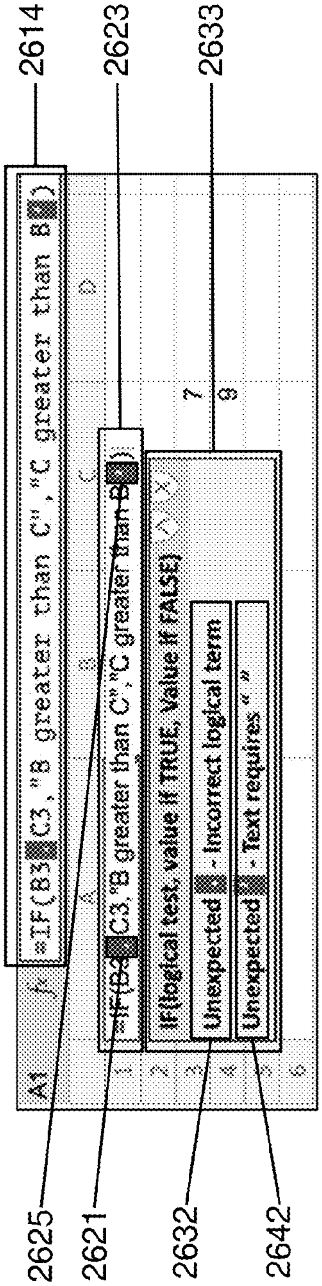
Figure 26B:
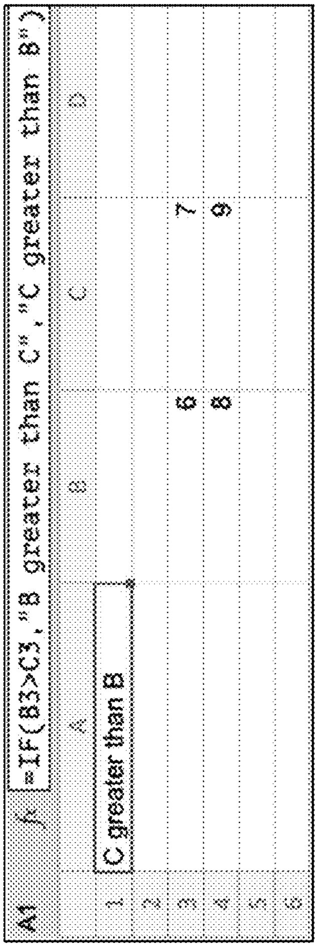
Figure 26C:
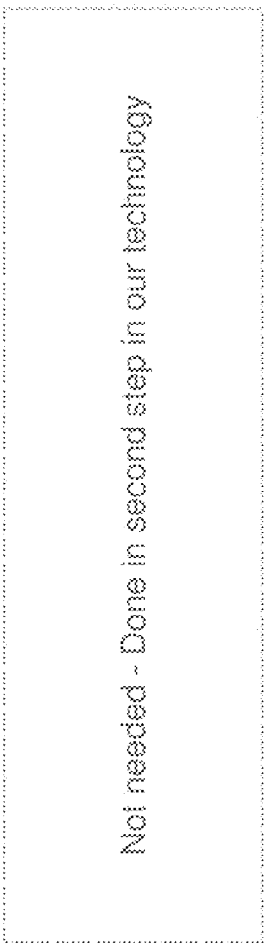
Figure 26D:
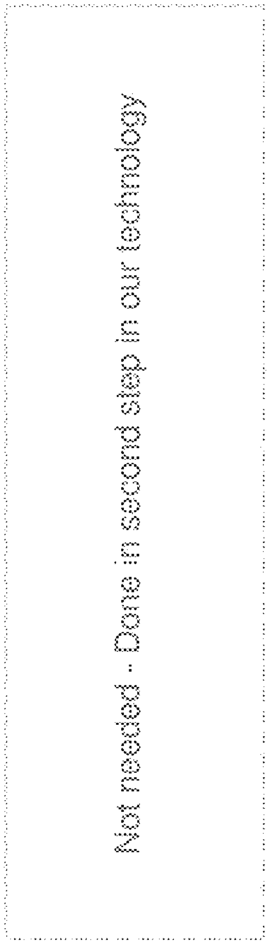

FIG. 26A through FIG. 26D examples the same situation in our technology, except FIG. 26C and FIG. 26D are blank because those steps are unnecessary. FIG. 26A shows in the cell formula 2614 and the formula bar formula 2623 the as you type separate unambiguous identification/emphasis of the token responsible for each of the two errors (e.g., 2621 and 2625 in the in-cell formula). The automatically deployed error popup 2633 shows the two specific error explanations (2632 and 2642), which in this embodiment includes the identification/emphasis of the token responsible for each of the two errors. This combination makes if visually very easy for the user to see exactly where the errors are and what is wrong, thereby making it simple for the user to correct them. Therefore, they correct the errors in one step, and see that they are fixed (because the error identifications/emphases and the error explanations go away and there is no red in their formula) and hit ENTER to get to correct formula in FIG. 26B—two less steps than in Excel or Sheets with no hunting for and trying to figure out errors. Imagine how much easier this is in long and complicated formulas as well as ones including multiple different functions and functions within functions.

Figure 27A:
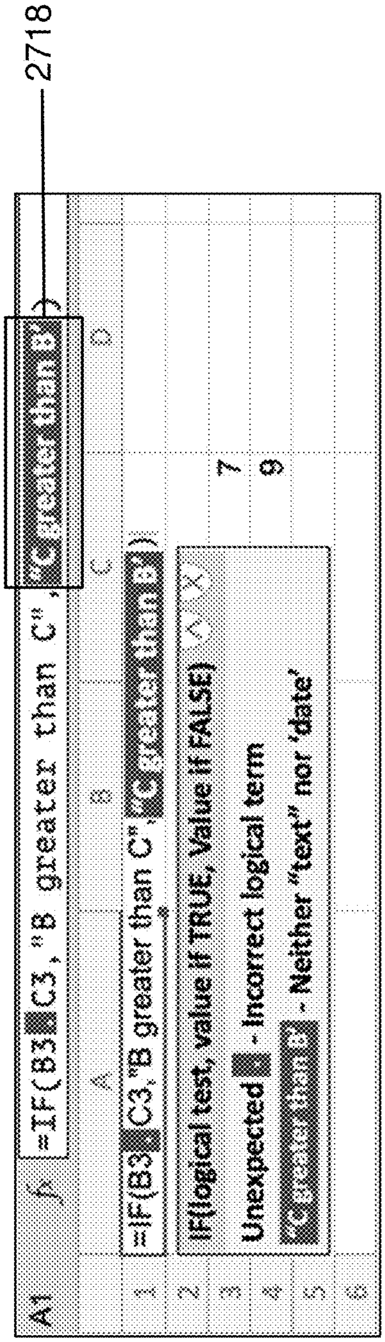
FIGS. 27A, 27B and 27C examples different embodiments of our technology for the error identifications/emphases and error explanations for the formula in FIG. 26A.
Figure 27B:
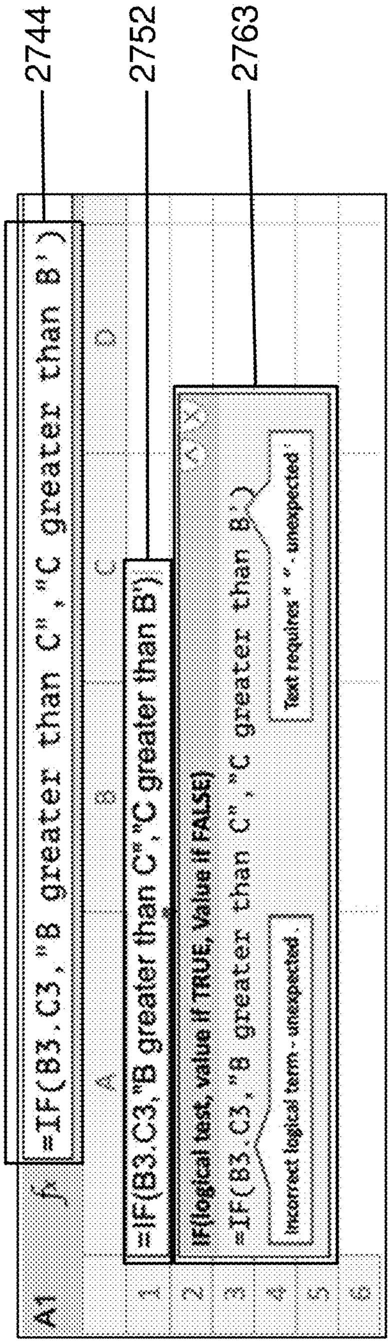
Figure 27C:
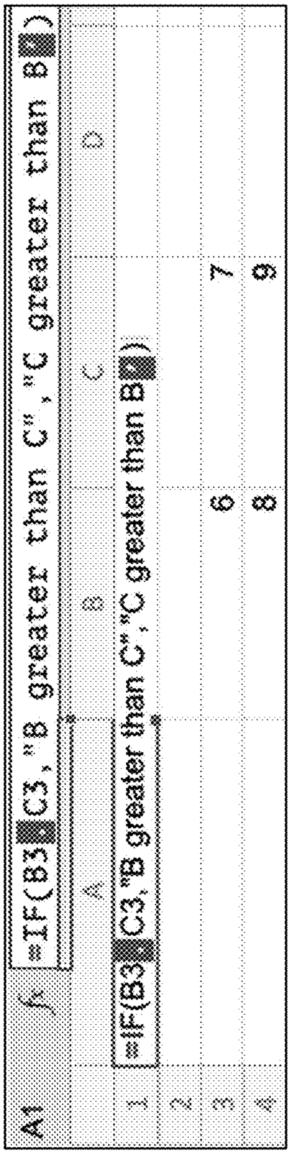

FIG. 27A through FIG. 27C examples different embodiments of our technology for the error identifications/emphases and error explanations for the formula in FIG. 26A. FIG. 27A examples an error identification on the second error '" C greater than B' ' 2718 where the technology identifies/emphasizes and explains the error pointing out the entire set of tokens that constitute the problem rather than simply the last token single quote ''' that is used for dates and therefore inconsistent with the double quote and text '"C greater than B'. In some more ambiguous settings, for example where the content includes some text and a date—going with this entire set of tokens approach is likely the best specific answer. In either situation our technology has been specific on the error to a level that the user understands why it is erroneous. FIG. 27B examples putting the error identification and emphasis in the popup 2763 and not in the in-cell formula 2752 and the formula bar formula 2744. It uses color to differentiate the separate errors and to frame the error explanations. FIG. 27C examples an embodiment where either the technology or the user has turned off the error explanations and is only showing the separate error identifications/emphases.

FIG. 28A and FIG. 28B example the use of our technology delivering post hitting ENTER popup (continuation) error messages for a spreadsheet function (i.e., IF). Where in FIG. 28A the error message visual 2834 includes the formula with the separate unambiguous error identifications/emphases (2832 and 2837) with error explanations (2844 and 2854) below. It is working in an application where the separate error identifications/emphases (2822, 2826, 2813 and 2818) are seen in the in-cell formula 2823 and in the formula bar formula 2816. FIG. 28B examples a similar error message visual 2874 but in a technology without the separate error identifications/emphases in the in-cell formula 2873 and in the formula bar formula 2866. The error message visual includes the separate error identifications/emphases (2872 and 2877) with error explanations (2884 and 2894) below. The text of those error explanations can be different, as 2894 has more description than 2854, as there are many ways to communicate explanations that specifically explain the error. There are also many different variants of how the error information is presented many previously shown which would apply to the popup error messages and many more that are equivalent.

Figure 29:
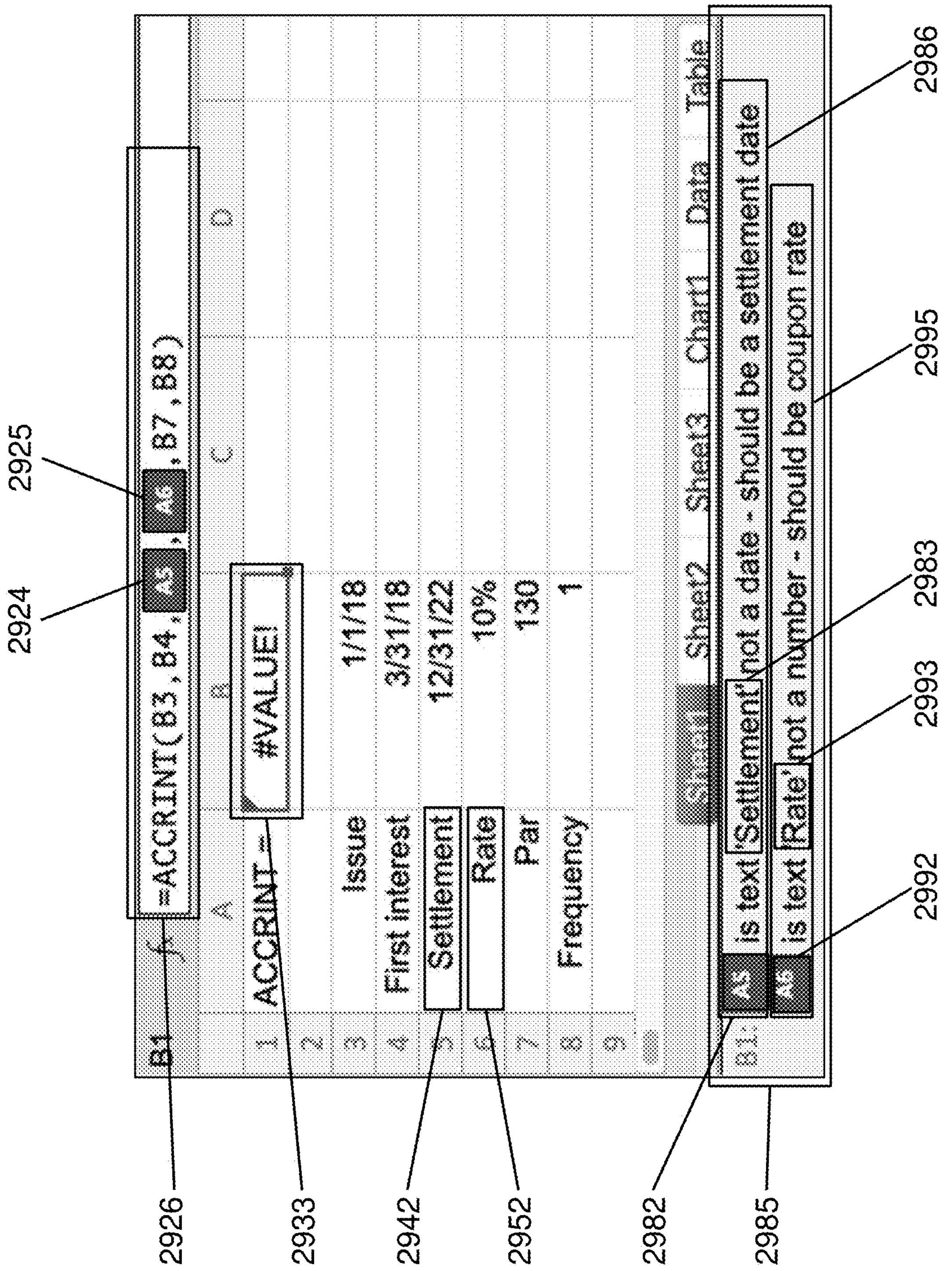
FIG. 29 examples the use of our technology delivering post evaluation (hitting ENTER) in-cell error values and their accompanying error messages for a spreadsheet function (i.e., ACCRINT).

FIG. 29 examples where the user hits ENTER in our technology and the formula evaluates to an in-cell error value, in this example ' #VALUE!' 2933. When the user is in the cell, 'B1' 2933, our app shows the formula in the formula bar 2926 with an unambiguous error identification/emphasis for each error (2924 and 2925). The corresponding error explanations are in what we call the status bar 2985 at the bottom left corner of the spreadsheet. In this embodiment each separate error identification/emphasis (2982 and 2992) is within its error explanation (2986 and 2995) to visually simplify linking the specific explanation of the error with where the error resides in the formula. The technology traces and presents the cell references (2924 and 2925) and cell values (2942 and 2952) in the error explanations (2982 and 2992) as exampled by the cell references (2982 and 2992) and their traced values (2983 and 2993) which make it very easy for the user to see the entire problem without having to manually trace cell values. Another advantage of our technology is the user does not need to do anything other than be in the cell to see the errors and their explanations, no need to click on parts of the cell or elsewhere to open error messages. We are now going to show how our technology makes writing correct formulas with our formulaic data easier.

As You Type Error Identification—Formulas with Formulaic Data

The formulaically defined non-spreadsheet cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

Later in this patent we will describe the specifics of how users of our technology can convert cell data into a formulaic data equivalents to gain the advantages of our simpler more readable formulas, built more easily using our progressive hints, easier data selection and the error identification/emphasis and error explanations we are covering next. As you will see our data conversion process allows formulaic data sourced from non-spreadsheet cells (NCS) and from spreadsheet cells to gain the advantages we are now going to describe.

Figure 30A:
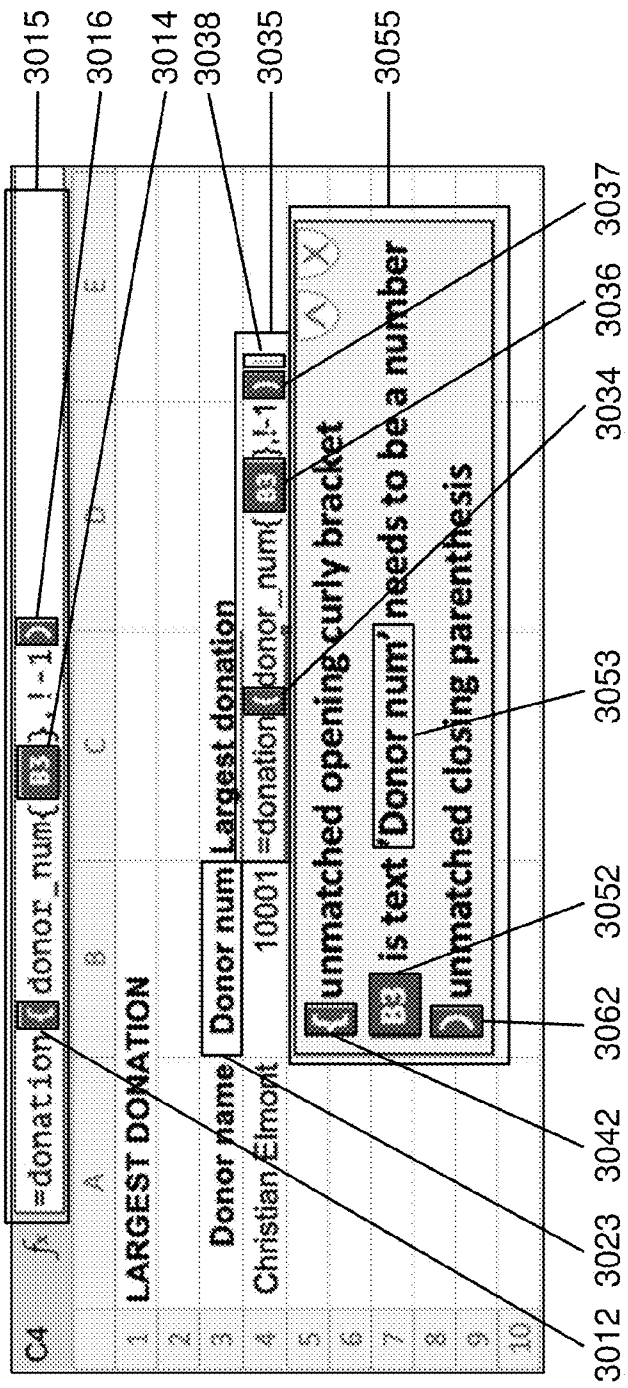
FIG. 30A and FIG. 30B example in our technology multiple unambiguous error identifications/emphases and specific error explanations for our formulaic data.
Figure 30B:
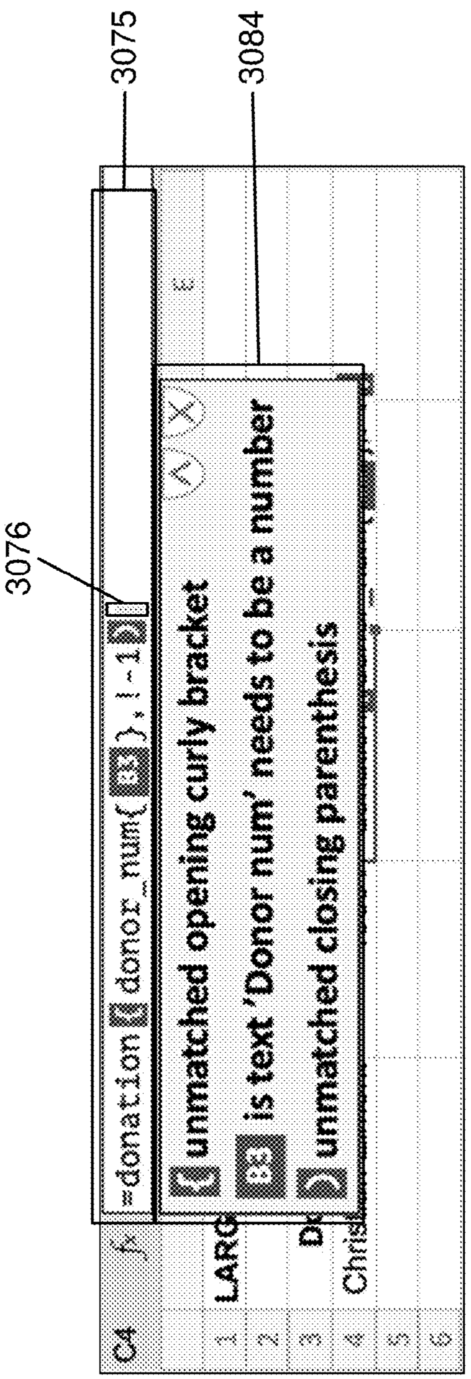

FIG. 30A and FIG. 30B example in our technology multiple error unambiguous error identifications/emphases and specific error explanations for our formulaic data. In this embodiment our formulaic data identifies the data with field names that use curly brackets { } so as not be confused with the predefined spreadsheet FUNCTIONs and algebraic operator use of regular parentheses ( ). The unambiguous identification/emphasis of separate errors works as previously described adhering to the rules of the formulaic data. So, FIG. 30A example an embodiment where the separate errors are unambiguously identified/emphasized in both the in-cell formula 3035 and the formula bar formula 3015. They and the specific error explanations are automatically shown as the user types with the explanations being shown in a popup 3055. The error emphases (3012, 3014, 3016, 3034, 3036, and 3037) in the formulas are replicated in the error explanations (3042, 3052, and 3062) to visually link the explanations and where the changes need to be made in the formula. Cell reference values are traced (e.g., 'Donor num' 3053 for 'B3' 3052) and explanations made specific. Like in the algebraic and FUNCTION situations the error explanation popup 3055 automatically shows up beside the active formula, in FIG. 30A near the in-cell formula 3035 which has the active cursor 3038, and in FIG. 30B the popup 3084 shows up near the formula bar formula 3075 which there has the active cursor 3076.

The formulaic data errors are driven by the requirements of the language, not unlike any programming language, with the added dimension of fulfilling the requirements of spreadsheet operation, e.g., cell references including $ limiters, cell copy paste, cell cut paste, cell insert and deletion, spreadsheet FUNCTIONs and single line formulas, as described in our earlier patent filings. In FIG. 30A and FIG. 30B that translates into the normal programming requirements of using the correct operators, e.g., curly brackets that are matched for formulaic data field and parentheses for algebraic or spreadsheet functions, and having data inputs that match the type required by the formulaic data field, e.g., donor_num requires numbers not text.

FIG. 31A and FIG. 31B example different embodiments of our technology for the error identifications/emphases and error explanations for the formula in FIG. 30A. FIG. 31A examples where the technology unambiguously identifies/emphasizes and explains the specific error as you type pointing out the entire set of tokens that constitute the problem rather than simply the unmatched curly bracket for the first error in FIG. 30A '{' 3012 which instead is shown as 'donation{' 3112 where the field and its curly bracket is identified/emphasized as the problem. Its error explanation 3145 reflects this difference with an explanation of 'Incomplete formulaic data field donation{' telling the user of its need for completion. Otherwise, the unambiguous error identifications/emphases are shown in the in-cell formula 3136 and formula bar formula 3115 and used in the error explanations in the UI visual 3146 to clearly link the errors and the explanations. FIG. 31B examples a formulaic data embodiment where both the error identifications/emphases 3174 and specific error explanations 3196 are done in the automatically generated as you type UI visual 3186. The unambiguous error identifications/emphases are shown in a replicate formula 3175 in the UI visual 3186 but not shown in the in-cell formula 3175 and the formula bar formula 3165.

Figure 32:
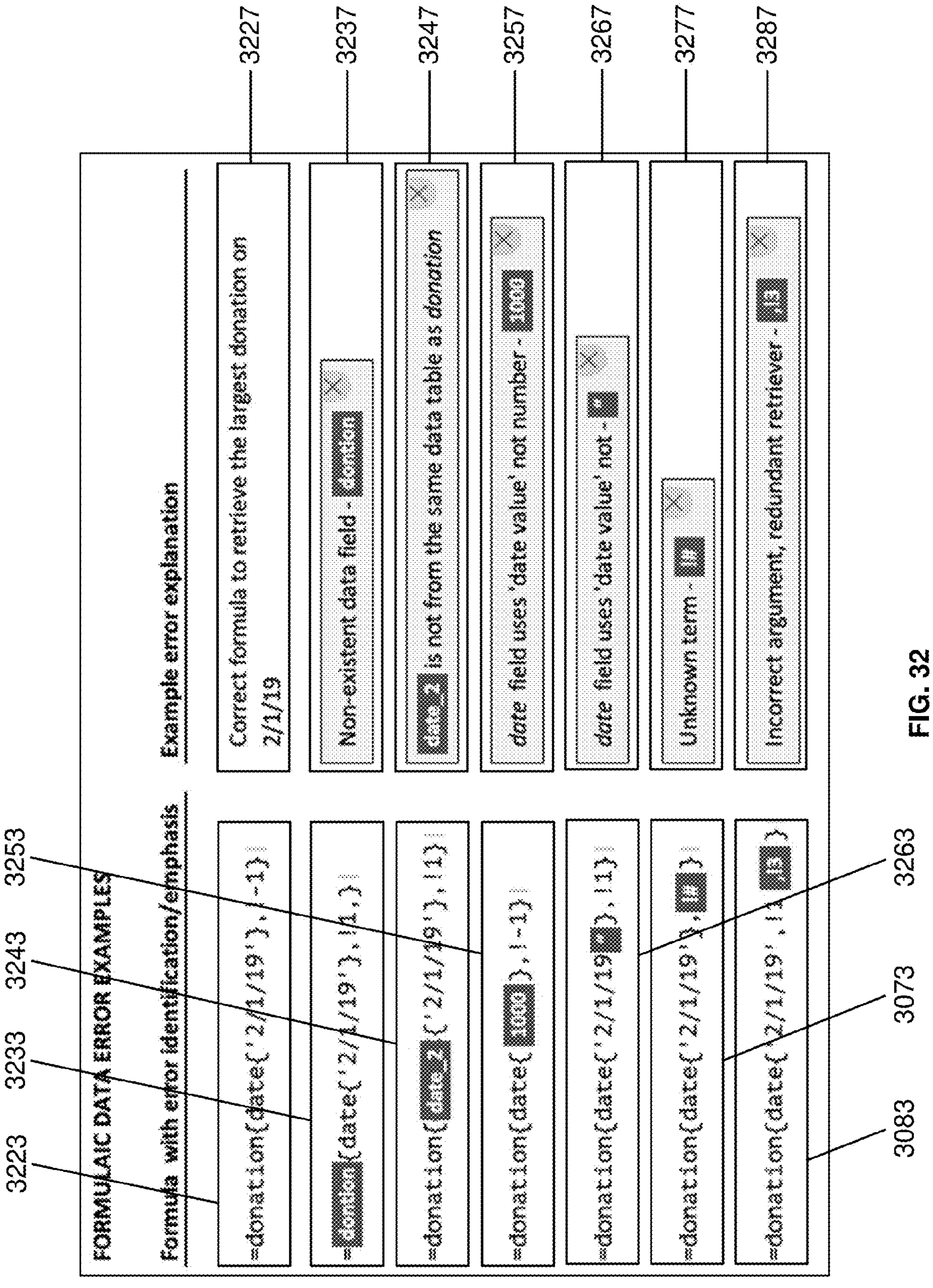
FIG. 32 examples for our technology the error identification/emphasis and error explanation for many of the types of formulaic data errors.

FIG. 32 examples for our technology the error identification/emphasis and error explanation for many of the types of formulaic data errors. It starts with correctly working formula 3223 and its explanation 3227 for purposes of comparison. The first error identification/emphasis is 'donation' 3233 which examples an error of a 'Non-existent data field—dontion' 3237 which is not available in the formulaic data fields available to this spreadsheet. The next error identification/emphasis is 'date_2' 3243 which examples an error of 'date_2 is not for the same data table as donation' 3247 where the constraint/filter date_2 is from another table and therefore cannot filter donation values. The next error identification/emphasis is '1000' 3253 which examples an error of 'date field uses 'date value' not number—1000' 3257 showing a data type mismatch of a date value which should be within single quotes with a number 1000 without any quotes. The next error identification/emphasis is on the double quotes """ 3263 which examples an error of 'date field uses 'date value' not—"' 3267 syntax mismatch. The next error identification/emphasis is '!#' 3273 which examples an error of 'Unknown term—!#' 3277. Finally, the last error identification/emphasis is '!3' 3283 which examples an error of 'Incorrect argument, redundant retriever—,!3' 3287 violating the argument structure of our formulaic data.

Figure 33A:
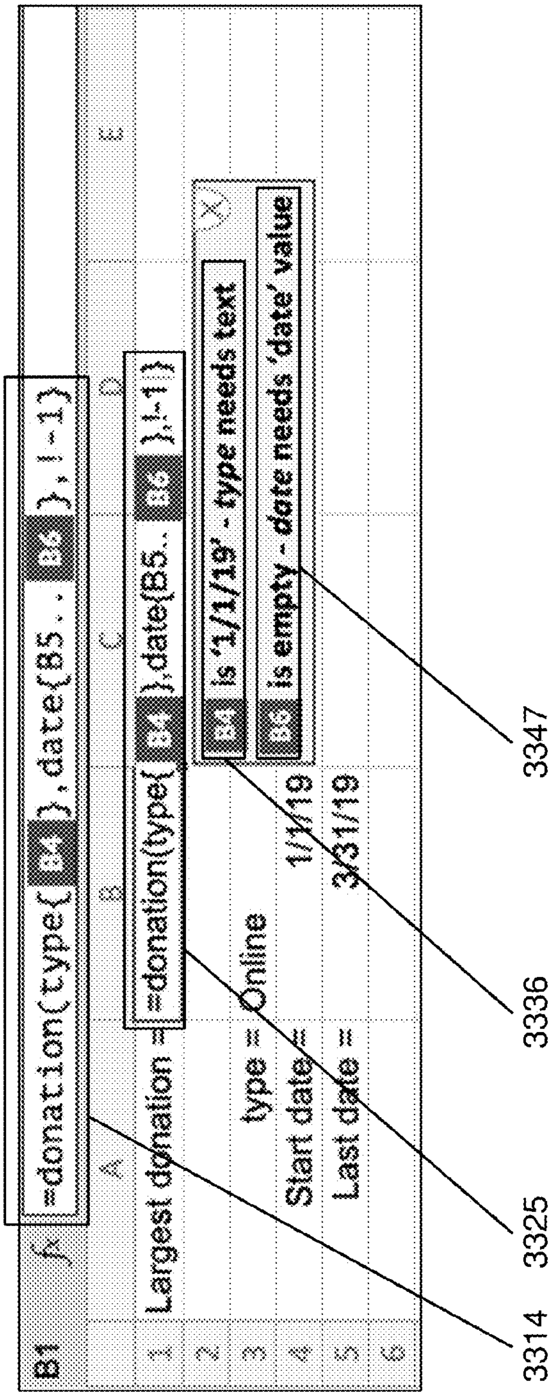
FIG. 33A examples errors where the data in the cell(s) referenced, rather than the cell reference, creates errors as you type in our technology (prior to formula evaluation).

FIG. 33A examples errors where the data in the cell(s) referenced rather than the cell reference creates errors as you type in our technology. In this example the errors were caused by the user inputting the wrong cells into their formula. The error explanation 'B4 is '1/1/19'—type needs text' 3336 traces the value in B4 into the explanation showing the user that its value does not work for the formulaic data field type. The next error explanation 'B6 is blank—date needs 'date' value' 3347 traces the B6 empty cell (blank) and specifically tells the user that the formulaic data field date needs a date input from the cell not an empty cell (note: if they wanted a blank date in this embodiment they would input !BLANK). This embodiment also displays the unambiguous separate error identifications/emphases in both the in-cell formula 3325 and the formula bar formula 3314. This is an example where the formula would pass the equivalent of an IDE because it is technically correct using the cell references except it would fail in a REPL or debugger (on the first error) because the data creates the error.

Figure 33B:
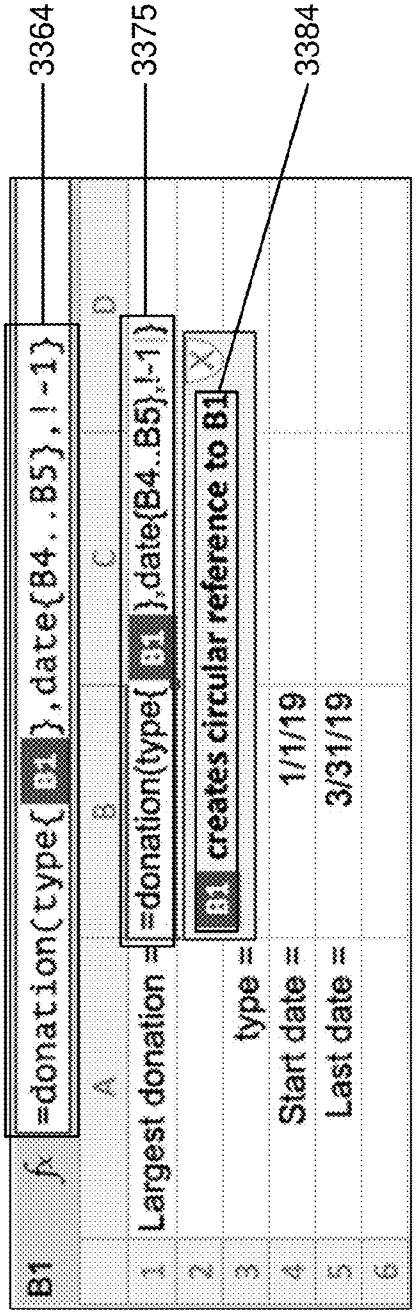
FIG. 33B examples a formulaic data and cell circular reference in our technology.

FIG. 33B examples a formulaic data circular reference error automatically shown as the user types in our technology, also created by the user inputting the wrong cell reference. The error explanation 'B1 creates circular reference to B1' 3384 traces the value in B1 to the cell the formula is being typed in (B1). Had that circle gone through additional cells it would have traced them as well, so the error explanation was specific and made it easy for the user to see the chain of cells creating the error. This embodiment also displays the unambiguous separate error identifications/emphases in both the in-cell formula 3375 and the formula bar formula 3364. While analogs of these problems can be found in other programming languages, the use of cell inputs is specific to spreadsheets and adds additional non-analogous errors introduced by the $ sign limitations of cell references in copy paste, cut and paste and drag and drop process. Our technology accommodates those $ sign impacts on errors caused by the copy paste, cut and paste and drag and drop processes.

Figure 34A:
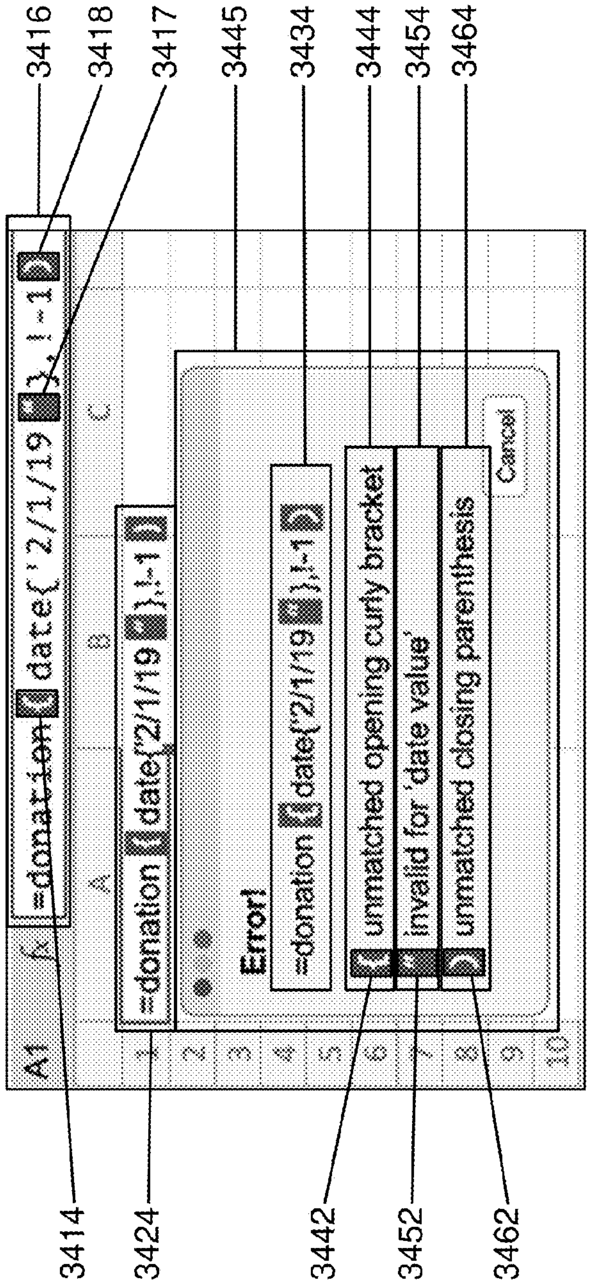
FIG. 34A and FIG. 34B example two embodiments of the formulaic data post evaluation (hitting ENTER) error messages in our technology.
Figure 34B:
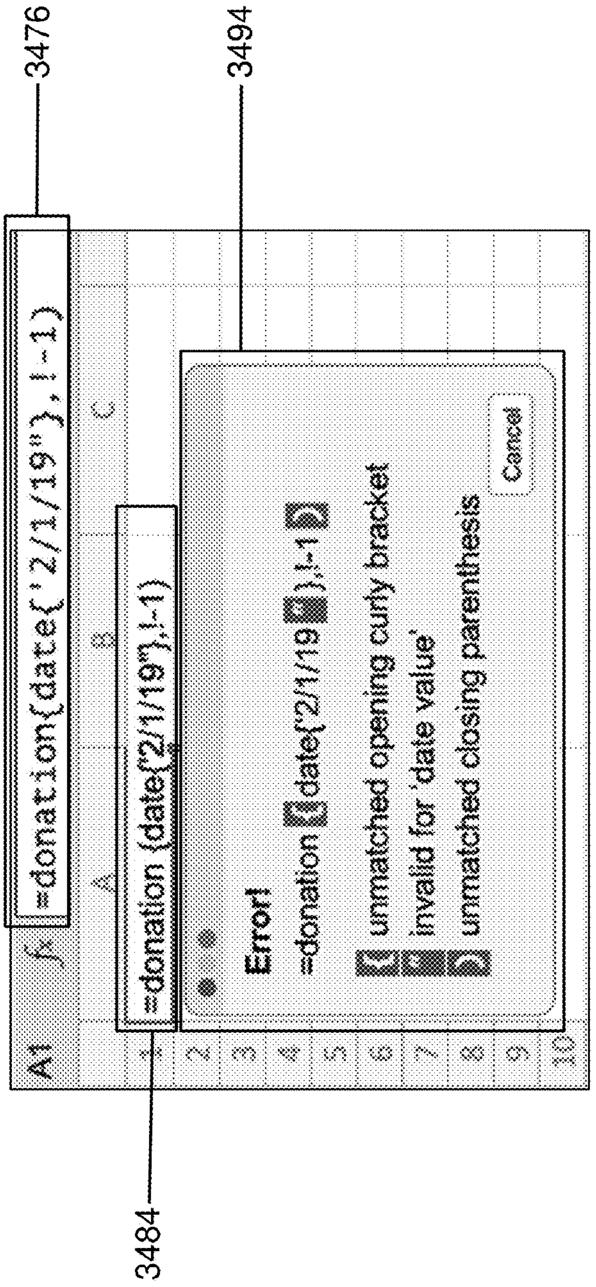

As previously exampled for algebraic and function errors, aspects of the as you type error identification/emphasis and explanations translate in our technology to the formulaic data post hitting ENTER error messages. FIG. 34A and FIG. 34B example two embodiments of the formulaic data post evaluation (hitting ENTER) error messages in our technology. FIG. 34A examples an embodiment where the unambiguous error identifications/emphases (e.g., 3414, 3417, 3418, 3442, 3452 and 3462) are displayed within the in-cell formula bar 3424, the formula bar formula 3416 and the error message 3445 replicate formula 3434 and the error explanations (3444, 3454 and 3464). The error identifications/emphases (3442, 3452 and 3462) are included in the specific error explanations (3444, 3454 and 3464) creating an easy to see connection between the explanation and the location of the error in the formula. FIG. 34B examples an embodiment where the error message is identical to the one in FIG. 34A, but there are no error identifications/emphases in either of the formulas (3484 and 3476).

Figure 35:
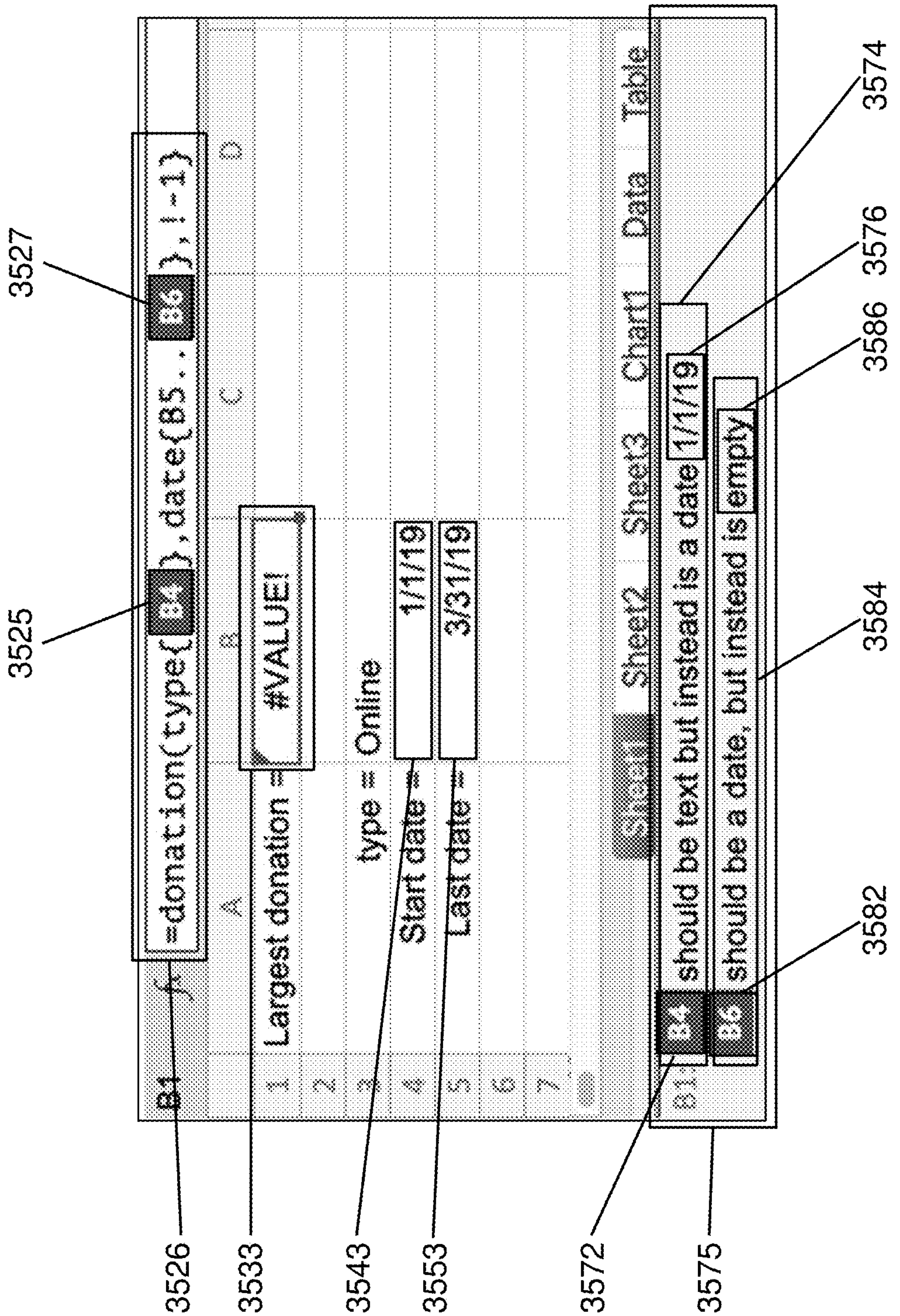
FIG. 35 examples an embodiment of our technology where formulaic data post ENTER error values are automatically accompanied by our error messages.

FIG. 35 examples an embodiment of our technology where formulaic data post ENTER (post evaluation) error values are automatically accompanied by error message displaying in our status bar 3575, a visual display in the lower left corner of our spreadsheet. Much like similar algebraic and function embodiments, when the user hits ENTER they get an error value ' #VALUE!' 3533 in the cell and the unambiguous error identifications/emphases (3525 and 3527) remain visible in the formula bar formula 3526 (when the cell in opened). However, they automatically get specific error explanations (3574 and 3584) in the status bar including the error identifications/emphases (3572 and 3582). The error explanations trace the references through to the values identifications/emphases (3576 and 3586) that create the errors making it all very easy for the users to completely understand what created each error. So, whether the user looks at the as you type or after hitting ENTER error identifications/emphases and explanations, our technology provides very clear and separate identification and explanation of their one or more errors.

Figure 36:
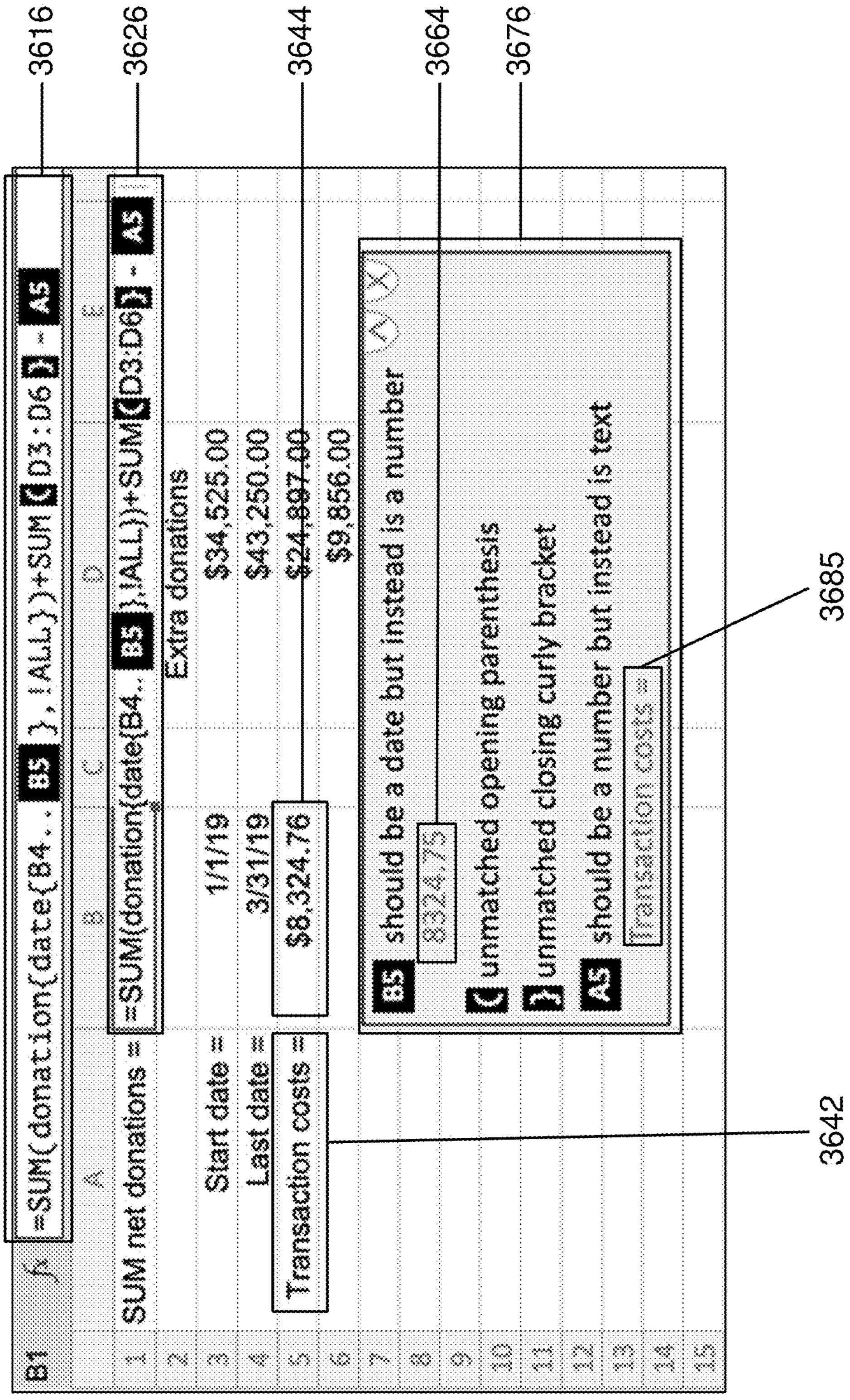
FIG. 36 examples our as you type error technologies for a combination of multiple functions, multiple formulaic data fields and multiple algebraic terms.

The before mentioned technologies work in combinations of algebraic, function and formulaic data formulas. They work when multiple functions are involved, when functions are within functions, formulaic data is within functions, formulaic data within algebraic formulas and with all the different combinations. FIG. 36 examples our as you type error technologies for a combination of multiple functions, multiple formulaic data fields and multiple algebraic terms. It examples as you type four unambiguous error identifications/emphases within the in-cell formula 3626 and the formula bar formula 3616. Those four error identifications/emphases are used in each of their respective error explanations in the UI visual 3676. The specific error explanations, which automatically show up and disappear with resolution and trace the errors through, in this example, cell references (3664 to 3644 and 3685 to 3642).

FIG. 37A through FIG. 38B examples an additional capability of our technology which can apply in embodiments to all the algebraic, function and formulaic data situations—specifically differentiating types of errors as you type. At least two types of errors have meaningfully different actions for users and therefore would be useful to unambiguously differentiate: One—errors caused by incompletion, where adding something later in the formula removes the error, and Two—errors where no later addition will cause it not to be an error. These two as you type errors have potentially very different resolution paths and therefore are worth differentiating in our technology.

Figure 37A:
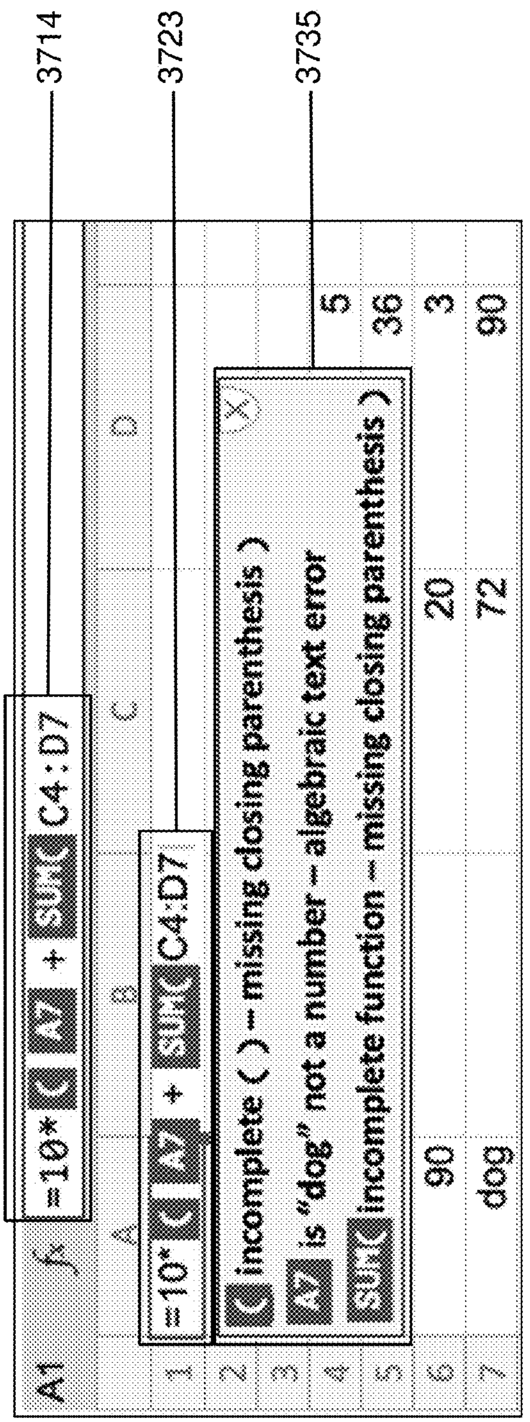
FIGS. 37A, 37B, 38A and 38B examples our technology differentiating our as you type error messages between incomplete errors and completed errors.
Figure 37B:
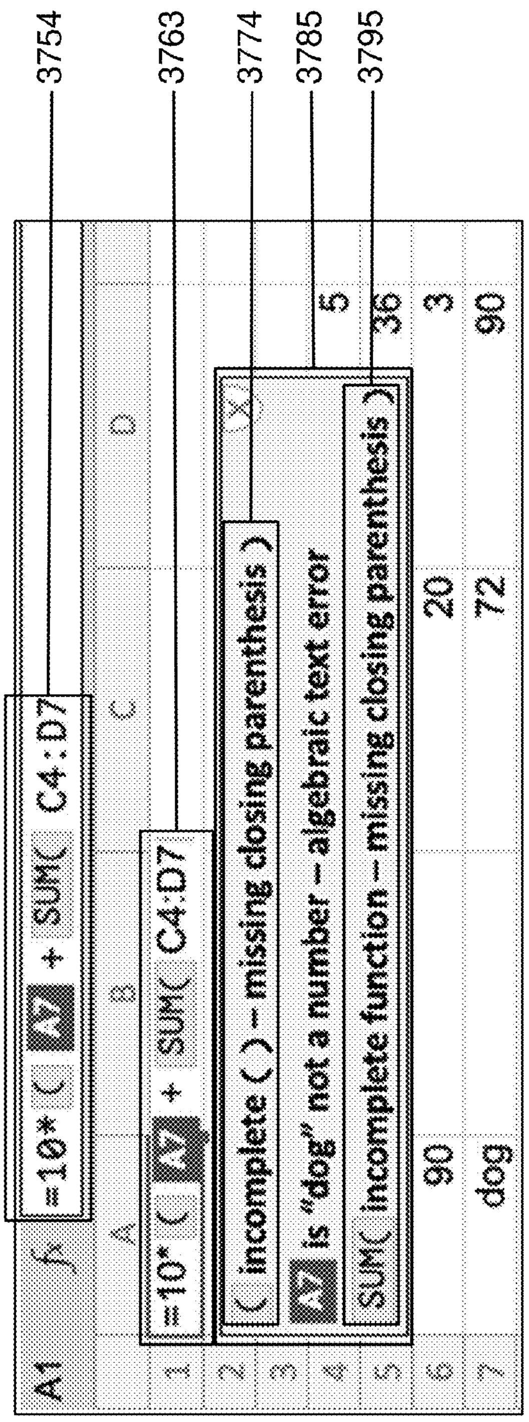

FIG. 37A and FIG. 37B example our error type non-differentiated and differentiated identifications/emphases in algebraic and function formulas. FIG. 37A examples the non-differentiated error identifications/emphases in this embodiment using red highlighted separate error identifications/emphases in the in-cell formula 3723, the formula bar formula 3714 and the error explanations in the UI visual 3735. However, two of the errors can be fixed by finishing typing the formula while the other one are not fixable through completion. So, FIG. 37B examples an embodiment of our technology where those two different types of errors are unambiguously differentiated by changing those errors that can be fixed by later formula additions (incomplete errors) to be highlighted in a much lighter yellow with an orange border (to make the separation of the different errors should they be side by side easier to distinguish). These different types of error identifications/emphases are shown in the in-cell formula 3763, the formula bar formula 3754 and the error explanations in the UI visual 3785. And in this example, the two later fixable error explanations (3774 and 3795) both point out to the user that the error is 'incomplete'. In an as you type situation the differentiation of the two types of errors allows the user to more focus on fixing the ones that cannot be resolved and not overreacting or being too distracted by those that can and likely will be resolved by finishing the formula.

Figure 38A:
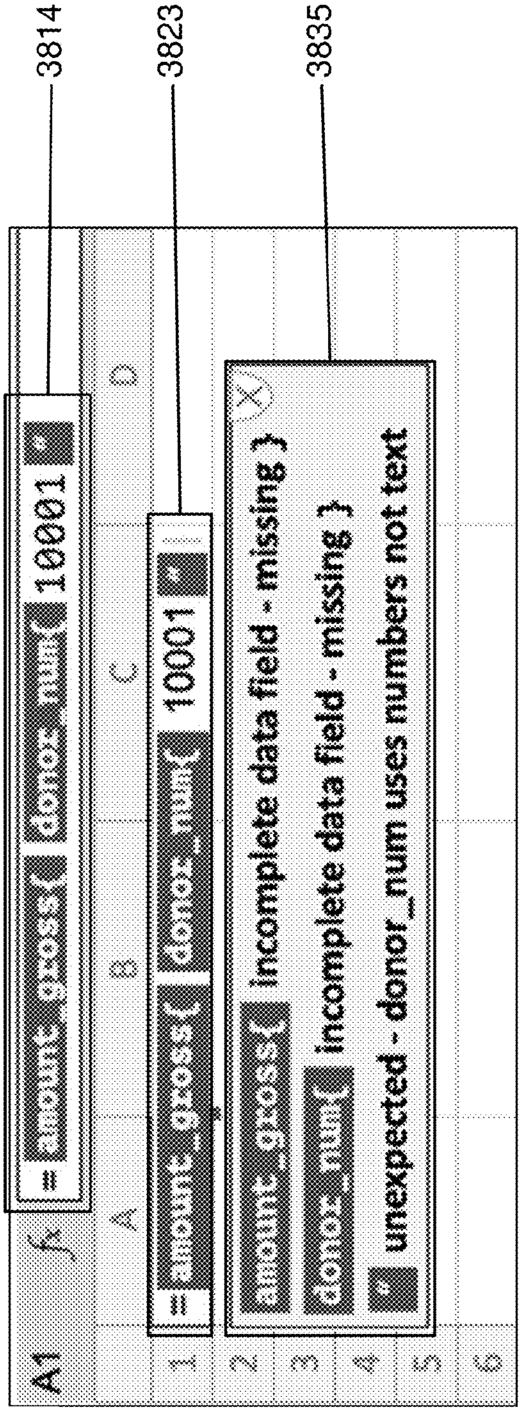
Figure 38B:
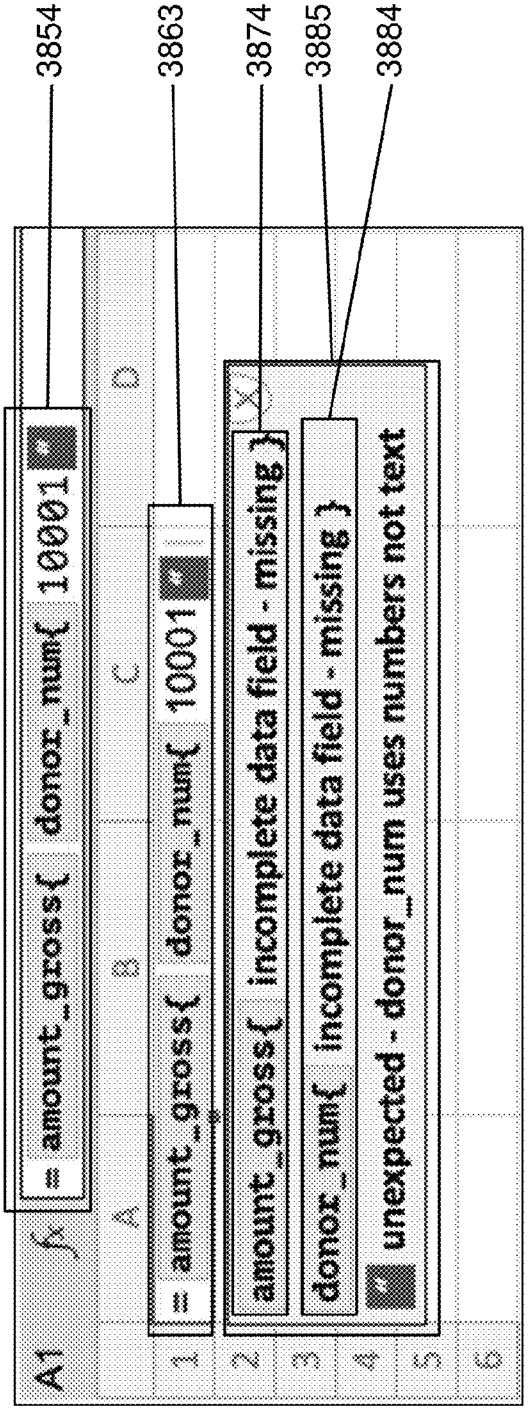

FIG. 38A and FIG. 38B example our error type non-differentiated and differentiated identifications/emphases in formulaic data formulas. FIG. 38A examples the non-differentiated error identifications/emphases in this embodiment using red highlighted separate error identifications/emphases in the in-cell formula 3823, the formula bar formula 3814 and the error explanations in the UI visual 3835. However, two of the errors can be fixed by finishing typing the formula while the other one is not fixable. So, FIG. 38B examples an embodiment of our technology where those two different types of errors are unambiguously differentiated by changing those errors that can be fixed by later formula additions to be highlighted in a much lighter yellow with an orange border (to make the separation of the different errors should they be side by side easier to distinguish). These different types of error identifications/emphases are shown in the in-cell formula 3863, the formula bar formula 3854 and the error explanations in the UI visual 3885. And in this example, the two later fixable error explanations (3874 and 3884) both point out to the user that the error is 'incomplete'. The error explanations would not need to say incomplete and could be shortened to simply point out the specific problem as the differentiation of the error identifications/emphases is likely sufficient for most users to understand the difference. Note, the mode of differentiation can be other than color which in this example was patterned after stop lights, yellow for the incomplete errors and red for those errors requiring more than completion to be fixed.

One other way to minimize the potential distraction to some users of the as you type error identification/emphasis and error explanations is to less frequently change it as the user types. Therefore, an embodiment of our technology uses pre-set or user set character or token intervals for the refresh.

So far, our technologies have been focused on making it dramatically easier for users to see errors in their spreadsheet formula and know specifically what caused them in order those errors easy to fix. However, wouldn't it be wonderful for users if there was a technology that helped users avoid many of these errors and makes it easier for them to write their formulas. We are now going to discuss such a spreadsheet technology which for many spreadsheet functions and all formulaic data formulas allows users to select argument values from a situationally curated set of options, along with helpful selection instructions. In some embodiments our technology goes so far as to display as you type or select the outcomes, either results or errors, and in many settings gives a step-by-step select driven formula build with no errors not fixable by completion of the formula. Imagine a process where your formula is always technically correct, so you totally focus on whether the formula logic does what you want. We then add a capability in our technology to better determine if the logic is right by showing an as you go formula result accompanied by a plain language recitation of what your formula is doing. Think about the benefit of no typo mistakes, no syntax mistakes and the ability to see a result and a plain language (in English or any other language) sentence layout of what your formula is doing step by step as you create it.

Preempting Errors in Formulas

The ability to avoid typo, syntax, data induced and sometimes even logic errors vary dramatically by type of formula. For example, Algebraic formulas have so many options for most steps of the formula that the correctly usable list is too long to be presentable and helpful to users. However, there is another end of the spectrum where the list of correct options can be usably displayed. That is the case for our formulaic data and its workings with spreadsheet functions. So, we will first example how our pre-empting errors technology works for formulaic data formulas, then example its combination with spreadsheet functions and finally application to spreadsheet functions by themselves.

In formulaic data there are two very different steps of building a spreadsheet formula or part of a formula, the first is selecting the formulaic data field to be evaluated and the second step, which can have many sub-steps, is constraining/filtering the value or values (in range functions like SUM, COUNT etc. that evaluate multiple values) to be evaluated. We will start exampling the first step of selecting and then populating in the formula the formulaic data field for evaluation. In this step the focus of our technology is curating the information a user needs to select the correct formulaic data field for evaluation. This sounds simple until you realize that many users will have access to a large number of sometimes very similar data fields in different data tables that they have little familiarity with. These people are frequently intermittent users of their spreadsheets who are not particularly data savvy and therefore need information going well beyond the typical programming data dictionary layout of the data objects (names), data types, sizes, nullability and more technical aspects like indexes and entity-relationships which they do not particularly understand. They need human generated informative descriptions of the data field content, human or data content generated data examples and information and a subset of the programming data dictionary information. In some situations, they instead would like a very easy way to see the data or a subset of the data to inform the selection of the formulaic data field to be used in the formula. As we will now example, our technology gives users different ways to decide and select the desired formulaic data field including an alphabetically screened list, a full text screened list, a summary table/data field view and a specific table view. All allow the user to start in their formula, then access the information they need to select a formulaic data field and then populate it in their formula in a seamless set of actions. Some also allow seamless transfer to one of the other options allowing the user to go to whatever level of data understanding they require to make their selection. We will start with the simplest of the options, the alphabetically screened list and then example the others and their potential seamless transfer capabilities.

Populating a Formulaic Data Field Via Alphabetically Screened Selection

Figure 39B:
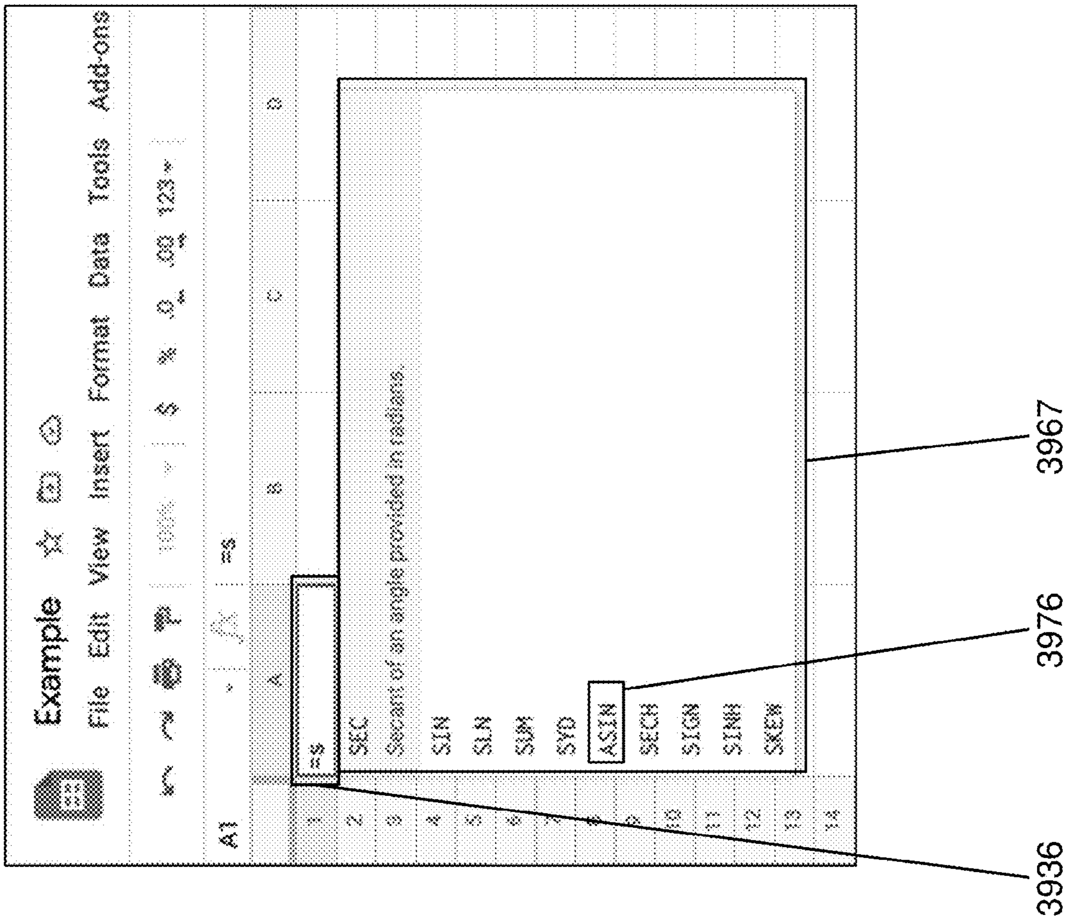
FIG. 39A and FIG. 39B examples how Microsoft Excel and Google Sheets display their as you type FUNCTION list.
Figure 39A:
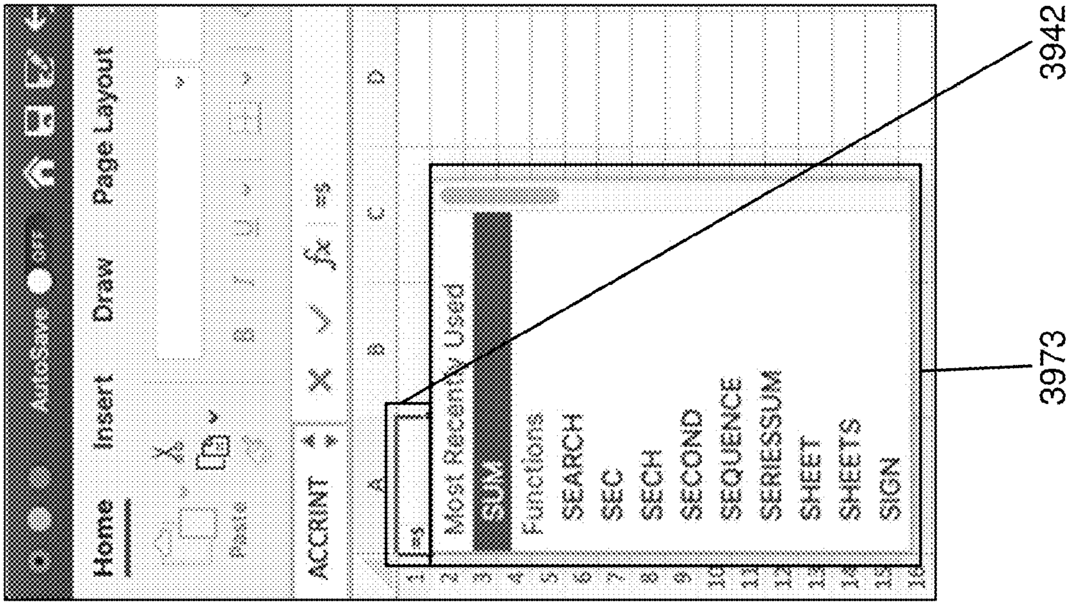

FIG. 39A and FIG. 39B examples how current spreadsheet users are used to seeing a list of predominately alphabetically limited functions when they start a formula with an equal sign=followed by a letter. FIG. 39A examples what a Microsoft Excel user sees when they type '=s' 3942 which is a UI visual 3972 showing a scrollable list of all the functions starting with s as well as the most recently used function beginning with s. FIG. 39B examples what a Google Sheets user sees when typing the same '=s' 3936 getting a UI visual 3967 showing a subset of the functions that begin with an s or are somehow selected functions (e.g., ASIN 3976). The top function has a function description and mousing over any function in the list switches the description to that function. It is not clear why these functions have been presented as Sheets has nearly as many functions as Excel and others show up as you type more letters. Also, as we described previously, these function lists are not situationally tailored and therefore offer functions in situations (e.g., an algebraic formula) where using them will only create an error. We will show how the advanced versions of our technologies offer only options that will work in the particular situation.

Figure 40A:
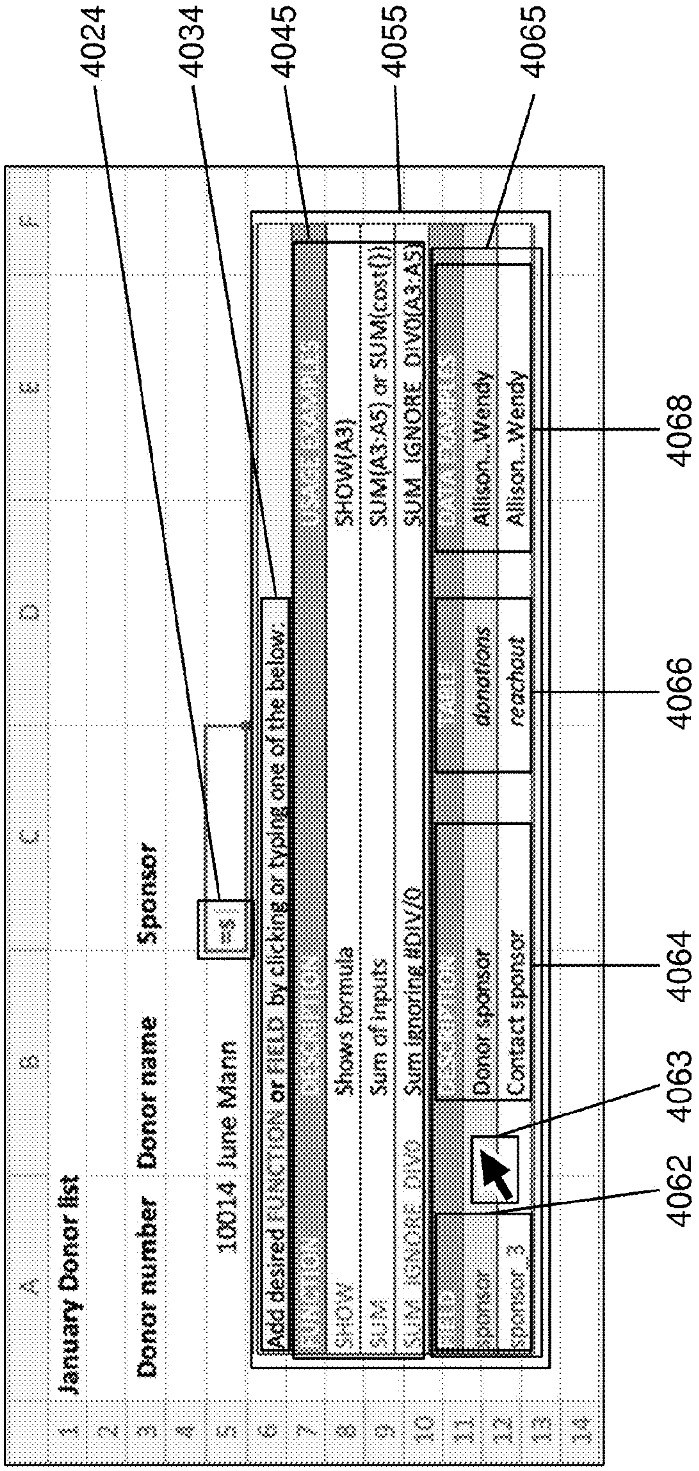
FIG. 40A and FIG. 40B examples an embodiment of our technology displaying formulaic data field and additional information in an alphabetically limited hint list used for populating a cell formula.
Figure 40B:
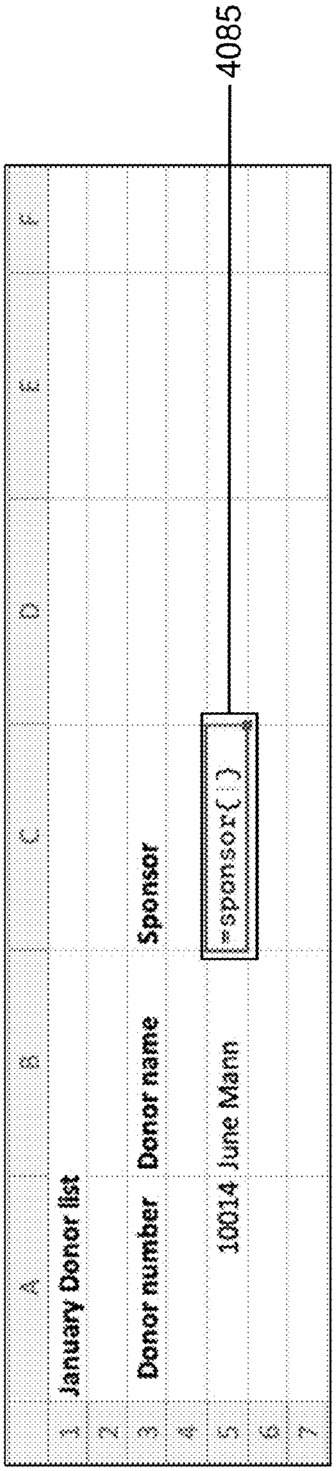

FIG. 40A examples an embodiment of our technology where typing the same '=s' 4024 gets a UI visual 4055 which displays an alphabetically limited list of the functions (assume in this example there are only the three shown but if there were more they would be in a scrollable list) and an alphabetically limited list of the data fields (assume in this example there are only the two shown but if there were more they would be in a scrollable list). The function list and its additional information (DESCRIPTION and USAGE EXAMPLES) come as part of the application and reflects the list for the users' version of the application. The data field list 4062 and additional information (4064, 4066 and 4068) is very different in that it is specific to the data sets (tables and fields) each user has available to them. Those can differ from user to user based on the setups (including processes like user authentication and authorization which can control which tables and even which fields within tables each user sees). The information included also goes beyond what is included in tools such as IDEs (with data extensions) and REPLs/debuggers and has no comparable information in any of the current spreadsheets. The Data DESCRIPTIONS 4064 are human inputted values, which are done in a setup process by the user or in most cases an administrator (admin) setting up information for many. This is not something found in IDEs or other program writing/editing tools and is not like anything found in today's spreadsheets. The table information 4066 would be available in some form in virtually all programming tools, The DATA EXAMPLES 4068, which in this embodiment are generated electronically by querying the data to determine the first (first alphabetically, smallest numerically or earliest date) and last (last alphabetically, largest numerically or latest date) non-null value and where possible in the space allotted showing them connected by two dots. As we will example later there is an alternative to electronic generation which is to let the user/admin input the DATA EXAMPLES 4068 information. In either situation this is not information provided in data dictionary tools and has no comparable in spreadsheets. Our UI, in this embodiment, also has an instruction line 4034 telling the user what their options are for adding their selection to the formula. When the user makes their selection, in this example clicking 4063 on the 'sponsor' field, it populates the selected field to the cell 'C5' 4085 as shown in FIG. 40B. In this embodiment it populates the field 'sponsor{ }' with both of its required curly brackets and the cursor between those curly brackets ready for the second step of typing or selecting any constraints/filters of the value to be evaluated. In this embodiment it populates that data field with an implicit value retriever which selects the first (in this case alphabetically sorted) value of the data field sponsor. As we will discuss later this has the added benefit of not creating an error as the formulaic data field does evaluate. Therefore, based on our previous error identification/emphasis and error explanation capabilities the formula shows no sign of an error.

In this embodiment and related variants displaying other additional data field information, the alphabetical screen of the potential data fields requires some reasonable knowledge by the user as to the formulaic data field names, which may be beyond the knowledge of many users—so we will now example data search approaches that are tailored to users with less knowledge of the data.

Populating a Formulaic Data Field Via Search Screened Selection

FIG. 41A and FIG. 41B examples a user initiating a character/group of characters search of the formulaic data fields and formulaic data field descriptions with the ability to select the formulaic data field of their choice or move to looking at a field's data in its table (retaining the data field selection to the formula capability). The exampled embodiment of our technology automatically displays a UI visual 4136 when the user type's an equal sign '=' 4142. In that UI visual there is a 'Data search' box 4135 that when the user clicks into it and types a letter, in this example 's' 4162 shown in FIG. 41B, it expands and alters the UI visual 4176 to include an instruction line 4166 and a display 4186 of the formulaic data fields 4173, their data descriptions 4177 (as previously described) and the table 4178 the data field is in. In this embodiment the 's' 4162 is highlighted (e.g., 4193 and 4185) wherever it shows up in the FIELDS 4173 and DESCRIPTIONS 4177. The instruction line 'Select the desired data field or see its table by clicking below:' 4166 tells the user they can select a formulaic data field to populate into the formula or click on one of the tables to see data. Note in this embodiment the selection active fields and tables were color differentiated in blue to stand out and thereby make selection easier for the user.

FIG. 42A and FIG. 42B examples a user selecting a formulaic data field from the character search UI visual where the user has typed 's' (as shown in FIG. 41B). Following on FIG. 41B the user clicks 4262 on the formulaic data field of their choice, 'address_street_2' 4263 which then populates 'address_street_2{ }' 4295 with the cursor ready to add any desired constraints/filters and the default value retriever of the first value, as previously discussed.

Figure 43:
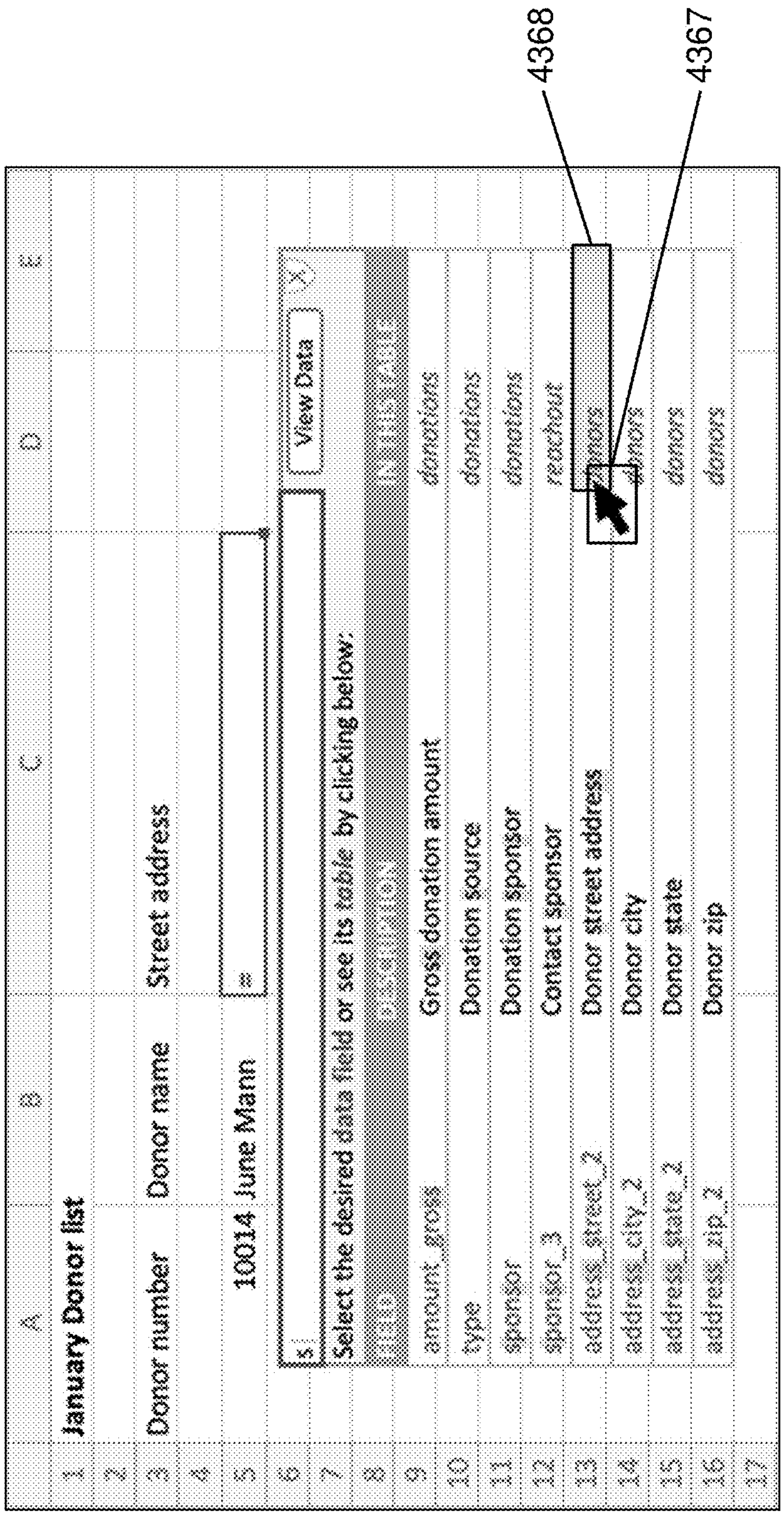
FIG. 43 examples the character/group of characters search in FIG. 41B being used to view the table of one of the search results.
Figure 44:
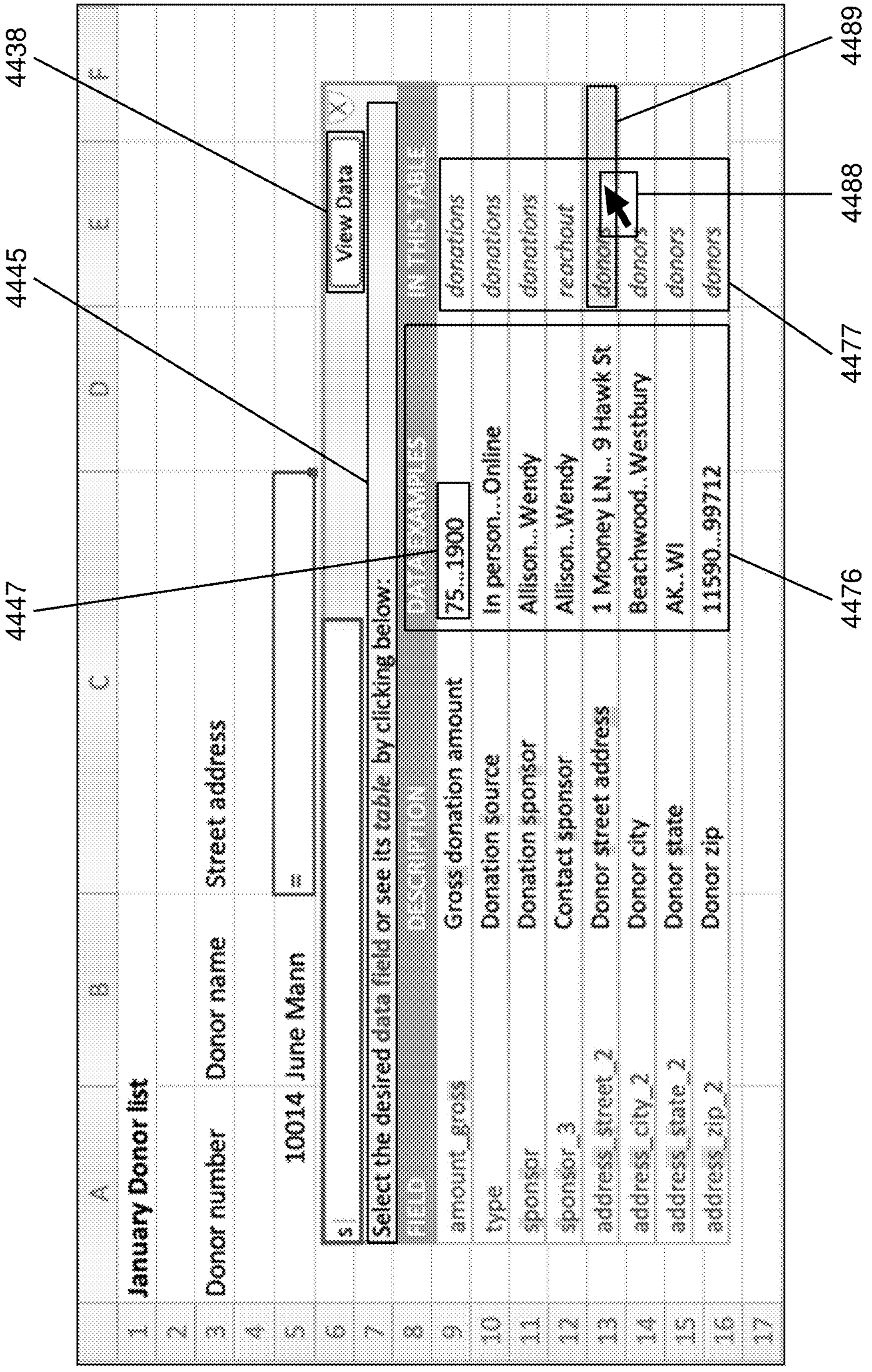
FIG. 44 examples a different embodiment of the search initiated in FIG. 41A with more additional data and different formatting, being used to view the table of one of the search results.

FIG. 43 and FIG. 44 example clicking to transfer the formulaic data field selection process from the character search to the table view. In FIG. 43 the user decides they want to view the 'donors' 4368 table by clicking 4367 on it. FIG. 44 examples the user making the same decision from a different embodiment of the search. This embodiment has a different instruction line 'Select the desired data field or see its table by clicking below:' 4445 and color-coded FIELD (blue) and TABLE (purple) selections. It also has some additional data field information, in this example DATA EXAMPLES 4476, which as previously described could be user/admin inputted or app generated. The selection works the same as described in FIG. 43 with the user clicking 4488 on 'donors' 4489. This then takes the user to the table view retaining the formulaic data field selection to the cell formula capability.

Populating a Formulaic Data Field Via Table View Selection

FIG. 45 examples a table view formulaic data selector. In this embodiment its UI visual 4355 pops up displaying a full or a partial set of the of the data for the table selected. The transfer from either FIG. 43 or FIG. 44 results in the desired table, 'donors' 4533 being loaded for viewing and selection. Users can then change their mind and select a different table to view and maintain the ability to select a formulaic data field in that new table. This embodiment has an instruction line 'Select the table desired and click the field you want in blue' 4536. This table view could also be directly accessed by clicking the 'View Tables' button 4137 in FIG. 41A. In that situation since no table would be specified the loaded table 4533 would have a default setting, e.g., the first table, the last table you visited or the table you visit the most. The user would then have the full capabilities to load the table of their choice and select any formulaic data field into their formula.

Figure 46A:
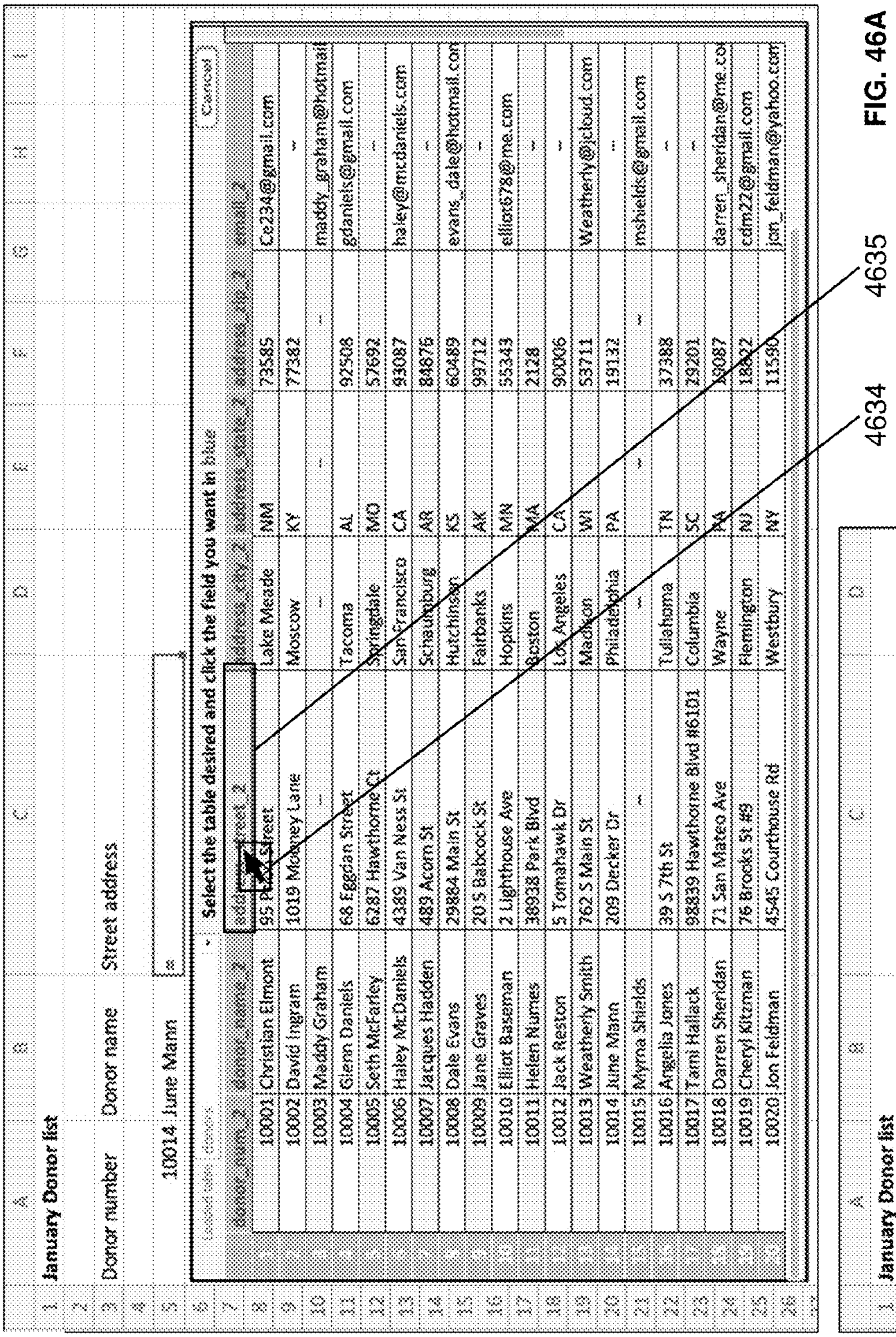
FIG. 46A and FIG. 46B example the formulaic data field selection from our table view hint.
Figure 46B:
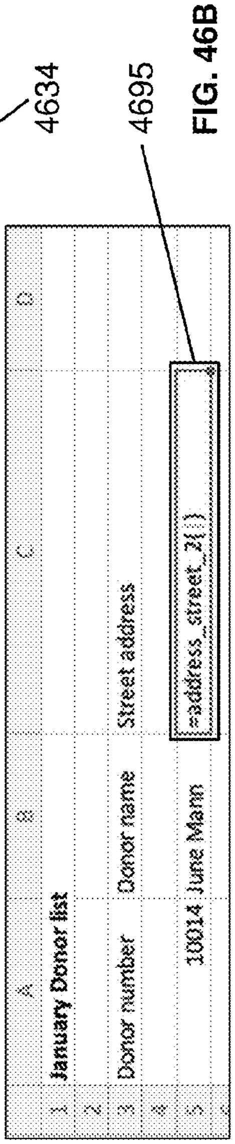

FIG. 46A and FIG. 46B example the formulaic data field selection from the table view, which is as simple as point and click. In this case the user clicks 4634 on 'address_street_2' 4635 to automatically populate 'address_street_2{ }' 4695 in the spreadsheet cell shown in FIG. 46B. Like the previous embodiments that formulaic data field is populated with the cursor in between the curly brackets, ready for adding constraints/filters, and an implicit retriever. Those later capabilities are clearly optional but leave the user with a formula that evaluates without error and leaves the field ready for the second step of pre-empting errors. It is also worth noting that user can move back to their previous search, for example back from the table view to the search view without losing the ability to make a field selection, thereby giving the user flexibility in discovering the formulaic data field they desire. This also applies to moving to and from the last data selection capability our technology supports, what in these embodiments has been called the data view.

Populating a Formulaic Data Field Via Data View Selection

The data view selector gives users a summary view of their tables while allowing them to expand one or more of them to get a summary view of its fields. This allows users to compare information on fields in tables holding potentially similar data. FIG. 47B examples a three-table situation with one of the tables expanded to show the formulaic data field level information. Users could have a large number of tables of data available to them where the ability to reorder and expand and collapse tables they want to understand and compare while all the time retaining the ability to select to the formula capability is very helpful. In this embodiment the data view UI visual 4775 pops up over the spreadsheet with and instruction line 'Data view—Click the field you want in blue or if you want to move to a table view click the table in purple' 4754. This both instructs the user to select the field of their choice in blue but gives them the option to move to the table of their choice, as with our previous embodiments retaining the field selection capability. Had they come from a different view then they would have a back button and there is also a cancel (or similar button) to stop the activity. The Table information 4764 contains a mixture of human inputted (e.g., DESCRIPTION), database query information and typical data dictionary information (e.g., #FIELDS). The formulaic data fields information 4776 is also a mixture of all those types as well as some translation of data dictionary data to be more non-programmer friendly. An example of that is the DATA TYPE information which in a data dictionary would not have values of 'Number' but would have Real or Integer. Given that could be confusing for many of the non-mathematical users our technology gives the option of altering normal programming tool data dictionary values to be more compatible with users. Our column ' #VALUES' is a query to determine the number of unique/distinct values, focusing in on information of high utility for spreadsheet work. The other columns in the formulaic data expansion 4776 have been previously discussed. Once the user has looked at the tables and data and decided on the formulaic data field, they simply click it like exampled for 'address_state_2' 4781 and that field populates in a similar manner to the field exampled in FIG. 46B.

Figure 48A:
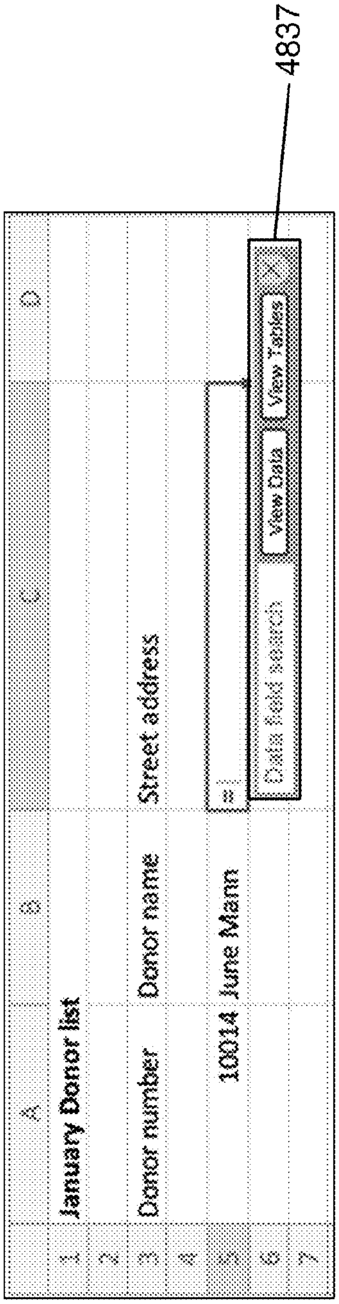
FIGS. 48A, 48B and 49 examples different positioning of the UI visual to access the View Data, View Table and Data Field Search hints in our technology.
Figure 48B:
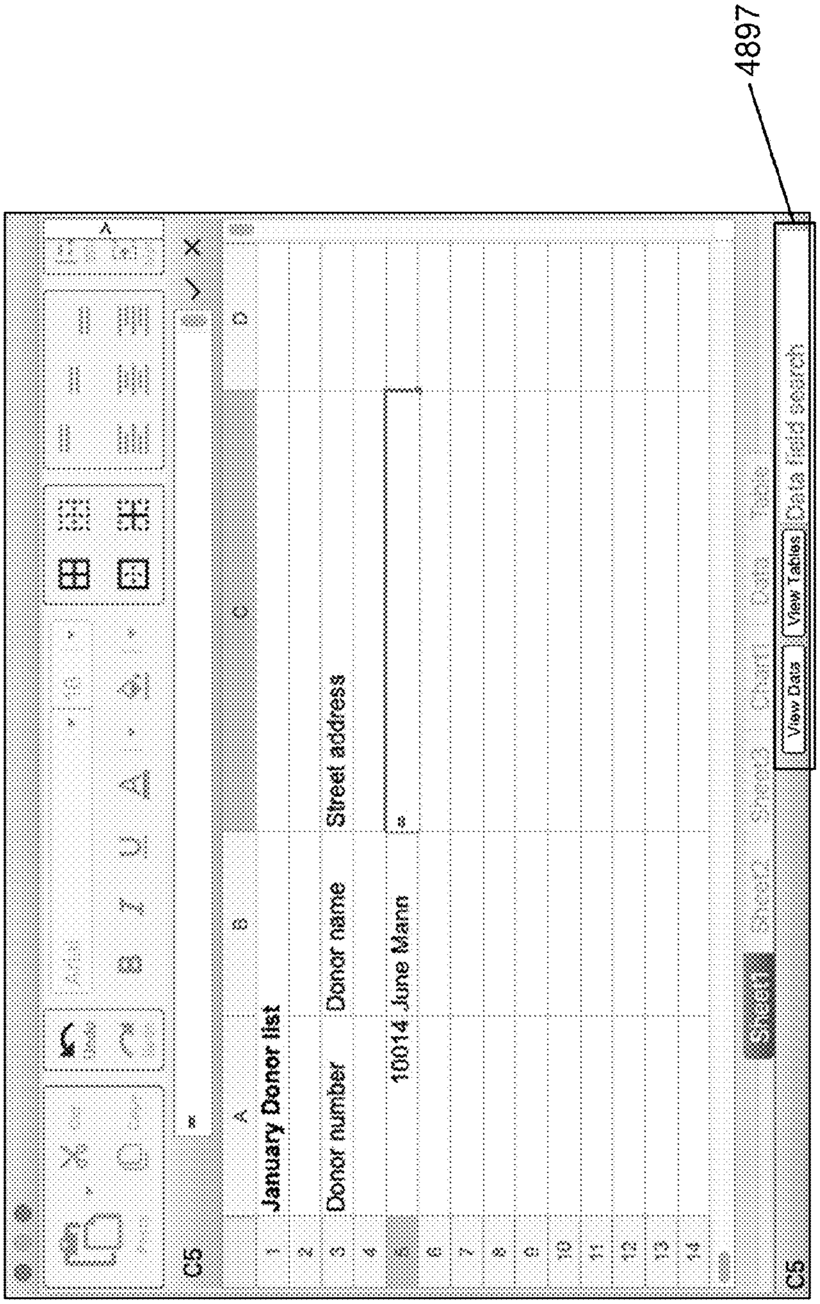
Figure 49:
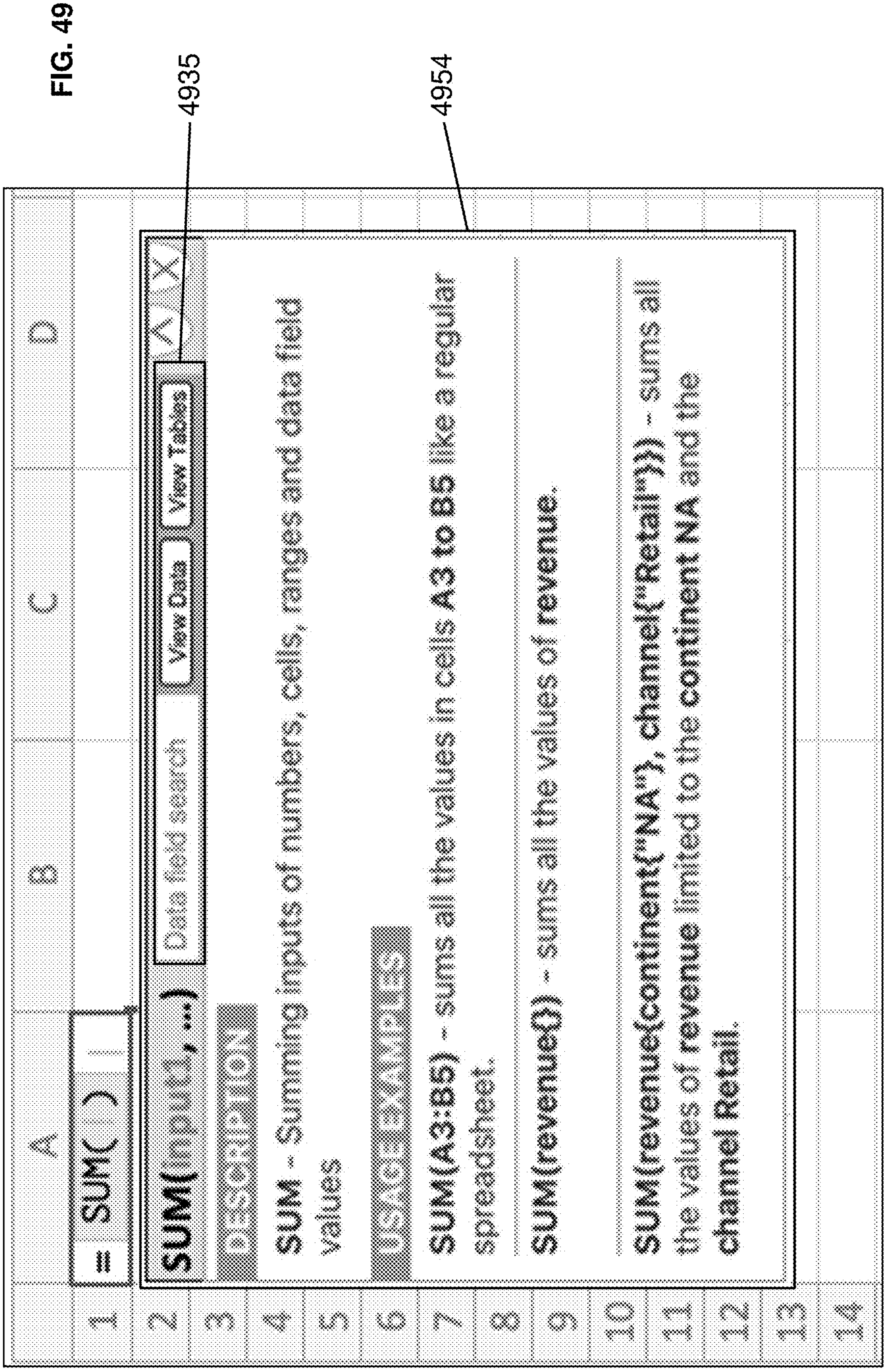

FIG. 47A examples one of the ways to access the Data view formulaic data field selector 4775. In this embodiment the user clicks a button labelled 'View Data' 4734 in a UI element automatically appearing when the user types an equal's sign '=' 4723 in a cell. Alternatively, the user could have accessed the selector by clicking the 'View Data' button 4438 in the search selector in FIG. 44. In FIG. 48A the search box and button access 4837 for the 'Data field search', 'View Data' and 'View Tables' automatically appears when typing an equal sign. They can be displayed in many different ways, as shown in the bottom bar location 4897 in FIG. 48B. FIG. 49 shows the different view selectors ('Data field search', 'View Data' and 'View Tables') 4935 exampled in a function (SUM) help 4854. And they could be shown elsewhere to give users access to selecting formulaic data fields.

Figure 50A:
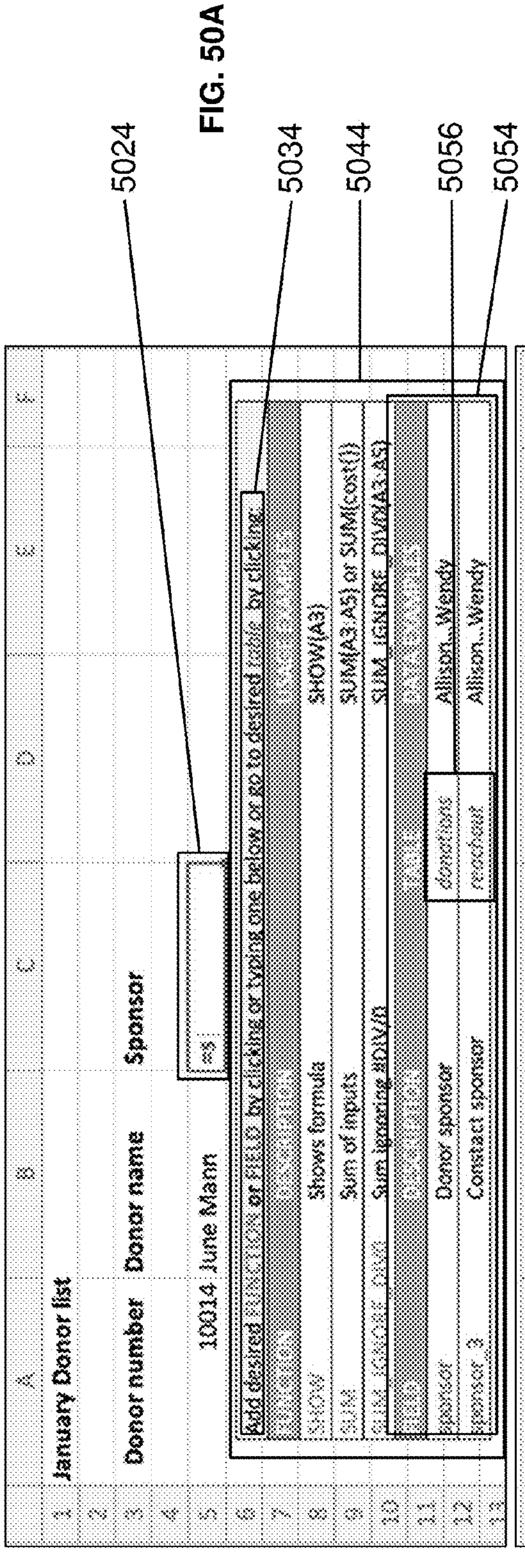
FIG. 50A and FIG. 50B example different variants of our joint FUNCTION and (formulaic data) FIELD formula populating selectors (hints).
Figure 50B:
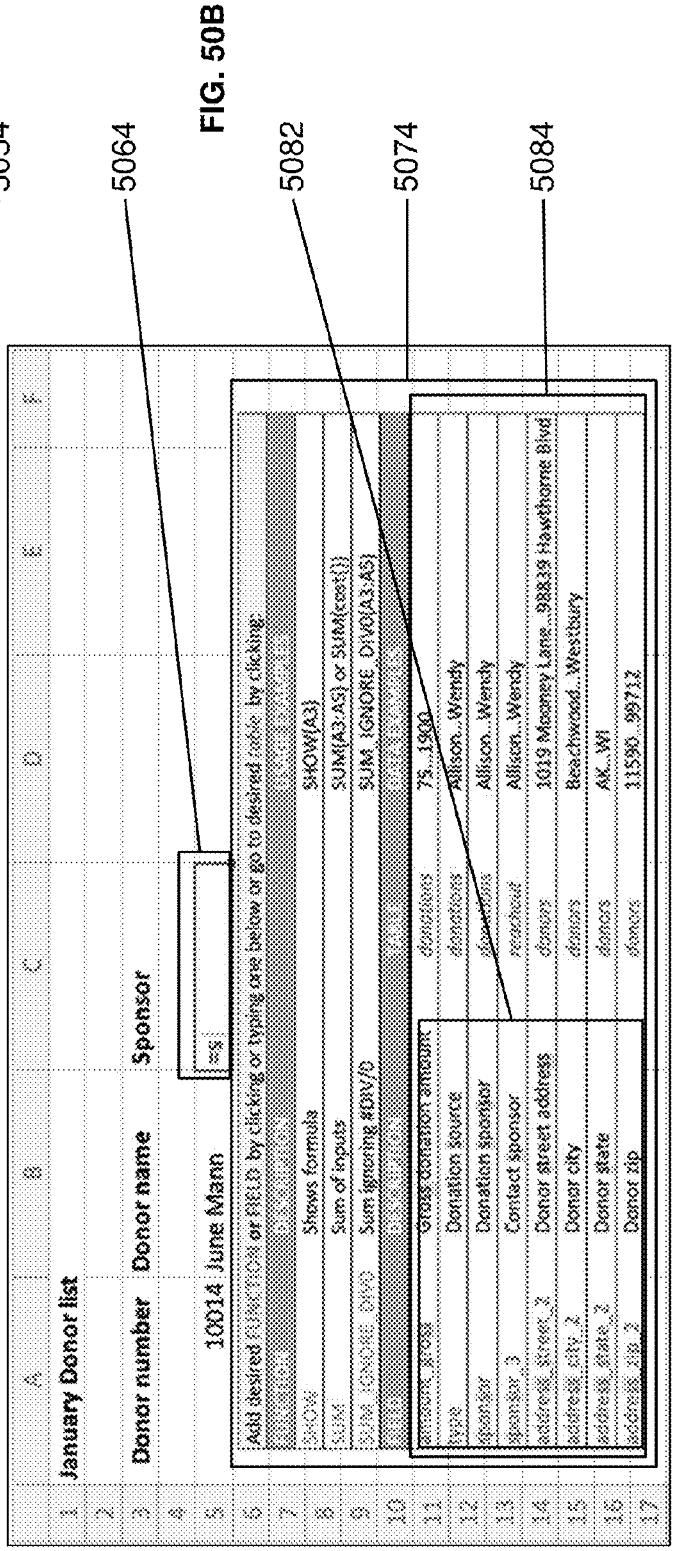

While we have shown four different variants of our formulaic data field selector, different variants using the component elements can be configured. FIG. 50A and FIG. 50B example additional variants. FIG. 50A examples an embodiment of the in-cell typing 5024 FUNCTION and FIELD alphabetically screening selector 5044 where the instruction line 'Add desired FUNCTION of FIELD by clicking or typing one below or go to desired table by clicking:' 5034 lets the user know they can move to the table view and retain the formulaic data field selection capability. They can do this by clicking one of the purple tables 5056. FIG. 50B examples an embodiment of the in-cell typing 5064 which combines an alphabetical screening of the FUNCTIONS with a full search of the formulaic data fields and select information (in this case the letter 's' in any part of the field or description). This is exampled in that the same '=s' typed in FIG. 50A 5024 generates two FIELDS while in FIG. 50B 5064 it generates eight FIELDS 5084 and the user can see the highlighted s in the two columns screened 5082. Other combinations of our screening and information capabilities can be combined as well as movement to and from different views and screening capabilities.

Figures 51A, 51B, 51C, 51D:
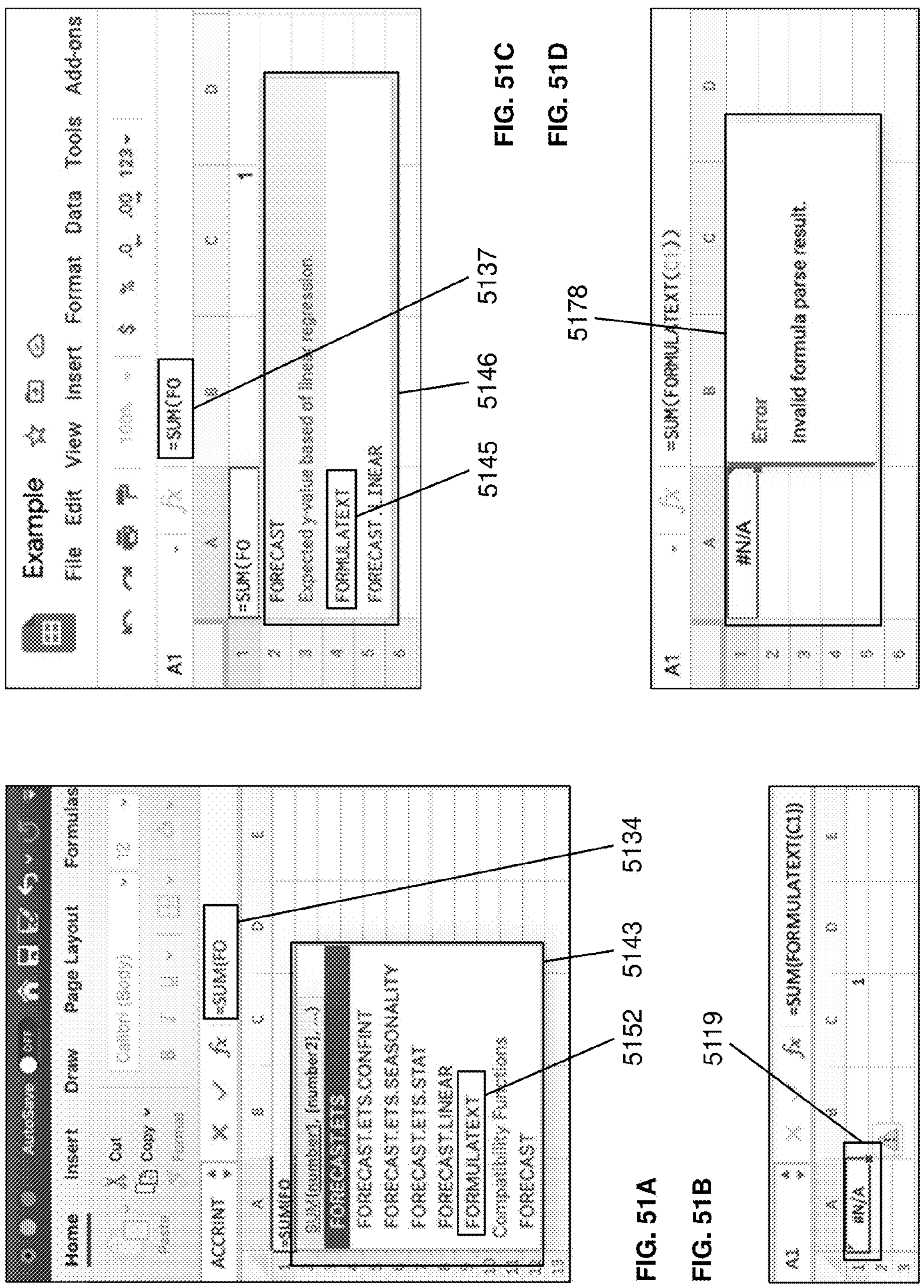
FIGS. 51A, 51B, 51C and 51D examples how Microsoft Excel and Google Sheets do not screen their as you type FUNCTION list for applicability of use in a FUNCTION argument.
Figure 52C:
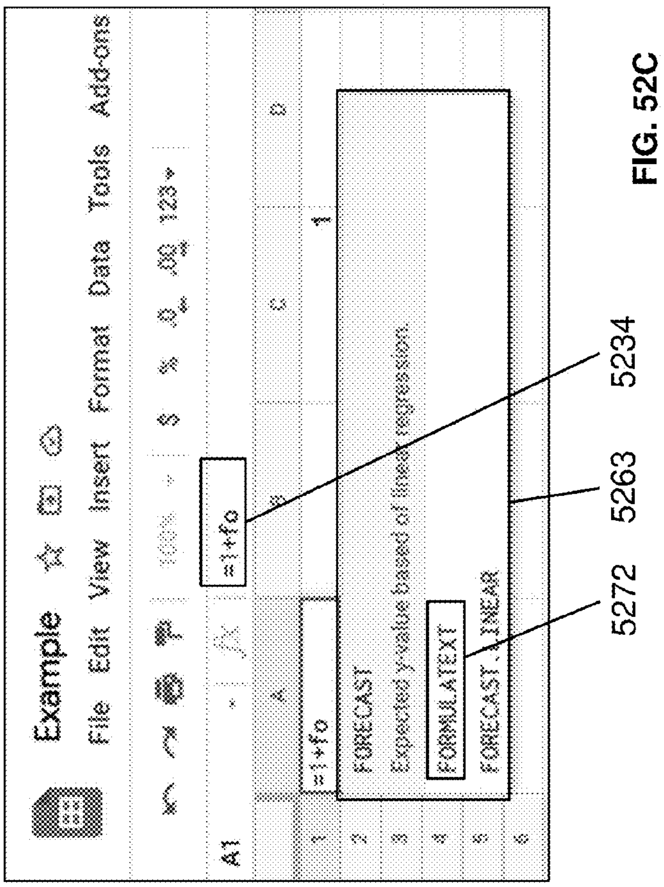
FIGS. 52A, 52B, 52C and 52D examples how Microsoft Excel and Google Sheets do not screen their as you type FUNCTION list for applicability to use in an algebraic formula.
Figure 52D:
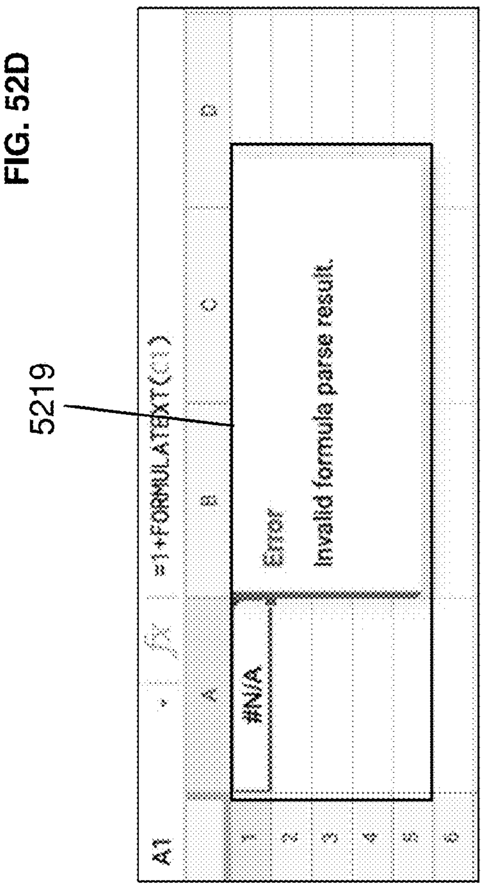
Figure 52A:
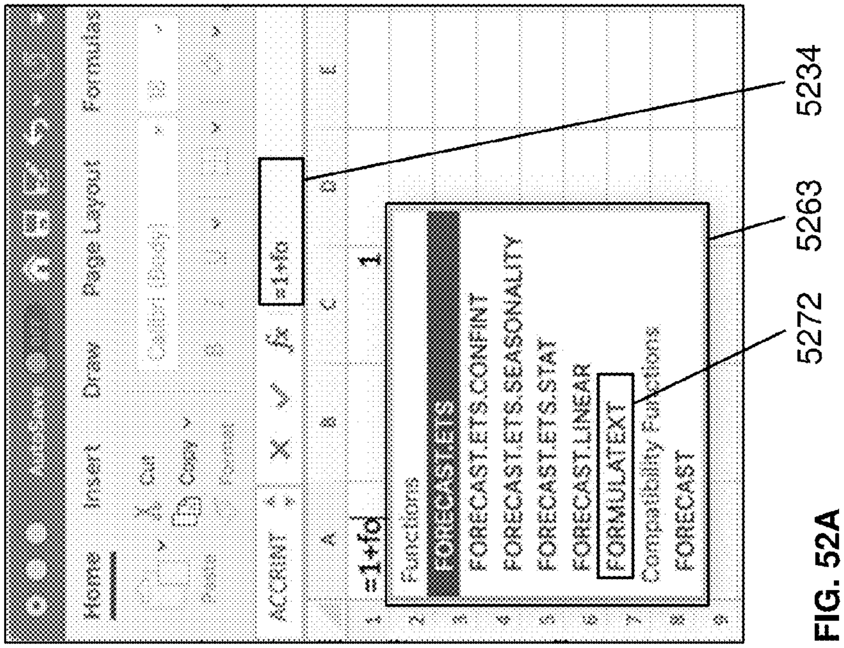
Figure 52B:
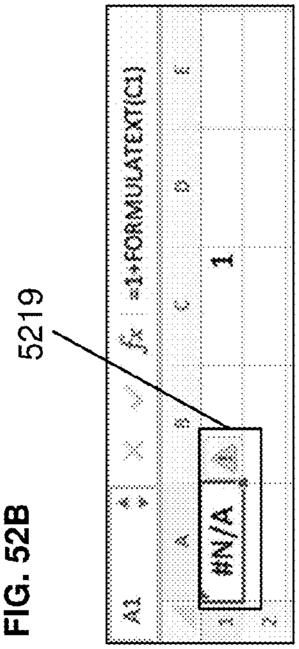

An additional level of sophistication in our technology is compared to that in existing spreadsheets in FIG. 51A through FIG. 57B. It's a capability not done by the existing spreadsheets, specifically testing whether the selections offered will work in the formula usage. FIG. 51A through FIG. 51D shows that neither Microsoft Excel nor Google Sheets limits their selections to workable options. FIG. 51A examples an Excel SUM formula 5134 and the function options 5143 that include 'FORMULATEXT' 5152 which when used in FIG. 51B generates the ' #NA' 5119 error value because the FORMULATEXT function does not generate a numeric value, as required by SUM. Google Sheet replicates the same issue in FIG. 51C for the SUM formula 5137 giving the function options 5146 which include 'FORMULATEXT' 5145 which when used in FIG. 51D generates the same ' #NA' 5119 error value for the same reason. FIG. 52A through FIG. 52D duplicates the same problem for an algebraic formula, and as further confirmed none of the existing spreadsheets screen their function suggestion for correct application and therefore give users wrong options.

Figure 53A:
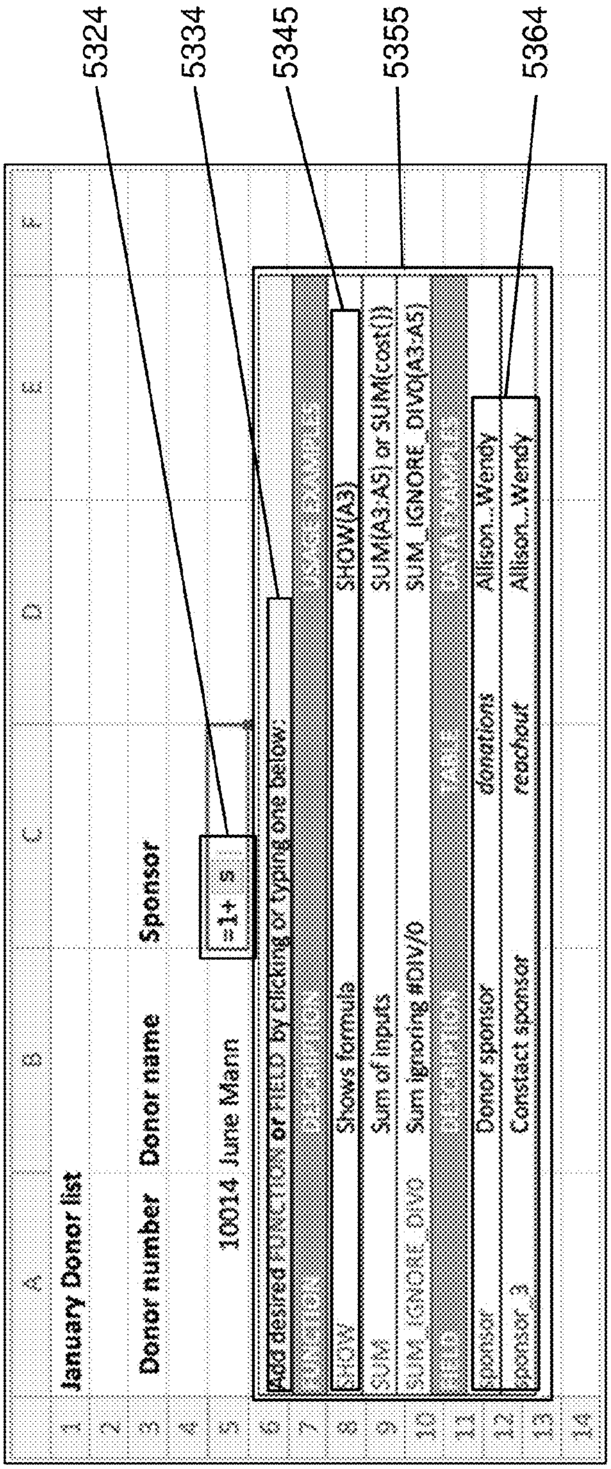
FIG. 53A and FIG. 53B examples our technology without and with the FUNCTION formula correct option applicability screening of the as you type FUNCTION and (formulaic data) FIELD hint lists.
Figure 53B:
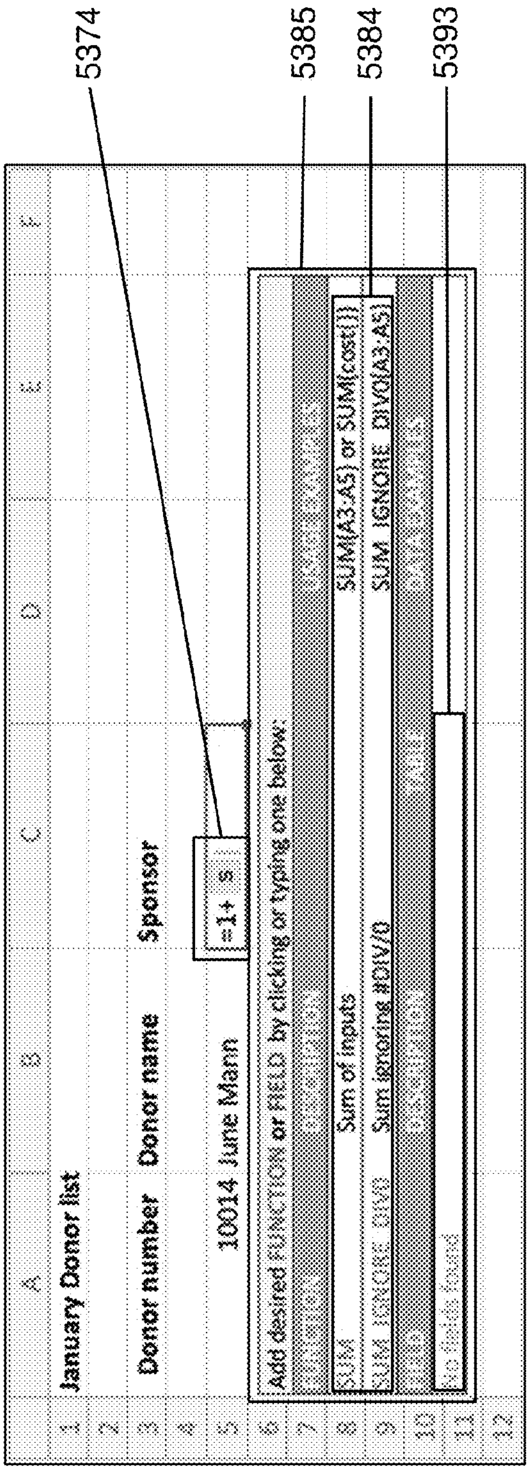

An embodiment of our technology eliminates those wrong options and does it not only for functions but for more complicated formulaic data and formulaic data function combinations. FIG. 53A and FIG. 53B examples our technology without and with that capability for an algebraic formula. In FIG. 53A the formula '=1+s' 5324 generates the option selection hint 5355 which includes the 'SHOW' function 5345 (which is a more human friendly synonym for FORMULATEXT in our app) which does not get displayed in FIG. 53B for the same formula 5374 which has the screening for applicability. Only the numeric functions 5384 remain in FIG. 53B. Also, FIG. 53B displays in its hint 5385 'No fields found' 5393 instead of the two fields 5364 found in FIG. 53A which are text not numeric fields. So, our technology has screened out all the FUNCTION and FIELD options that will not work in this algebraic formula situation.

Figure 54A:
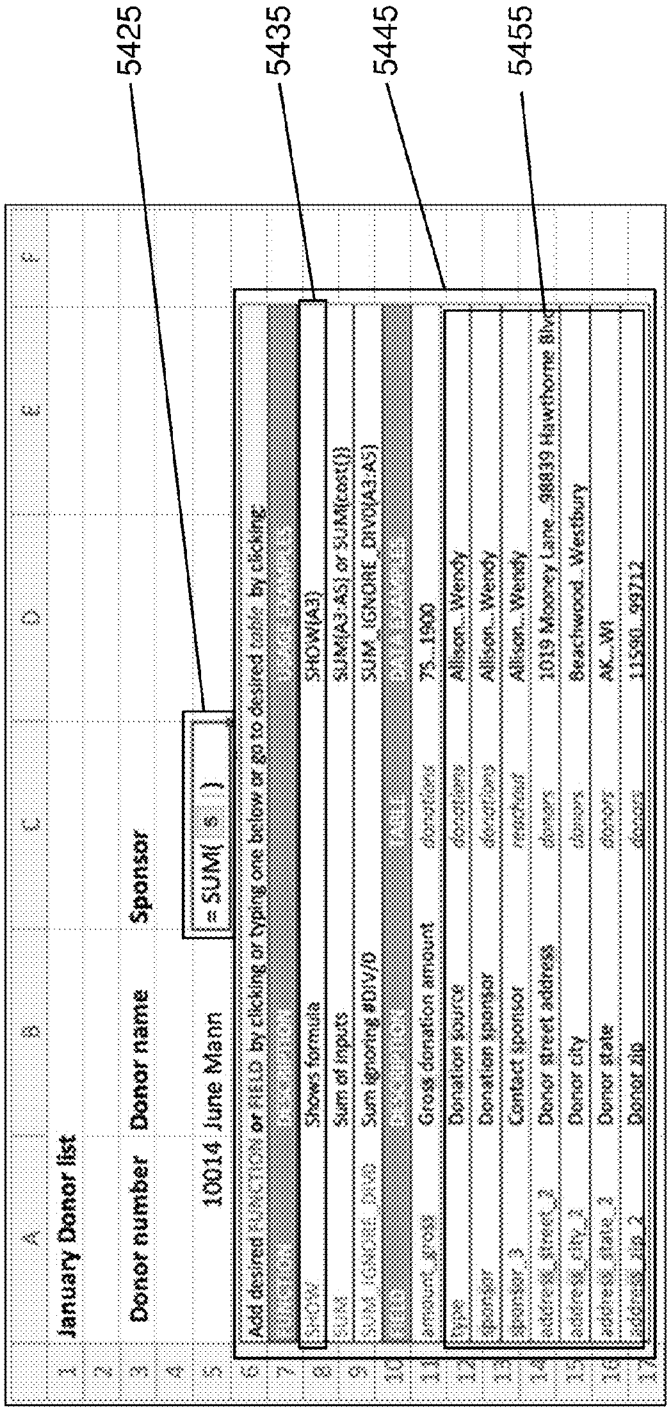
FIG. 54A and FIG. 54B examples our technology without and with the algebraic formula correct option applicability screening of the as you type FUNCTION and (formulaic data) FIELD hint lists.
Figure 54B:
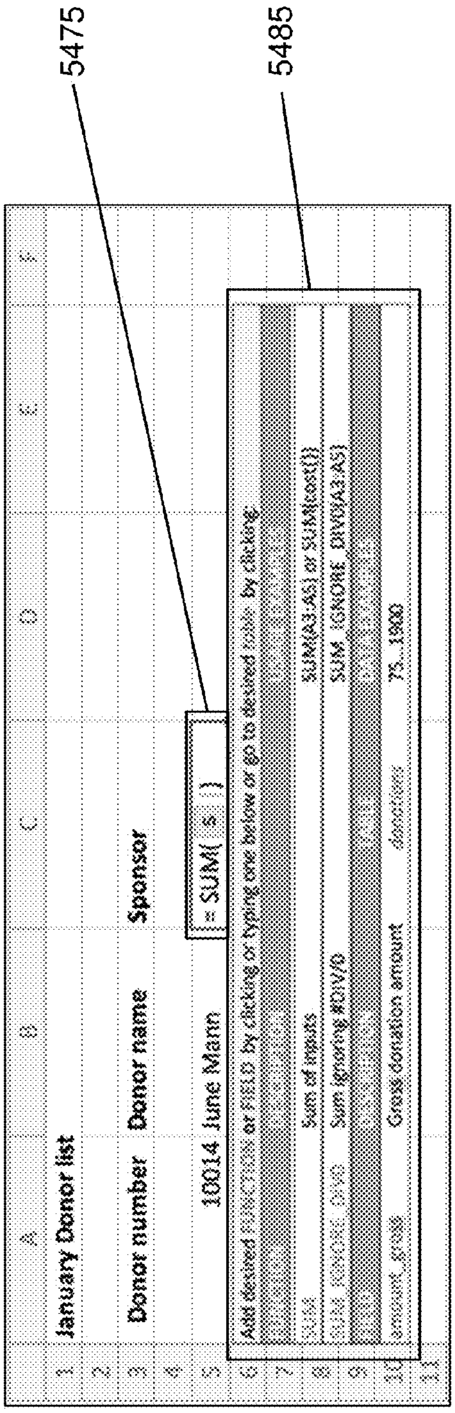

FIG. 54A and FIG. 54B example our technology without and with the correct option screening capability for a function formula. In these examples the same function formula (5425 and 5475) displays very different hint options (5445 and 5485) because the screening for applicability for the SUM function used eliminates one of the FUNCTION options 5435 and seven of the FIELD options 5455. Clearly making the selection of the desired option substantially easier and eliminating the chance the user selects a function or field that will generate an error.

Figure 55A:
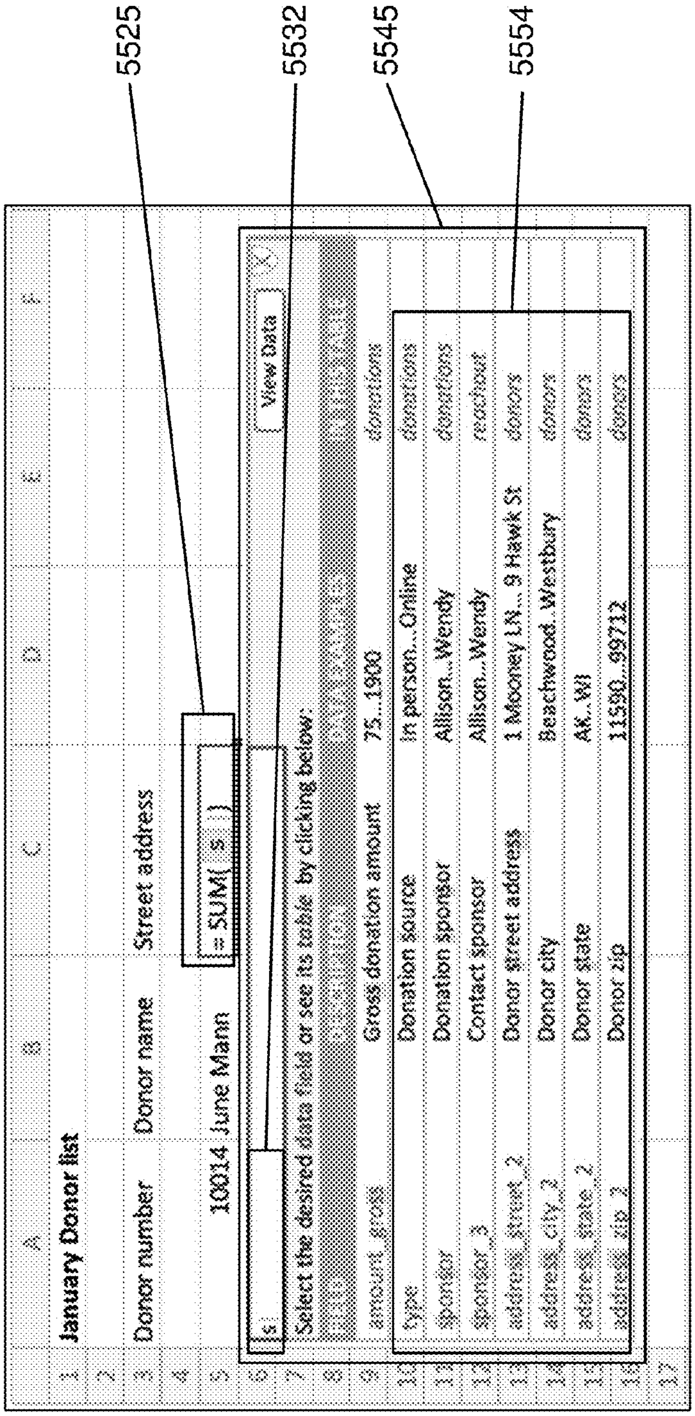
FIG. 55A and FIG. 55B examples our technology without and with the FUNCTION formula correct option applicability screening of the as you type character/group of characters search (formulaic data) FIELD and DESCRIPTION hint list.
Figure 55B:
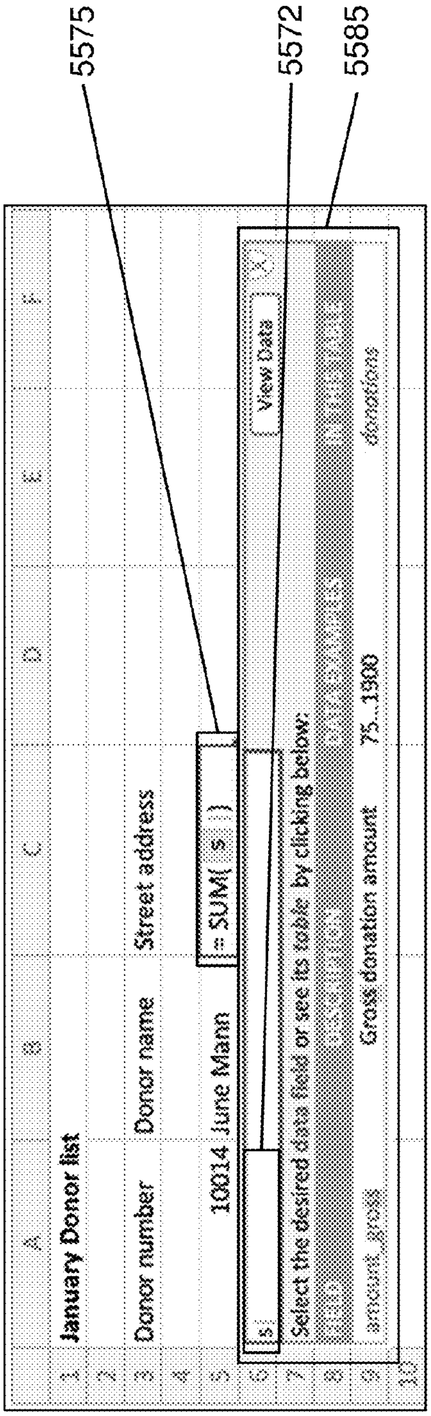

FIG. 55A and FIG. 55B example our technology without and with the correct option screening capability for a function formula where the user has invoked the character/group of characters formulaic data fields and formulaic data field descriptions search. For the same formula (5525 and 5575) and the same search (5532 and 5572) the applicability screening reduces the number of options by seven, making the selection in FIG. 55B extremely simple with one option. Note, while zip might look like a numerical field it is actually a text field in this data set because some zips have leading zeros that are not lost when it is a text field.

Figure 56A:
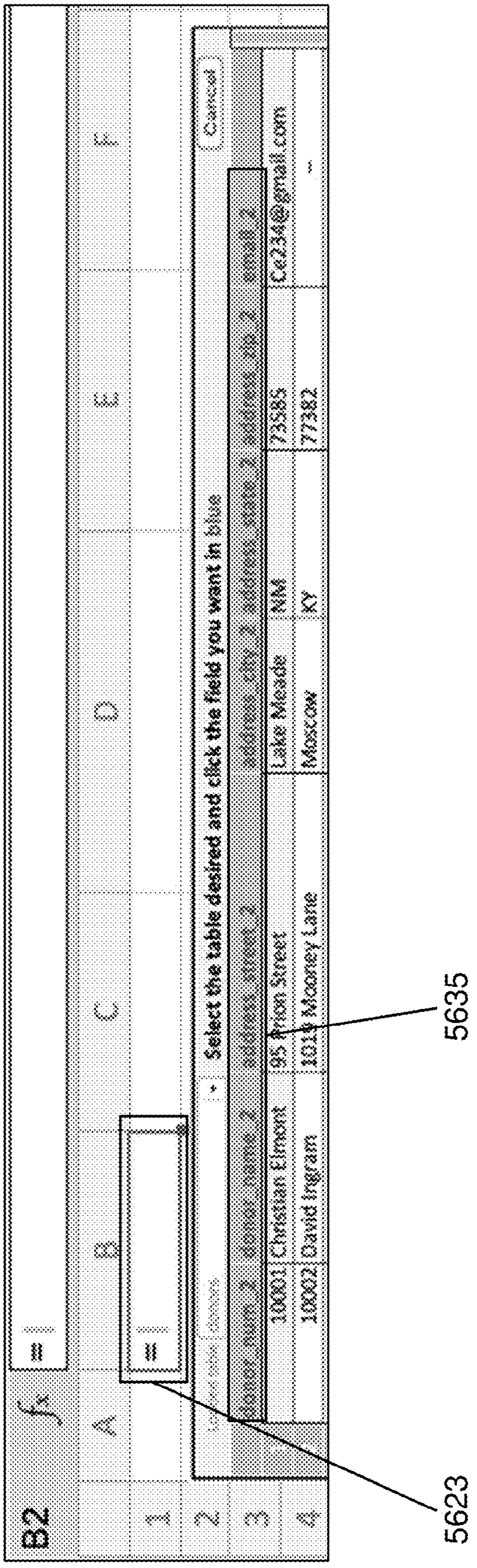
FIG. 56A and FIG. 56B examples our Table View option selection technology with the option applicability screening capability.
Figure 56B:
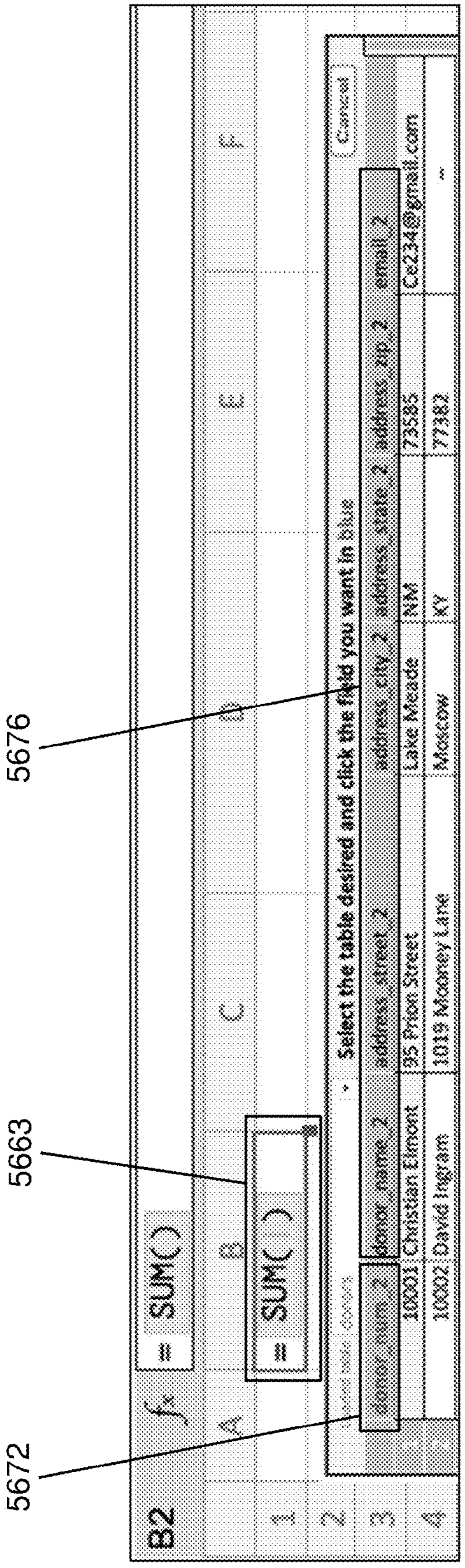

FIG. 56A and FIG. 56B examples our Table View option selection technology with the option applicability screening capability. In FIG. 56A the user sees the full list of formulaic data fields selectable (in blue) 5635 because the formula '=' 5623 accepts any field. However, in FIG. 56B the user only sees one selectable data field (in blue) 5672 because it is the only numeric field required by the formula '=SUM' 5663. The other formulaic data fields 5676 are disabled for selection and in this example shown in black text not blue.

Figure 57B:
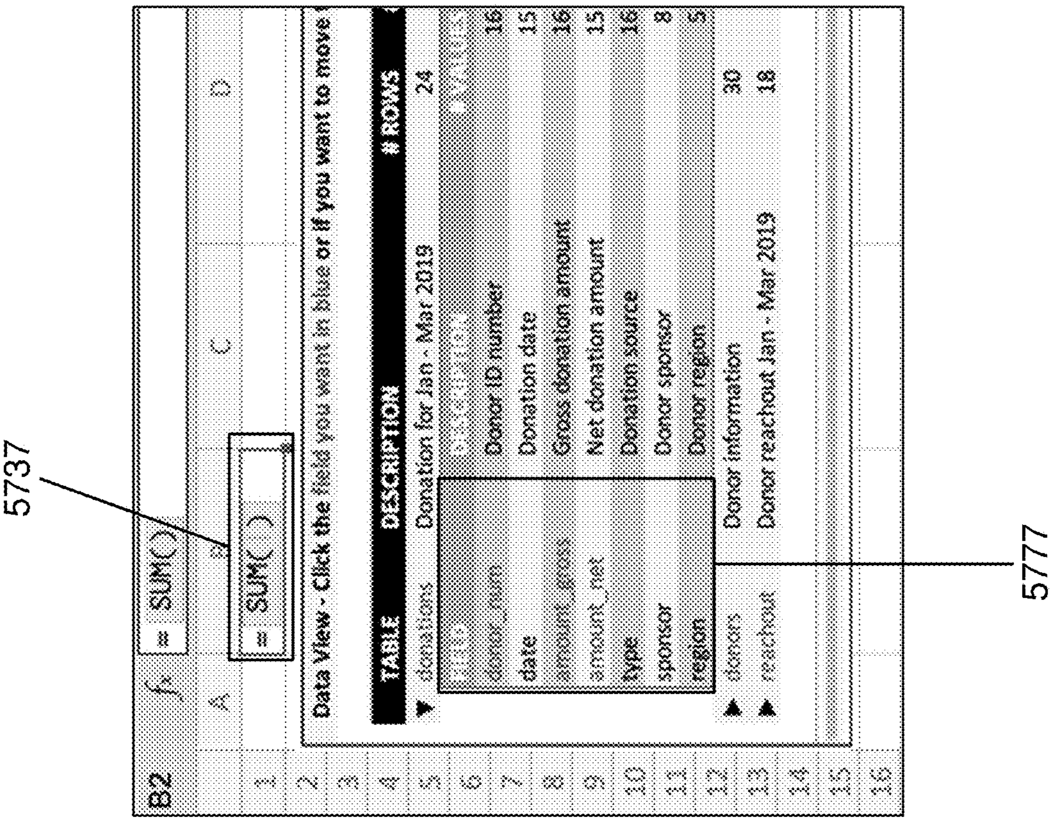
FIG. 57A and FIG. 57B examples our Data View option selection technology with the option applicability screening capability.
Figure 57A:
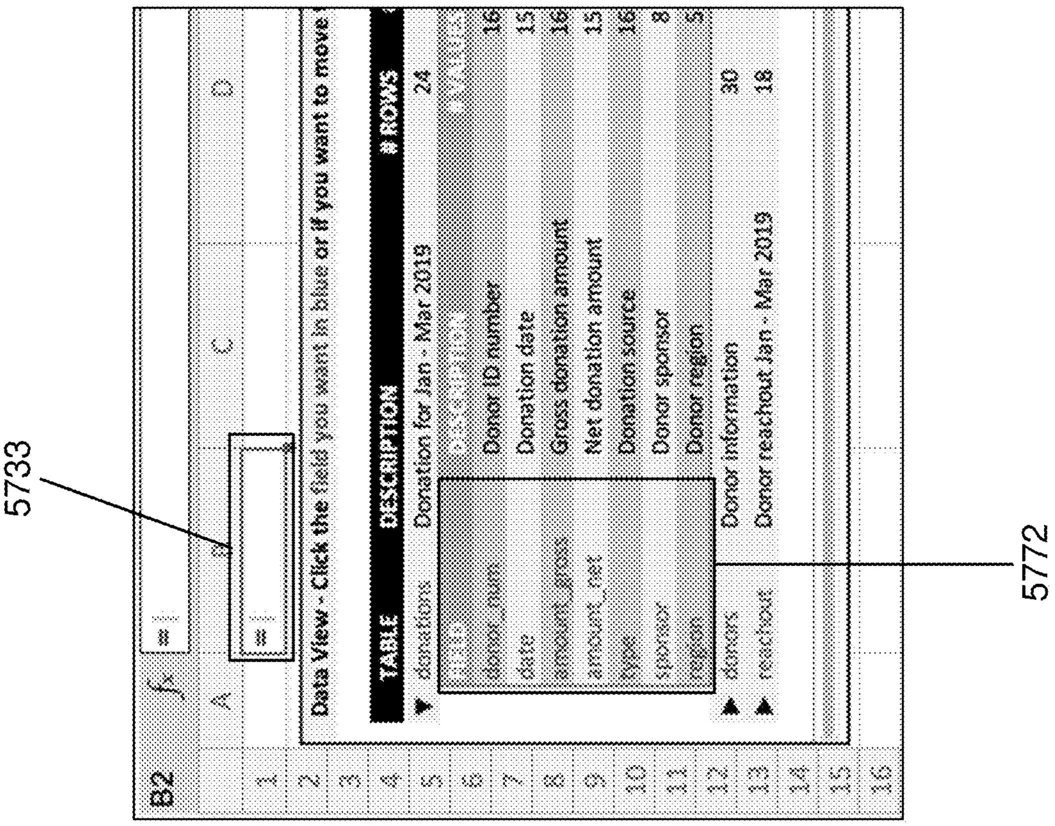

FIG. 57A and FIG. 57B examples our Data View option selection technology with the option applicability screening capability. In FIG. 57A the user sees the full list of seven formulaic data fields selectable (in blue) 5772 because the formula '=' 5633 accepts any field. However, in FIG. 56B the user only sees three selectable data fields (in blue) 5777 as only the numeric formulaic data fields are usable by the '=SUM' 5737 formula. The four other formulaic data fields 5777 are disabled for selection and in this example shown in black text not blue.

In all these examples, our technology screening the options for correct applicability in the formula situation simplifies and speeds up the selection and eliminates mistakes. We have seen a very simple application of that concept to which we are now going to see a much more elaborate and complicated application where once a user has selected a formulaic data field our technology step by step screens all the filtering options they have to complete the formulaic data or formulaic data function combination formula or part of a formula.

Our formulaic data field selection technologies are all about giving users of different data knowledge and skill sets the information needed to select the field they want from the right table or other grouping of fields and allowing them to, if desired, look in multiple ways without losing the ability to then select the field to the cursor position in the spreadsheet cell. Once this decision has been made a very different process (with many possible sub-steps) kicks in for determining any filters/constraints and alterations to the value or values retrieved to the formula for use. We will now example embodiments of those processes in our technology where our technology intelligently curates the selection options across a much broader set of types of options while limiting the user to options which will successfully evaluate, thereby eliminating typos, syntax errors and in many cases data errors.

Formulaic Data Hints—Comparison to without Hints

With a formulaic data field selected for evaluation our app is ready to provide the user with a very tailored display (hint) of their formula options for each step of building their formula. Allowing a user to point and click selections to build a formula with no errors (other than possibly logic errors on what the formula does). We will start exampling embodiments of our technology with a start to finish comparison creating a formula with and without our hints. Then we will go into depth on our technology for producing the filtering hints, exampling how it limits what we call direct and indirect filter options; followed by the additional factors that change the hint options displayed, how they are displayed and what they do when selected.

Figure 58:
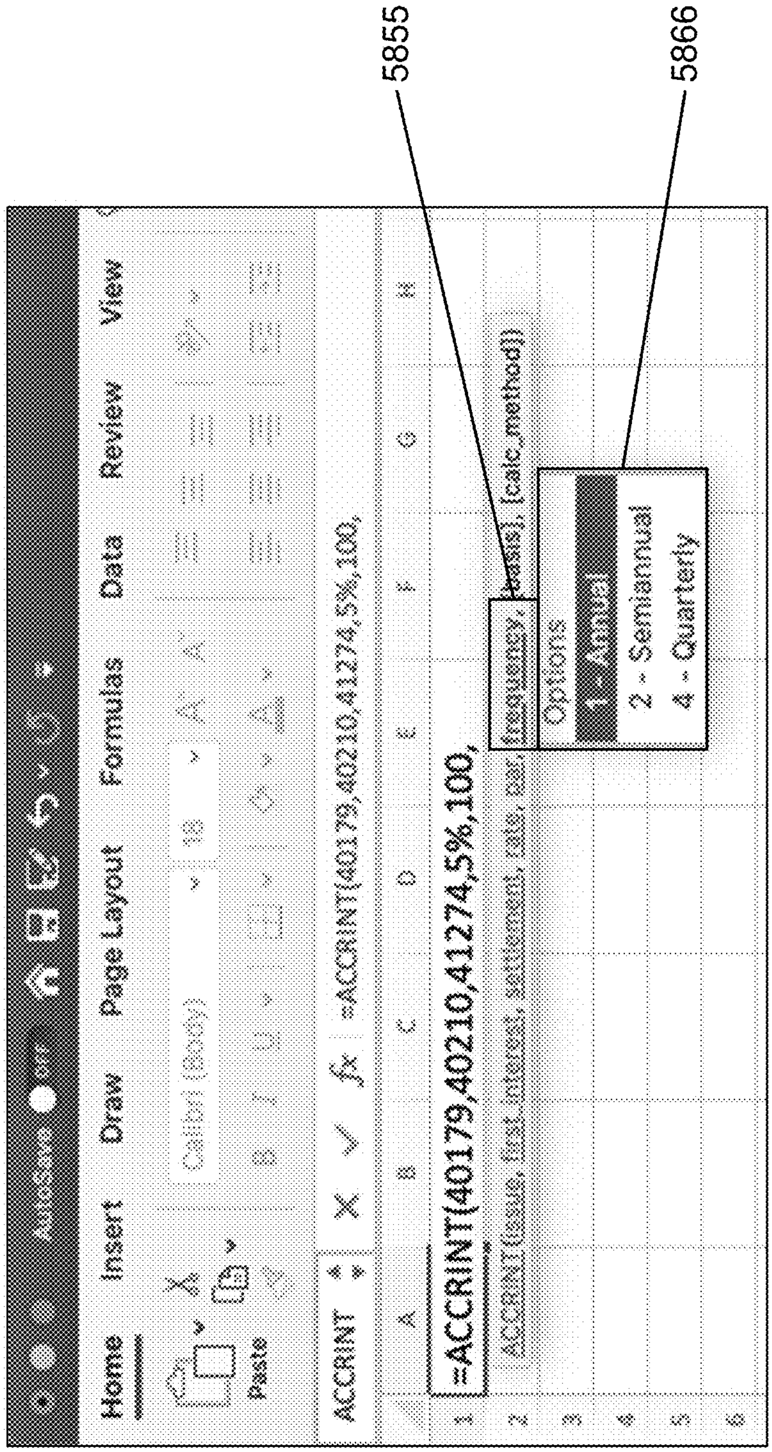
FIG. 58 examples a Microsoft Excel predefined FUNCTION argument value selector for arguments with a fixed set of options FIGS. 59A, 59B, 60A, 60B, 61A, 61B, 62A, 62B, 63A, 63B and 63C does a comparison of building a formulaic data formula with and without our hints.

There is nothing remotely related to our formulaic data hints in the current spreadsheets, and more broadly for spreadsheet functions the only further option selector (beyond the function selectors previously discussed) is exampled in FIG. 58 5566 which in Excel gives users an opportunity in some functions to select an argument/parameter value from a fixed set of options of that argument/parameter—in this example the Options 1—Annual 2—Semi-annual 3—Quarterly 5866. Sheets and other spreadsheets have nothing that goes beyond this. None of the current spreadsheets does what our technology does, which is situationally determines the applicable options for an argument/parameter in our formulaic data and curates with relevant selection information and instructions and upon selection delivers the value with the needed syntax for the selection (e.g., "" for text) and prepares the user for any further selections when applicable giving the user a hint for their next possible selections.

FIG. 59A through FIG. 63C does a comparison of building a formulaic data formula with and without our hints. What you will see as the overall comparison is the user not using the hints has to type thirty-four characters with the correct syntax, the correct values, no typos and then hit enter while the user using our hints' types one character and then does four selections and clicks on the hints before hitting enter with no chance for a typo, syntax mistake or selecting an invalid data value. Our hint technology effectively eliminates all but logic errors (we will later example an additional hint capability to reduce logic errors), thereby eliminating a large fraction of the typical errors in creating a spreadsheet formula.

Figures 59A, 59B:
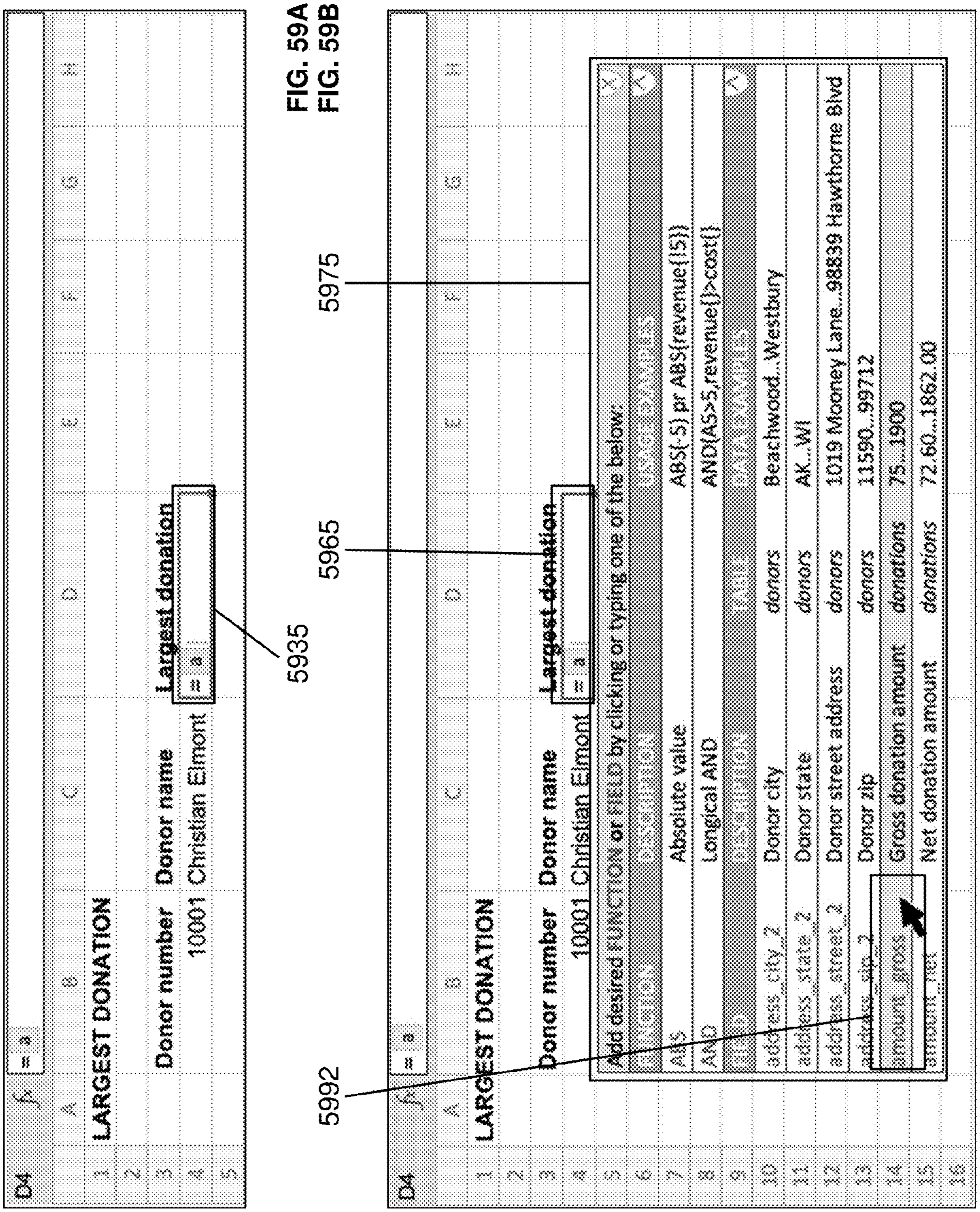

FIG. 59A examples the user without hints starting the formula by typing '=a' 5935. In both situations the in-cell formula and the formula bar formula will identify/emphasize errors, but we are not showing the related error explanations as we will example incorporation of those later. In FIG. 59B the user types the same '=a' 5965 however that automatically displays the step one FUNCTION and FIELD alphabetical screening selector 5975 exampled previously. At this point the user with the hints sees the formulaic data field they want, 'amount_gross' and clicks it 5992. The user without formulaic data hints must remember the formulaic data field name they want and correctly type it, correctly typing twelve characters versus the one click.

Before we go further, we want to define two terms we will use, namely direct and indirect filters. In our terms a direct filter is one that uses a value of the formulaic data field itself to filter the formulaic data evaluation. For consistency throughout you will see us call those options VALUES or RETRIEVERS, which are simply two different ways to set that filter value. Obviously, these labels could be different and different methods used to filter the formulaic field directly. An indirect filter in our terms is a formulaic data field used as a filter. For consistency throughout you will see us display these as CONSTRAINT or MATCH (join) formulaic data field names.

Figure 60A:
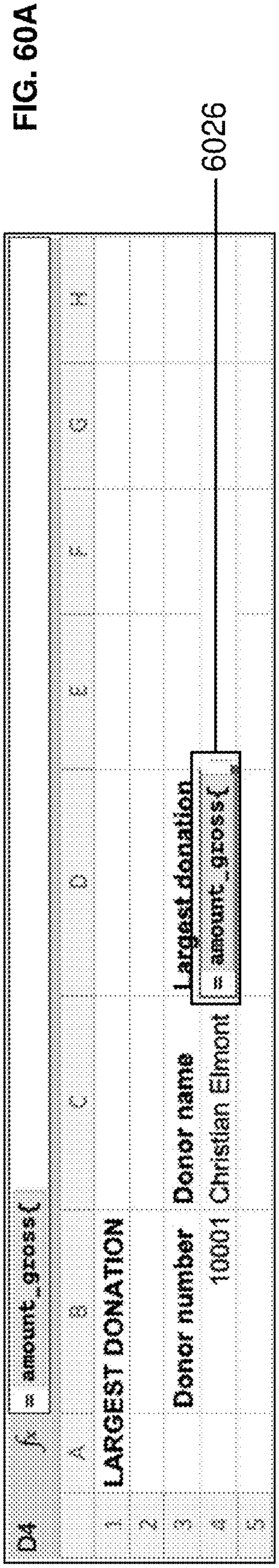
Figure 60B:
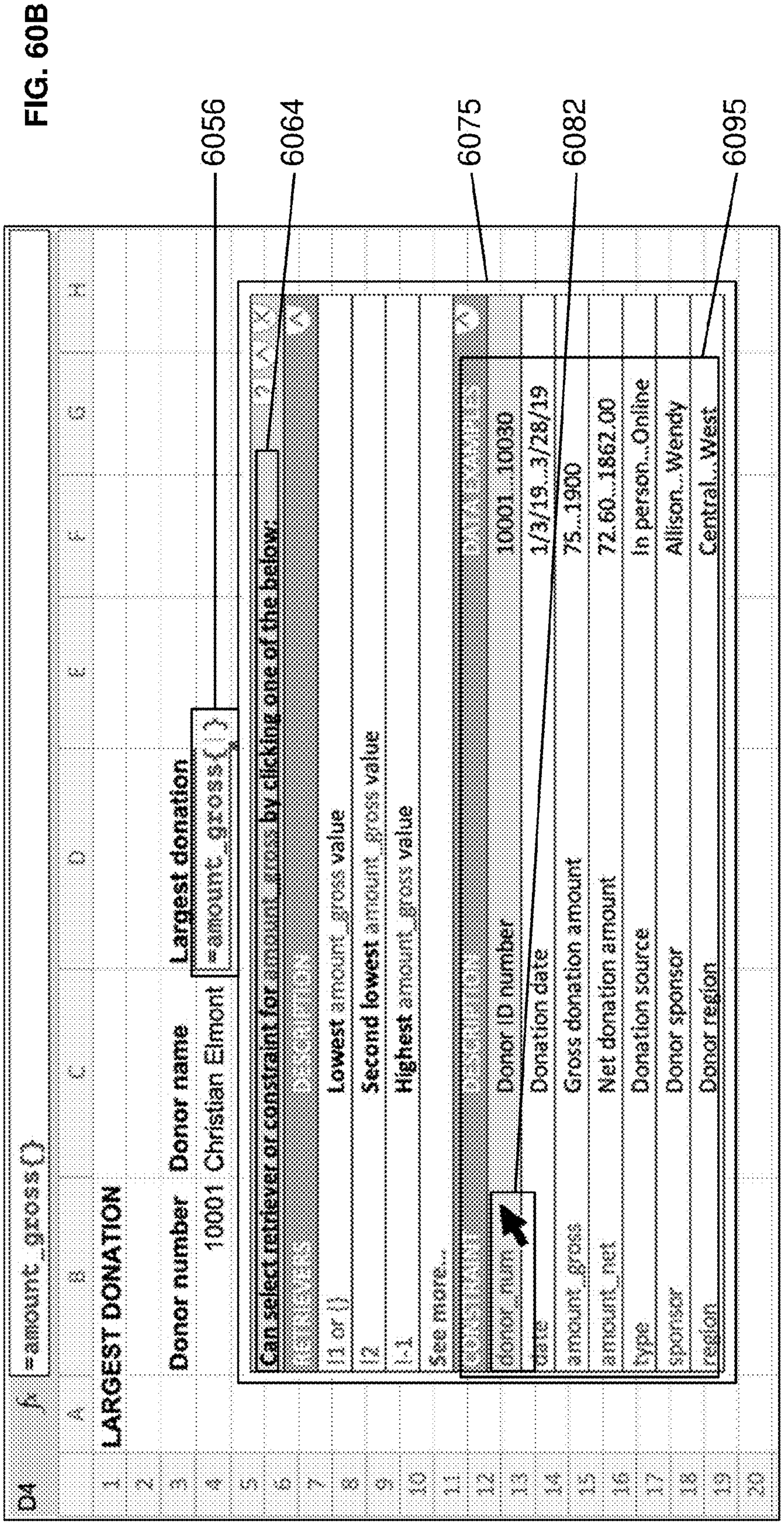

FIG. 60A then examples the user without hints adding a desired direct or indirect filter to the formulaic data field 'amount_gross' 6026. Again, the user needs to remember the exact field name for the desired field in the same table as 'amount_gross' 6026 and correctly type it. While the user with the hints in FIG. 60B is automatically presented from the previous click with a hint showing all their options. This hint has an instruction line 'Can select retriever or constraint for amount_gross by clicking one of the below:' 6064 pointing out that the user has two different sets of selection options, RETRIEVERS (e.g., '!2') or a CONSTRAINT (e.g., 'donor_num'). The indirect filter options 'CONSTRAINT' 6095 selectively displays only those formulaic data fields within the same table as 'amount_gross' 6056 so the user cannot click and enter a field that will not evaluate. The hint also makes it very easy for the user through the additional information shown to help them identify the field they want to select with no need to remember anything. So, the user with the hints again does one click while the other user after remembering the desired field has to correctly type ten characters.

Figure 61A:
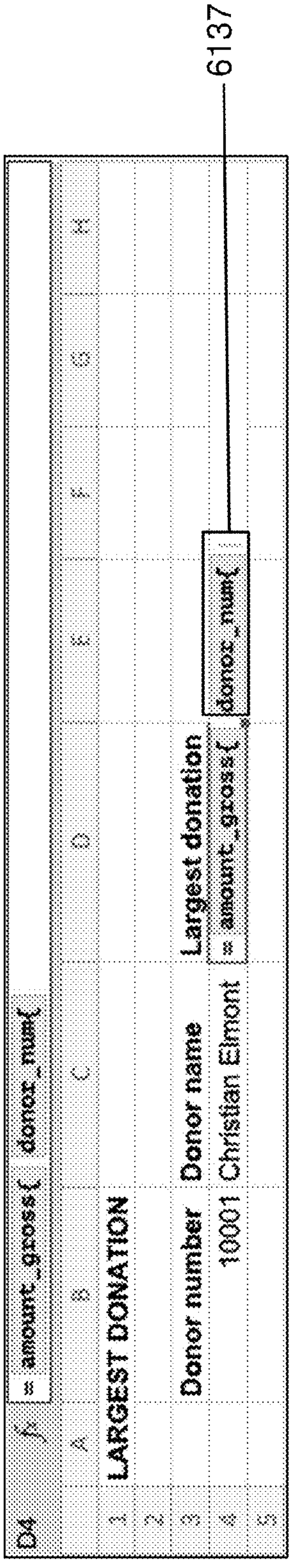

FIG. 61A then examples the user without hints typing the direct filter value for 'donor_num' 6137 while the user with hint automatically sees from the previous click a hint 6185 with their options for 'donor_num' 6157. As with the previous hints it has an instruction line 'Can select a donor_num value, retriever or match by clicking one of the below:' 6165 which lets the user know that they can specify the direct filter with either a VALUE 6172 or a RETRIEVER 6185 or specify an indirect filter MATCH 6196. Thus, giving the user a selection of all of their options. Our technology is taking the user step by step through building the formulaic data formula telling them what to do at each step and their options to do it. They don't have to remember anything about the mechanics of creating the formula such as the syntax, arguments and after their first field selection have all their other field and value selection options are laid out for them for point and click execution. So, in this step the user with the hints clicks the value they desire '10001' 6172 while the other user remembers and types the 5 characters.

Figure 62A:
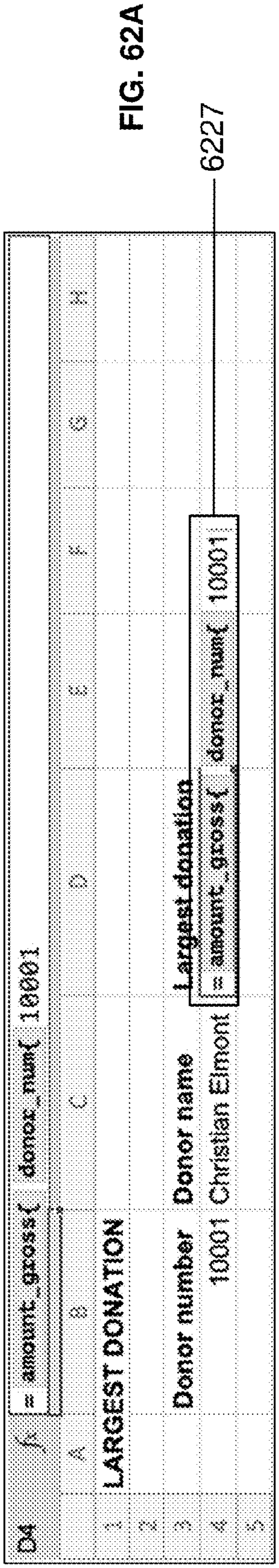

In FIG. 62A the user without the hints is ready to start finishing arguments and adding the retriever to retrieve the largest value of amount_gross{donor_num{10001' 6227 formula. That user needs to remember the retriever for the largest remaining value and type it. The user with the hints automatically has the next hint 6275 displayed with the instruction line 6264 and can easily see what they want, the highest remaining value of amount_gross and therefore clicks that selection 6273. No need to remember the retrievers as they are displayed for them and no need to remember the syntax as the click takes care of the proper syntax as well.

Figure 63A:
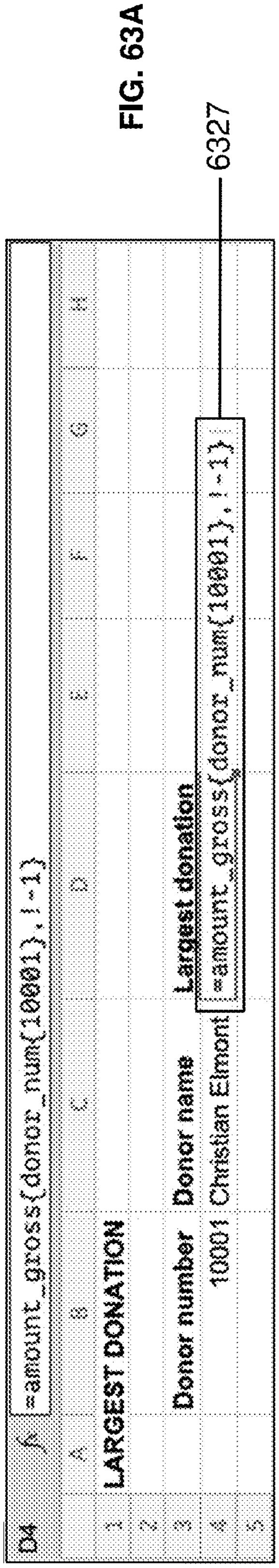
Figure 63B:
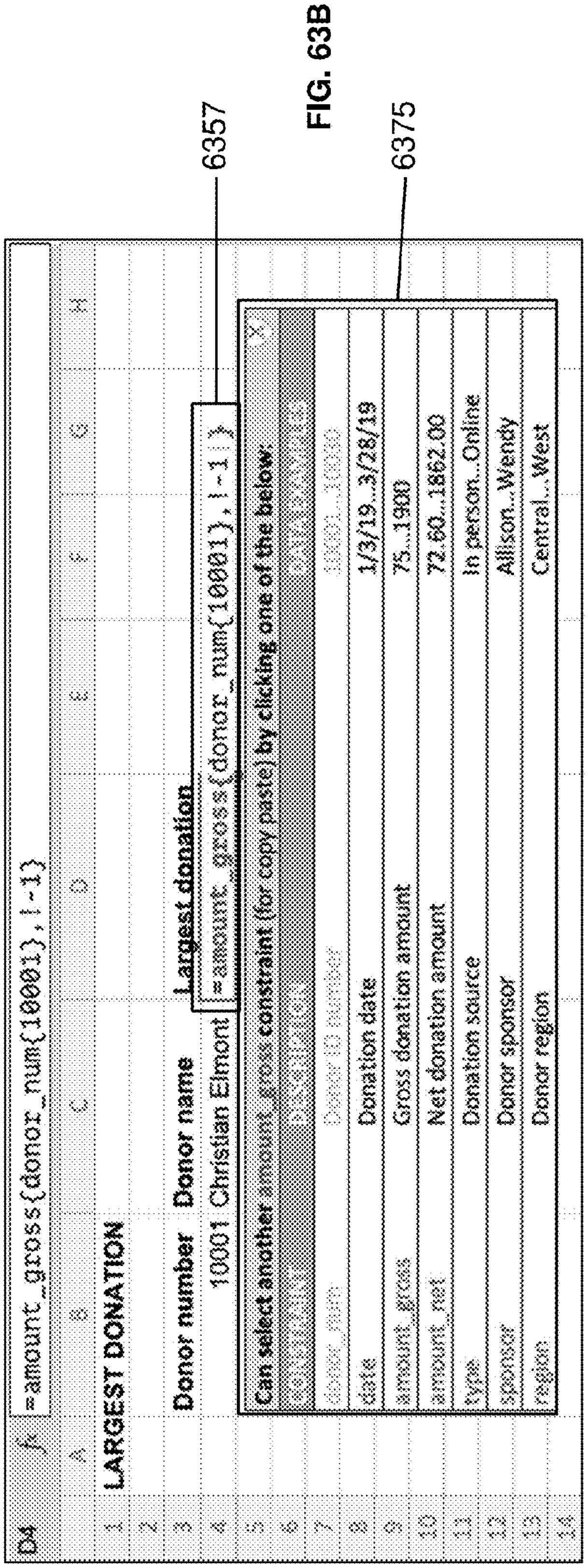
Figure 63C:
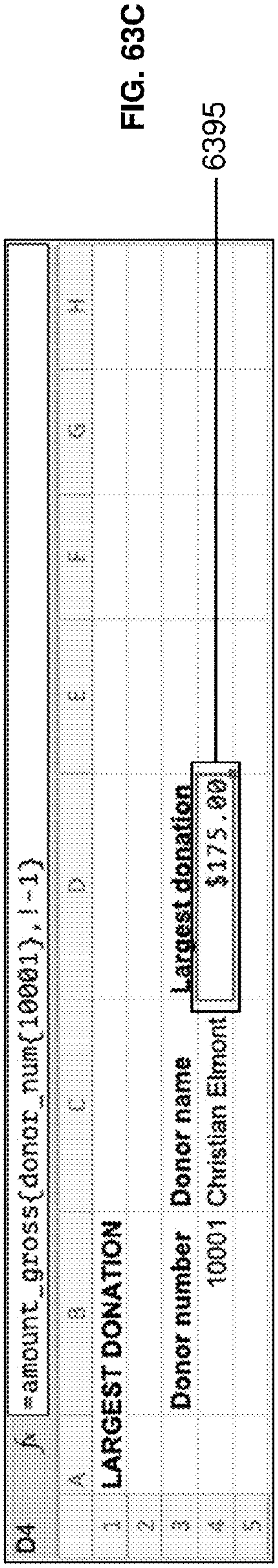

So, in FIG. 63A and FIG. 63B both users are ready to hit ENTER and evaluate their formulas as shown in FIG. 63C 5695. In our technologies both users see no error identifications/emphases (e.g., in 6327 and 6357) and therefore know that their formula is free of errors. At this stage the user with the hints can see what remaining options they have available in the hint 5675 but they like the other user will simply hit ENTER.

Overall, the user not using the hints had to type thirty-four characters with the correct syntax, no typos and remember all the correct filter values then hit ENTER while the user using our hints types one character and then does four selections/clicks on the hints before hitting ENTER, The user with hints had no chance for a typo, syntax mistake or selecting an invalid input and had to remember almost nothing as their options were all shown to them. Our hint technology eliminates a lot of work and effectively eliminates typos, syntax errors, most data value selection errors thereby eliminating a large fraction of the typical errors in creating a spreadsheet formula.

Formulaic Data Hints—Different Filter Options

After seeing a start to finish comparison of what our hint technology does for formulaic data formulas, we will now example how it works. Our technology uses a formula analyzer that situationally determines the correct formulaic data options given your previous inputs and curates the results into an organized easy to understand usage prioritized display that turns formula writing into a simple point and click selection process. Our analyzer determines and curates the options by field usage (e.g., evaluation or filtering including matching), prior arguments, data type, data content and type of activity (e.g., creation or editing). The display curation of our technology decides display order, sections, groupings, content and display types to make selection an easy process for a spectrum of different users. There are many variants of the curation that will work however, to illustrate the important aspects of the option determination and curation process we will example embodiments in FIG. 64A through FIG. 66B that do not substantially alter the curation.

Figure 64A:
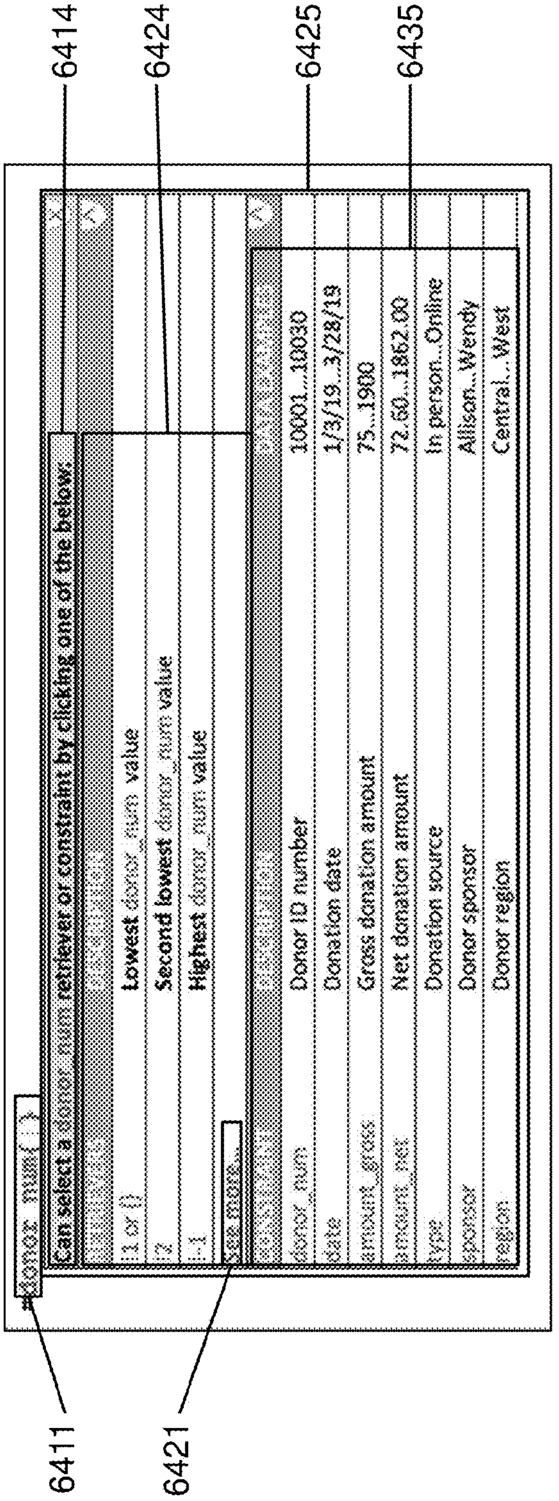
FIG. 64A and FIG. 64B examples a formulaic data field evaluation hint and a formulaic data field filter hint.
Figure 64B:
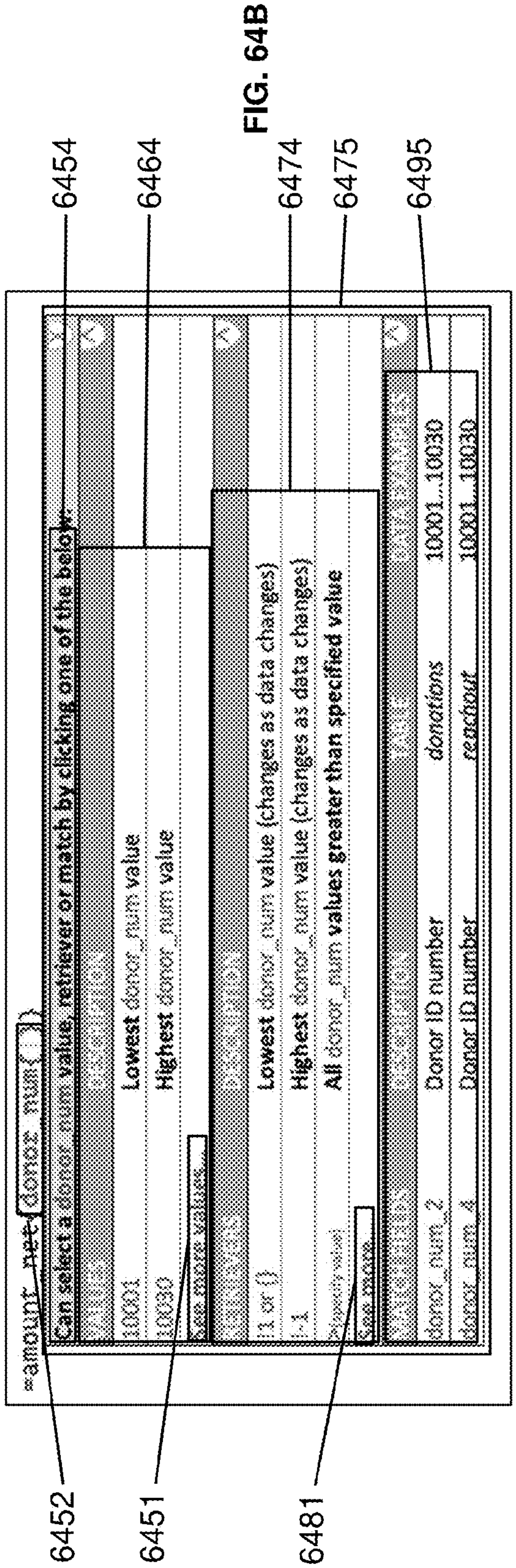

One implementation uses direct and indirect formulaic data field filters to determine the options to be displayed in the hint. The hint uses the formulaic data field for which the hint is being displayed to select the formula options displayed. Those options include direct and indirect filter options for the formulaic data field where the direct filter options are limited to those of the formulaic data field itself. FIG. 64A examples the direct filter as 'RETRIEVERS' 6424 while FIG. 62B examples two forms of direct filters 'RETRIEVERS' 6474 and 'VALUES' 6464 and in both situations the values are limited to the field for which the hint is displayed 'donor_num' (6411 and 6452). The indirect filter options are limited to fields from the same table as the formulaic data field and/or match/join fields for that formulaic data field. FIG. 64A examples the indirect filter options labelled 'CONSTRAINT' 6435 that are limited to the fields from the same table as the field for which the hint 6425 is displayed 'donor_num' 6411. FIG. 64B examples the indirect filter options labelled 'MATCH FIELDS' 6495 that are limited to the match/join fields for that formulaic data field 'donor_num' 6452 for which the hint 6475 is displayed. These match fields are from other tables available within the application which match the data for the field 'donor_num' 6452. We will go into greater depth on how this works later.

Formulaic data hints—single versus range evaluation

Figure 65A:
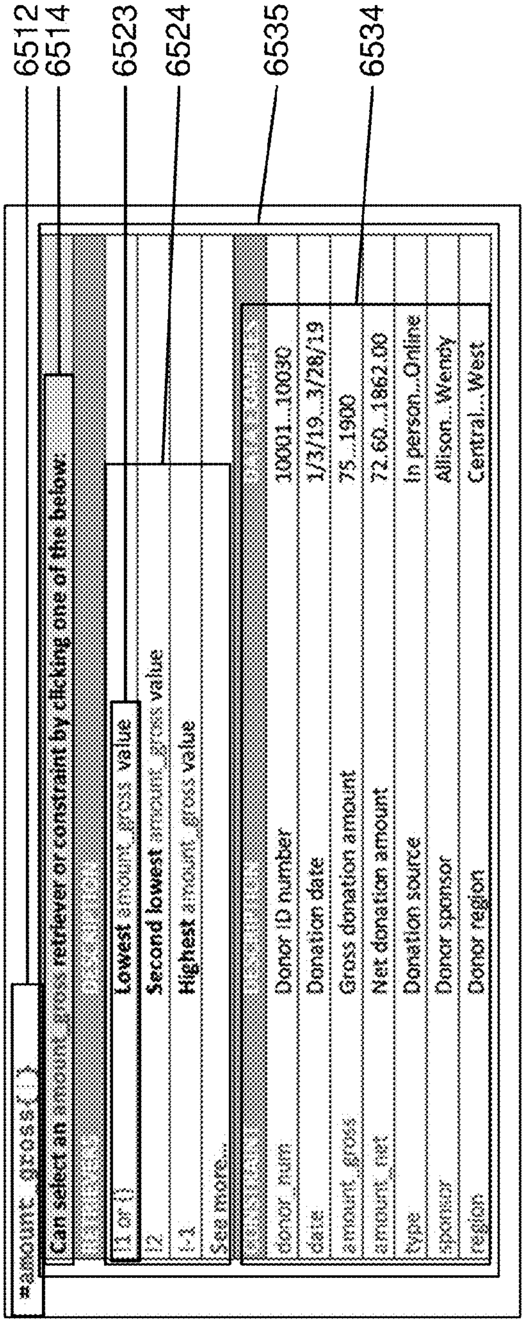
FIG. 65A and FIG. 65B examples hints for the same formulaic data field with and without a range function (SUM).

In a spreadsheet the same formulaic data field evaluation can be very different based on whether it is in a situation where the result is a single value (e.g., in a cell or in an algebraic formula) or a range of values (e.g., in functions like SUM, MAX, AVERAGE). Therefore, in an implementation of our technology the options displayed differ by whether the evaluated field yields a single value (see FIG. 65A) or range value (see FIG. 65B). The formulaic data field being evaluated in both examples is the same 'amount_gross{ }' however the difference is the formula being:

'=amount_gross{ }' in FIG. 65A

Figure 65B:
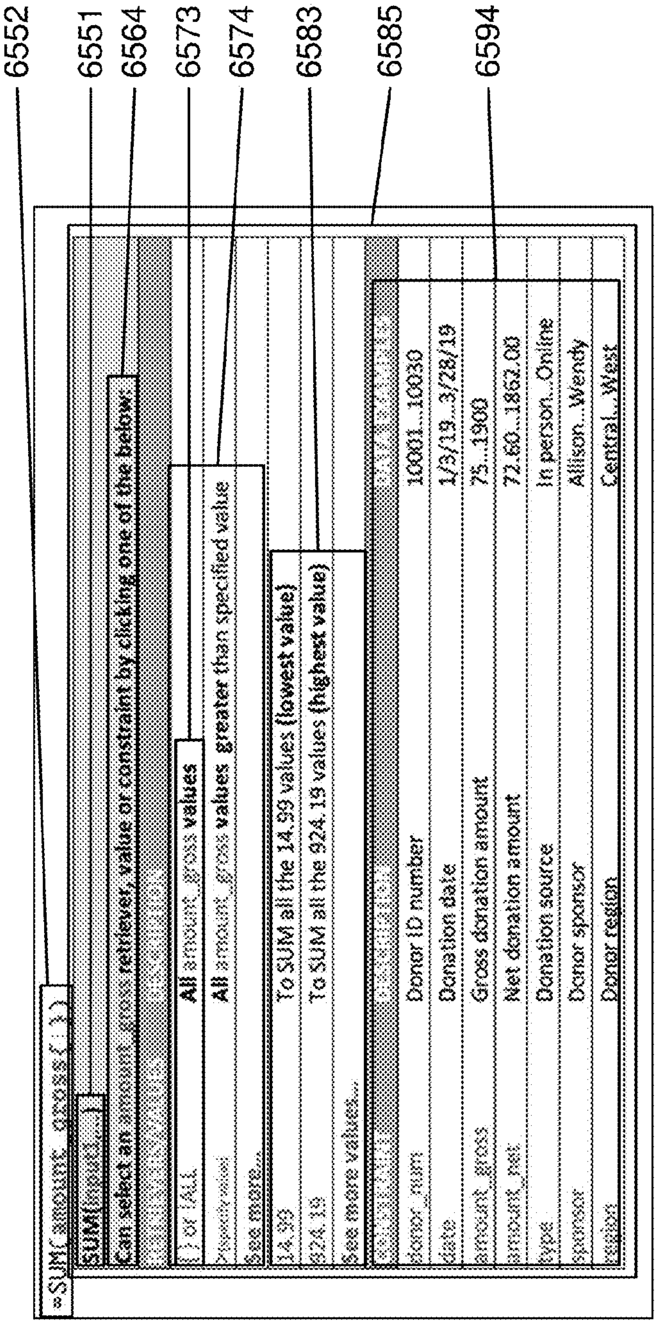

'=SUM(amount_gross{ })' in FIG. 65B

This leads to differences in the direct filters between the two situations. The single value direct filters must result in a single value and therefore have no multi-value retrievers (e.g., !ALL) and have only the single values 'RETRIEVERS' 6524. The range evaluation filters predominately display multi-value RETRIEVERS 6574, e.g., !ALL and the inequality retrievers>(specify value), with the rarely used single value retrievers shown in the 'See more . . . ' expanded list. In the single value hint list 6535 there are no VALUES because that is the equivalent of simply typing a number while in the SUM range evaluation hint 6585 there are VALUES 6583. That is because summing all the donations of $50 (for example) is a reasonable formula and therefore accommodated in the hint. Otherwise, the difference is the SUM hint 6585 includes the function syntax line 6564. Leaving the instruction lines (6514 and 6564) and the indirect filter 'CONSTRAINT' (6534 and 6594) unchanged between the two. Note, the abbreviated 'RETRIEVERS/VALUES' heading in hint 6585 was simply done to conserve space and easily could have been two separate headings.

Figure 66A:
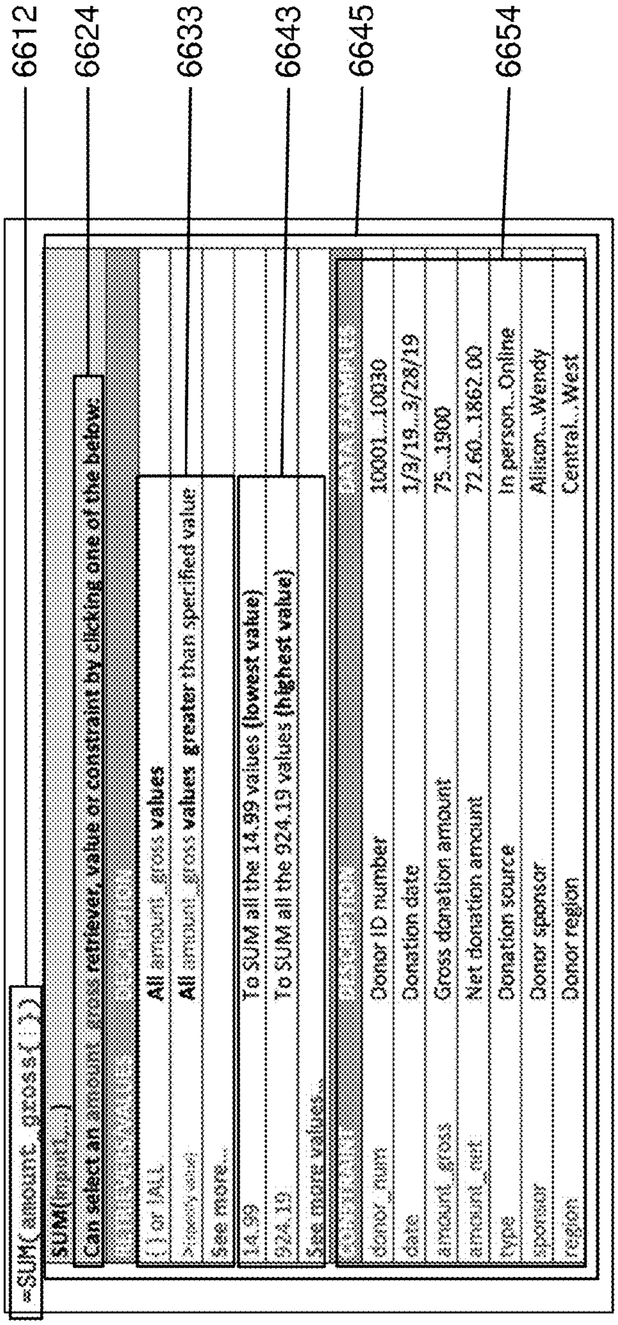
FIG. 66A and FIG. 66B examples hints for the same formulaic data field for two different range functions (SUM and MAX).
Figure 66B:
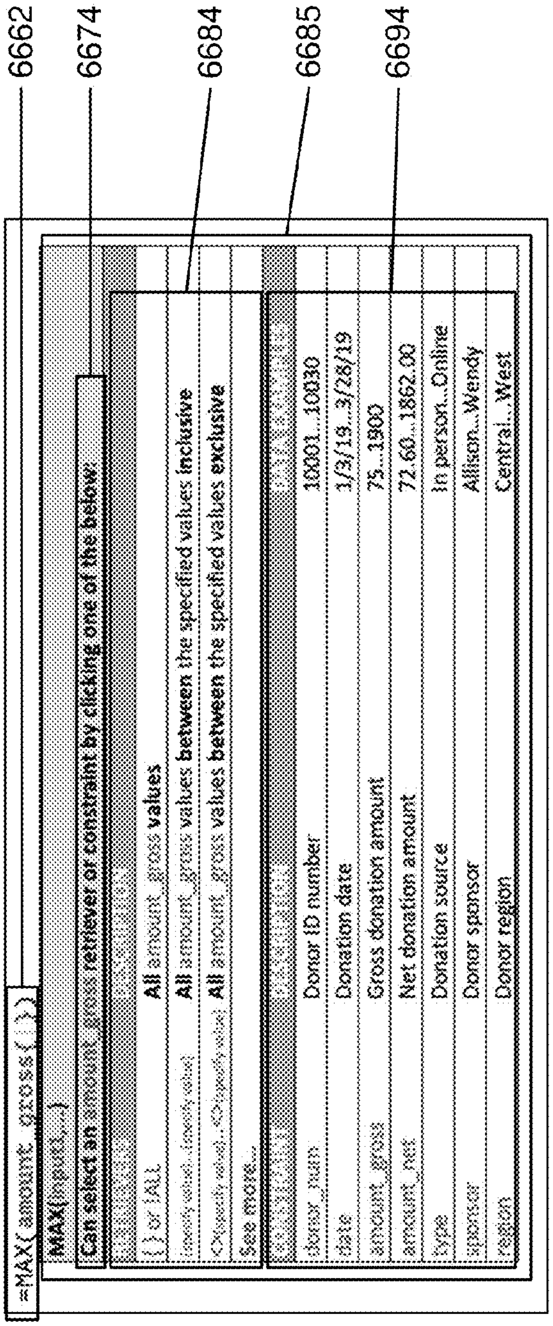

In an implementation of our technology those options can further differ between spreadsheet range functions because various direct filters make no sense or are inapplicable for some functions. FIG. 66A and FIG. 66B compares, for an embodiment of our technology, the hints (6645 and 6685) for evaluation of the same formulaic data field 'amount_gross{ }' in a SUM FUNCTION and in a MAX FUNCTION formula:

'=SUM(amount_gross{ })' 6612

'=MAX(amount_gross{ })' 6662

Like in the non-FUNCTION formula in FIG. 65A, displaying values makes no sense in the MAX function (e.g., MAX of a specific value is the value). While summing all the values with a particular value does make sense (e.g., SUM of all donations of $50) and therefore VALUE options 6643 are displayed for SUM but not MAX. Further the most typically used RETRIEVERS 6684 for MAX, differ from those of SUM 6633 and do not include the single value RETRIEVERS 6524 (in FIG. 65A). MAX and SUM example the types of differences that occur in other sets of functions. Our technology situationally selects and curates those different hints making it easier for users to select from a set of options that eliminates options that are not applicable and prioritizing the options used the most to the easier to see positions in the hints.

Formulaic Data Hints—Prior Arguments

Figures 67A, 67B, 67C:
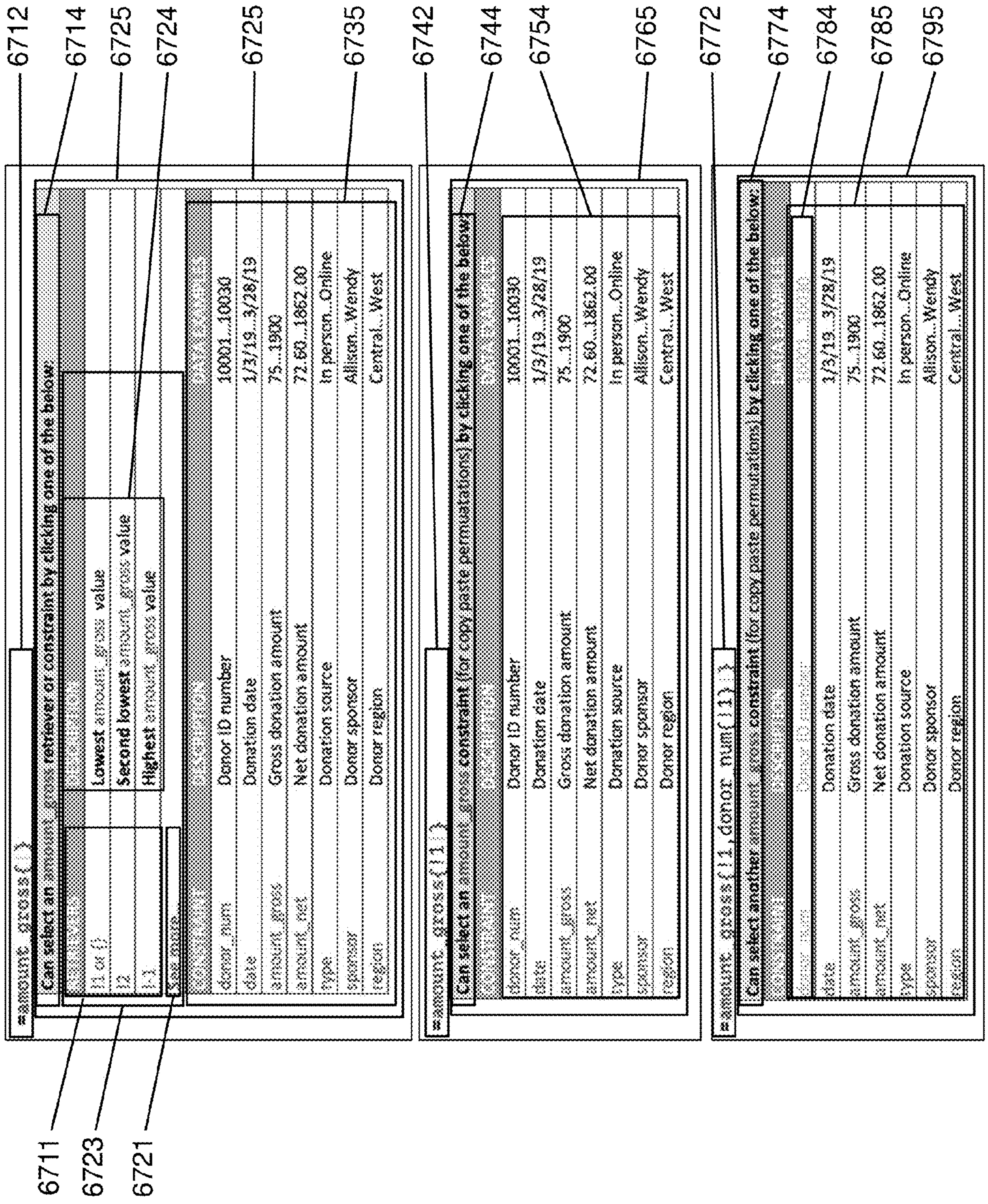
FIGS. 67A, 67B, 67C, 68A, 68B, 69A and 69B example hints for the evaluation of the same formulaic data field with different prior arguments.

FIG. 67A through FIG. 69B example our technology delivering different hints to the same formulaic data field being single value evaluated. The only difference is the number of filter arguments being evaluated, but our technology delivers a different tailored hint in each situation. FIG. 67A examples the formula '=amount_gross{|}' 6712 having no arguments prior to the cursor 'i'. Its hint 6725 has a 'RETRIEVERS' section 6723 which neither of the two following hints 6765 in FIG. 67B and 6795 in FIG. 67C has. Its instruction 6714 differs from the instructions 6744 in FIG. 67B and 6774 in FIG. 67C of the two following hints. Its 'CONSTRAINTS' section 6735 differs from the 'CONSTRAINTS' section 6785 in FIG. 67C because of the disabled 'donor_num' 6784 formulaic data field in FIG. 67C. There are much smaller changes between the hints in FIG. 67B and FIG. 67C with the only difference being the disabled 'donor_num' 6784 formulaic data field in FIG. 67C. In this situation rather than eliminate showing an erroneous option our technology opts to show the option disabled so the user can't make a mistake and understands that they have already used that option.

Figure 68A:
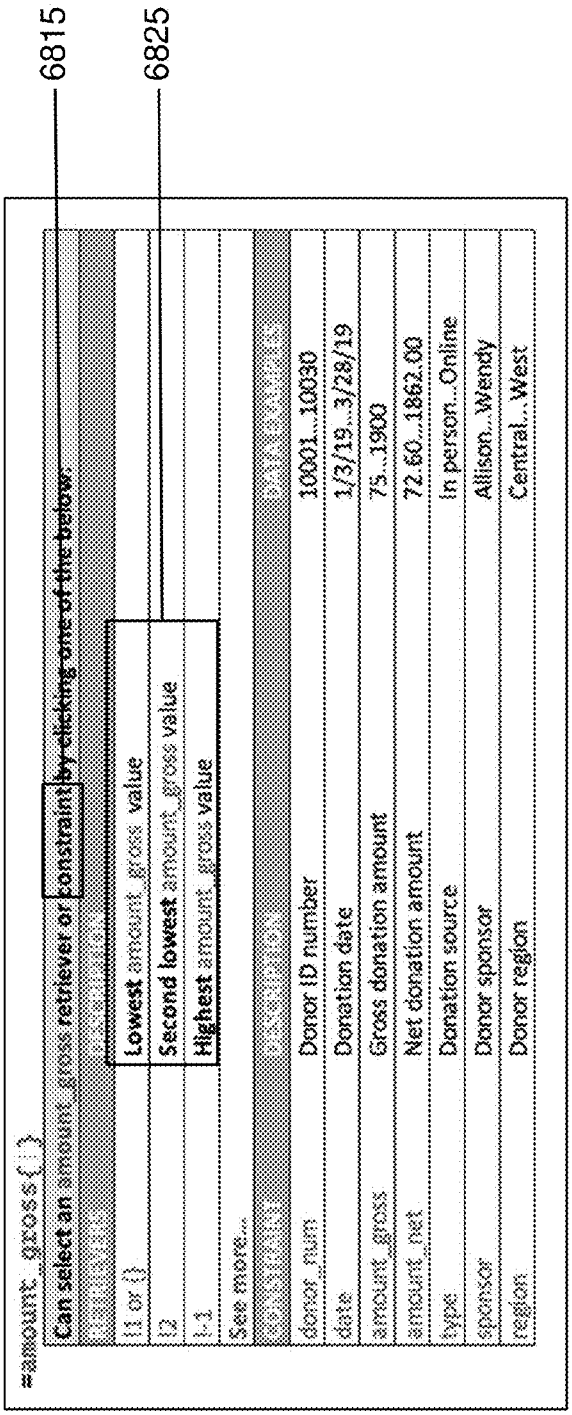
Figure 68B:
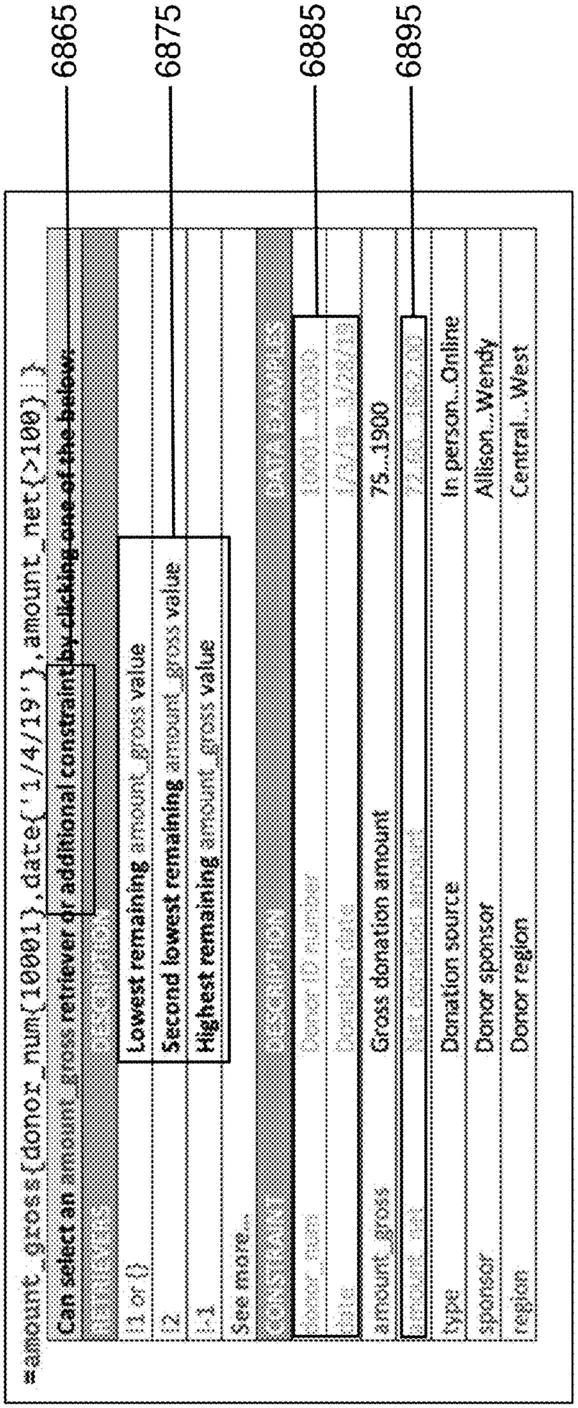

FIG. 68A and FIG. 68B example both option and wording differences, with the wording differences done by our technology to inform the user of how the formula works. The wording difference of the 'additional constraint' 6865 versus 'constraint 6815 in the instruction lines lets the user immediately that in know FIG. 68B indirect filters have already been applied, which is also visible in the disabled 'CONSTRAINTS' 6885 and 6895. The wording difference adding 'remaining' in the 'RETRIEVERS' 'DESCRIPTION' lines 6875 (versus the lack of 'remaining' in the description lines 6825) lets the user know that they may not get the lowest, second lowest or highest value of 'amount_gross' but will get those values remaining after the impacts of the prior filters. All of this serves to clearly communicate what the user will get from their selection.

Figure 69A:
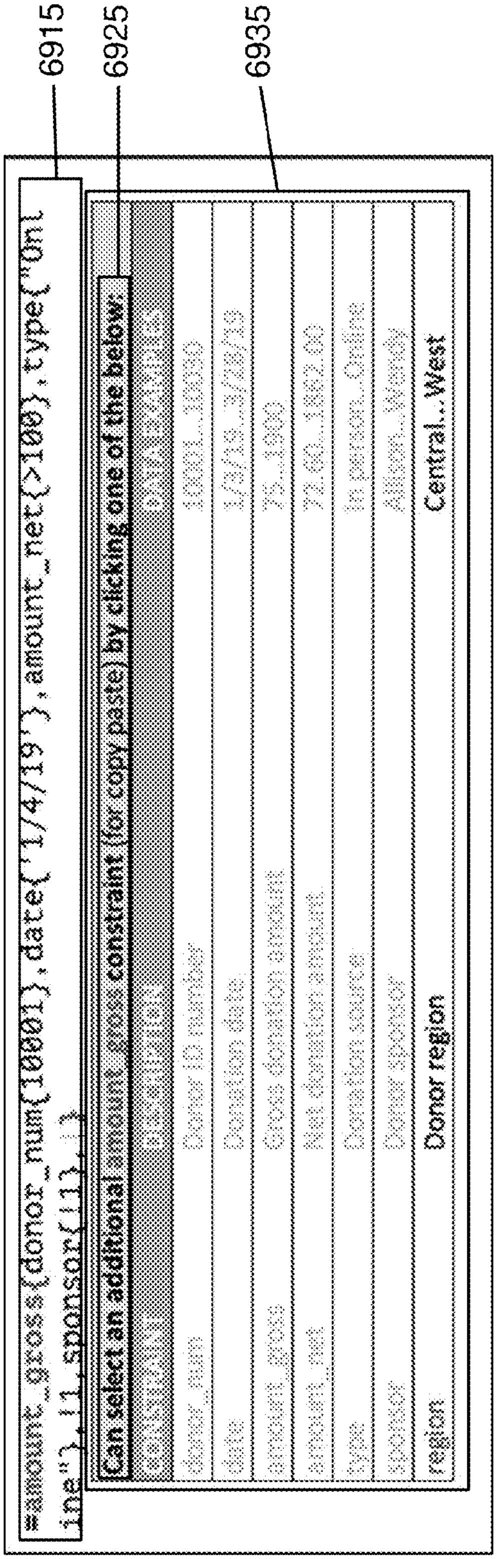
Figure 69B:
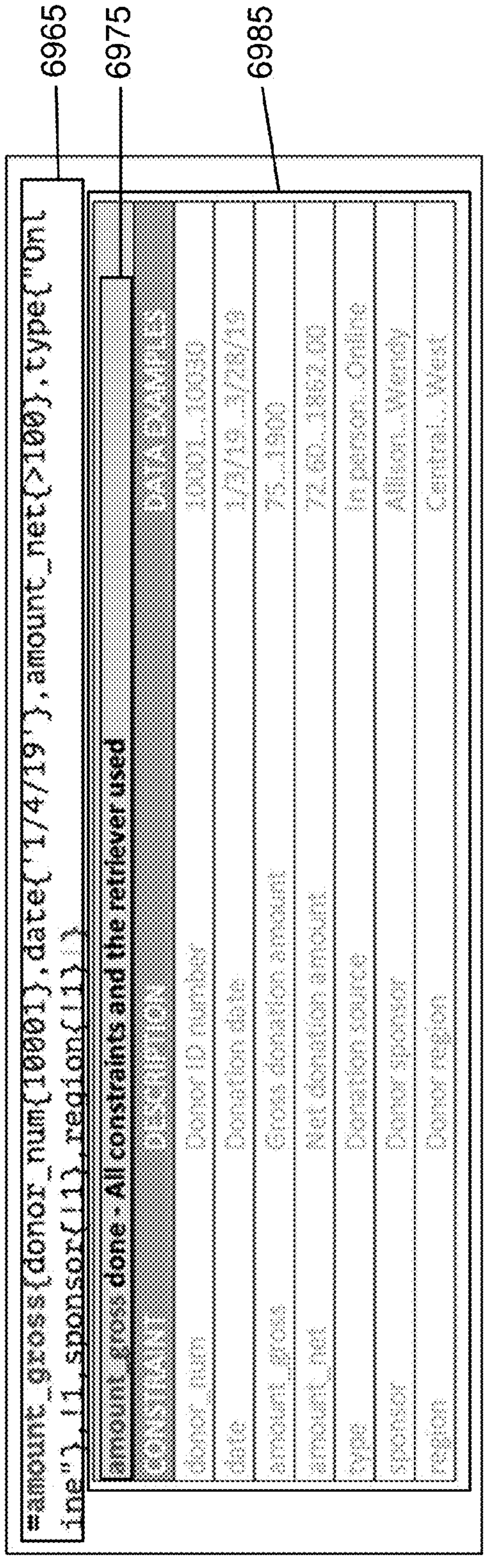

FIG. 69A and FIG. 69B further examples 'amount_gross' formulas (6915 and 6965) with more filters resulting in additional situational tailoring of the hints. There is a large change in the instruction lines (6925 and 6975) with the later telling the user 'amount_gross done—All constraints and the retriever used' clearly letting the user know that there is nothing left to do. This is reinforced by all the 'CONSTRAINT' options 6985 being disabled while in the hint 6935 in FIG. 69A one of the selections is selectable.

Figure 70A:
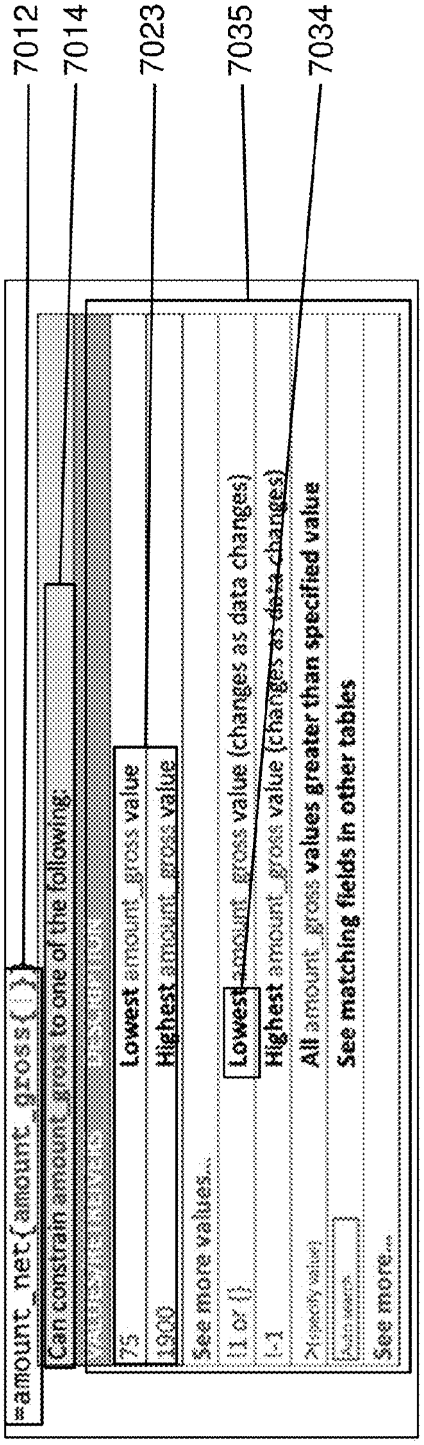
FIGS. 70A, 70B and 70C example hints for the filtering of the same formulaic data field with different prior arguments, FIG. 71A and FIG. 71B examples the impact of with and without a FUNCTION on the evaluation of the same formulaic data field with a filter prior to the cursor.
Figure 70B:
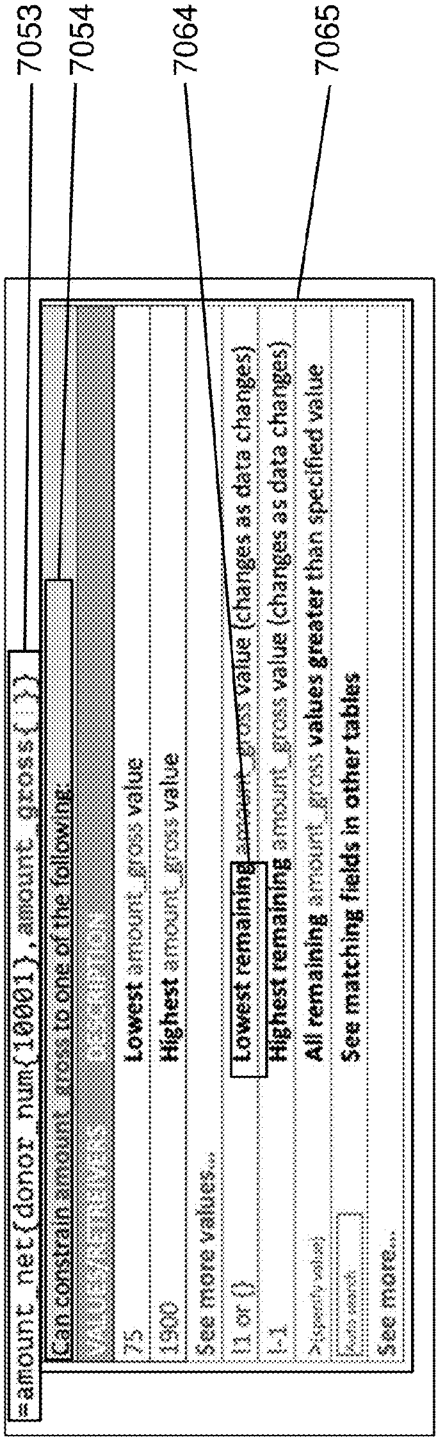
Figure 70C:
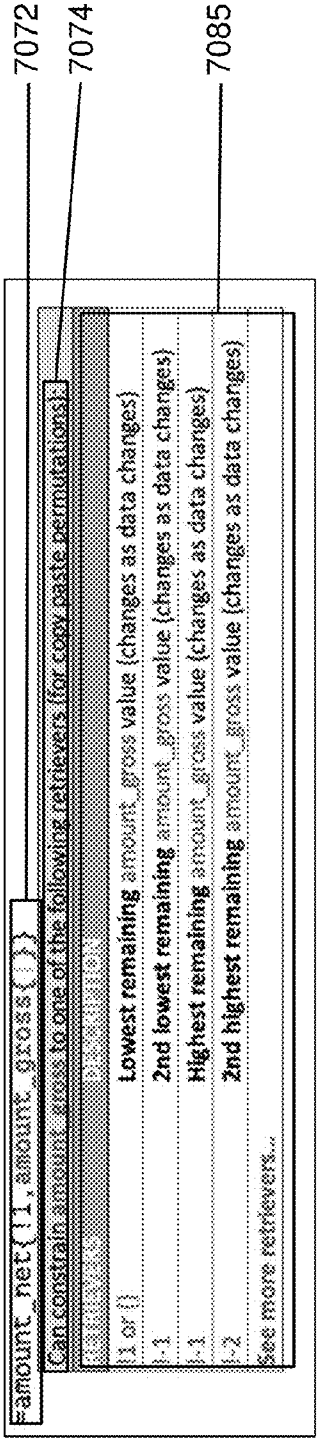

FIG. 70A through FIG. 70C example different evaluation argument situational impacts on the constraint/filter options and their curation. FIG. 70A versus FIG. 70B examples the impact of no prior evaluation constraint/filter argument versus one or more prior constraint/filter argument(s). The difference to the hints (7065 versus 7035) is the addition of remaining (e.g., 7064 versus 7034) to some of the descriptions, letting the user know that the previous constraints/filters will impact those values retrieved. FIG. 60C versus FIG. 60A or FIG. 60B examples the substantial impact if one of the previous arguments is the retriever, in this example the '!1' in the formula '=amount_net{! 1,amount_gross{|}}' 7072. This eliminates use of VALUES so that the hint only shows RETRIEVERS 7085 and changes the instruction to 'Can constrain amount_gross to one of the following retrievers (for copy paste permutations):' 7074 from "Can constrain amount_gross to one of the following:' 7014.

Figure 71A:
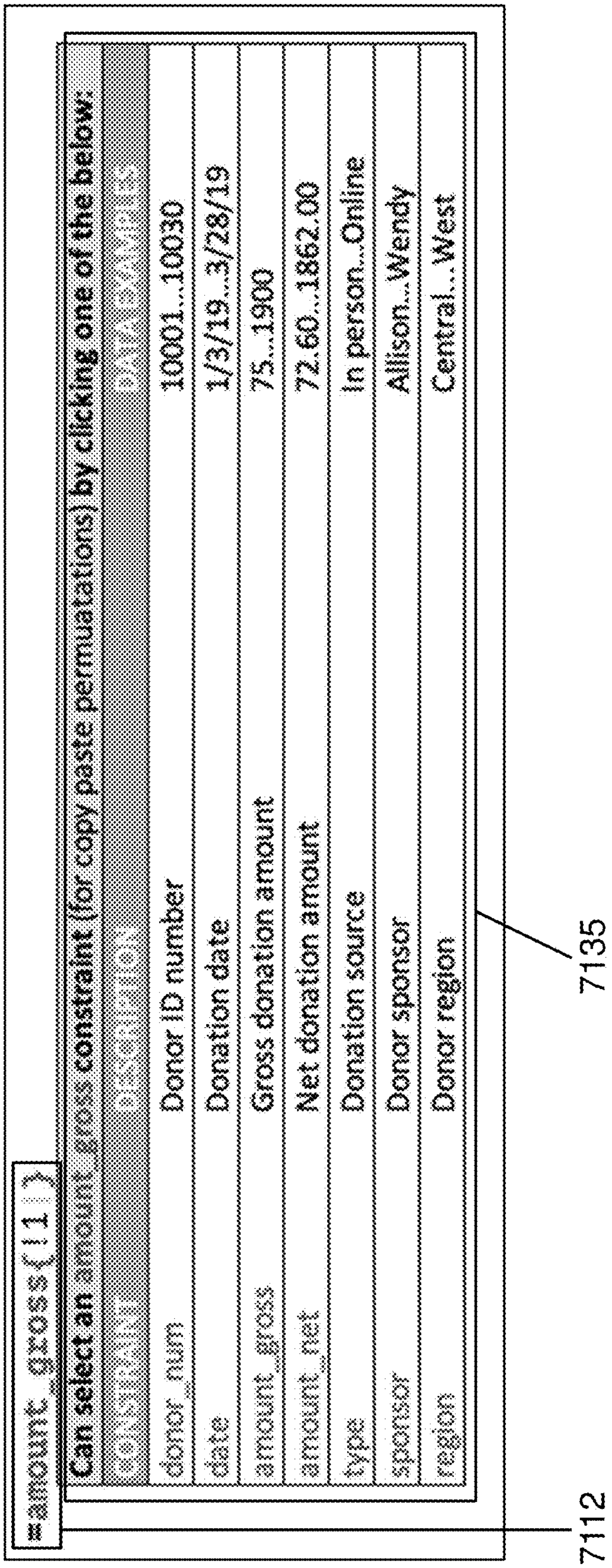
Figure 71B:
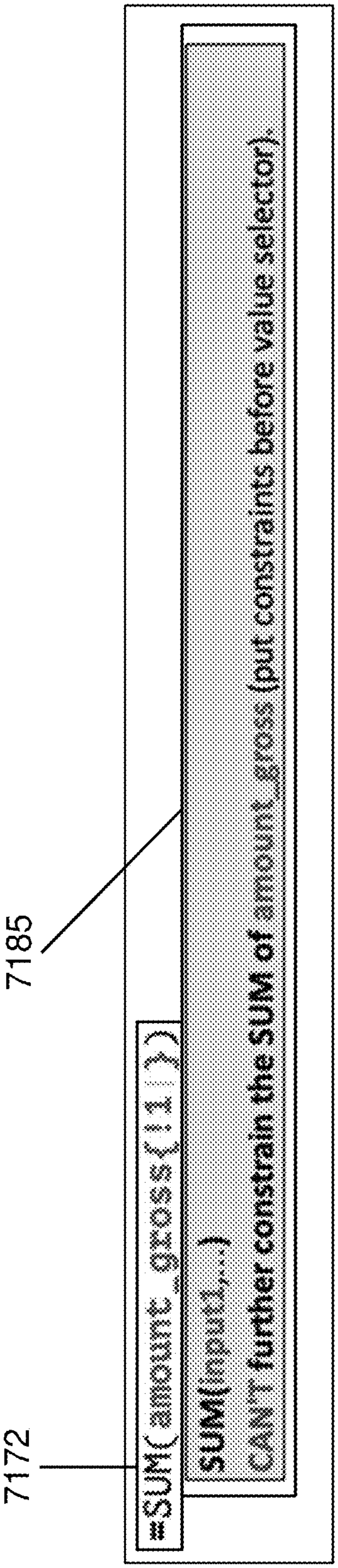

FIG. 71A and FIG. 71B example the differential impact of prior filters for the same formulaic data field evaluation with and without a function:

'=amount_gross{! 1|}' 7112 in FIG. 71A

'=SUM(amount_gross{! 1|})' 7172 in FIG. 71B

The combination of the function SUM results in a very different hint 7185 versus the hint 7135 without the function, despite having the exact same formulaic data field with the exact same prior filter and cursor in the same place.

Step Two Formulaic Data View Hints—Data Types and Content

Data types not only alter the options displayed and their additional information, but also impact the content populated into the formula. To simplify usage for users our technology populates data field values with any data type specific syntax required for the formula. In the exampled embodiments that is double quotes "" surrounding text values, single quotes ' ' surrounding date values and nothing surrounding numbers (real or integer) or Booleans.

Figures 72A, 72B, 72C:
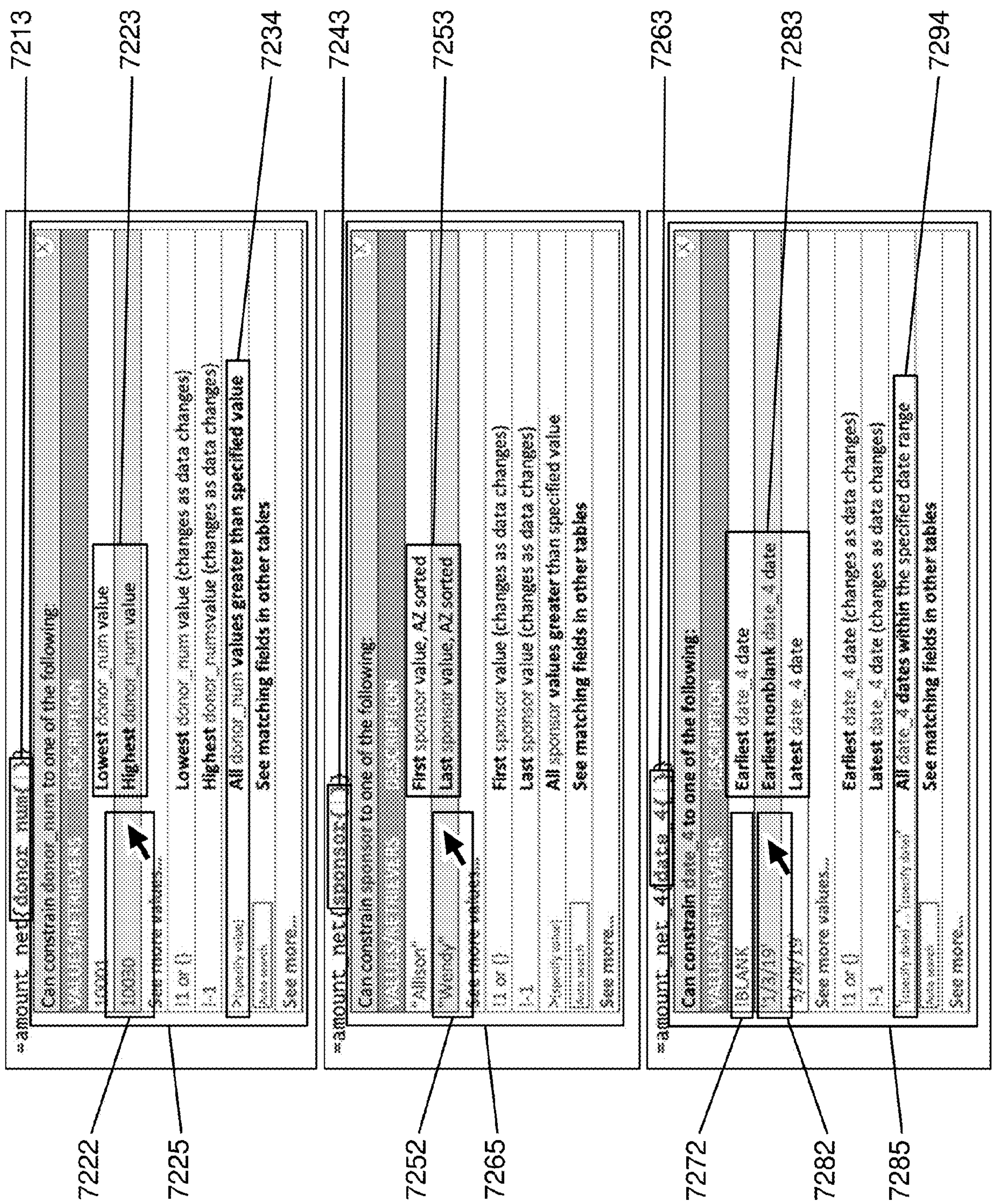
FIGS. 72A, 72B, 72C, 73A and 73B example differences in our hints driven by different data types and the content of the data.

FIG. 72A examples a numeric data field 'donor_num{|}' 7213 hint 7225 where the 'VALUES' 'DESCRIPTIONS' 7223 use a number data type specific 'Lowest' and 'Highest' differentiators. In FIG. 72B, the comparable text data type 'VALUES' 'DESCRIPTIONS' 7253 uses 'First' and 'Last' with an added 'AZ sorted' in the hint 7265 for the data field 'sponsor{|}' 7243. In FIG. 72C, the comparable date data type 'VALUES' 'DESCRIPTIONS' 7283 uses 'Earliest' and 'Latest' in the hint 7285 for the data field 'date_4{|}' 7263. For each data type the description has been tailored by our technology to make it very clear what defines the boundaries and order of the set of values. This embodiment of our technology also changes the options and the curation by data type showing the more frequently used '>(specify value)' and its 'All donor_num values greater than the specified value' 7234 DESCRIPTION for numbers and the more frequently "(specify date)' . . . (specify date)" and its 'All date_4 within the specified date range' 7294 DESCRIPTION for dates. As previously mentioned clicking '10030' 7222 populates 10030 into 'donor_num{|}' 7213 to give 'donor_num{10030}'. The '"Wendy"' 7252 shows the text value in the data automatically adding the double quotes "" required in the formula, the click then populates data value '"Wendy"' including the double quotes into the formula 'sponsor{|}' 7243 to give 'sponsor{"Wendy" }'. The '"1/3/19"' 7282 shows the date value in the data automatically adding the single quotes ' ' required in the formula, the click then populates data value "1/3/19" including the single quotes into the formula 'date_4{1}' 6263 to give 'date{'1/3/19'}. This not only automatically transforms any data type values into the syntax required by the formula but educates the user by visually showing the correctly formatted data so if a user decides to type a value they know what they need to type. Not shown is a Boolean example which has a simpler set of hint options because of its typically only having two values (TRUE and FALSE) or three if the field has blanks (nulls).

The content of the data also is used in our technology to determine the options displayed and their curation. An example of those differences is the data in FIG. 72C contains NULLs versus the data in FIG. 72A and FIG. 72B which don't. The 'VALUES' in FIG. 72C includes a row for '!BLANK' 7272 which in this embodiment is the token expression used for NULL values. The 'VALUES' 'DESCRIPTIONS' 7283 are also altered to reflect that in this embodiment the '!BLANK' 7272 date is the earliest date and the '1/3/19' 7282 date is the 'Earliest nonblank date_4 date' 7283. This curation further informs the user of the formulaic data rules/syntax for blanks/nulls without requiring them to remember them.

Figure 73A:
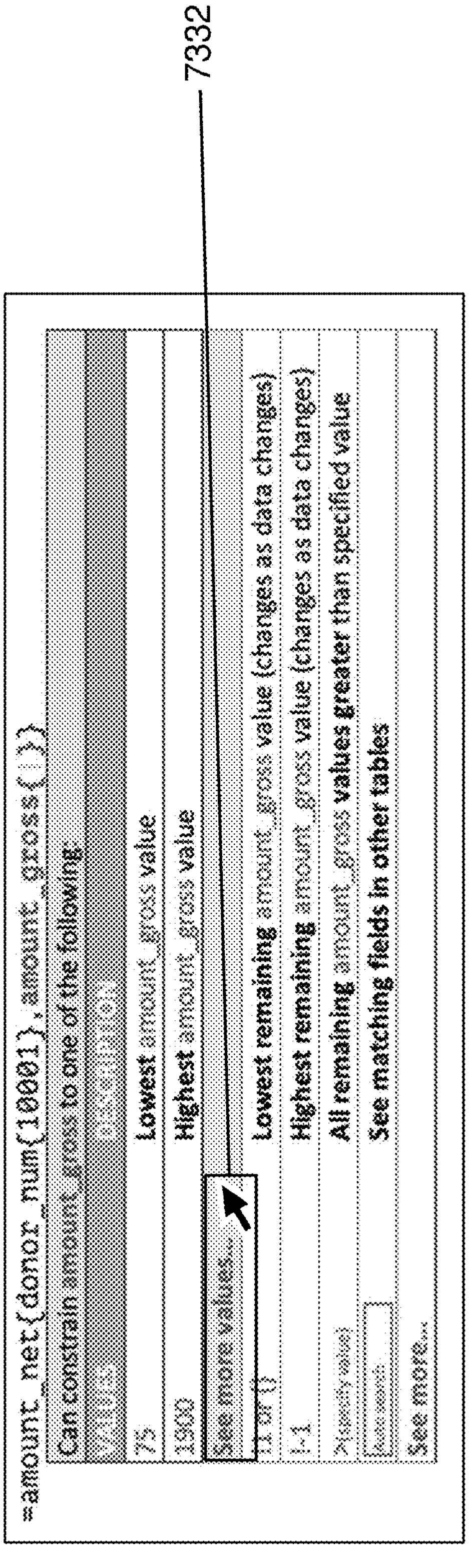
Figure 73B:
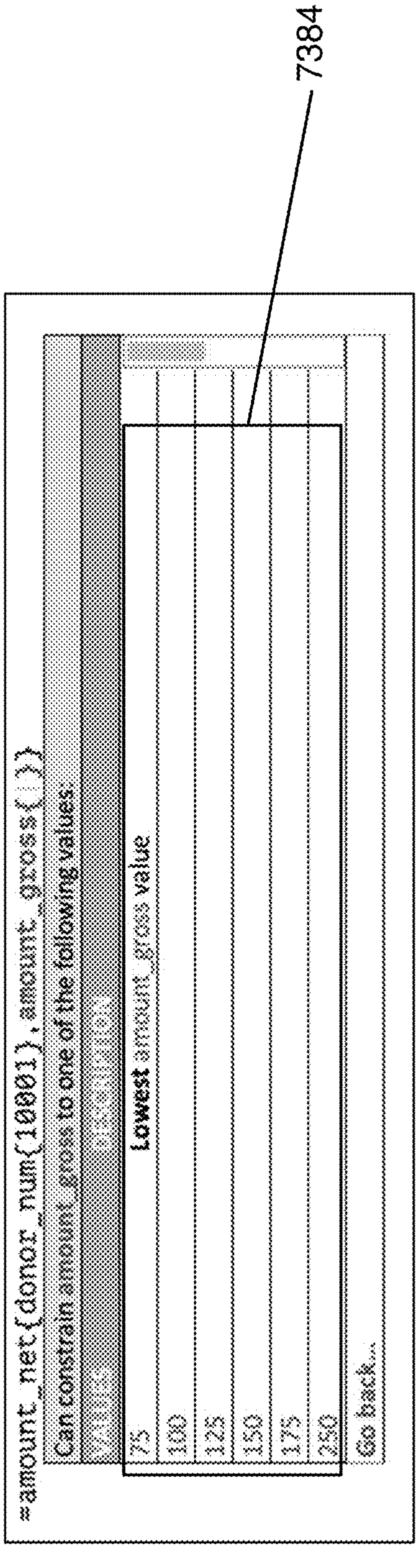

FIG. 73A and FIG. 73B example the 'See more values' expansion of the select options from our hints. To see the expanded list of values the user clicks on the 'See more values . . . ' 7332 to get a scrollable listing of the values 7384 from which the desired value can be selected. Our technology not only analyses the prior arguments and filters to determine the hint options, but as we will discuss next it analyses and adjusts for fields and filters post the cursor to tailor the hint.

Formulaic Data Hints—Editing

Figure 74A:
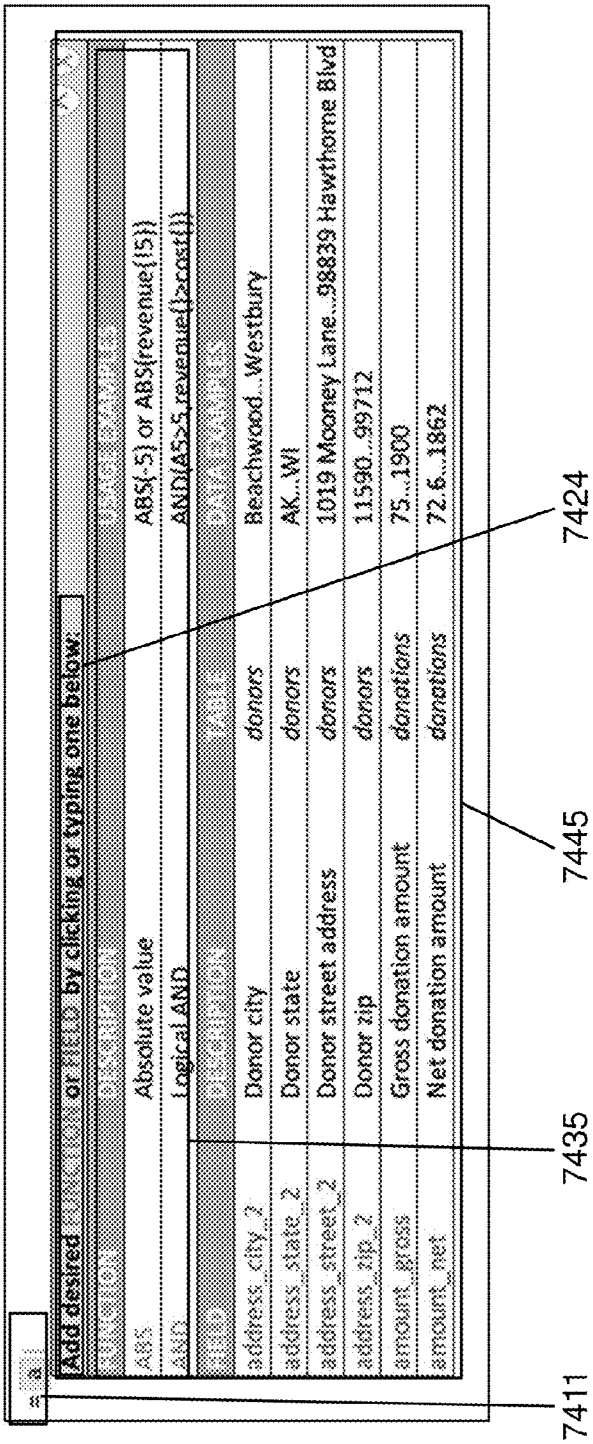
FIG. 74A and FIG. 74B examples the hint changes in editing (instead of creating) a formulaic data formula being evaluated.
Figure 74B:
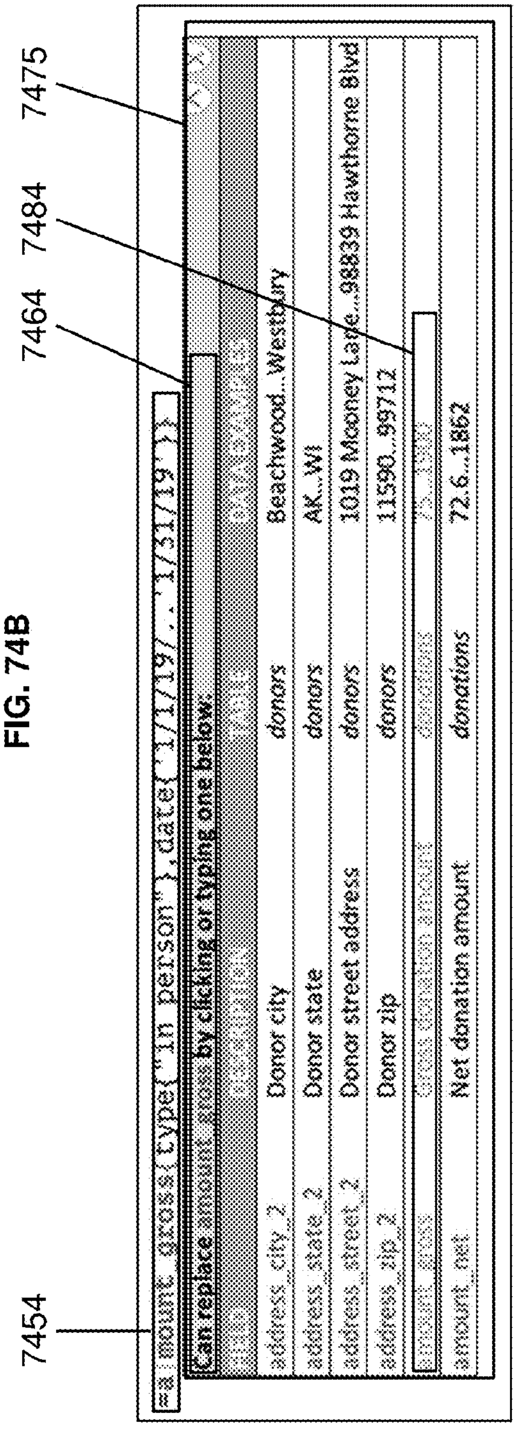

When editing formulas our technology alters the hints based on past filters and arguments. FIG. 74A and FIG. 74B examples the difference of having a cursor in the same place in a formula relative to prior filters or arguments but getting a different outcome based on past filters or arguments. FIG. 74A examples the hint for a formula '=a|' 7411 where the cursor as shown is after the 'a'. FIG. 74B examples the hint for a formula '=a|mount_gross{type{"In person" },date{'1/1/19' . . . '1/31/19'}}|' 7454 where the cursor as shown is also after the 'a'. However, the hints 7445 and 7475 are very different with very different instruction lines 7424 and 7464, hint 7445 displays a 'FUNCTION' section 7435 that hint 7475 does not have and has the 'amount_gross' CONSTRAINT 7484 disabled. These differences are because our technology factors in what is after the cursor and because the formula 7454 has curly brackets in this embodiment FUNCTION replacements should not be displayed. It also clearly communicates in the instruction 7464 that the activity being undertaken is a replacement.

Figure 75A:
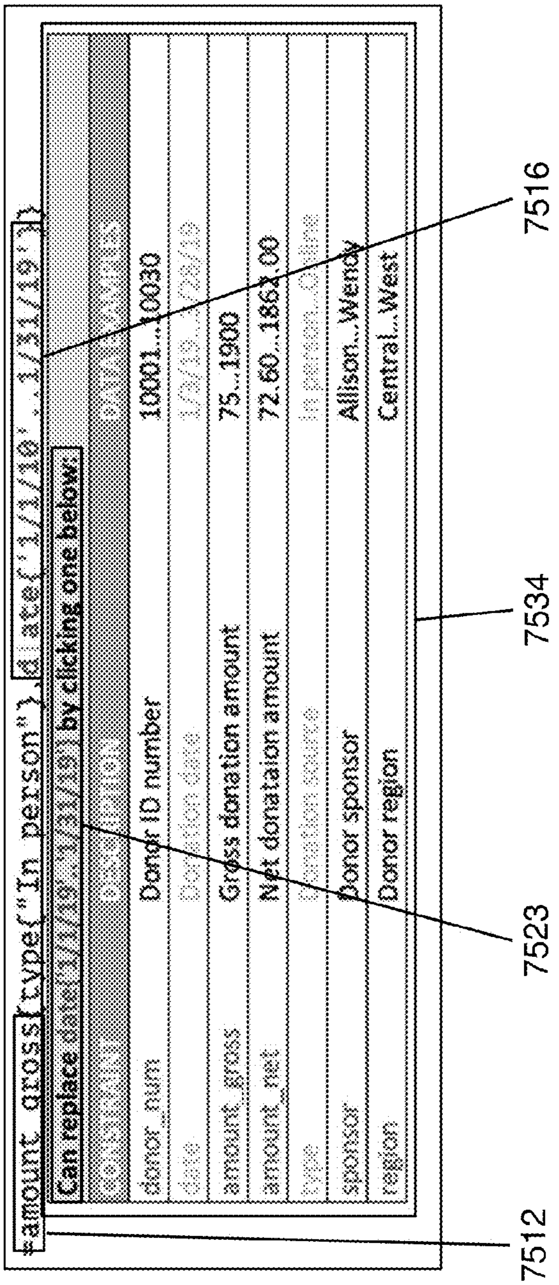
FIG. 75A and FIG. 75B examples the hint changes in editing (instead of creating) a formulaic data formula being used as an indirect filter.
Figure 75B:
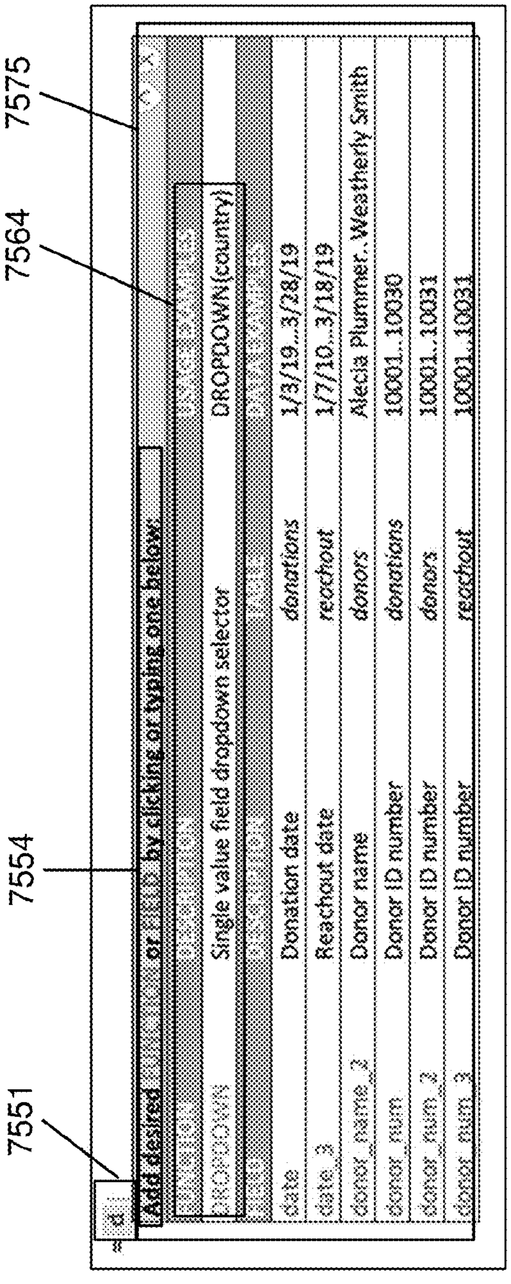

FIG. 75A and FIG. 75B examples the difference of having a cursor in the same place after a d in a filter and by itself. It too results in very different hints 7534 and 7575. The hint in FIG. 75A examples our technology using the information both prior and post the cursor, as only options shown are constraints for the evaluation field 'amount_gross' 7512 and the previously used constraints, 'type' and 'date' are shown disabled. The post cursor information is used as no error is shown because the current filters do correctly evaluate. Similar to the previous example the instruction lines 7523 and 7554 are very different and no 'FUNCTION' section 7564 is shown in FIG. 75A while functions are viable options in FIG. 75B.

Formulaic Data Hints—Other Formula Actions

Figure 76:
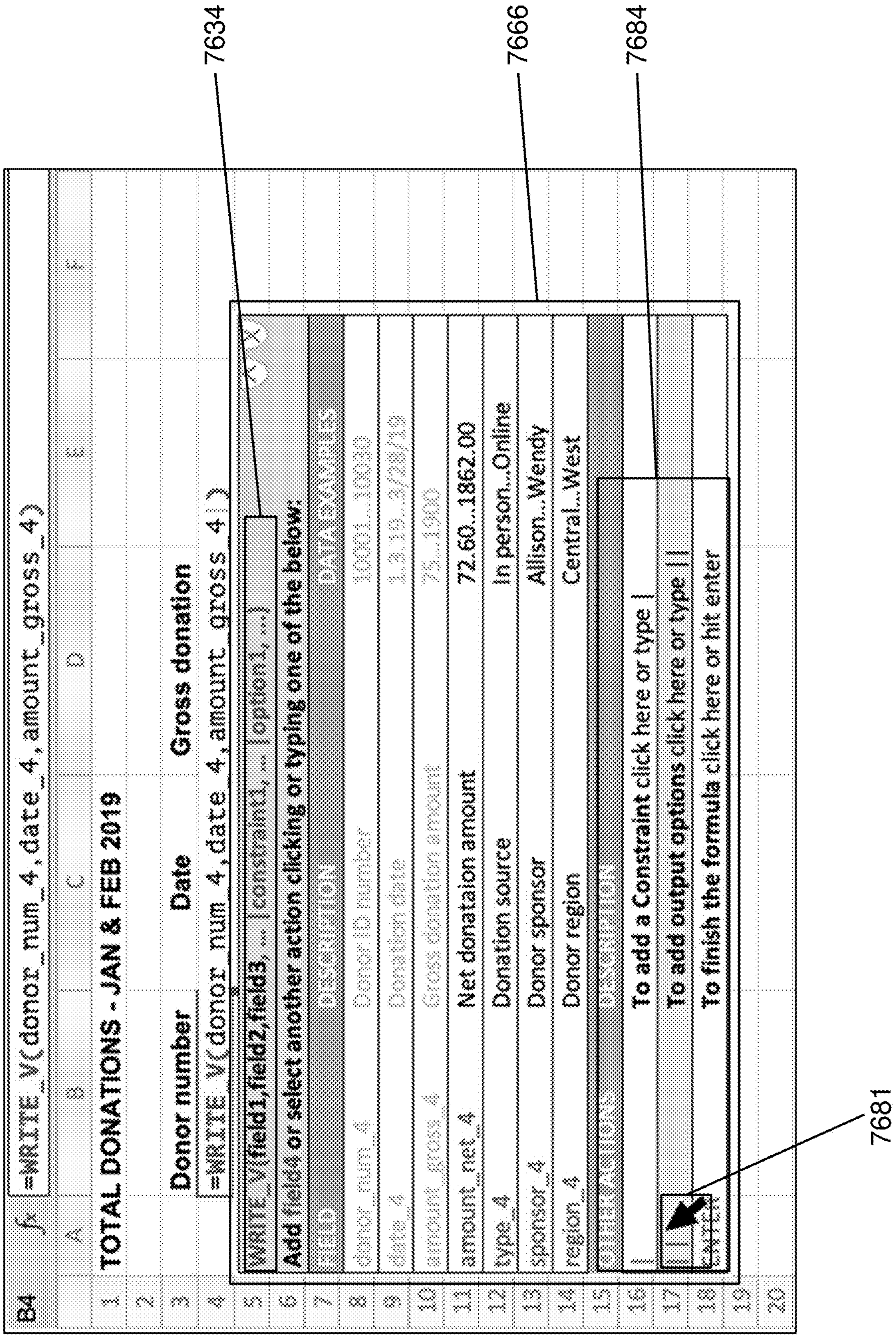
FIGS. 76, 77A and 77B examples OTHER ACTIONS, FUNCTION specific arguments, FUNCTION specific syntaxes and FUNCTION specific option differences automatically situationally tailored for in our hints.
Figure 77A:
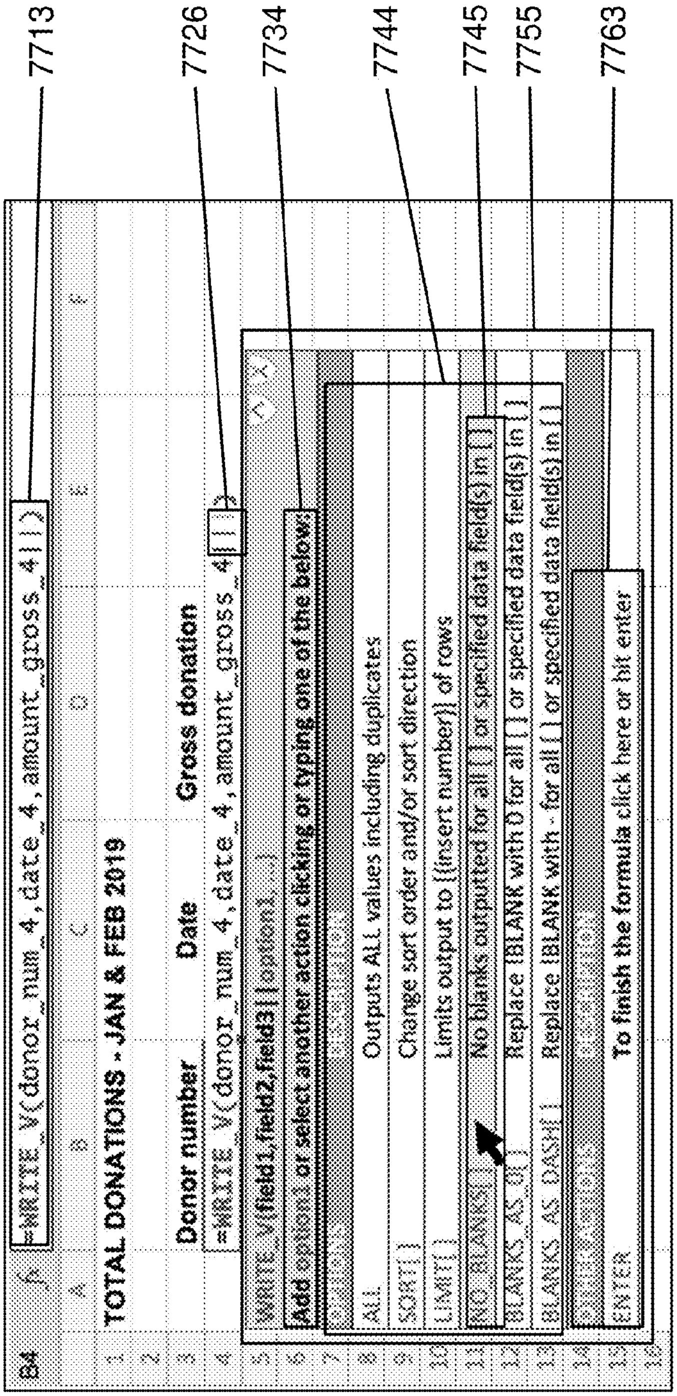
Figure 77B:
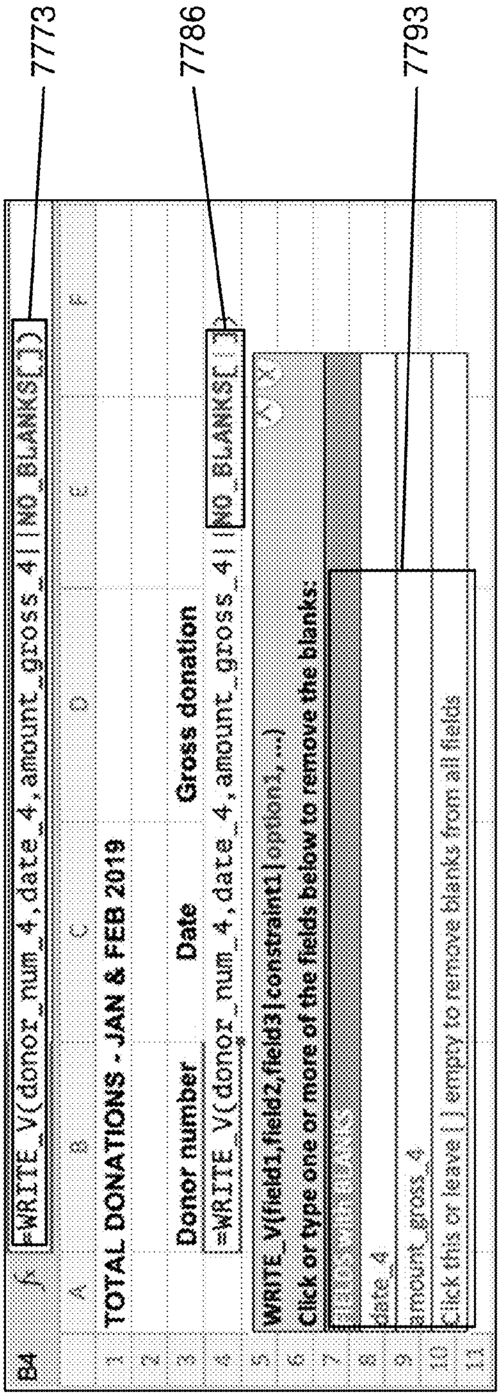
Figure 78A:
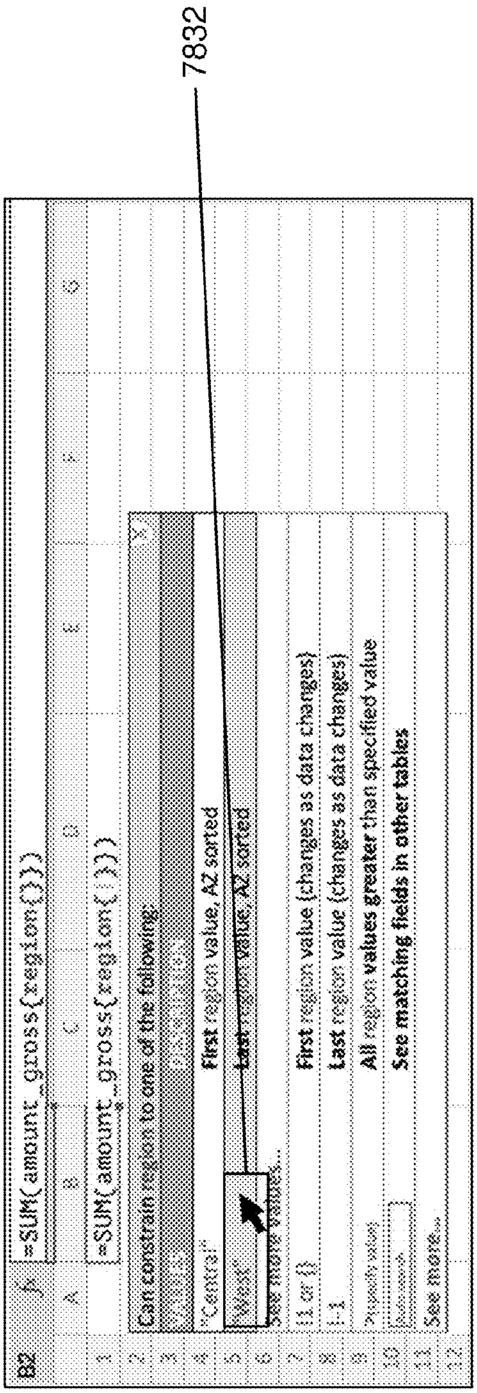
Figure 78B:
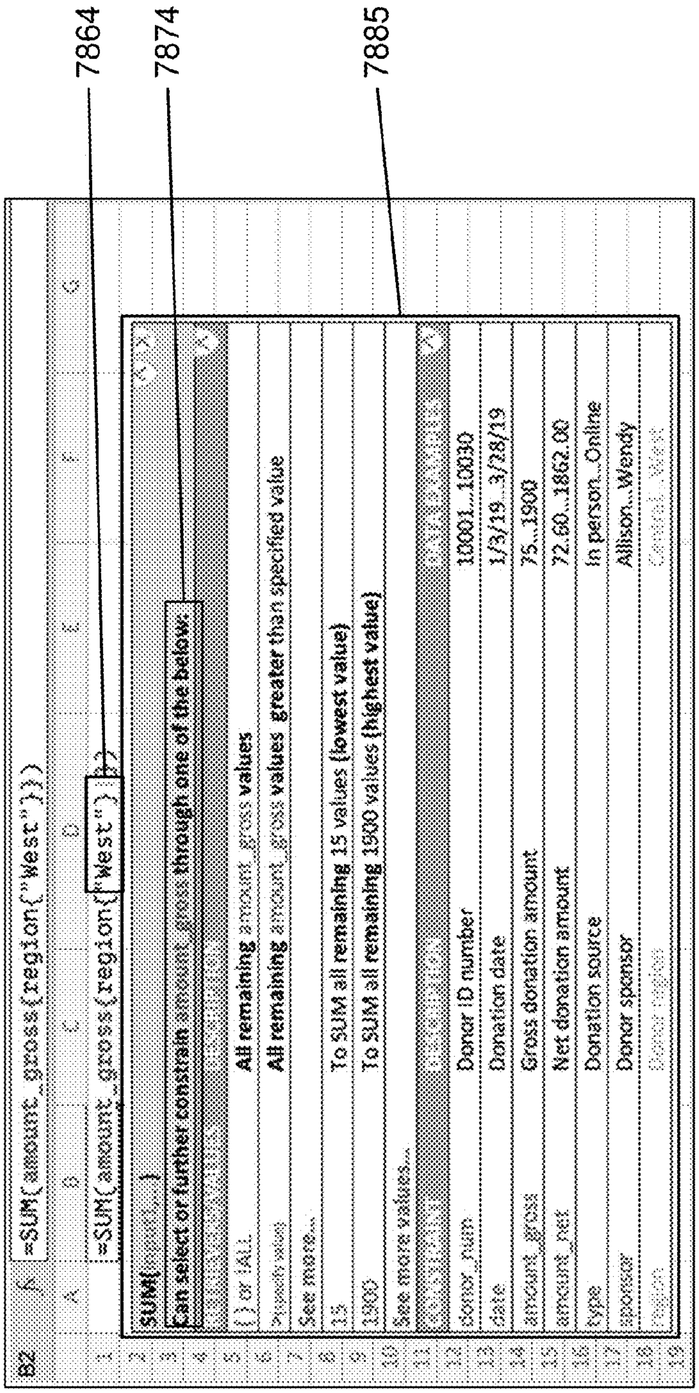

When functions come into play with formulaic data it adds additional situational dimensions to the hint option selection and curation. FIG. 76 through FIG. 77B examples OTHER ACTIONS, FUNCTION specific arguments, FUNCTION specific syntaxes and FUNCTION specific option differences automatically situationally tailored for in our hints.

The user clicking of the OTHER ACTION 7681 in FIG. 76 is from a very function specific argument structure. Our technology understands and displays the options giving the user a hint 7666 that means they do not have to remember the argument structure or figure it out from the function summary structure 7634 but instead get detailed step by step layouts of their options and instructions on what to do; thus, removing one of the large impediments to user trying unfamiliar functions. The click 7681 inserts the double bars '| |' 7726 into the formula 7713 exampled in FIG. 77A. The hint 7755 displays a set of WRITE OPTIONS 7744 that our technology has selected screening down to only correctly applicable options. For this function it involves analyzing the prior selected formulaic data fields and their use in the formula. An example would be the 'NO BLANKS' 7745 line the user is clicking on, is only there because one or more of the fields specified previously in the WRITE arguments contain blank values. Had none of them contained a blank (null) value then that option would not be shown. Additionally, the OTHER ACTIONS 7763 shows only the one action that is left—with our technology recognizing that showing the previously used options would be confusing and not helpful.

FIG. 77B examples the result of the user clicking the 'NO BLANKS' 7745 option which then automatically opens a new hint with an instruction and a listing of the 'FIELDS with BLANKS' 7093 options. These options are only showing the field2 (date_4) and field3 (amount_gross_4) in the formula '=WRITE_V(donor_num_4,date_4, amount_gross_4||NO_BLANKS[|])' 7773 and not showing 'donor_num_4' which has no blank values. This embodiment of our technology provides users with formulaic data situationally analyzed function input options, curation and inputs selections into the formula.

FIG. 78A through FIG. 79B example how our hint technology goes beyond tailoring the displaying of the selectable options to tailoring the selection actions to deliver the syntax needed and help the user avoid errors. An embodiment of our technology not only displays text data in the hint with the double quotes required for correct use in a formula, but automatically inserts those double quotes as shown by in FIG. 78A where when the user clicks '"West"' 7832 the formulaic data value is populated in the formula with the double quotes '"West"' 7864 (shown in FIG. 78B). Additionally, our technology knows that the direct filter is complete and so rather than placing the cursor after the closing double quote on '"West"' 7864 it places it beyond the curly bracket 7964 ready to populate an 'amount_gross' further constraint or retriever as described in the hint 7885 instruction line 7874. This is not only convenient for the user but also reduces the potential for user errors placing and erroneous filter value.

FIG. 79A and FIG. 79B examples how our technology further corrects potential errors while delivering the syntax required for formulas, functions and/or formulaic data. FIG. 79A examples where a user has been typing rather than hint clicking their formula and therefore have amassed three incomplete errors (shown in yellow in this embodiment) in their formula. At this point they are working on the filter for the formulaic data field 'date{' 7913 and they now decide to use the hint clicking '1/3/19' 7932 which then populates that value with single quotes into the formula. However, our technology also knows that completes the 'date' filter and therefore adds the closing curly bracket with the "1/3/19'} 7964 and places the cursor beyond the completed filter ready to add arguments to 'amount_gross' as shown in the hint 7985 in FIG. 79B. Thus, our technology fixed the unmatched curly bracket incomplete error created by the user typing the formula.

Figure 80:
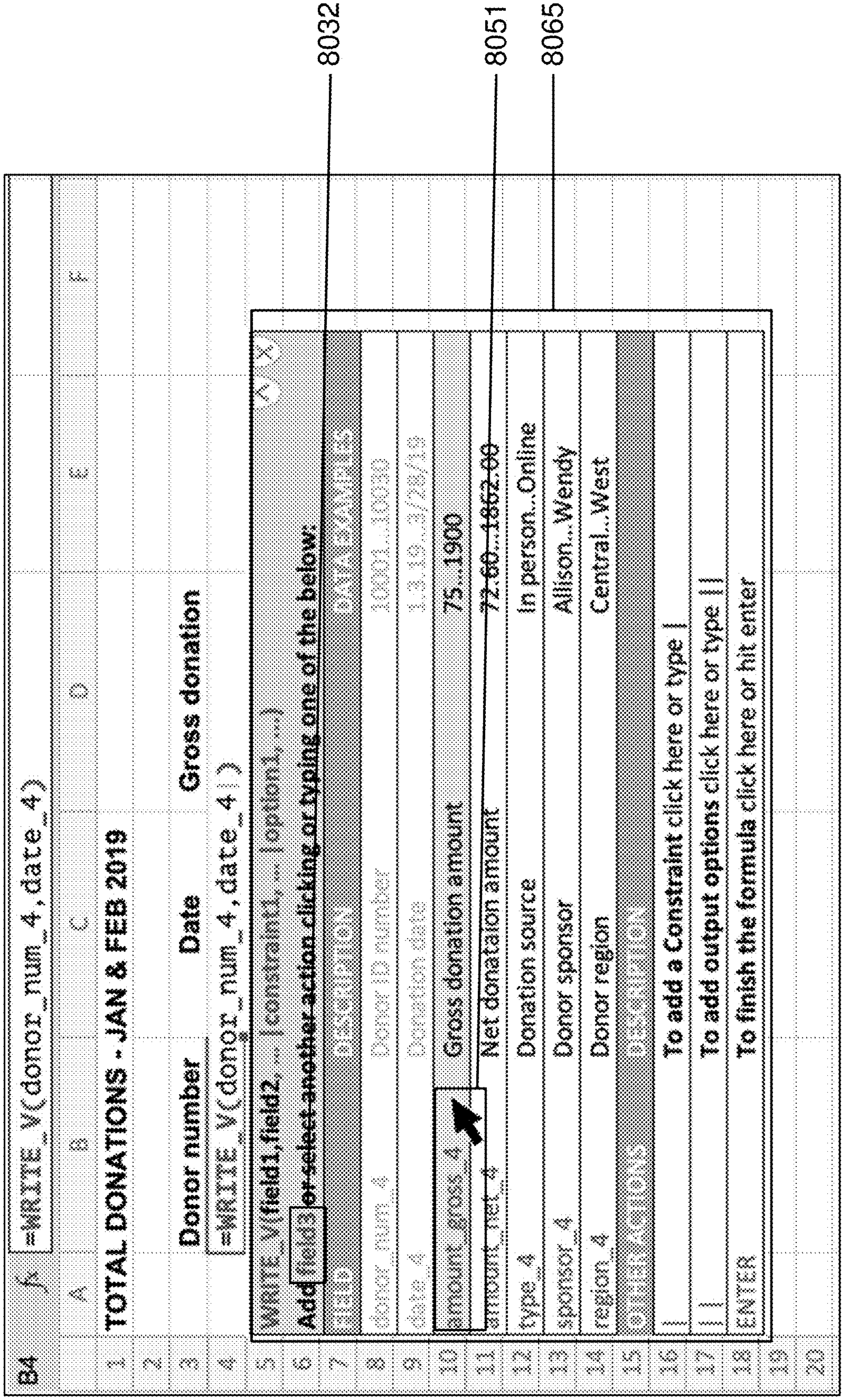
Figure 81:
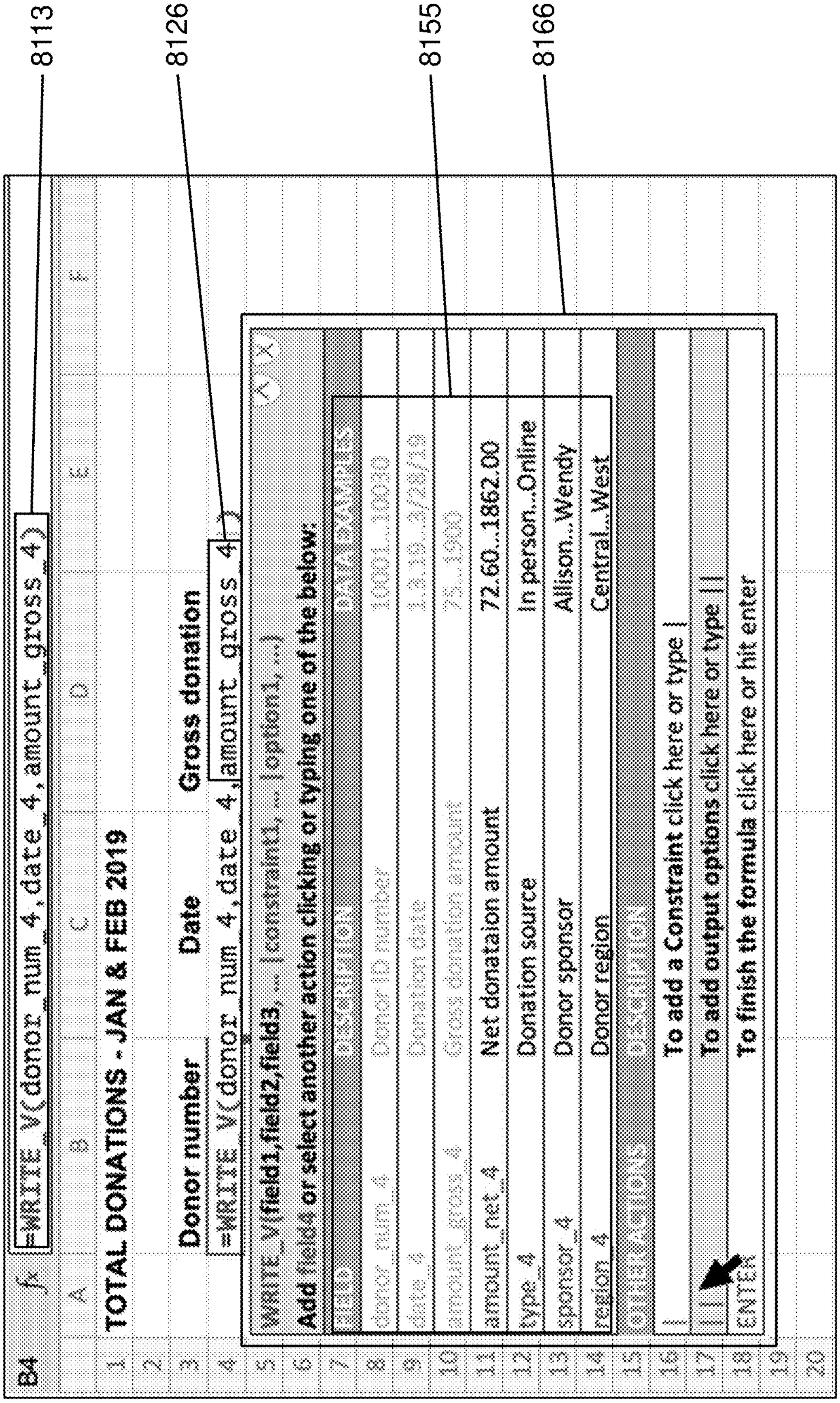

FIG. 80 and FIG. 81 example how formulaic data actions in functions are tailored to the syntax. In FIG. 80 clicking on 'amount_gross_4' 8051 in the hint 8051 to add a 'field3' 8032 populates 'amount_gross_4' 8126 with none of the normal curly brackets typically populated for formulaic data fields because the argument syntax for fields in a WRITE_V function is without the curly brackets.

Formulaic Data Hints—Situationally Tailored Edit Actions

Figure 82A:
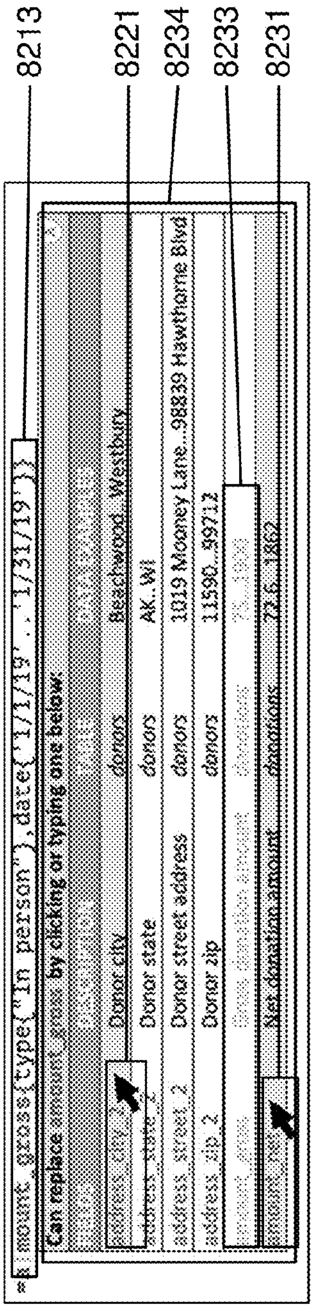
FIGS. 82A, 82B and 82C examples the difference actions taken by our hint technology when a user replaces an evaluated formulaic data field with one from the same table versus when the replacement is from a different table.
Figure 82B:
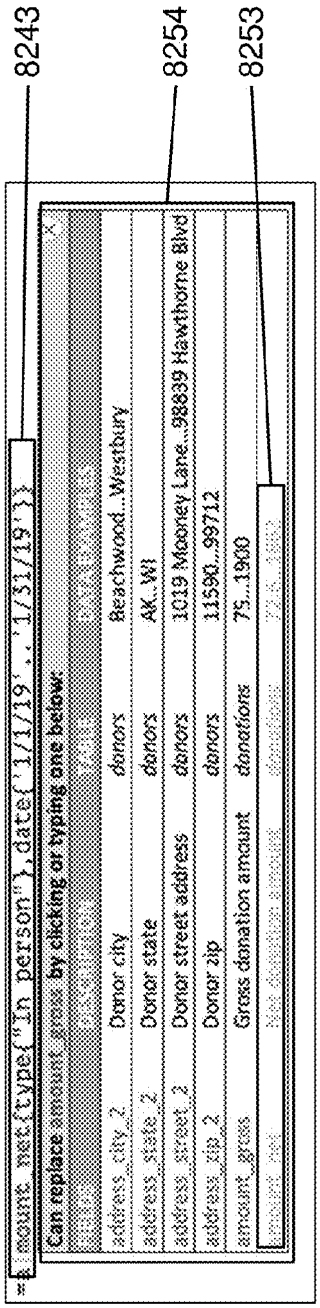
Figure 82C:
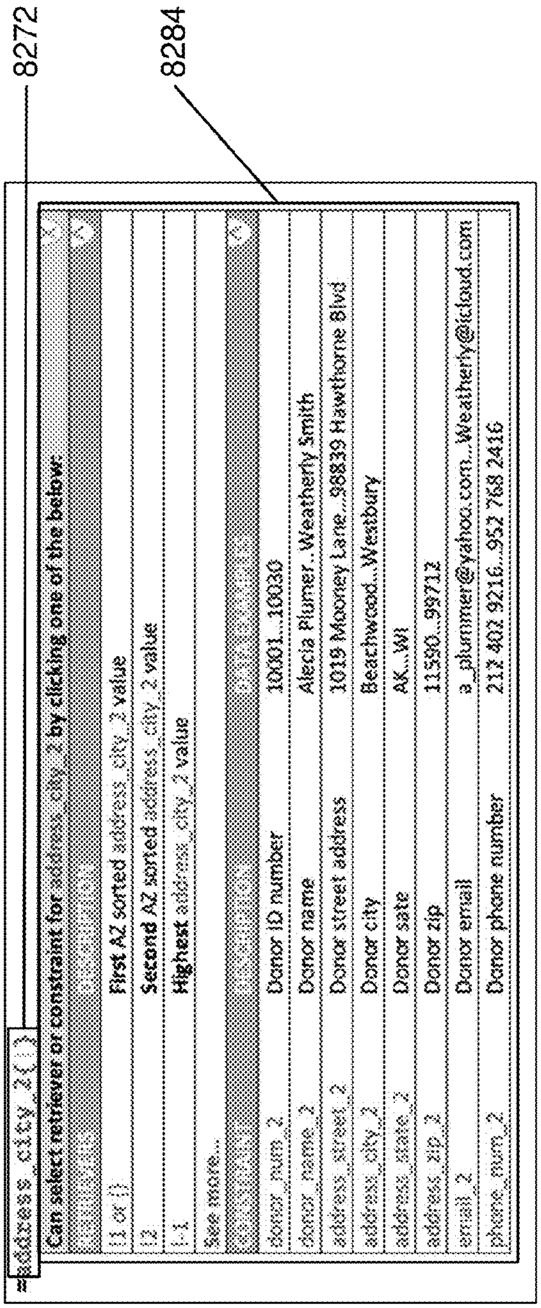

We previously exampled the difference in hints when editing a formula, however the editing differences in our technology impact the selection actions. FIG. 82A through FIG. 82C examples the different actions taken by our technology when a user replaces a formulaic data field with one from the same table versus when the replacement is from a different table. FIG. 82A examples an edit to the evaluation formulaic data field 'amount_gross' in the formula 'a|mount_gross{type{"In person},date{'1/1/19' . . . '1/21/19'}}' 8213 where the cursor is after the 'a' in 'amount_gross' and automatically gets a hint 8234 showing only the FIELDS alphabetically screened for what is before the cursor, in this example 'a'. In this situation our technology does not show the FUNCTION options because a function would not work for what follows 'amount_gross'. If the user clicks 'amount_net' 8231 then they get the replacement of 'amount_gross' with 'amount_net' as shown in the formula 'a|mount_net{type{"In person},date{'1/1/19' . . . '1/21/19'}}' 8243 FIG. 82B with the hint 8254. That hint then has the line for 'amount_net' grayed/disabled 8253 rather than 'amount_gross' grayed/disabled 8233 as it was previously before the change. Nothing otherwise was changed in the formula because the 'type{"In person" },date{' 1/1/19' . . . '1/31/19'}' would all be applicable to a replacement with a field from the same data table. However, if the user instead clicks 'address_city_2' 8221, which is not in the same data table as the 'amount_gross' formulaic data field it is replacing, then our technology delivers a very different outcome. That is because the 'type{"In person" },date{'1/1/19' . . . '1/31/19'}' in the formula 8213 would not be applicable to a field in a different table and therefore our technology removes them from the replacement 8272 and leaves the user with the cursor ready to input a retriever or constraint in 'address_city_2{|}' 8272. Our technology then displays the hint 8284 that supports those potential selections. Our technology intelligently differentiates the actions occurring from different formula editing selections and thereby eliminates work and potential mistakes for users.

Figure 83A:
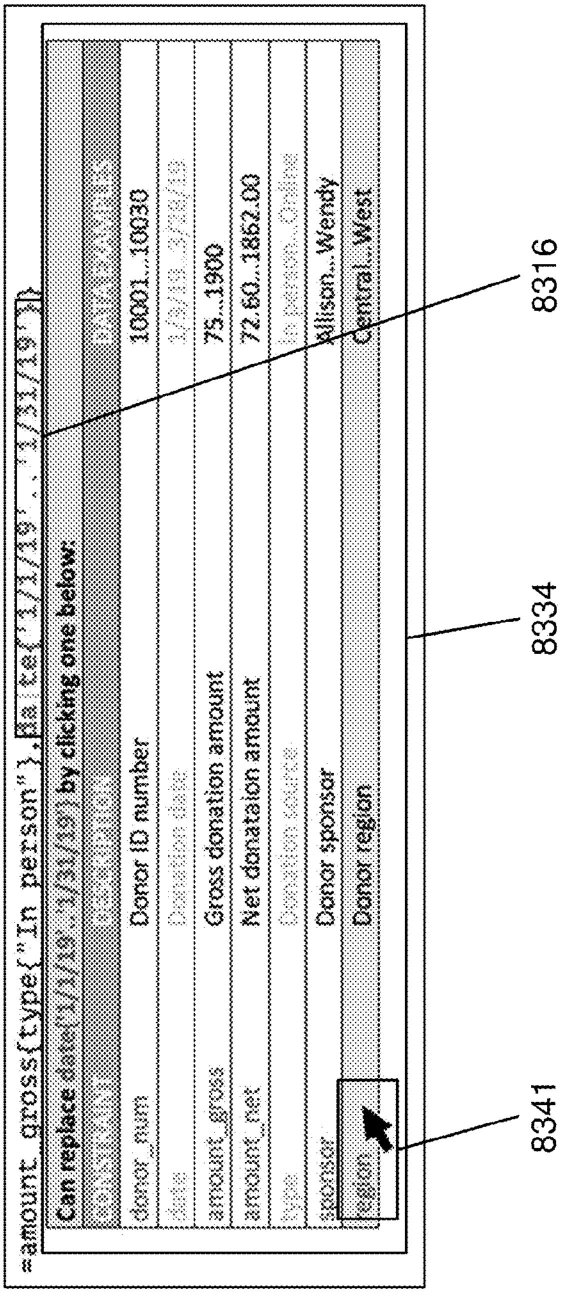
FIG. 83A and FIG. 83B examples the actions taken by our hint technology when a user replaces an indirect filter formulaic data field.
Figure 83B:
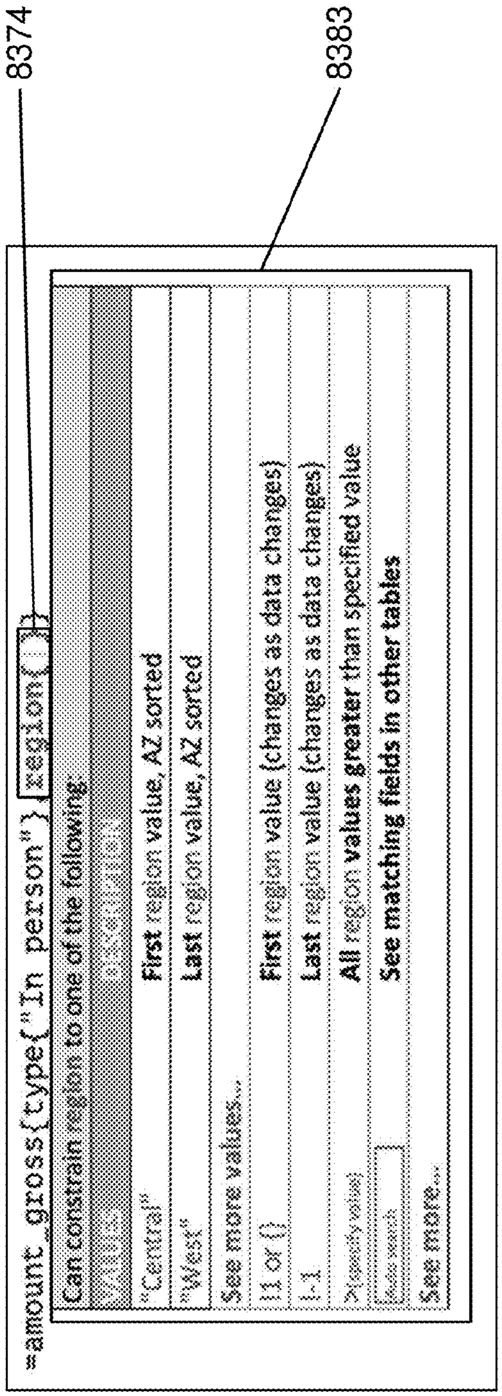

FIG. 83A and FIG. 83B examples the editing replacement of an indirect filter formulaic data field. FIG. 83A shows the user looking to edit the indirect filter formulaic data field 'date' however our technology highlights the field and its filter 'da|te{'1/1/'19' . . . 1/31/19'}' 8316 as they may change. Clicking 'region' 8341 results in the total replacement of 'da|te{'1/1/'19' . . . 1/31/19'}' 8316 with 'region{|}' 8374 (in FIG. 83B). The filter value "1/1/'19' . . . 1/31/19" was eliminated because the date values would not work in a text field 'region' and the cursor is in a different position ready for the user to select a filter from the new hint 8383. Again, saving the user work making corrections and eliminating the possibility of errors from not replacing the old filter.

Figure 84A:
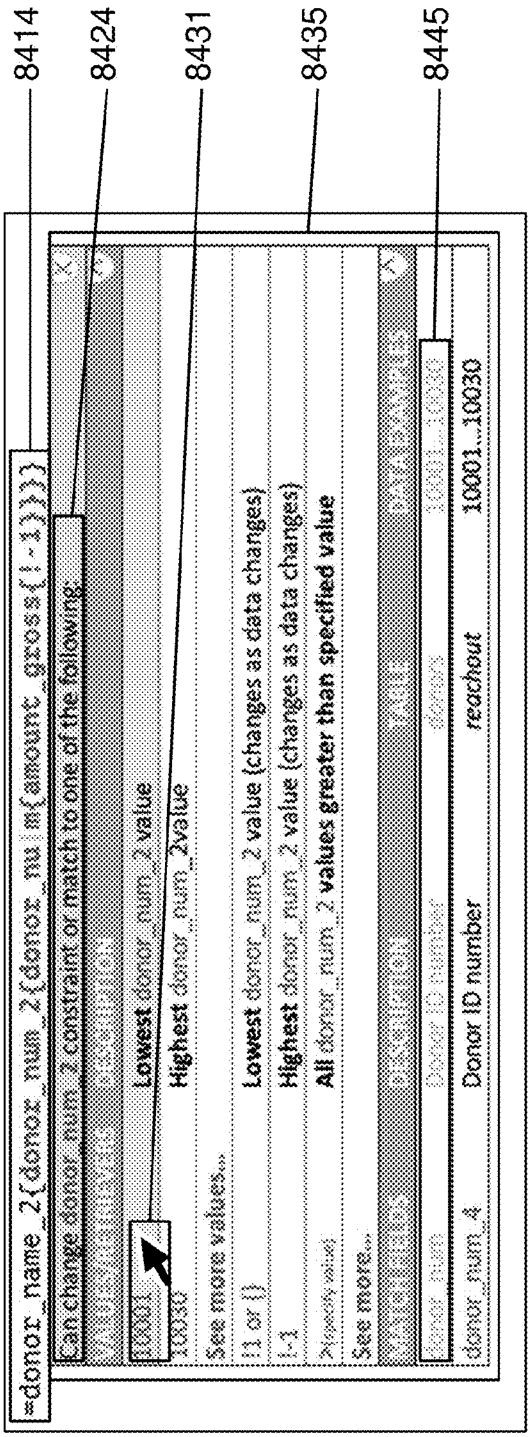
FIG. 84A and FIG. 84B examples the actions taken by our hint technology when a user replaces an indirect filter MATCH formulaic data field.
Figure 84B:
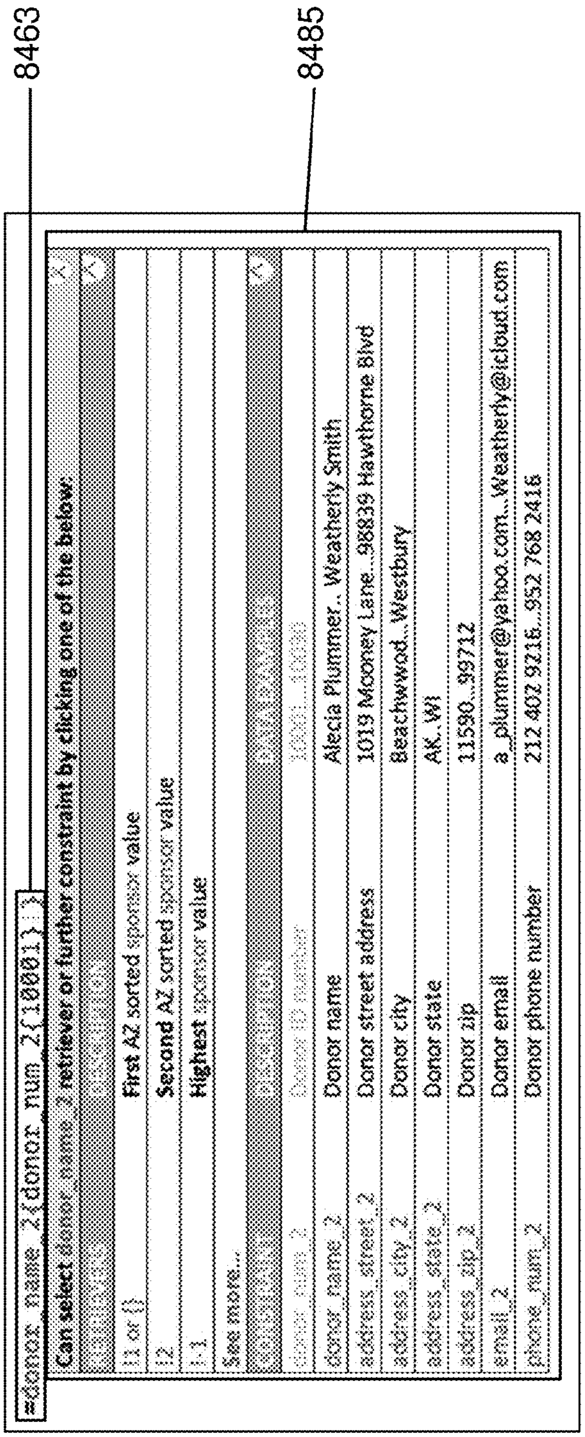

FIG. 84A and FIG. 84B examples the editing replacement of an indirect filter MATCH formulaic data field. Our technology recognizes that the editing of a MATCH FIELD indirect filter is more than just editing a field. Therefore, when the user puts the cursor in 'donor_num' in the formula 8414:

'=donor_name_2{donor_num_2{donor_nu|m{amount_gross{!-1}}}}

Our technology highlights then entire term 'donor_num_2{donor_nu|m{amount_gross{!-1}}}' because it knows that the change could involve all of it. It also displays the hint 8435 for changing the 'donor_num_2' filter as told in the instruction 8424. Because the user is not really changing the field 'donor_num' but replacing it with another filter for 'donor_num_2'. When the user does exactly that by clicking on '10001' 8431 the result is not to simply replace 'donor_num' with '10001'. Instead, the '10001' 8431 replaces the entire term 'donor_num_2{donor_nu|m{amount_gross{!-1}}}' as shown in the formula 8463 in FIG. 84B. Our technology has gone well beyond a simple replacement of 'donor_num' to intelligently replace its entire term. It has also then move the cursor to the place ready for a next action and shows the hint 8485 ready to support selections of the next correct actions. Our technology again eliminates potential errors through automated intelligent edits.

Formulaic Data Hints—User Simplicity Alterations

Figure 85:
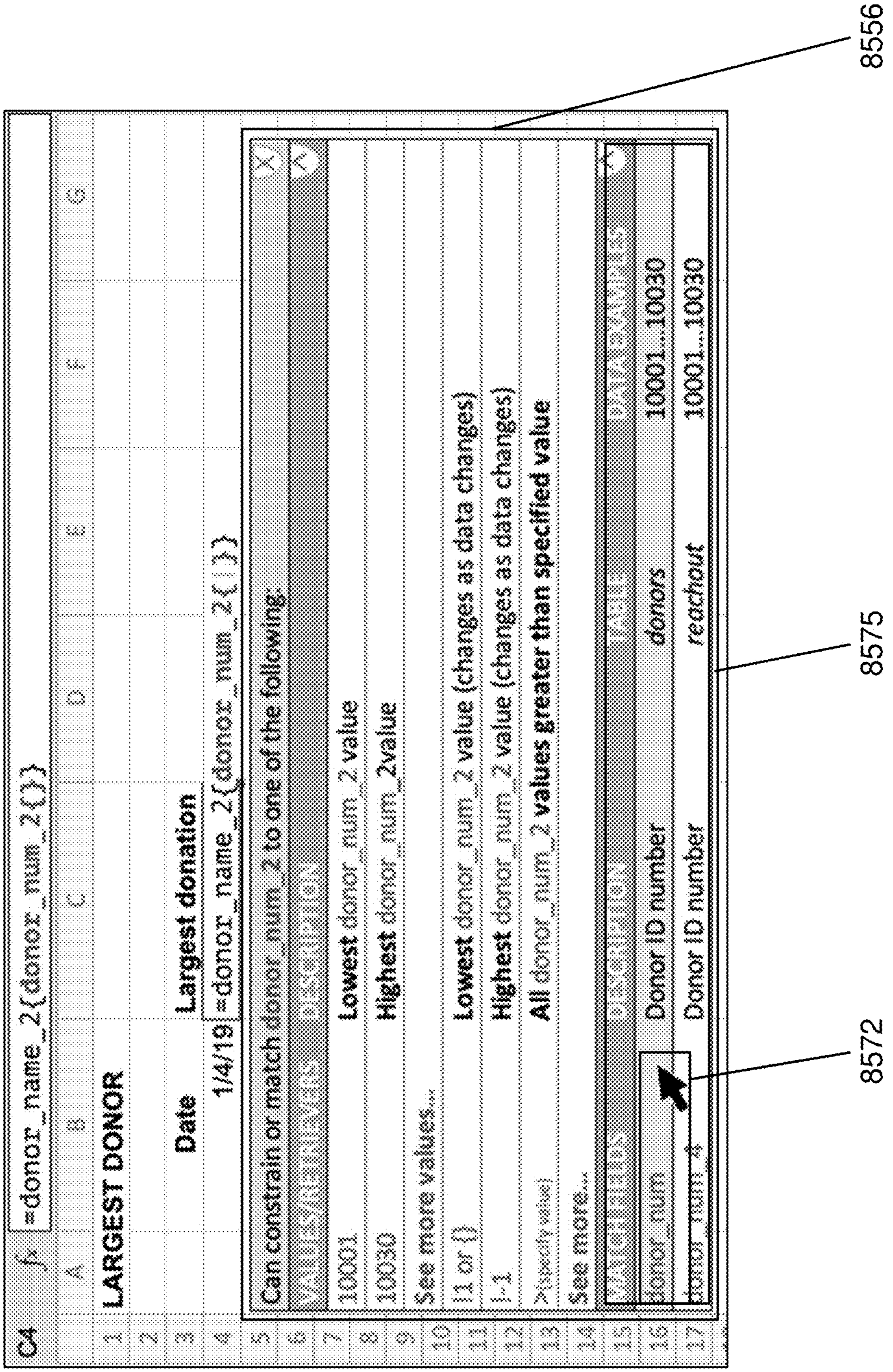
FIGS. 85, 86A, 86B and 87 examples user simplicity trade-offs that can be user set in our technology or automatically altered (e.g., one step versus two step MATCH indirect filters).
Figure 86A:
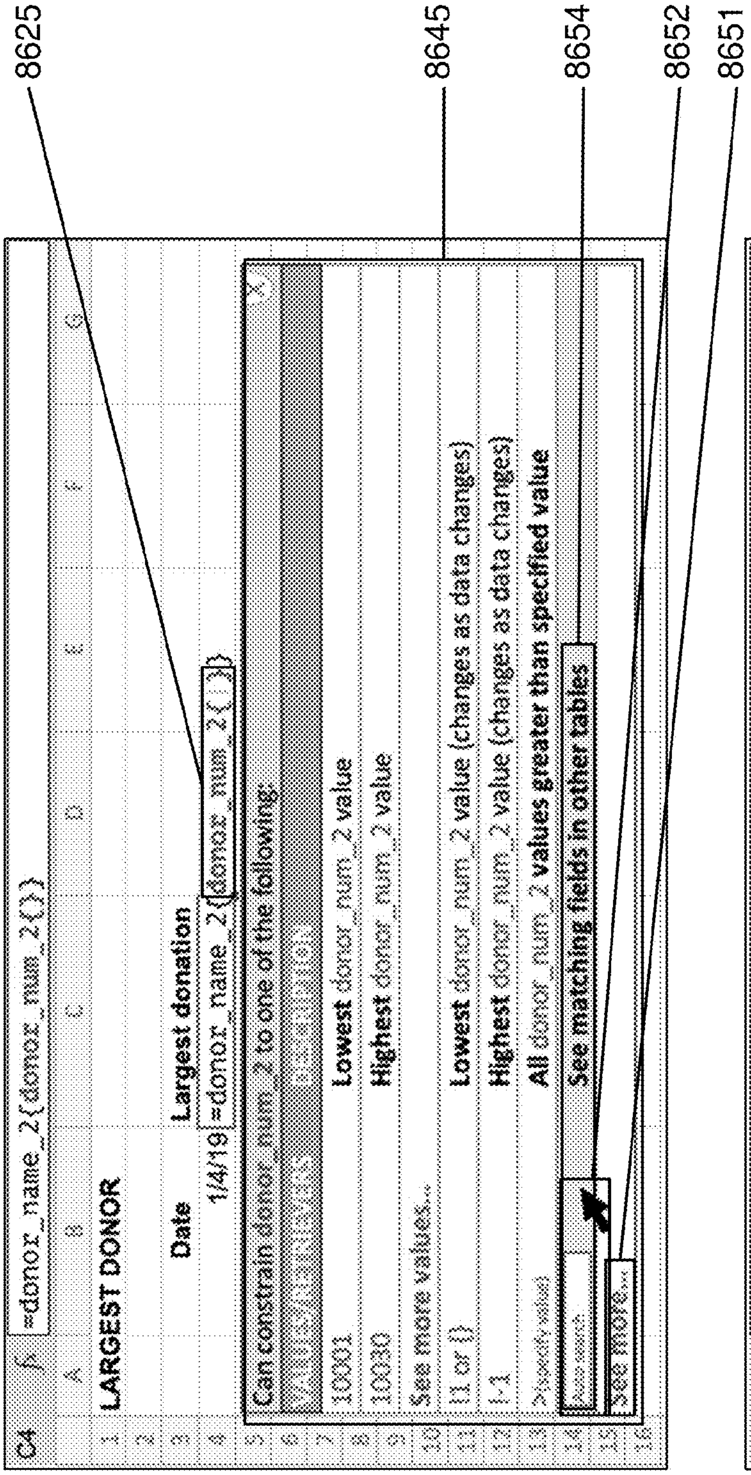
Figure 86B:
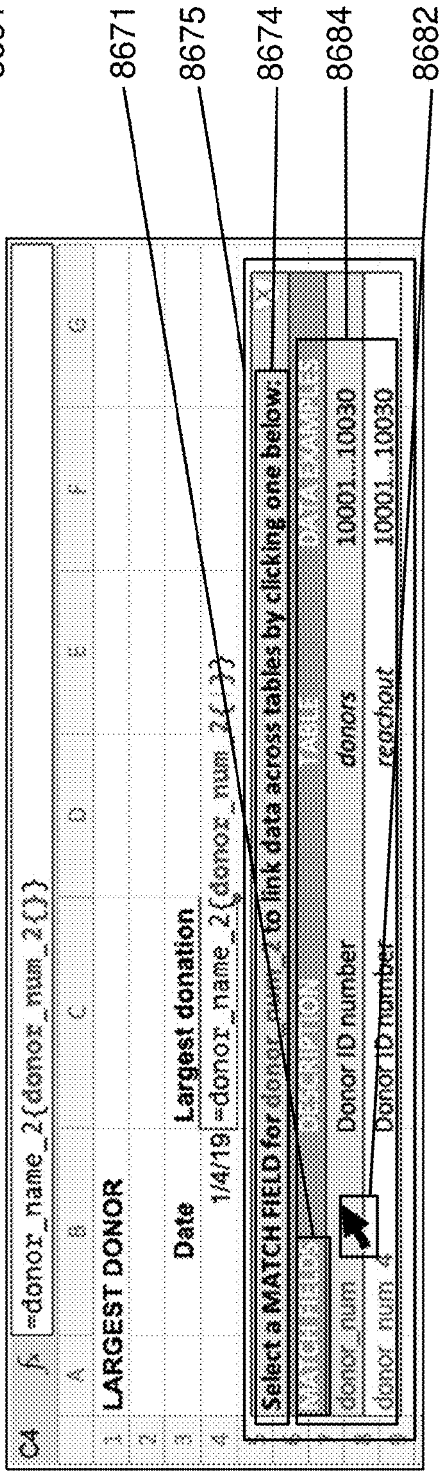
Figure 87:
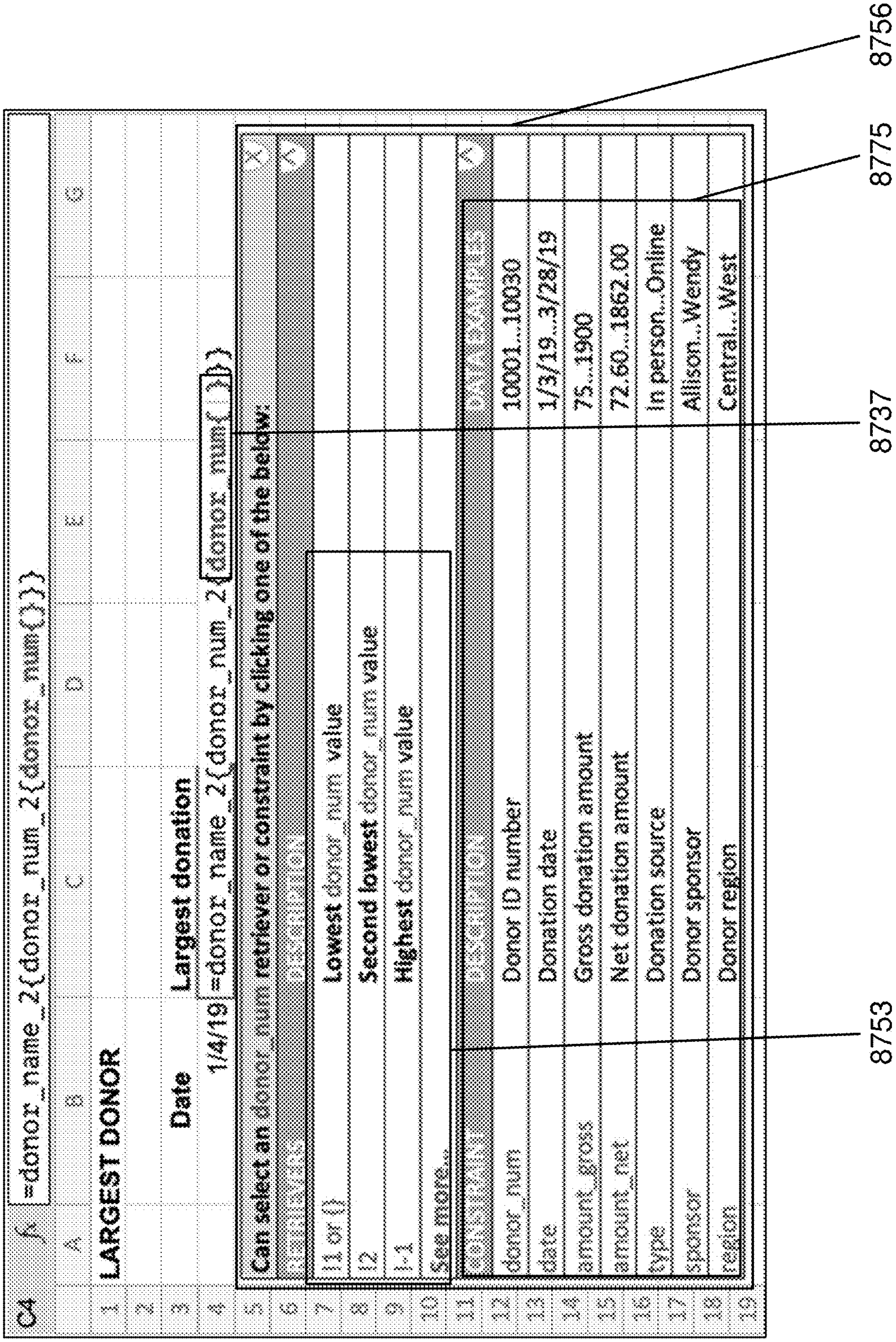

FIG. 85 through FIG. 87 examples user simplicity tradeoffs that can be user set in our technology or automatically set. Our technology can also analyze utilization patterns and alter the options displayed and their curation. The indirect matching/joining of formulaic data fields is a more advanced capability that may be rarely used and confusing for some users. It is effectively bringing together data across data tables, and while substantially simpler than having to worry about left and right joins or unions instead of joins, it requires a knowledge of data tables beyond some users. As such we have created a single step operation shown in FIG. 85 where the 'MATCH FIELDS' section 8575 is displayed in the hint 8556. It assumes the user understands the concept of matching fields across tables and is not confused by its options without further explanation.

FIG. 86A and FIG. 86B examples a two-step matching process for user who infrequently use the capability and require more explanation. The two-step process minimizes the intrusion into the frequently seen displays with a single more descriptive line 8654. Upon clicking the 'Auto search' button 8652 a new UI visual hint pops up 8675 shown in FIG. 86B. It is totally dedicated to the MATCH FIELDS 8671 with a much more explanatory match dedicated instruction 'Select a MATCH FIELD for donor_num_2 to link data across tables by clicking one below:' 8674 telling the user more about matching fields. In this example the list of fields is short but in many situations it would be a much longer list. These match fields can be set by the user/admin at data setup or algorithmically determined by our technology conducting a simple or more advanced statistical test to determine the fields with the same data types and high value overlap.

Clicking the desired field, 8572 in FIGS. 85 and 8682 in FIG. 86 gives the same result 8737 populating the formula and generates the same hint 8756 with indirect filter shown as 'CONSTRAINTS' 8775 for the data table of the match field 'donor_num' 8737. The hint also displays direct filters as 'RETRIEVERS' 8753 in the hint.

Our hint technology next brings together embodiments of the error identification/emphasis and error explanations with the hint including a language recitation of an error free formulaic data formula or part of a formula to give the user a very simple way to create error free formulas and see and resolve errors should they occur.

Formulaic Data Hints—Error Integration

Figure 88A:
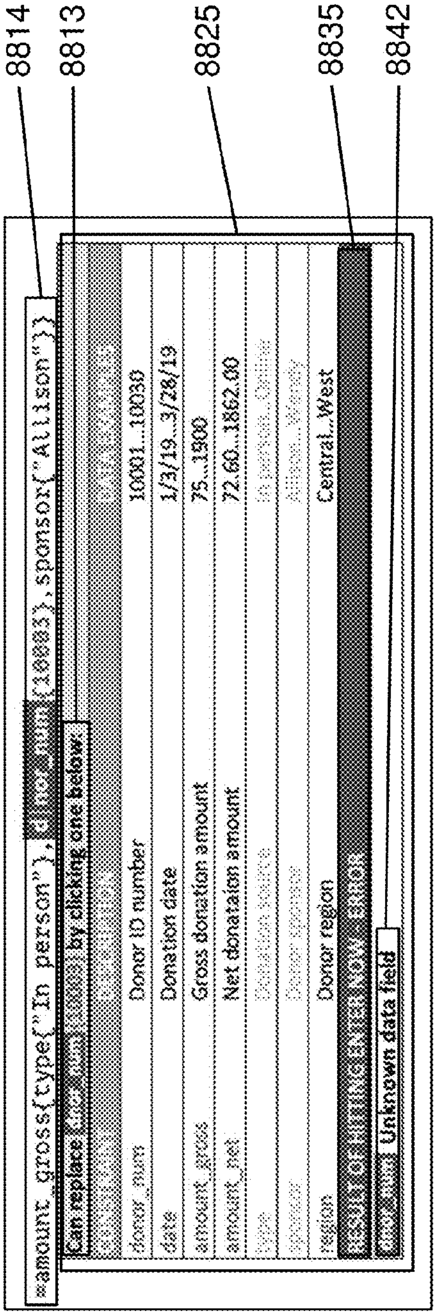
FIGS. 88A, 88B and 88C examples the error identification/emphasis and error messages hint integration for formulaic data formulas.
Figure 88B:
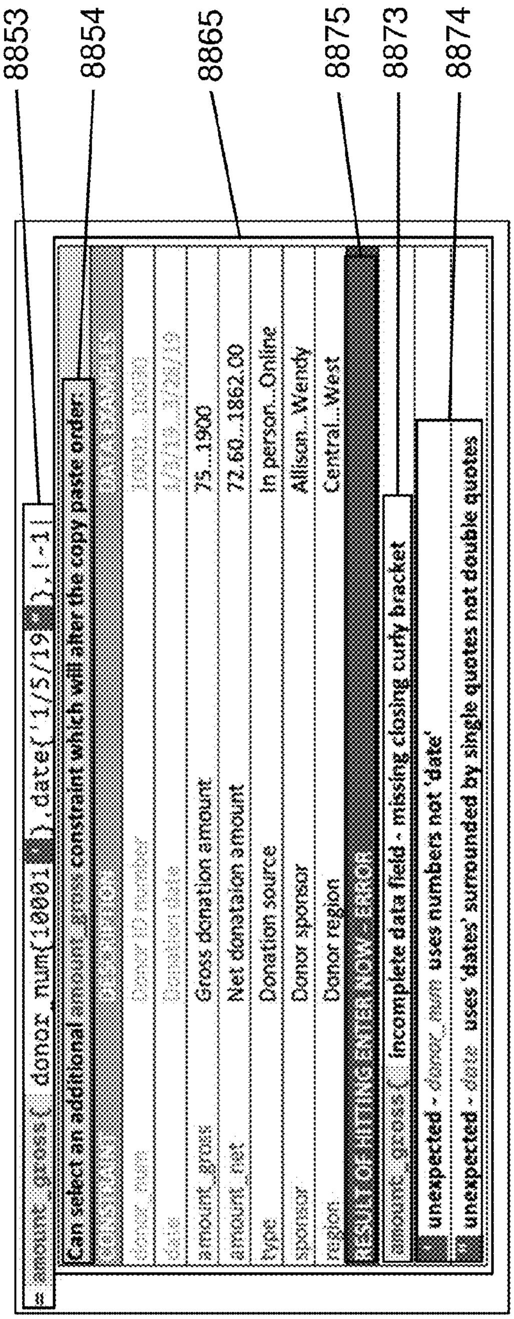
Figure 88C:
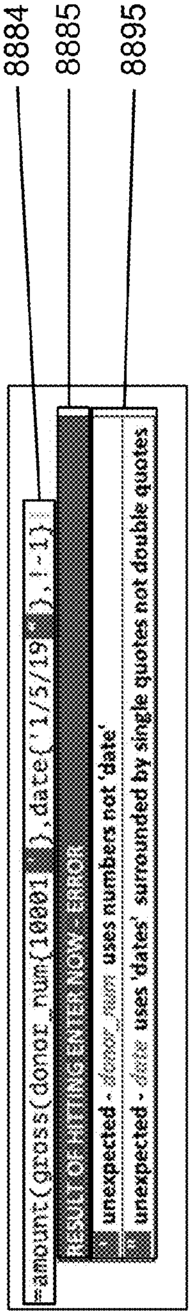

Embodiments of our technology integrate the error identification/emphasis and error messages with the hints for all the formulaic data and/or applicable function formulas. Our technology works while creating those formulas and editing. FIG. 88A through FIG. 88C examples the error identification/emphasis and error messages hint integration for formulaic data formulas. FIG. 88A examples a user editing an erroneous formulaic data field 'dnor_num' in the formula 8814 where the cursor is between the 'd' and the 'n' in 'd nor_num' and in this embodiment the error identification/emphasis is red highlighting. That error identification/emphasis is then used in the instruction 8813 and in the error explanation 8842, which is positioned at the bottom of the hint 8825. The hint has an added result line 8835, which in this embodiment, is colored to match the highlighting of the error identification/emphasis. Otherwise, the hint situationally displays the hint content previously described as the user types or clicks the formula FIG. 88B examples a user creating a formulaic data formula having not finished the formula 8853. In this formula the user has both an incomplete error 8873, which in this embodiment is highlighted in yellow, and two errors 8874, which are highlighted in red. The result line 8875 is colored and messages, in this embodiment, the fact that if the user hits ENTER it will be an overall set of errors and colors it red. This is then followed by three error explanations, the first for the incomplete error 8873 and then next two 8874 for the red highlighted errors. As mentioned previously the rest of the hint 8865 contains the situationally generated options previously described.

FIG. 88C examples a setting where the user has completed the formulaic data formula 8884 with the cursor beyond the last curly bracket. So, there is no hint elements telling the user their formulaic data options but, in this embodiment, users see a hint result line 8885 telling the user that their formula will not evaluate without and error, and they get two error explanations 8895, explaining each of the errors identified/emphasized.

Figure 89:
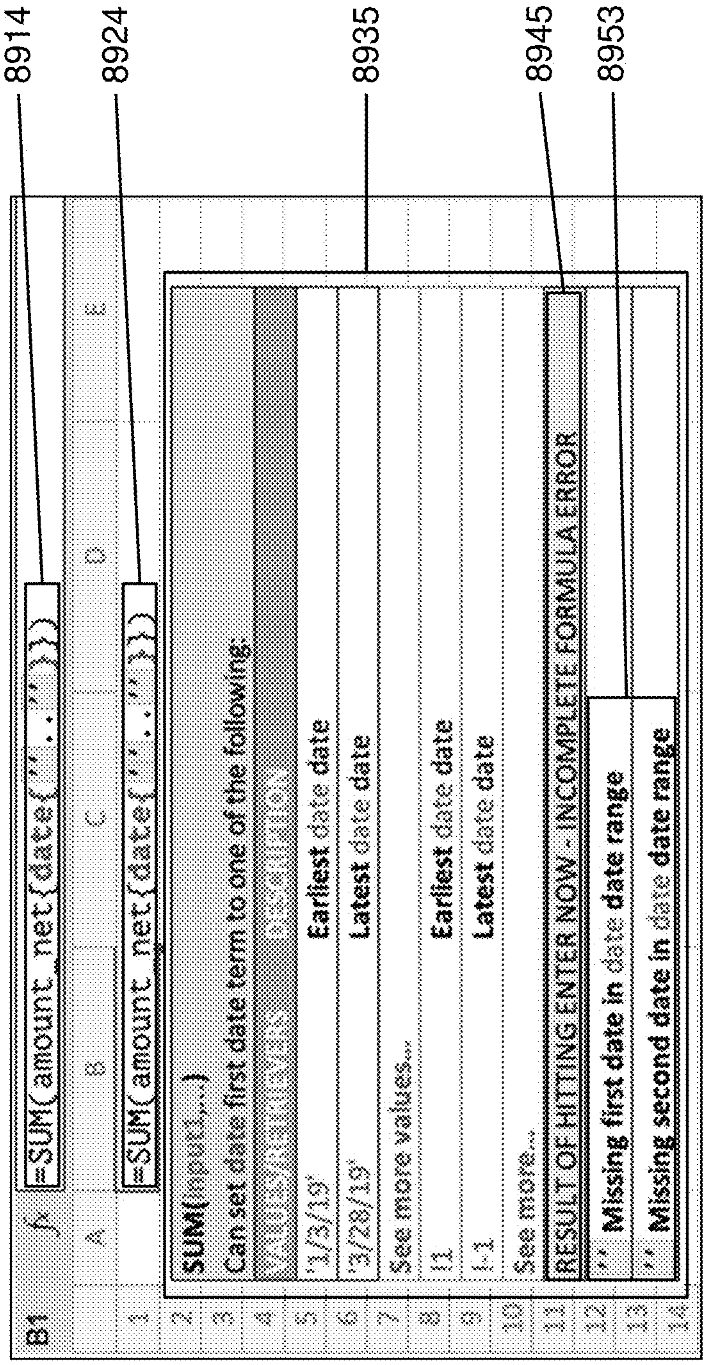
FIG. 89 examples a function and formulaic data combination formula with two incomplete error messages shown in the formula hint.

FIG. 89 examples a function and formulaic data combination formula with two incomplete errors shown in its formula (8914 and 8924). In this embodiment, because both of the errors are incomplete errors, the result line 8945 is colored yellow rather than red. The error explanations 8953 display the error identifications/emphases from the formula with the explanations. Otherwise, like previously described, the hint displays the instruction, function syntax and selection options. The next part of the integration of the hints is what occurs if the formula has no errors.

Formulaic Data Hints—Language Formula Recitation

FIG. 90A through FIG. 93 examples different embodiments of our technology informing the user of the state of their formula when it has no errors. These examples are for formulaic data and formulaic data and function combination formulas. The objective of our technology is to enhance the ability of the user to decide whether they have the formula logically doing what they want it to. Our technology does that two ways, one showing them the result of their formula which is the equivalent of them hitting ENTER and the second way is a plain language recitation of what their formula is doing. As discussed before there are some existing spreadsheets and formula situations where the user sees a result before hitting ENTER, recognizing as previously discussed that result ignores incomplete problems meaning that if the user hits ENTER they get an ERROR not the shown result. However, there are no spreadsheets where users see a plain language recitation of what their formula is doing and where that recitation is combined with the true to hitting ENTER result.

Figure 90A:
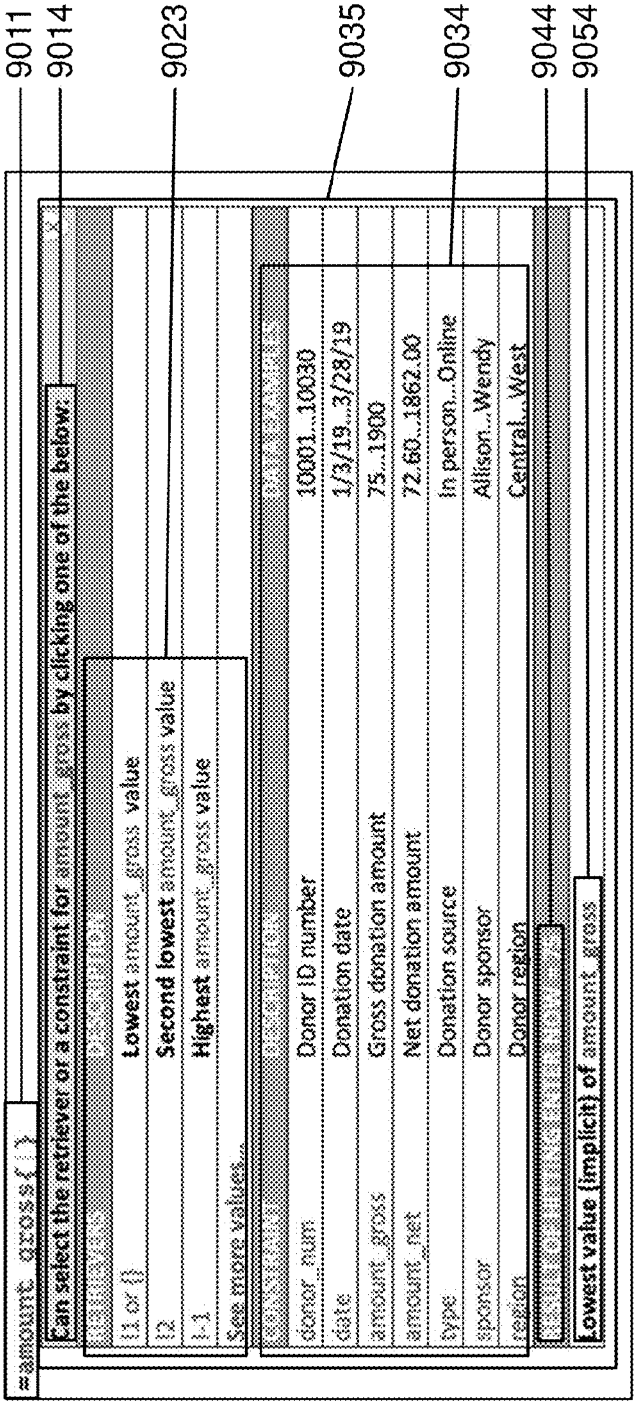
FIGS. 90A, 90B, 91A, 91B and 92 examples different embodiments of our technology informing the user of the state of their formula which has no errors, including a result(s) and a plain language recitation of the formula or part of the formula.
Figure 90B:
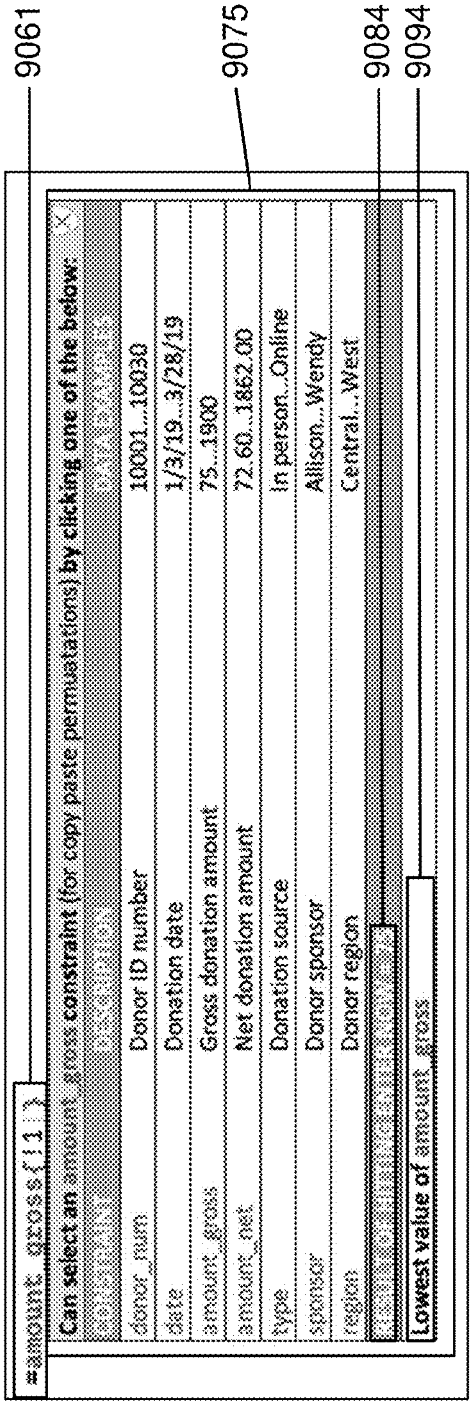

FIG. 90A and FIG. 90B examples two formulaic data formulas with the same results and plain language recitations, where one uses our implicit/default capability and the other does not. FIG. 90A examples the formula '=amount_gross{ }' 9011 which employs our implicit/default retriever to evaluate. Specifically, if the user inputs nothing in the curly brackets of a formulaic data field which is not being evaluated by a range function (e.g., SUM, COUNT, MIN, and MAX), it implicitly uses a retriever for the lowest value (e.g., first AZ for text, earliest for dates). So, '=amount_gross{|}' 9011 displays a result line 'RESULT OF HITTING ENTER NOW=75' 9044 and provides a plain English recitation line 'Lowest value (implicit) of amount_gross' 9054. That recitation allows the user to see in a simple sentence what their formula is doing so that they can check it against what they want it to do. Otherwise as previously discussed the hint 9035 contains an instruction 9014 and sections and groupings of options as previously described (e.g., "RETRIEVERS' 9023 and 'CONSTRAINT' 9034). FIG. 90B examples the formula '=amount_gross{! 1}' 9061 which gives the same result line 'RESULT OF HITTING ENTER NOW=75' 9084 in the hint 9075 as in FIG. 90A 9044. However, in this embodiment FIG. 90B has a different plain language recitation line 'Lowest value of amount_gross' 9094 because it has '!1's not the implicit/default retriever. Some embodiments for simplicity may not tell the user about the implicit/default retriever in the plain language recitation, despite it being used. Without a default retriever (default direct filter) the formula would be incomplete and not evaluate. As we will example later in this embodiment the default retriever changes for range formulas to '!ALL', as ALL values is much more commonly used.

Figure 91A:
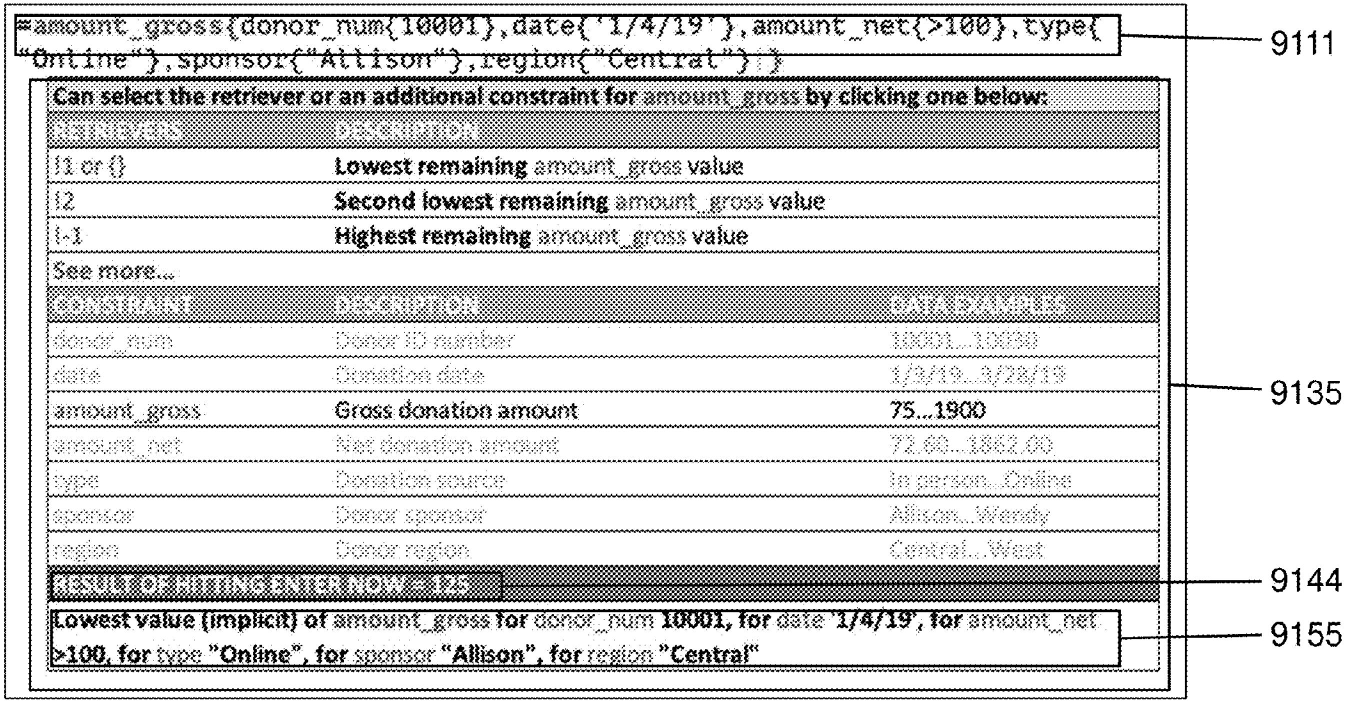
Figure 91B:
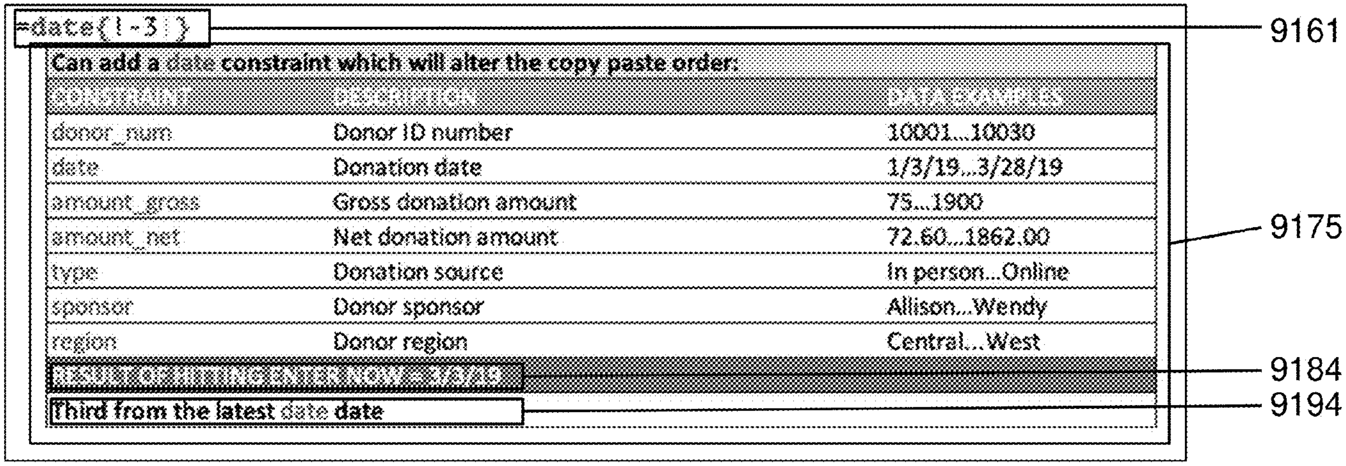

FIG. 91A and FIG. 91B example our result and plain language recitation technology with color coding for a more complicated formula and one that evaluates to text. The stoplight like color coding is completed in this embodiment, with red for errors that finishing a formula will not resolve, yellow (caution) for errors that finishing the formula correctly can resolve and green for formulas with no errors that will evaluate if the user hits ENTER (or RETURN on a Mac).

FIG. 91A examples a more complicated formulaic data formula 9111 with many constraint arguments. The hint 9135 has a green background result line 9144 and a plain language recitation line 'Lowest value (implicit) of amount_gross for donor_num 10001, for date '1/4/119', for amount_net>100, for type "Online", for sponsor "Allison" for region "Central"' 9155 which uses color to differentiate the data field names and lack of bolding for the constraint data fields. The purpose of this is to make it easier for users to differentiate the fields from the values and other wording in the recitation. FIG. 91B examples a simple date type formulaic data formula where the '=date{!-3}' formula generates for our technology a previously described hint 9175 with the addition of the green background result line 9184 and the plain language recitation line 9194.

Figure 92:
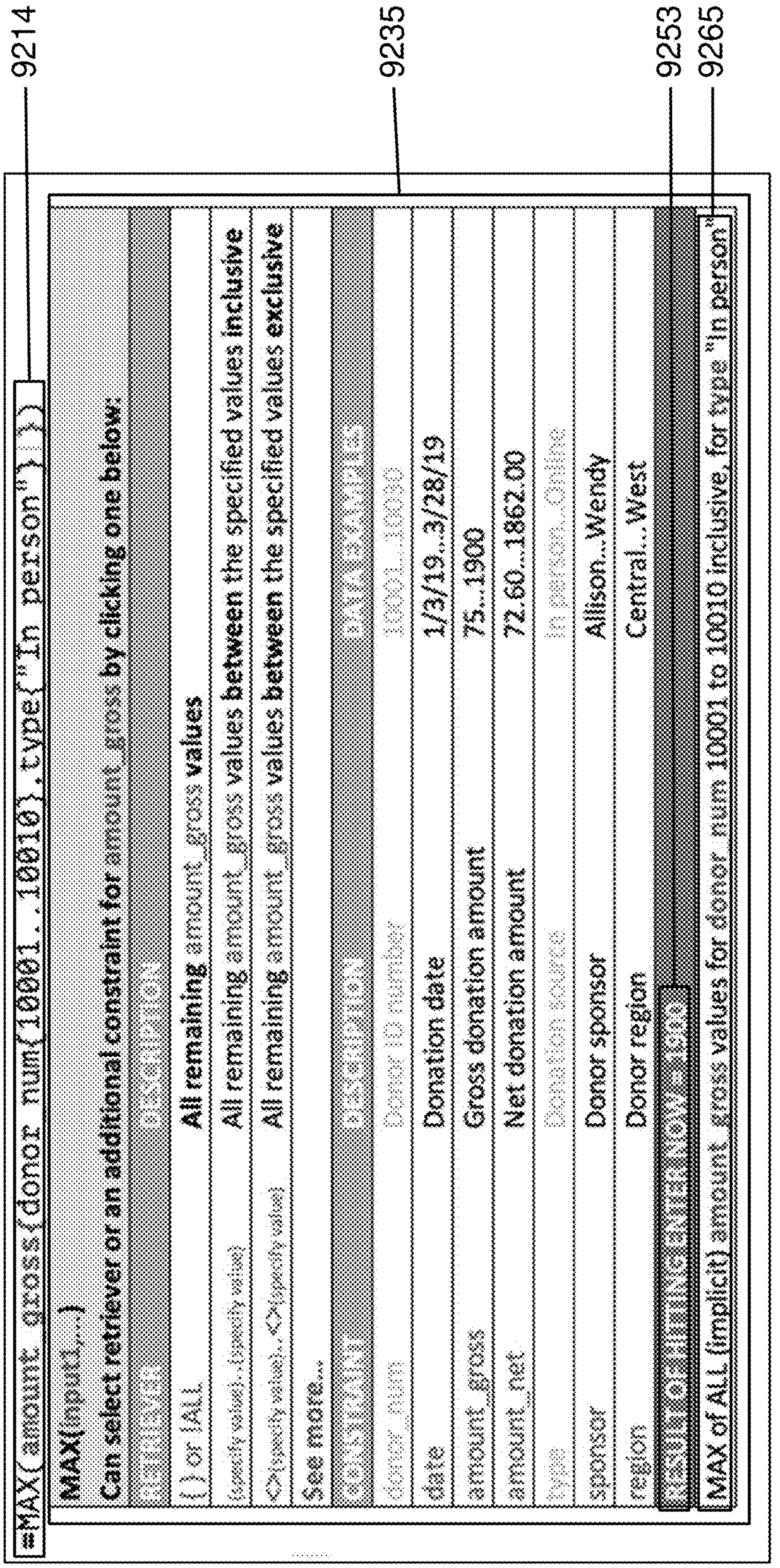

FIG. 92 examples a combination spreadsheet function and formulaic data formula 9214 generating a hint 9235 with a green background result line 9253 and a plain language recitation line 9265 with color differentiated data field names. Because the formulaic data field 'amount_gross' is being evaluated by the range function 'MAX' in the formula 9214 the recitation 9265 tells the user that the implicit value is 'ALL' not the lowest value it would be if no range function were involved. Our technology automatically situationally displays the hint select options factoring that into the plain language recitation.

Figure 93:
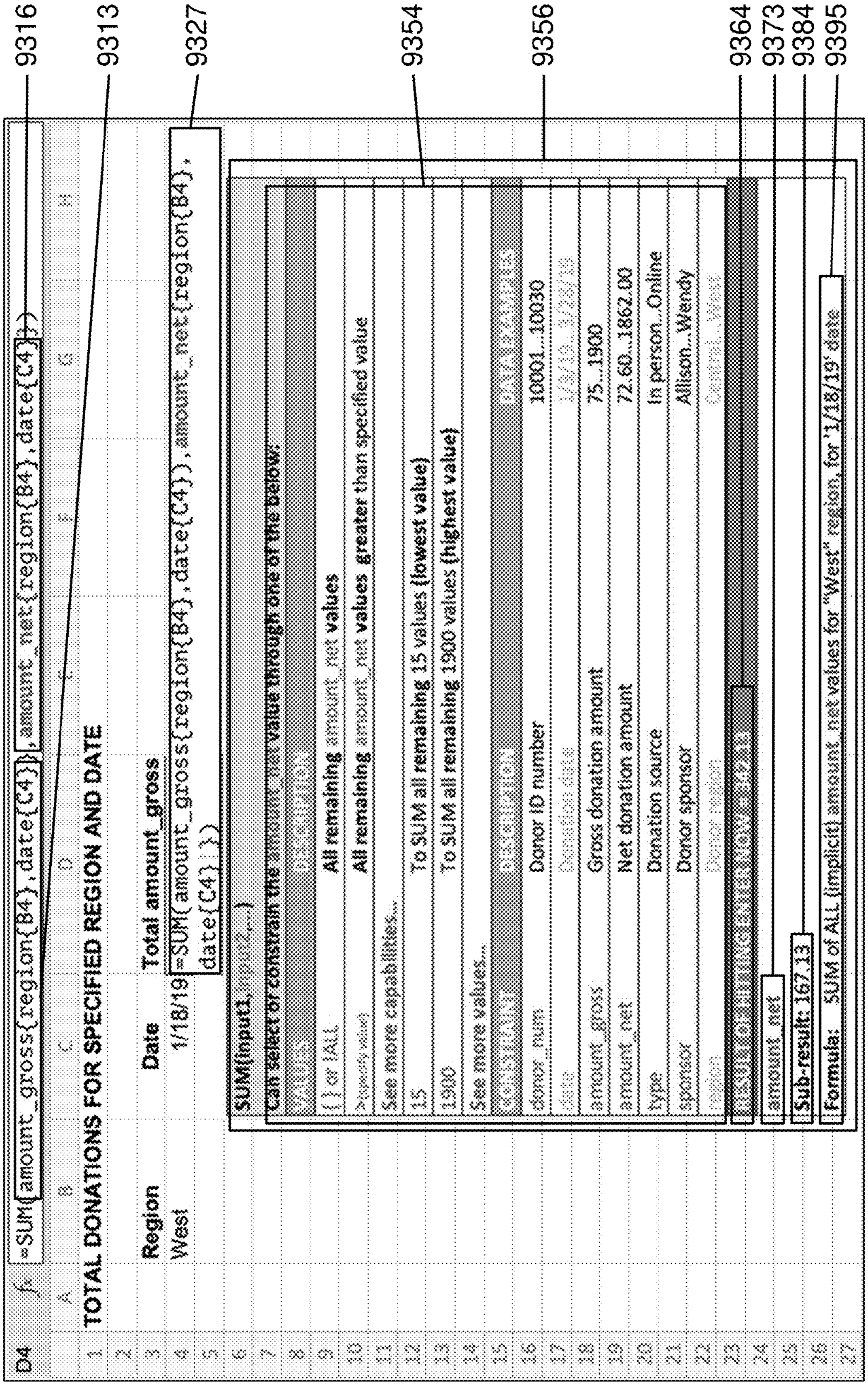
FIG. 93 examples our technology displaying a hint with an overall result and a sub-result, with the sub-result plain language recitation.

FIG. 93 examples a further complexity automatically handled by embodiments of our technology, specifically function situations involving the evaluation of more than one formulaic data field resulting in a very long and complicated plain language recitation. This embodiment rather than reciting back the entire formula, just recites the current formulaic data field—thus keeping the recitation focused on one evaluation and therefore less confusing. Since users will be building the different parts of the formula one at a time, they will be able to see and check each part as they create that part of the formula. The SUM formula 9327 has two formulaic data arguments, where the first one 9313 has been completed and the second 9316 is still being created. Therefore, the selection options 9354 part of the hint 9356 are for that second argument 'amount_net{region{B4},date{C4}}' 9316. Although in this embodiment the green backgrounded result line 9364 shows the calculated result for the entire formula with a 'Sub-result:167.13' 9384 shown for the second argument 'amount_net' 9373. And the plain language recitation line 'Formula: SUM of ALL (implicit) amount_net values for "West" region, for '1/18/19' date' 9395 is also just for 'amount_net{region{B4},date{C4}}' part of the formula not the entire formula. This facilitates users building functions with multiple formulaic data fields step by step so that they are not overwhelmed with a single long and confusing recitation. Other embodiments could show each part of the sub-results with their recitations or simply show the overall result and the plain language recitation for the current argument. Our technology supports multiple different ways to support building more complicated formulas with no typos, no wrong syntax, no wrong arguments and plain language recitations that allow users to check and likely eliminate wrong logic problems. Thereby eliminating or dramatically reducing most, if not all, of the factors leading to errors in spreadsheet formulas.

Start-to-Finish Combination Function and Formulaic Data Example

FIG. 94A through FIG. 102 example building a combination function and formulaic data field formula with multiple data field constraints from start-to-finish using our technologies. They example how the different elements of our technologies can come together to make building formulas easier and pre-empt errors.

Figure 94A:
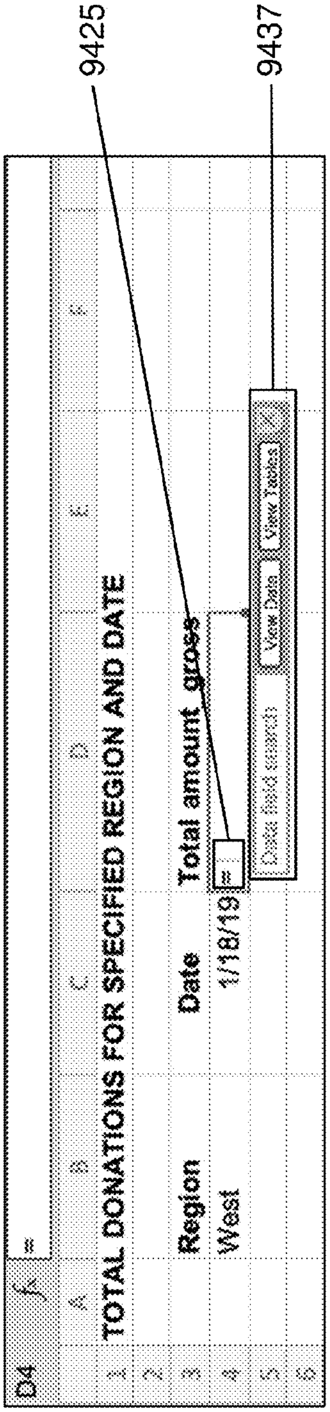
Figure 94B:
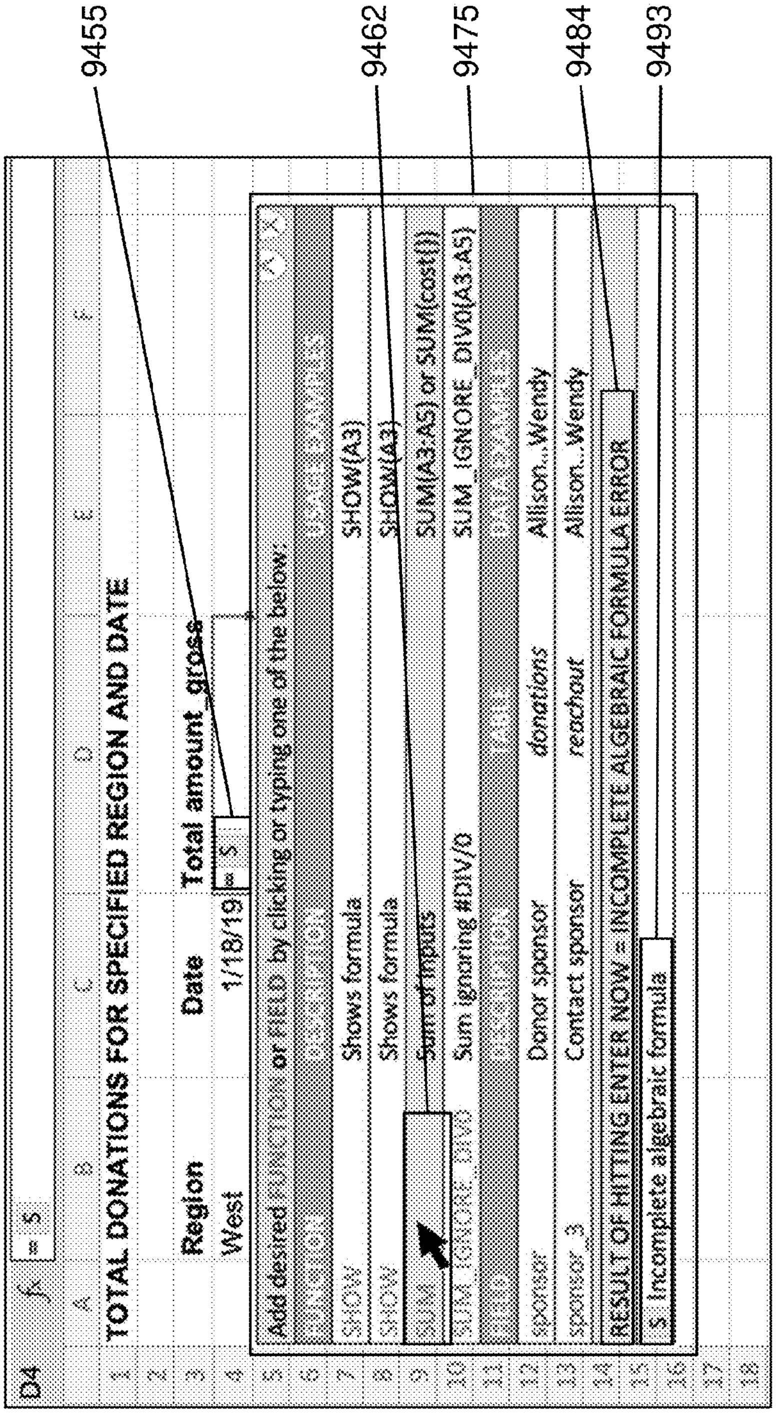

FIG. 94A examples starting a formula by typing an equal sign '=' 9425. In this embodiment it automatically triggers the UI visual 9437 which presents the user with additional formulaic data field selection options beyond just continuing to type. Since, in this instance the user knows the function they want to start with, they elect to start to type the function name. FIG. 94B examples the automatically generated UI visual 9475 the user triggers when they type 'S' 9455 in cell D4. This hint 9475 includes a list of all the FUNCTIONS and FIELDS beginning with 'S'. It also includes the result line 9484 warning the user that if they hit ENTER now they will get an 'INCOMPLETE ALGEBRAIC FORMULA ERROR' 9484. The hint also includes an error explanation 9493 which contains an error identification/emphasis visually connecting the error in the formula with the explanation. The user elects to click 'SUM' 9462 because doing so not only populates the FUNCTION name and opening parenthesis (as it does in today's spreadsheets) but also populates the closing parenthesis (so no unmatched parentheses errors) and puts the cursor in between the parentheses ready to fill in the argument(s).

Figure 95:
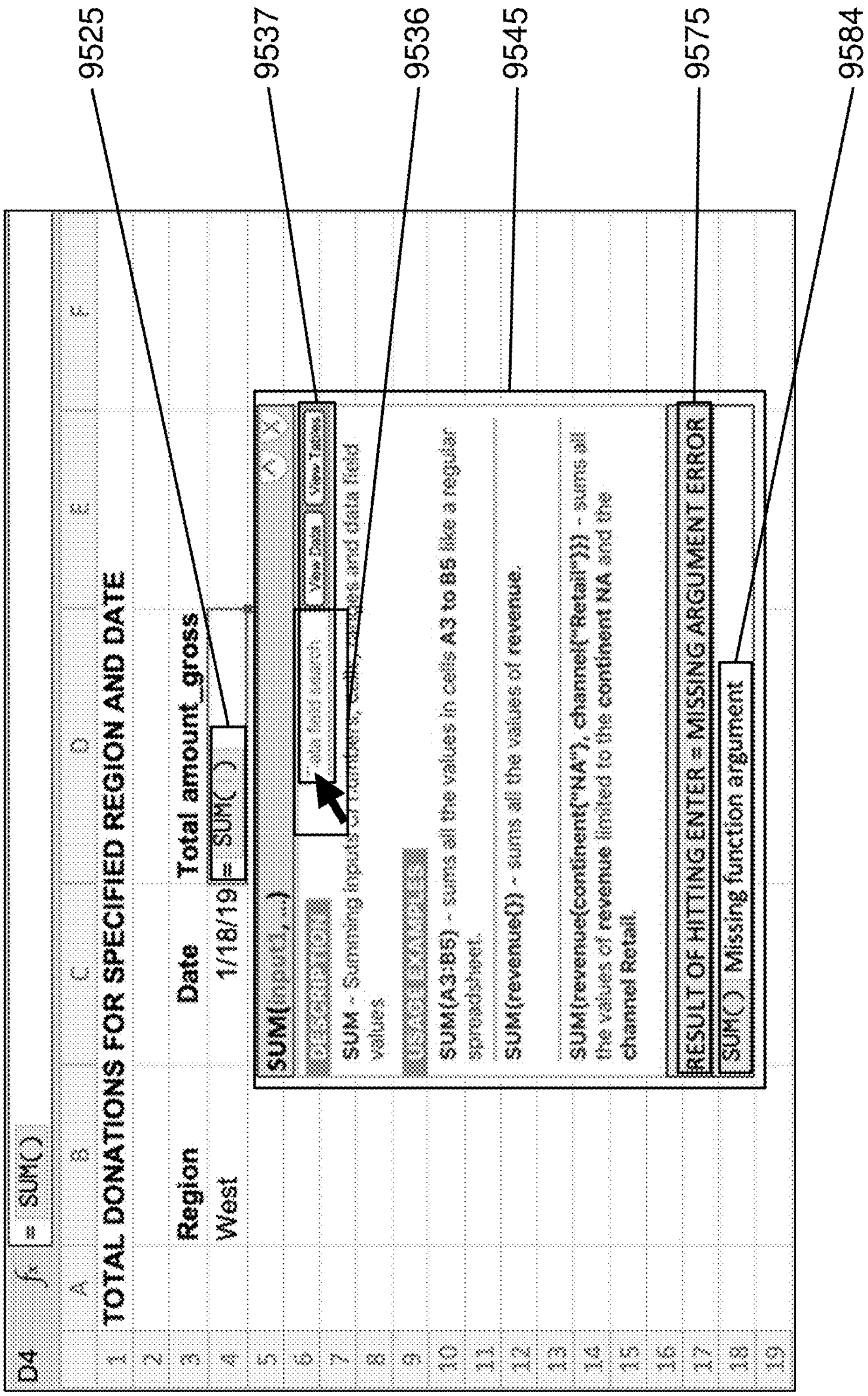

FIG. 95 examples that outcome'=Sum(|)' 9525 automatically displaying the SUM hint including a result line 9575 and an error explanation 9584. Additionally is contains a visual 9537 which presents the user with additional formulaic data field selection options beyond just continuing to type in the formula. In this example the user clicks on the 'Data field search' box 9536 because they want to find a field for donations but do not know what it is called. The 'Data field search' 9536 is one way for them to find and select the field they want with a full text search that they are pretty sure will display the field they want. FIG. 96A shows the cursor automatically moving from the formula 9625 into that search bar 9635 in the UI visual 9637. At this point the user types 'dona' 9651 in FIG. 96B getting the hint 9675 with an instruction line 9664 letting the user know they can select a field to populate in the formula or see more about a field by clicking to see its table. Our technology did a full character search, in this embodiment, of all the FIELDS and their DESCRIPTIONS back shadowing (e.g., 9682) why each FIELD is there. It then screened those options to only display those which fit the requirements of the 'SUM' function into which it would be populated, so only fields that are numeric. It also presents 'DATA EXAMPLES' and the 'IN THIS TABLE' source, as previously described, to give the users helpful information for their selection. And the user can click to move to the table of their choice while maintaining the ability to select a field from it into the formula. In this example the user sees the field they want and clicks 'amount_gross' 9673.

Figure 97:
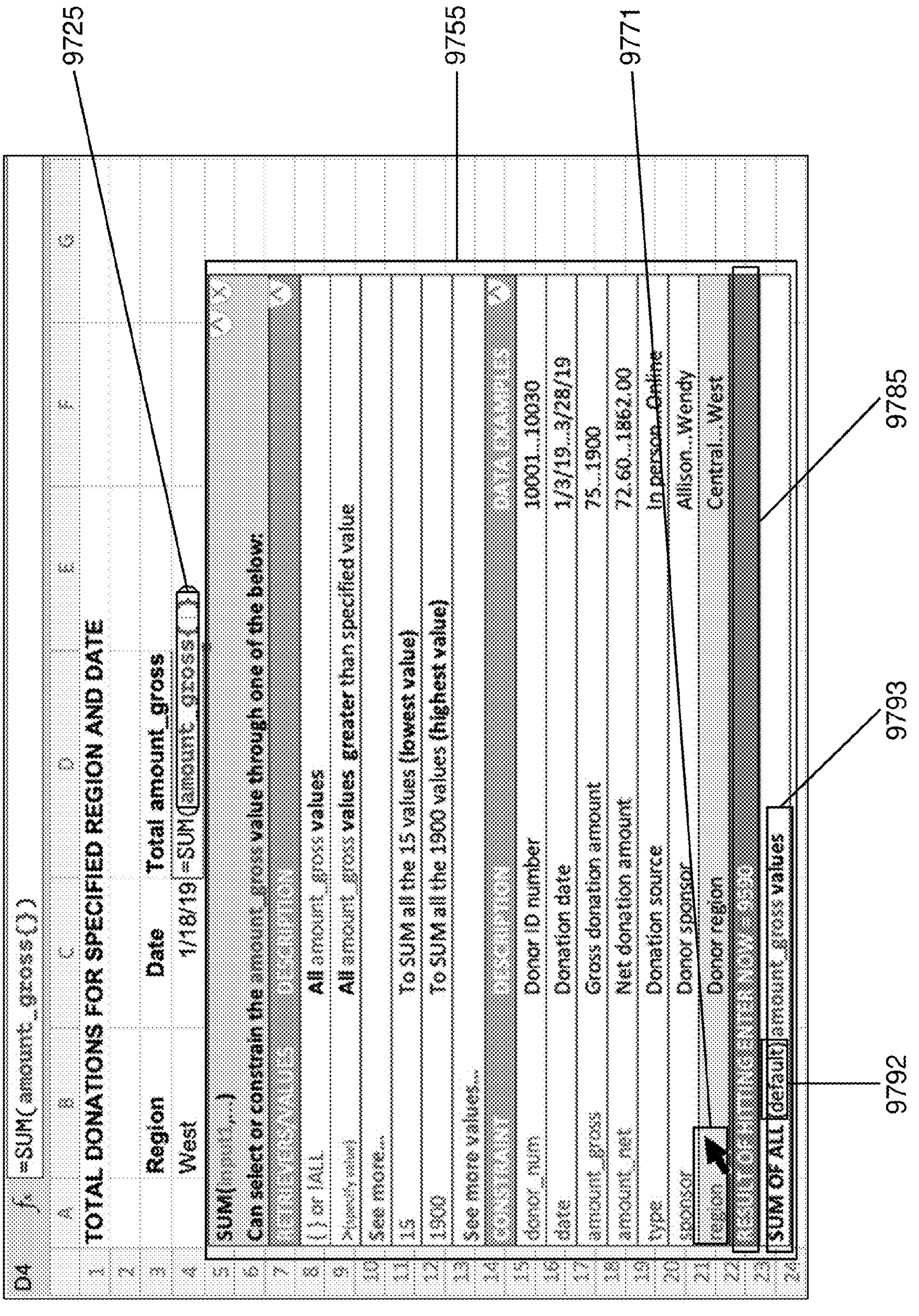

FIG. 97 examples that outcome of that click which populates 'amount_gross{|}' 9725 with both curly brackets (again so no unpaired errors) and the cursor between the brackets ready for selecting a retriever, value or constraint. Our technology automatically displays the hint 9755 showing the most frequently used options, as previously described, with a result 9785 automatically shown using our default/implicit retriever. In this embodiment, the plain language recitation of the formula 9793 mentions that '(default)' usage which allowed the formula to as you type/click give a result. The user sees the selection they want and clicks on 'region' 9771 to automatically trigger their next hint options.

Figure 98:
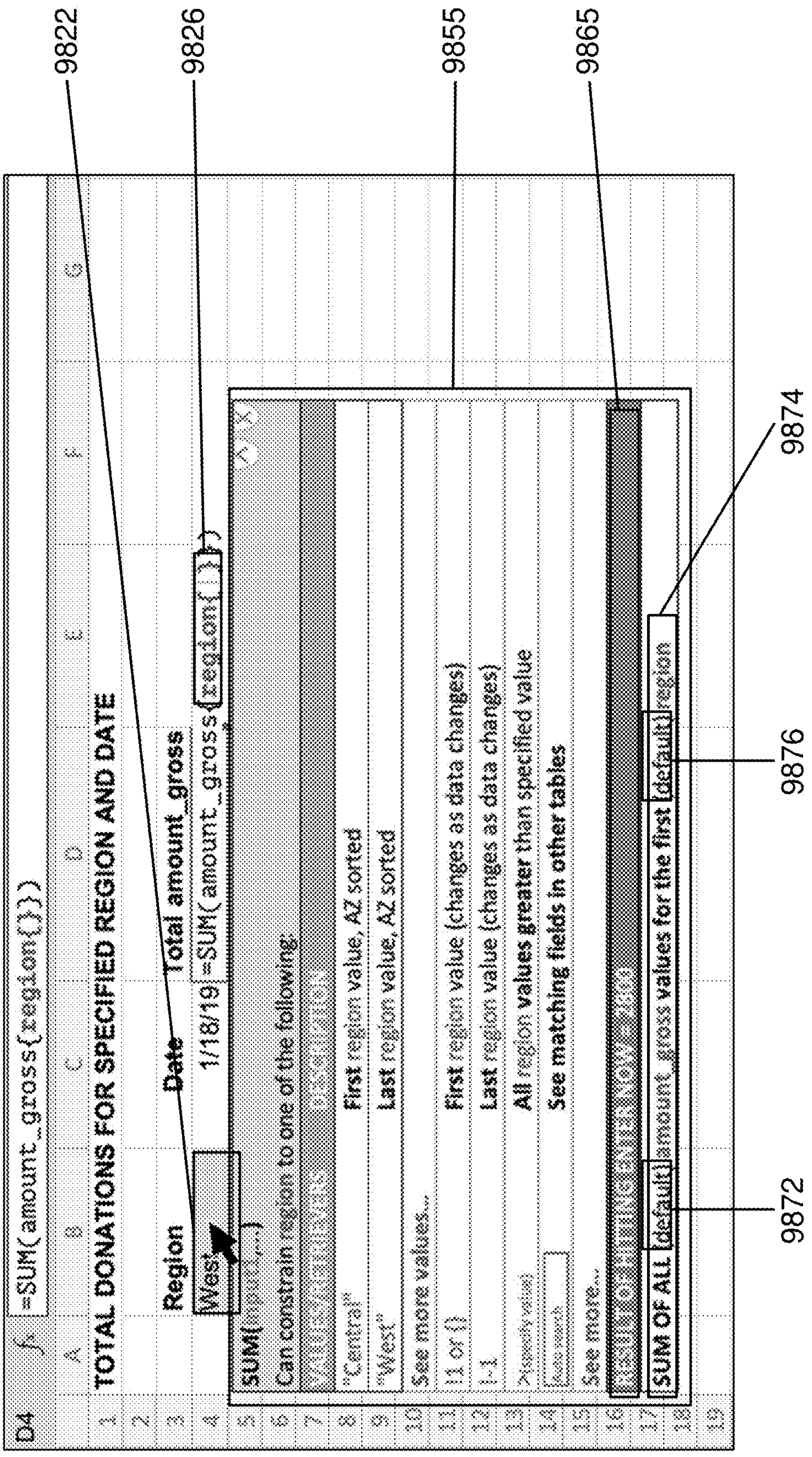
Figure 99:
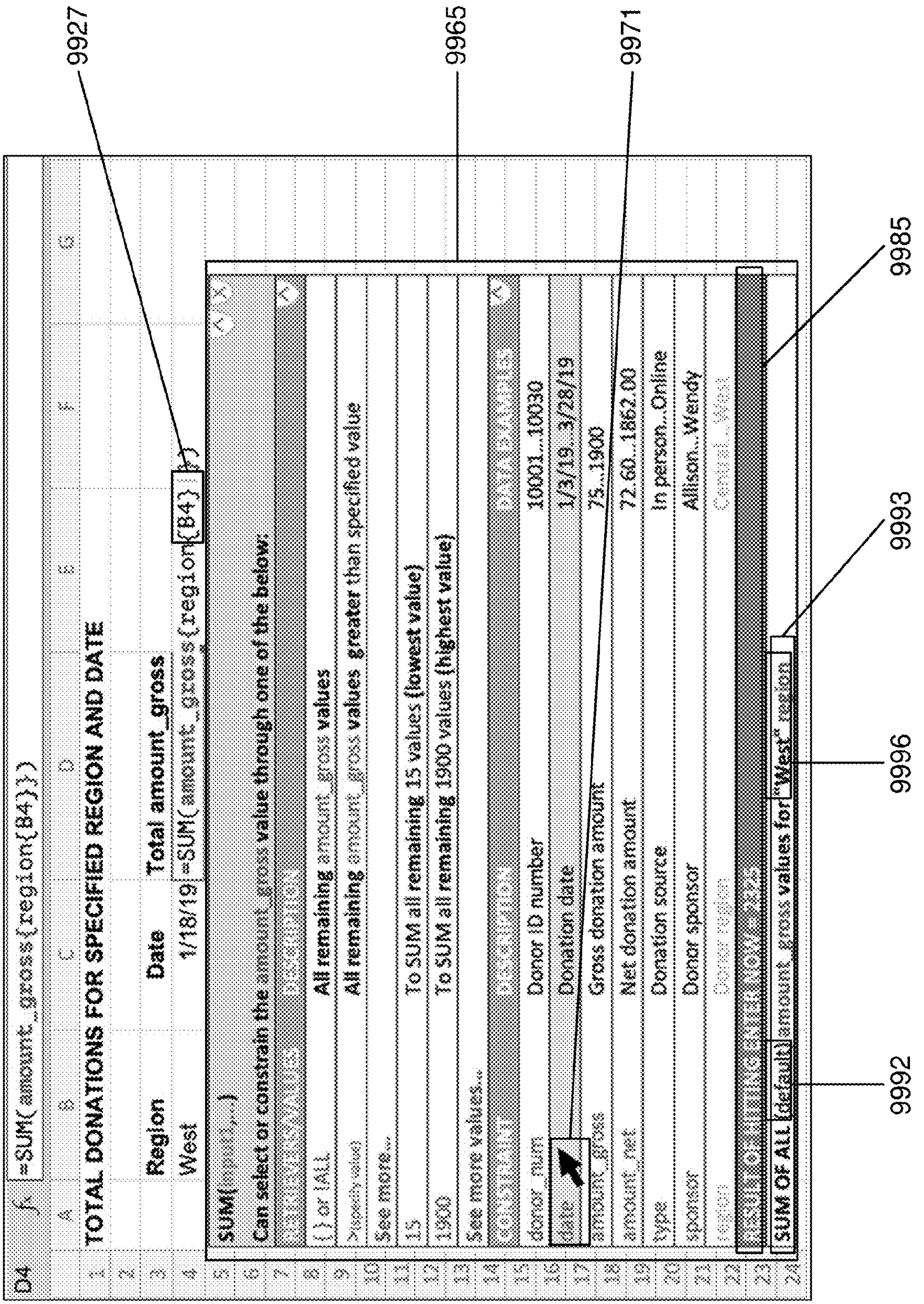

FIG. 98 examples those options in hint 9855 with a result 9865 made possible by now two default retrievers (9872 and 9876) as described in the plain language recitation 9874. Here the user opts to click cell 9822 to populate a direct filter into 'region{|}' 9826 and our technology then knows the argument is done and the click populates the value 'B4' in the curly brackets our technology moves the cursor beyond them as shown in 9927 in FIG. 99. This also automatically displays the hint 9965 but has replaced the default 'region' constraint value with the value "West" (from B4) as shown in the plain language recitation 9993. That recitation has given the user exactly what the formula is doing tracing through the cell reference 'B4' 9927. The user is not done and sees the additional constraint field desired clicking on 'date' 9971.

Figure 100:
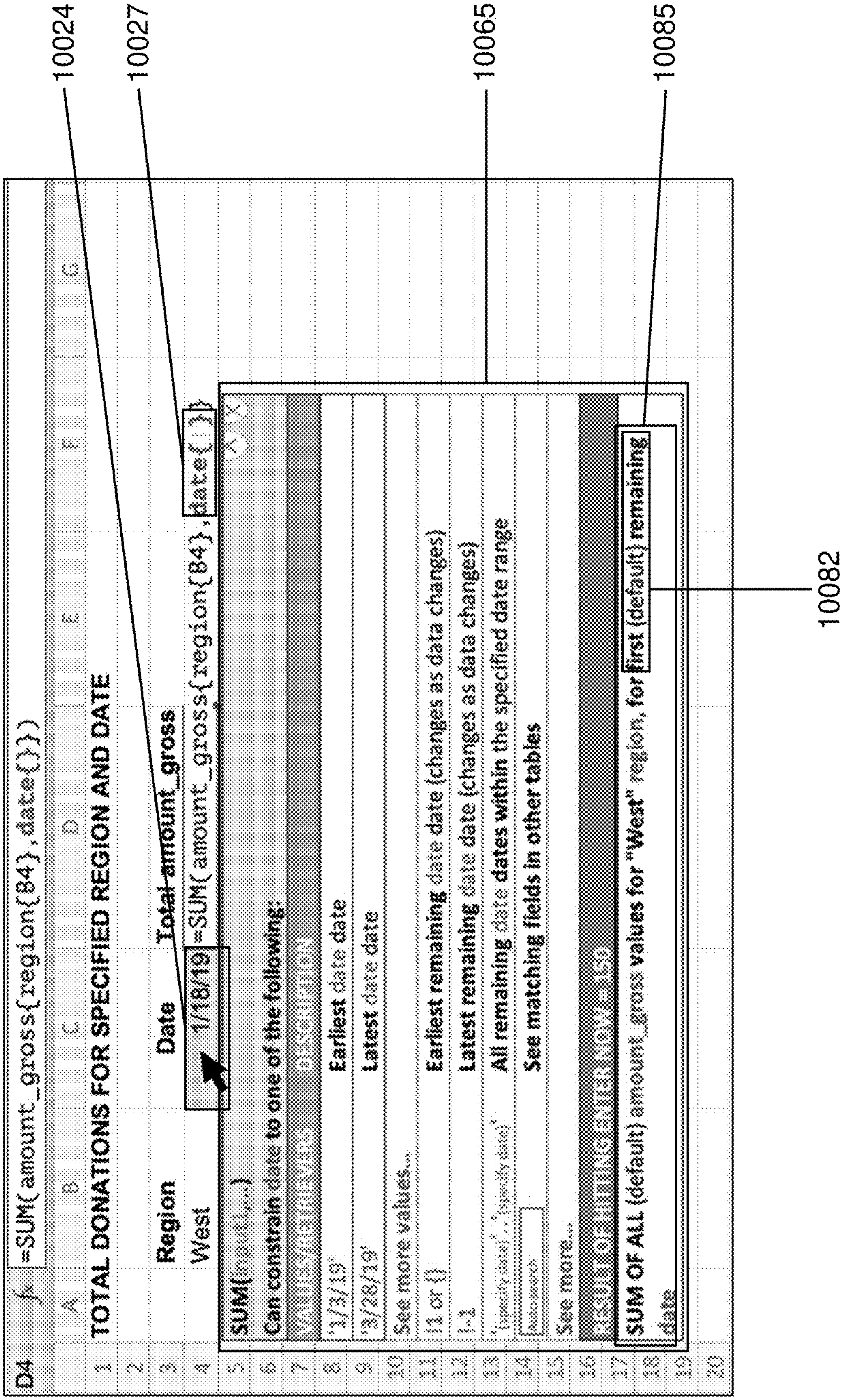
Figure 101:
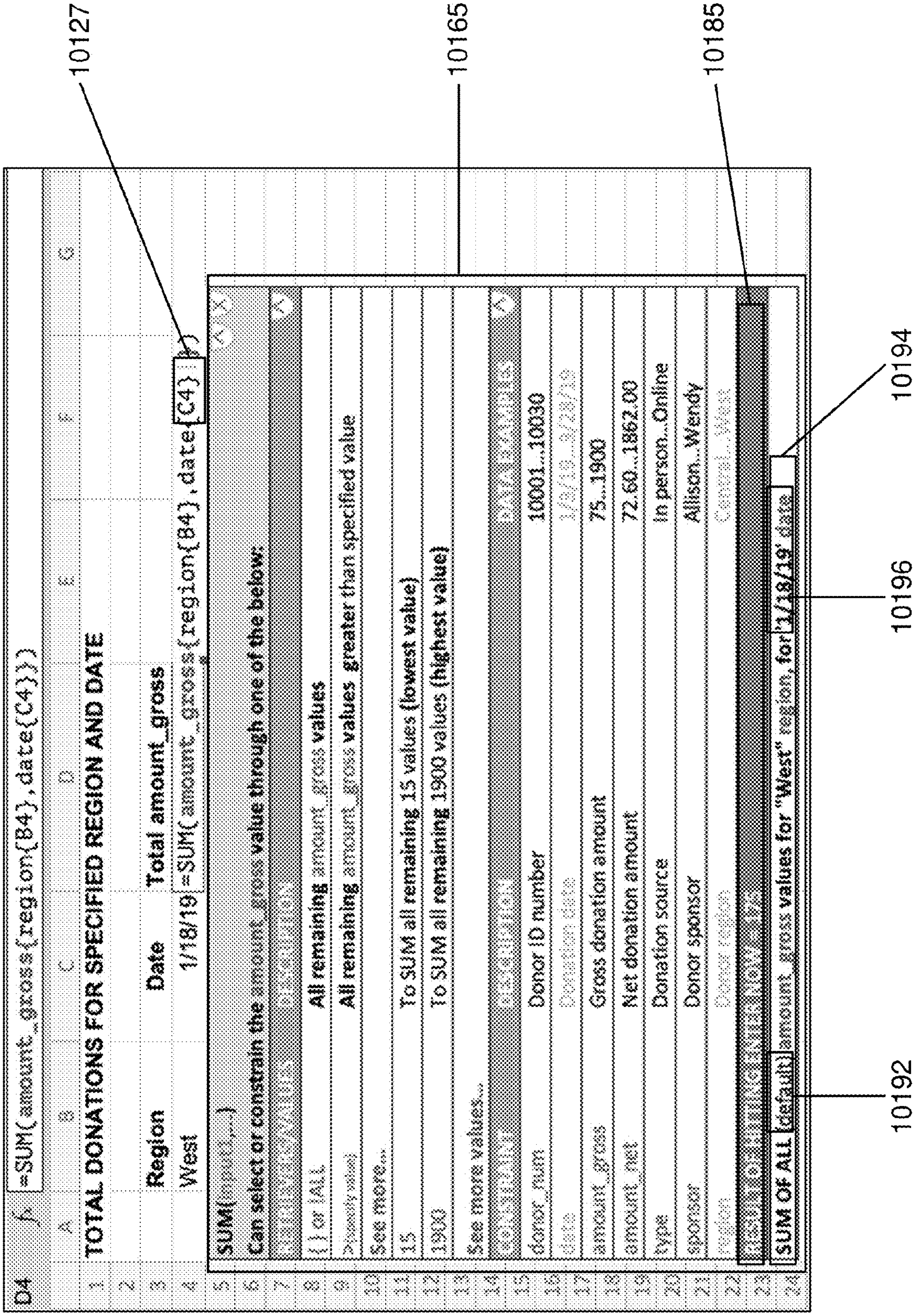
Figure 102:
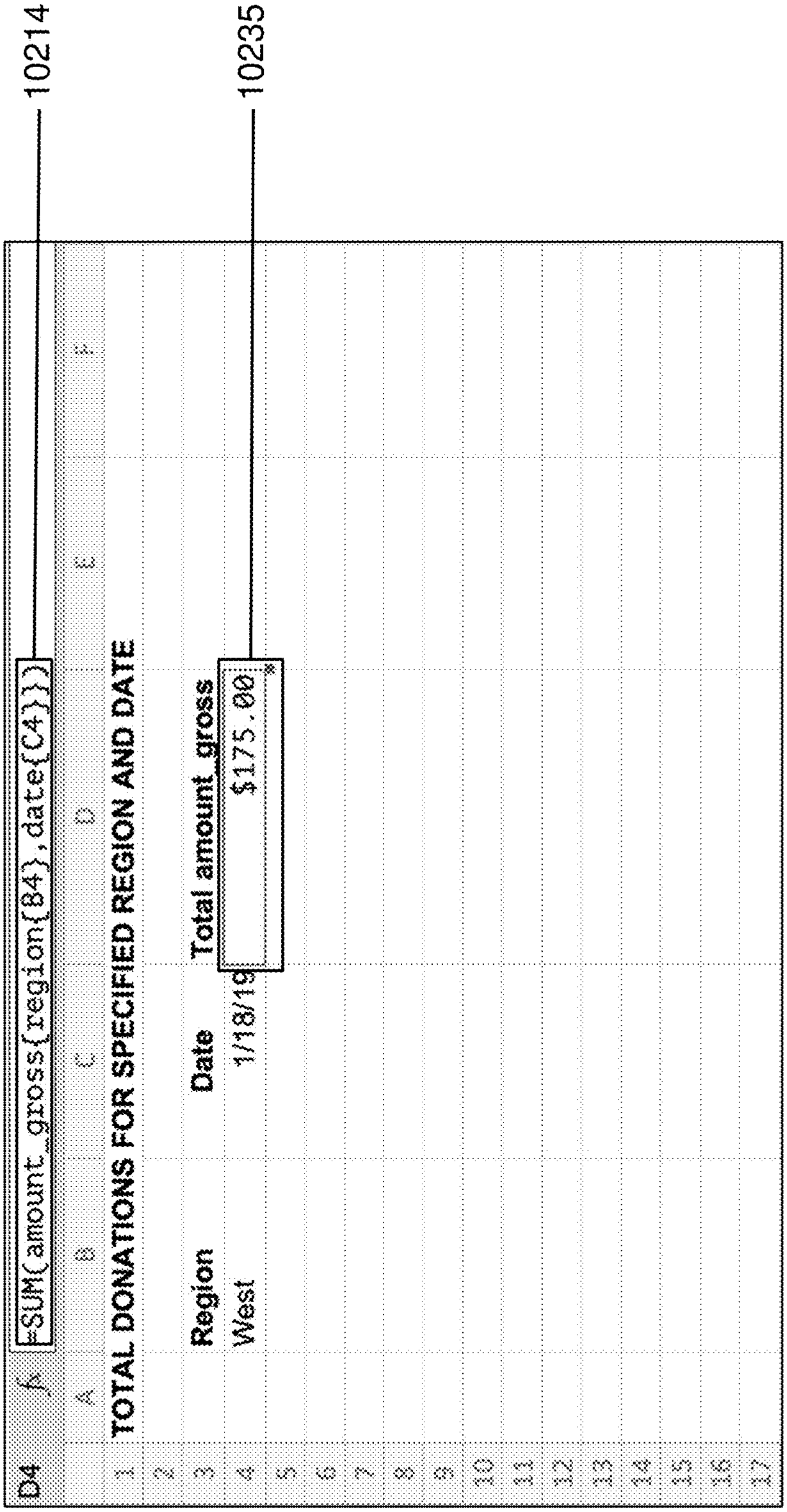

FIG. 100 examples the population of that date field in the formula 10027 automatically displaying the hint 10065 again evaluating because of the default/implicit value of the 'first (default) remaining' 10082 date (as explained in the plain language recitation 10085). The user then clicks on a cell holding the date they desire 10024 which automatically populates the cell reference into the formula 10127 in FIG. 101. It also automatically displays the hint 10165 with a result 10185, which reflects all of the previous changes. The plain language recitation 10194 reflects the date change and like in the case of region automatically traces the date value through the cell reference 'C4' to '1/18/19' 10196. The formula still uses one default retriever ('ALL') explained by 10192 in the recitation 10194 which is what the user wants so they hit ENTER to get the result 10235 shown in FIG. 102 with the formula available in the formula bar 10214.

In our technology the user has mostly been able to click selections where all the erroneous possibilities have been removed, where their clicks automatically fulfil any syntax or argument requirements of the functions, formulaic data language or data, where they automatically see their next set of options, where they know ahead of time whether the formula will successfully evaluate, and where if it will evaluate they see its result and get a plain language recitation of what the formula is doing. This eliminates typos, syntax mistakes, argument mistakes and through seeing the results step-by-step and getting a plain language explanation of what the formula is doing eliminates many of the logic mistakes made in writing spreadsheet formulas. It is a big improvement on having to remember all the data they want to reference, hunting typos, fixing mismatched parentheses and so on with todays' spreadsheets. In the final part of our technology, we will example how our Non-spreadsheet cell (NSC) formulaic data capabilities can be set up for data residing in spreadsheet cells to avail that data to all the capabilities previous described.

Formulaic Data Setup from Spreadsheet Cells

As previously described our technology employs information in its hints that goes well beyond the data dictionaries in the tools used for writing and debugging computer code. Such as the IDEs (with data extensions), REPLs and debuggers. Conventional spreadsheets have no comparable data dictionaries in their spreadsheet use of the cell data and not even in their data import tools and functionality. One of the dimensions that differentiates our technology is that it combines information gained from the equivalent of conventional data dictionaries and databases with information sourced from running queries on the data to better describe it and adding human generated descriptions of the data. The same processes can be emulated for spreadsheet cell data through a process and technology creating the same information. What follows is a description of embodiments that creates from spreadsheet cell data the information that would support the broad set of hint technologies described including supporting the creation of plain language recitations. While our previous filings have described the use spreadsheet cell source formulaic data, we have not exampled a process used to create it and to create its information used in our hints.

Figure 103:
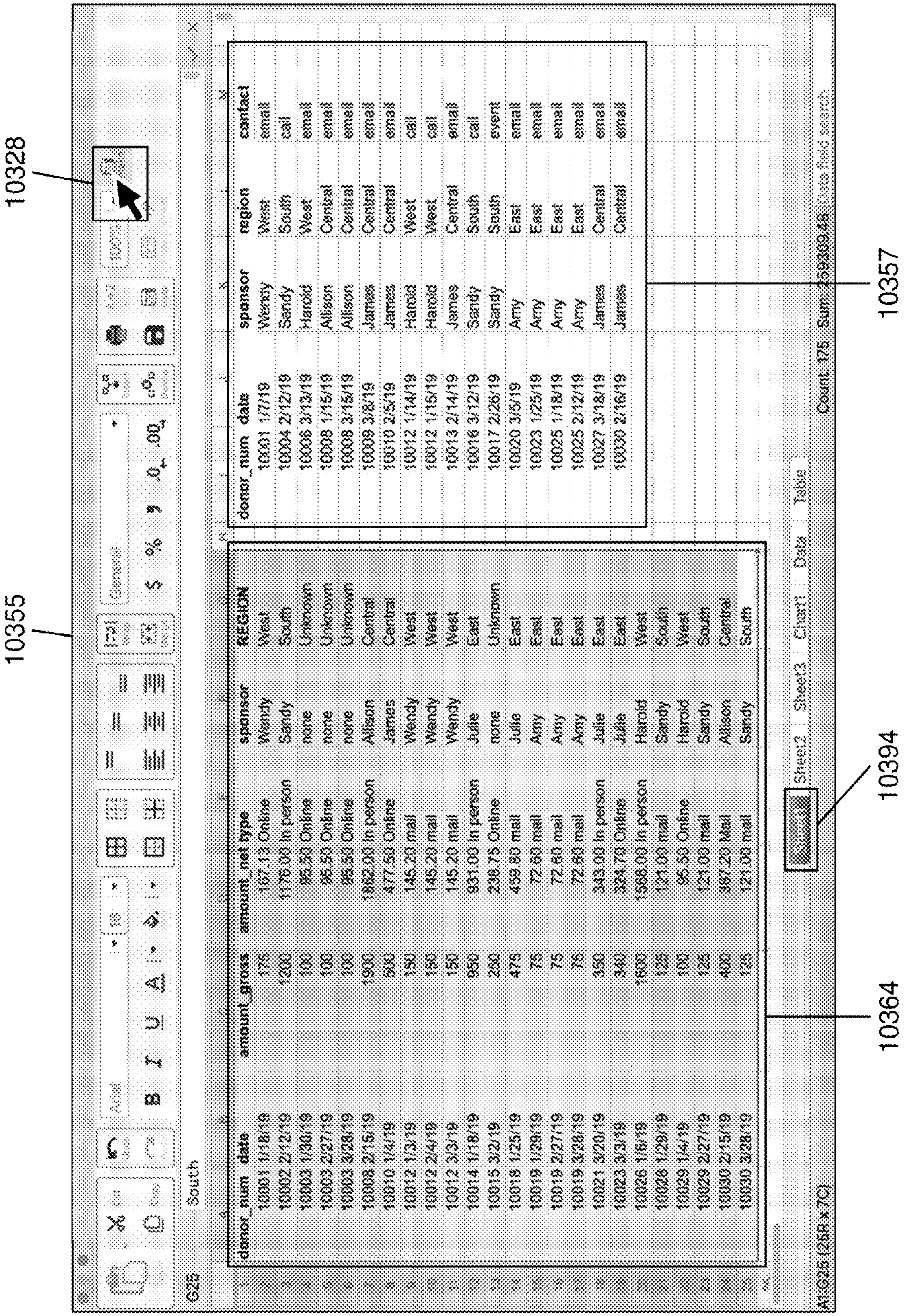
Figure 104:
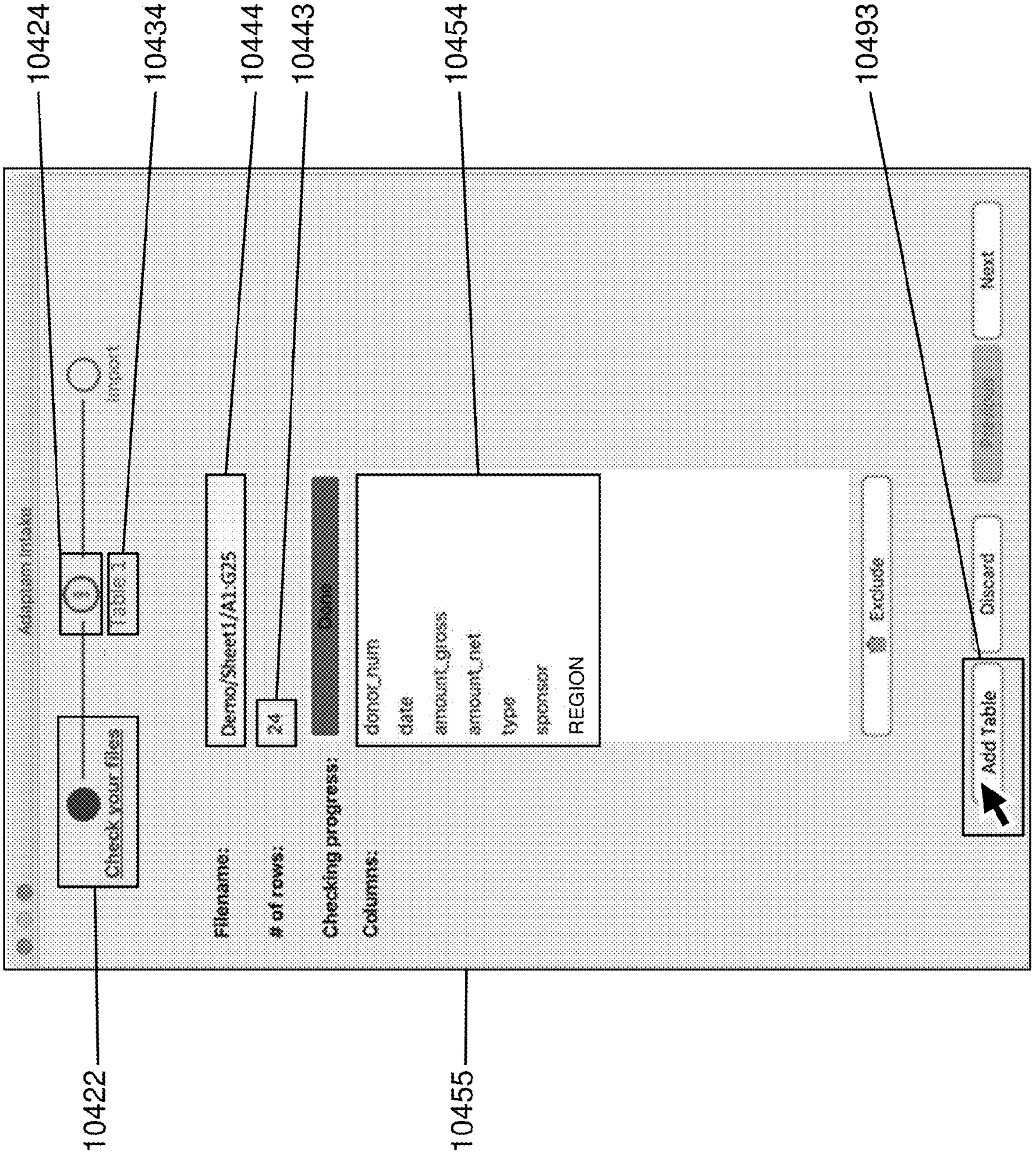

FIG. 103 shows a spreadsheet cell equivalent of two of the Non-spreadsheet Cell (NSC) formulaic data sets used in many of the previous examples. We have exampled very small data sets but the principals described in our embodiments scale to very large NSC data sets (e.g., hundreds of millions of rows) and for the spreadsheets cell sourced data, data sets as large as the largest spreadsheet can hold. While the NSC data resided external to the spreadsheet cells. this version of it resides in the 'Sheet1' 10394 worksheet within the spreadsheet 10355. The first data set 10364 is highlighted for the Intake process initiated by, in this embodiment, clicking the button 10328. It automatically triggers the beginning of the setup process shown in FIG. 104. Here the user sees that they are in the 'Check your files' step 10422 with a single table of data 'Table 1' 10434 which has at least one warning of an issue indicated by the yellow exclamation mark icon 10424. It has a 'Filename:' 'Demo/Sheet1/A1:G25' 10444 that indicates the source of the data is not external but the 'Demo' spreadsheet, worksheet 'Sheet1 in cells 'A1:G25'. It tells the user there are '24' 10443 '# of rows:' in the date set with the column headings 10454. The user then decides to add an additional table clicking the 'Add Table' button 10493. In this embodiment this then opens up a selection box and returns the user to the spreadsheet where they then select the data set 10357 in FIG. 103 to add as the second table. They then elect to repeat the process for a third time to finish populating the three tables 10524 shown in FIG. 105.

FIG. 105 examples the 'check your files' 10522 view UI 10555 for the three tables from spreadsheet cells which our Intake tool is setting up for formulaic data. The user notices that the Table 1 exclamation mark icon that was yellow 10424 (in FIG. 104) is now red, as are the other icons in 10524. In this embodiment it tells the user they must resolve problems before Intake will make the data available. In the 'Filename:' row each of the data locations is automatically recorded (10533, 10536 and 10538) as are the ' # of rows:' per each table 10545. The column headings for each table are shown in the 'Columns:' area (10563, 10566 and 10568). Since the user is now satisfied that they have the right data seeing the cell references, the number of rows and the column heading names, they click 'Next' 10599 to proceed with the process.

FIG. 106 through FIG. 113 example the formulaic data setup of the tables, data fields and additional information used in our technology's formulaic Data tab and the hints. The information that describes the data and allows our hints to make it simple to see the possible formula options and populate a selection as previously described.

Figure 106:
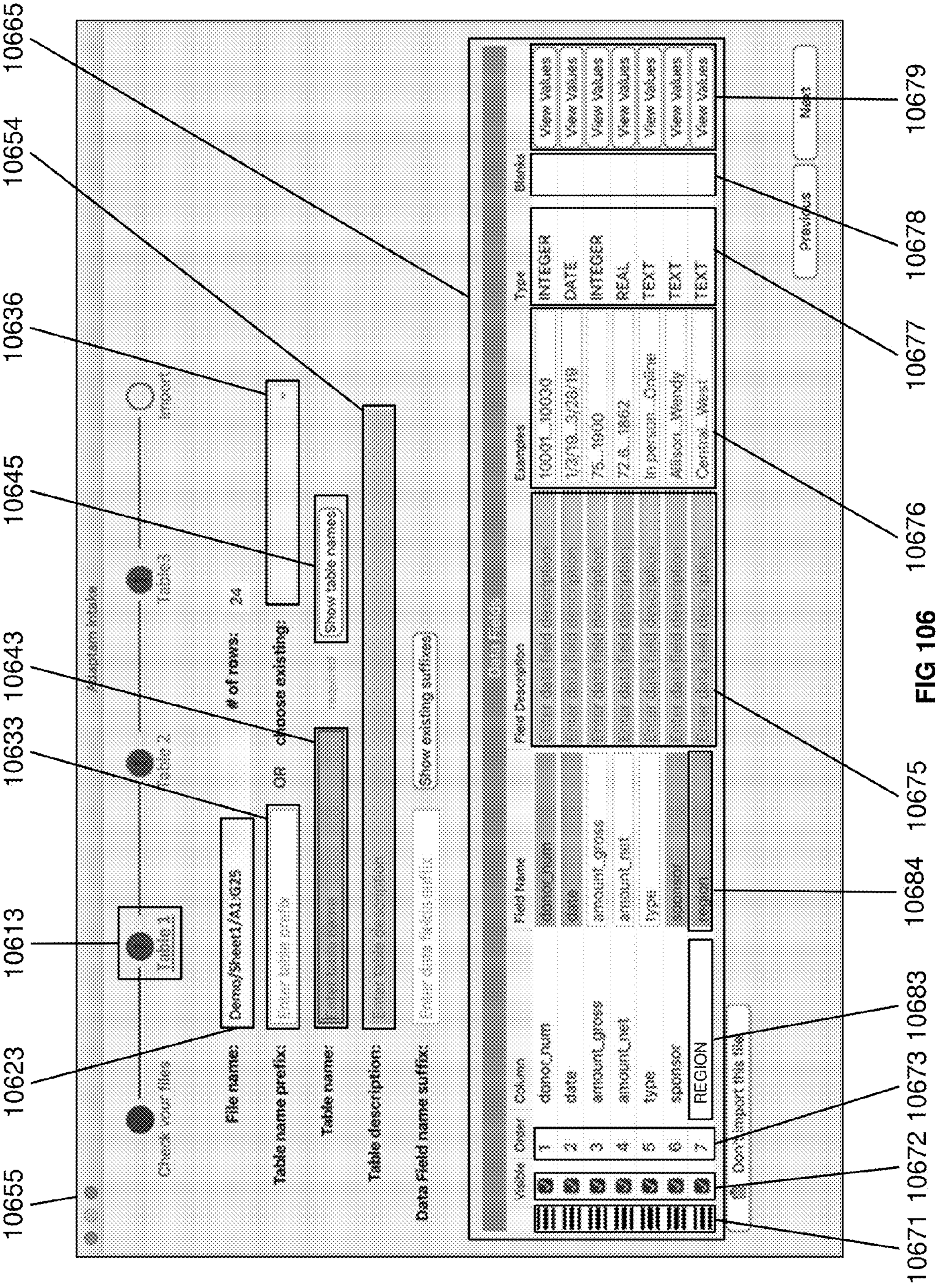

FIG. 106 examples the formulaic data table setup UI 10655 for the first ('Table 1' 10613) of the Intake spreadsheet cell data sets 'Demo/Sheets1/A1:G25' 10623. In this embodiment the red highlighted content (e.g., 10643) is to inform the user a change must be made for the setup to correctly work. The yellow highlighted content (e.g., 10654) is to inform the user that a change here would be highly beneficial but is not required. Hovering over any cell with the highlighting opens a popup telling the user what to do. A unique table name is a requirement of this embodiment and our technology does not remove the red highlighting 10643 until the user makes the name unique. To facilitate this there is a button 'Show table names' 10645 to display all the existing table names. Users with many tables also find it helpful to prefix related tables so they sort together and display together so our technology provides an optional entry for that 10633 that will then be applied to the table name in 10643. In situations where the user already has one or more tables of data in our application there is a selector to use one of the existing prefixes 10636 which is disabled here because the user is starting with an empty data set.

Our technology then supports many capabilities in refining the Data Fields 10665. In this example our technology has imported all the data specified in the cells using the first row as the column headings (e.g., 10683). It gives the user a drag and drop capability 10671 to change the order 10673 often used in hints or the Data tab. This gives users the opportunity to group like data fields together for easier to understand presentation. This embodiment also gives users the option to make invisible any data field 10672 as sometimes users later decide a field is not helpful or confusing. In this embodiment of our technology converts the column headings (e.g., 10683) from the data set (if the data has them) into the formulaic data field names (e.g., 10684) converting the characters to lower case and removing any non-database compatible characters. In this embodiment, it highlights red any field name (e.g., 10684) that is not unique relative to any data fields already in their data sets and in other tables being imported now. The user needs to make those unique before this embodiment of our technology will accept the Intake. The Field Descriptions 10675 are highlighted in yellow as a very important input. In this embodiment they are made yellow rather than red because the user may try out the data or just use it themselves with fields that they well understand. They can come back later and add the descriptions once they are happy with how it works or before they share the data with other people who are less familiar with it. The Examples 10676 are autogenerated in this embodiment linking the first and last values with a ' . . . '. This requires Intake to query or run the equivalent of a MIN and MAX function over the data to produce the values. The user is given the ability to replace the autogenerated values with an inputted value as previously discussed for the NSC formulaic data hints. The next column of information is the data type 10677 which is autogenerated, here differentiating INTEGER and REAL although other embodiments could simplify both of those to NUMBER as previously mentioned for hints (for the non-math inclined users). The next information is an autogenerated evaluation of whether the data included empty cells/blanks where in this embodiment if the answer is no is left blank 10678 (but easily could be Y or N or Yes and No). Finally, to aid the user the 'View Values' buttons 10679 give the user a complete set of the values to aid them should they want to override any of the autogenerated values in the 'Examples'.

Figure 107:
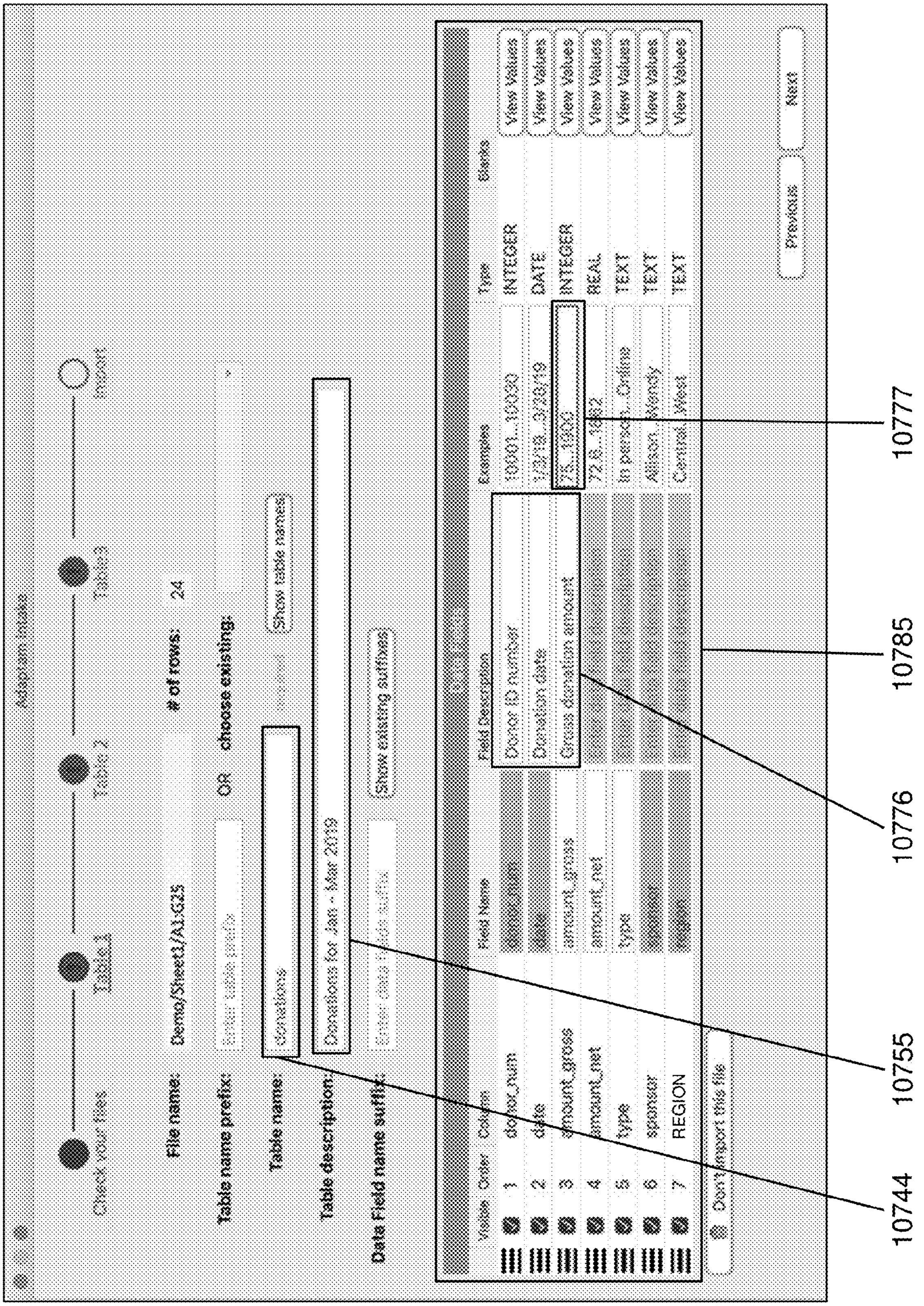
Figure 109:
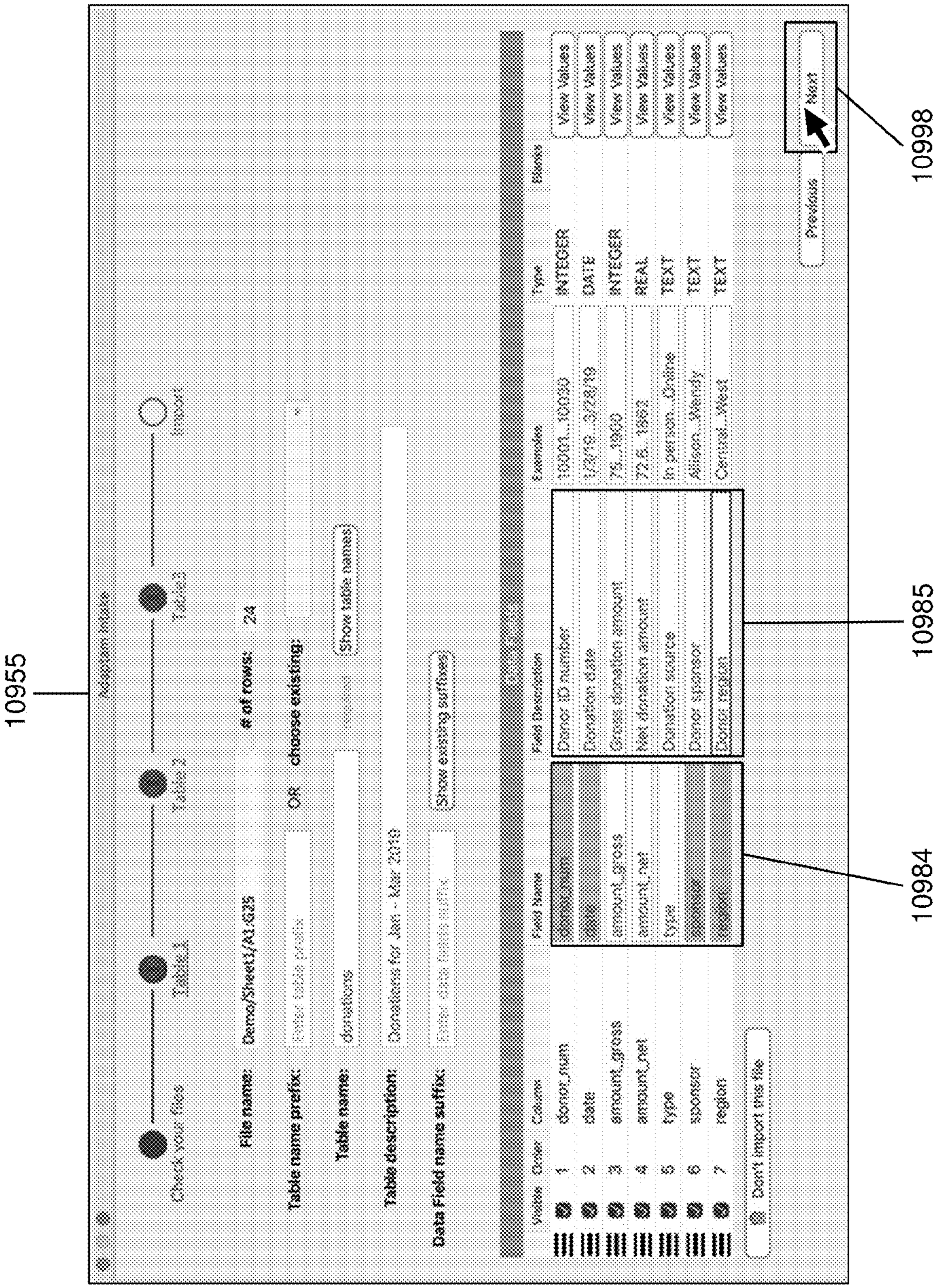

FIG. 107 examples the user having partially filled out the Intake screen in FIG. 106. The user has filled in the 'Table name:' 'donations' 10744 and the 'Table description' 'Donations for January-March 2019' 10755. They have also filled in three of the 'Field Description' values '10776 and have just opened one of the 'Examples' '75 . . . 1900' 10777 to replace the autogenerated information. FIG. 108A expands out the 'Data Fields' part of the Intake screen 10785 in 10845 showing the opened 'Examples' '75 . . . 1900' 10847. The user then types 'USD' into that input 10847 and hits ENTER to get the outcome USD' 10877 shown in FIG. 108B. The user then decides to revert back to the autogenerated value before finishing all the 'Field Description' values 10985 in FIG. 109, thereby eliminating all the yellow highlighting in this table. At this point the user decides to not alter the red highlighted 'Field Name' values 10984 but instead to change the other instances of those field names in the rest of the Intake to thereby remove the red highlighting (duplication of the field name). Therefore, the user hits 'Next' 10998 to move to the working on the next table.

Figure 110:
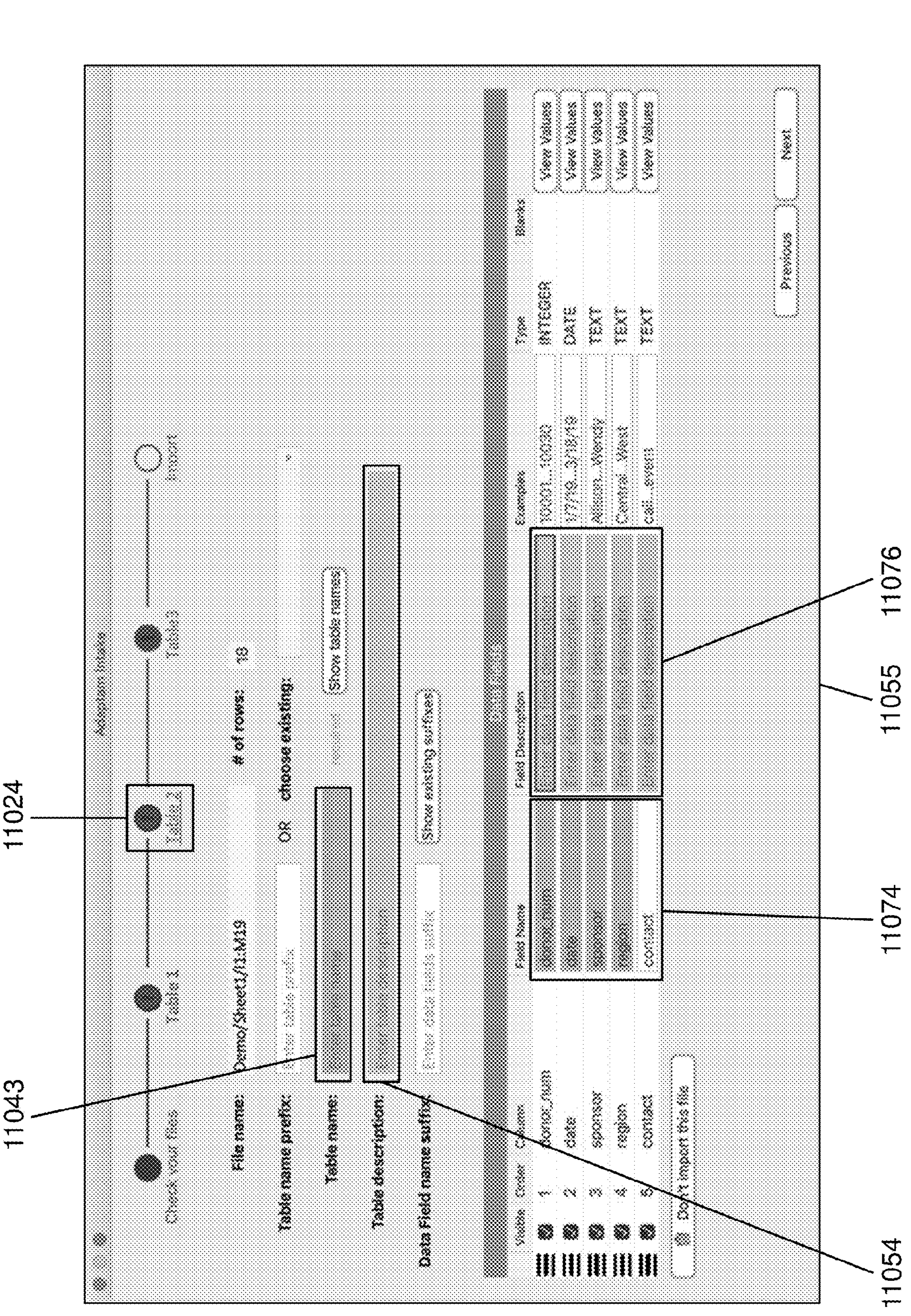
Figure 111:
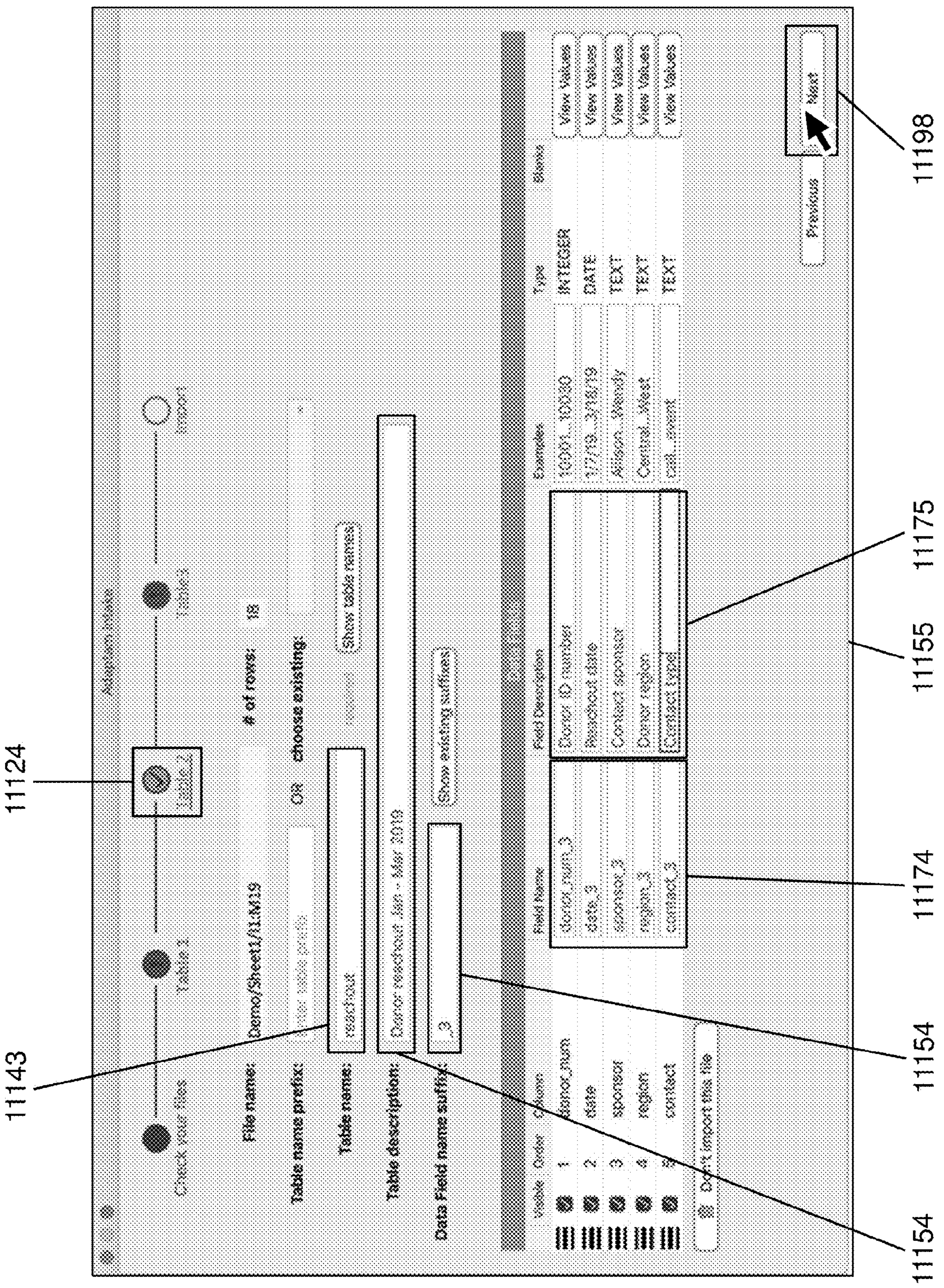

FIG. 110 examples what the user then sees for 'Table 2' 11024 in the Intake UI 11055. They see red highlighted the 'Table name' input 11043 and four of the five 'Field Name' inputs 11074. They see all the 'Field Description' inputs 11076 yellow highlighted. They also see the other autogenerated information and capabilities described for the previous table. FIG. 111 then examples the user having filled or altered all the highlighted inputs. The 'Table name' input 11143, the 'Table Description' 11154 and the Field Description' inputs as described before. They rectify the four red 'Field Name' inputs 11074 (in FIG. 110) by entering in the 'Data Field name suffix' input '_3' 1154 which appends the '_3' suffix to each of the 'Field Name' inputs 11174. In one move they have fixed the four duplicated field names and done it with a suffix that makes it easy to quickly understand all the fields in the same table. The result of all these inputs changes the previously red exclamation icon 11024 for 'Table 2' in FIG. 110 to the green check one 11124 telling the user there are no problems in this Intake table. So, the user clicks the 'Next' button 11198 to move to the final table.

Figure 112:
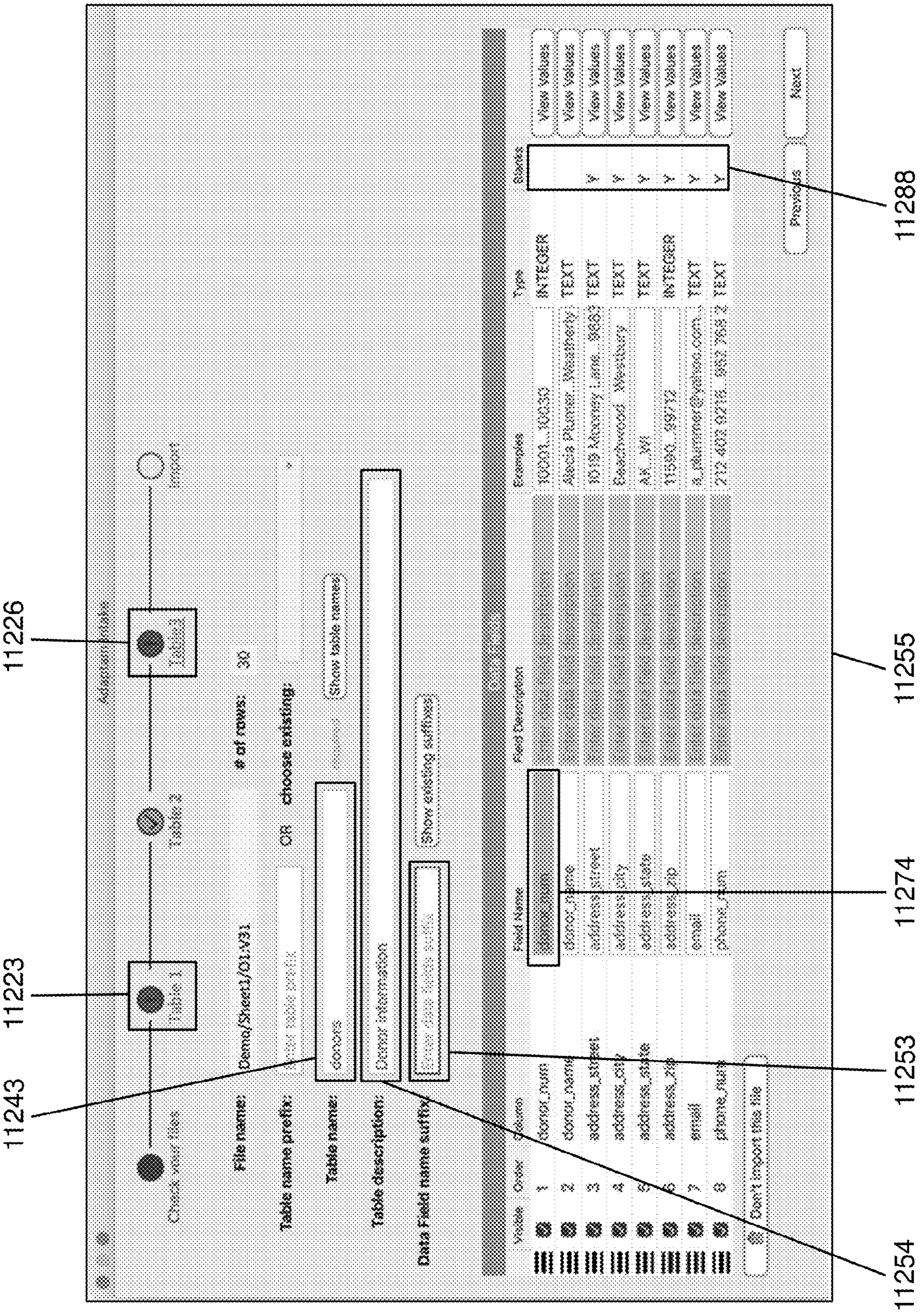
Figure 113:
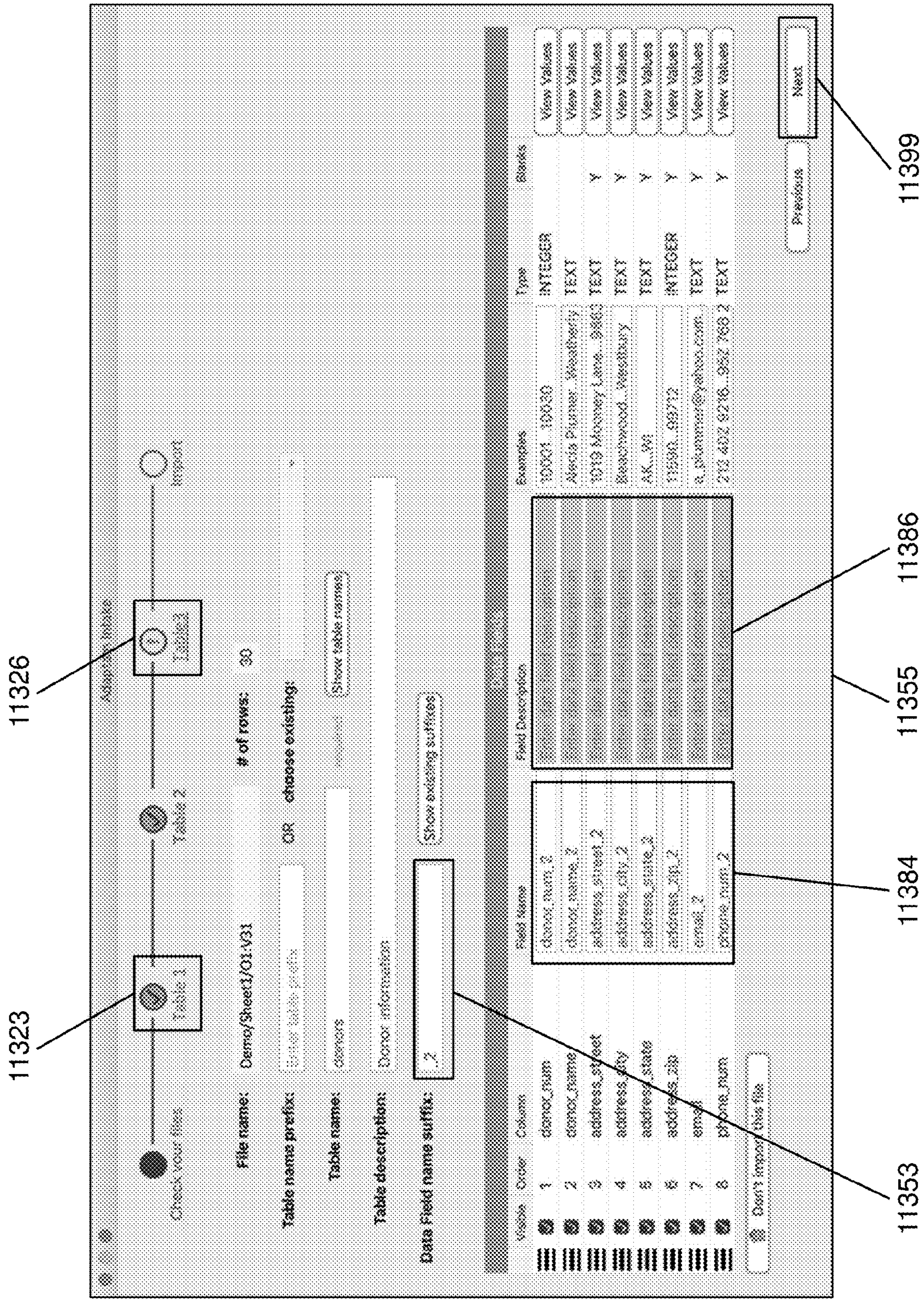

FIG. 112 examples that Intake UI 11255 where the user has already inputted the 'Table name' input 11243 and the 'Table Description' 11254 inputs as described before. In this table the 'Y' for yes to blank cells 11288 is shown for six of the eight rows. The user clicks into the 'Data Field name suffix' input 11253 and then types '_2' to get the result in FIG. 113 where all the 'Field name' inputs 11384 within the Intake UI 11355 have appended the suffix '_2' which then turns the 'Table 1' icon from the red exclamation mark 11223 (in FIG. 112) to the green check mark 11323. It also turns the 'Table 3' icon from the red exclamation mark 11226 (in FIG. 112) to the yellow exclamation mark 11326. In this embodiment, because there is no red shown for any of the three tables the user could move to complete the Intake setup Import. However, the user instead fills in all the 'Field Description' inputs 11386 before clicking the 'Next' button 11399 to proceed to the Intake setup Import.

Figure 114:
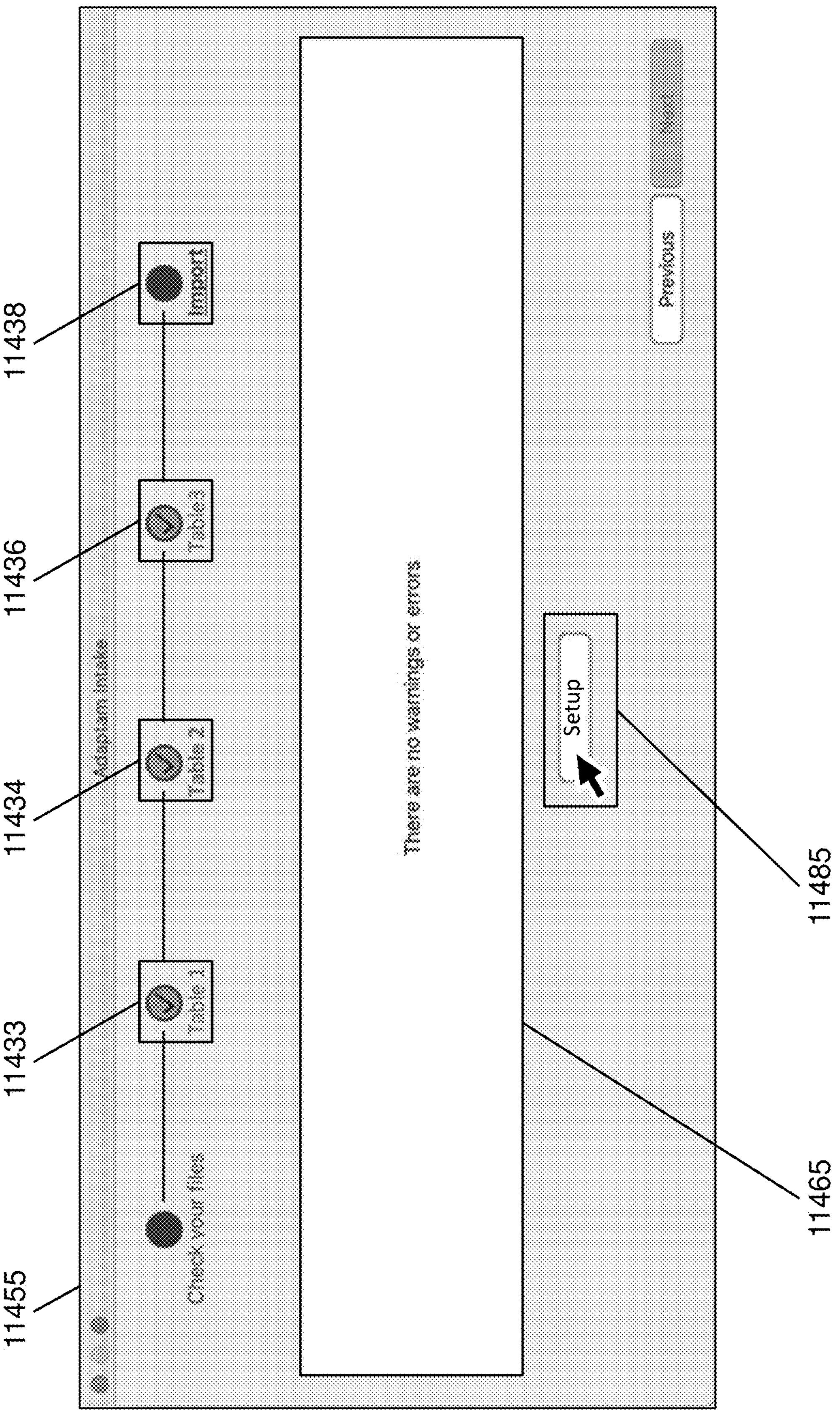
Figure 115:
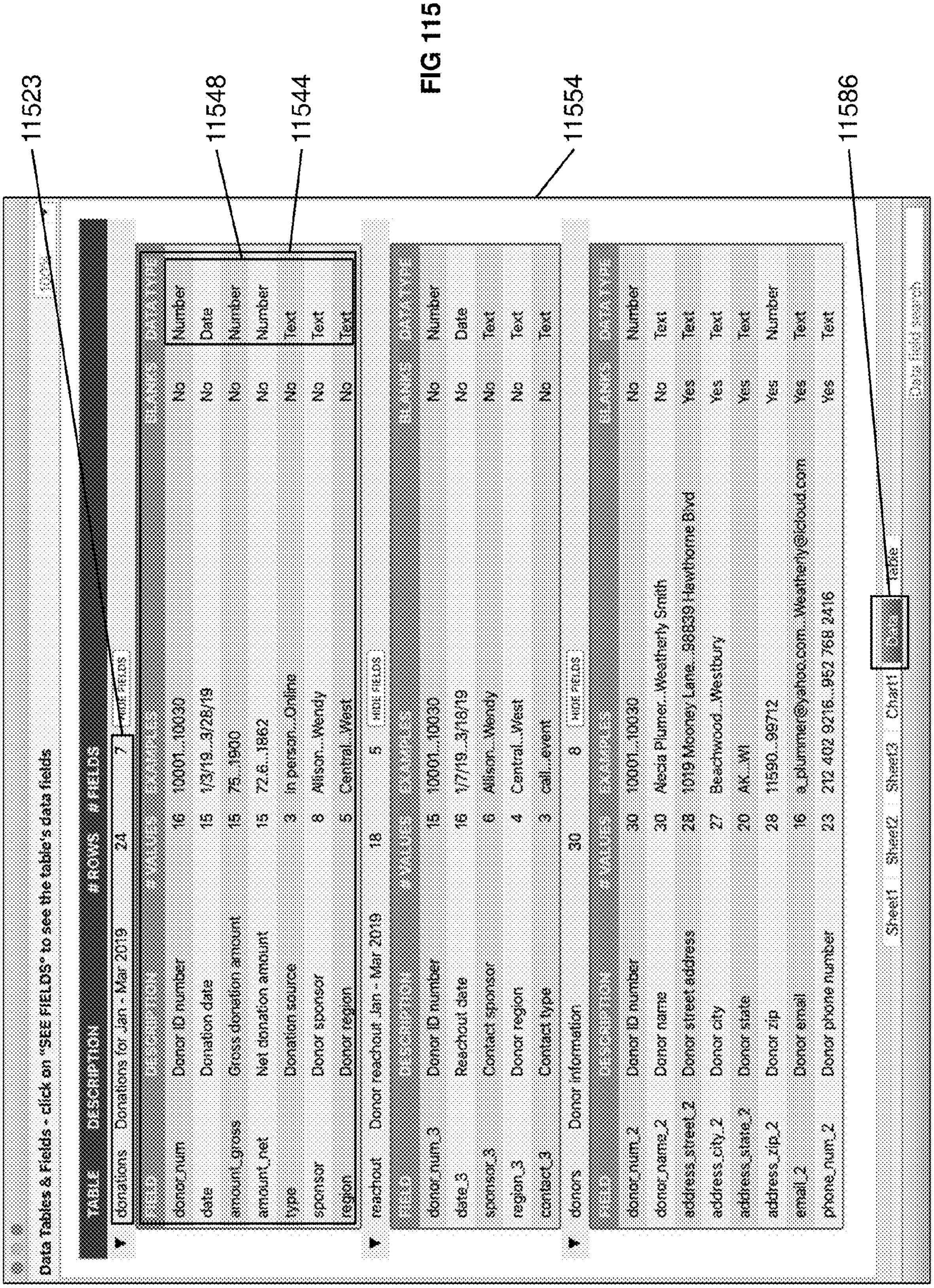

FIG. 114 examples that Intake setup Import step 11438. Because all the table icons (11433, 11434 and 11436) are green and the box for Errors and Warnings 11465 displays 'There are not warnings or errors', the user can successfully import the Intake setup. Therefore, the user clicks the 'Setup' button 11485 to get the Data View setup in the Spreadsheet Data tab 11586 shown in FIG. 115. Because the user employed the exact same inputs as setting up the equivalent external Non-spreadsheet Cell (NSC) data this cell sourced data works identically as previous described for the formulaic data formulas, error identification/emphasis, error explanations and all the hint embodiments. This version shows the user opted to simplify the Date type form INTEGER and REAL to Number as shown in 11548. Just like what was shown for the Non-spreadsheet Cell (NSC) externally sourced data the same information is shown for the TABLES 11523 and for the FIELDS 11544. Likewise, the spreadsheet cell sourced data provides the same 'Table' 11686 view exampled in FIG. 116 showing the data 11655 the same way as if it were NSC sourced. For of our previously described technology either externally sourced Non-spreadsheet Cell (NSC) data or spreadsheet cell sourced data taken through the right setup steps supports our described embodiments herein. Both also support easy update of the data within our application when additional rows of data are added to the source data. For the in-cell sourced data our system supports automatic updates or additional contiguous rows of data or in a more manual setting user triggered updates, both automatically retaining all the setup actions previously done by the user/administrator (e.g., any changes to table name, field names, field descriptions, order, visibility, or any other setting). In the event of addition or additions of contiguous columns of information our automatic updates can be set to proceed with auto addition or hold off addition until setup actions are done (e.g., make that field or fields not visible until the user/admin sets them up and clicks them visible like in FIG. 106 10672)

Computer System

FIG. 117 is a block diagram of an example computer system, according to one implementation. Computer system 11710 typically includes at least one processor 11714 which communicates with a number of peripheral devices via bus subsystem 11712. These peripheral devices may include a storage subsystem 11724 including, for example, memory devices and a file storage subsystem, user interface input devices 11722, user interface output devices 11720, and a network interface subsystem 11716. The input and output devices allow user interaction with computer system 11710. Network interface subsystem 11716 provides an interface to outside networks, including an interface to communication network 11785, and is coupled via communication network 11785 to corresponding interface devices in other computer systems or in the cloud and usable for cloud applications.

User interface input devices 11722 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 11710 or onto communication network 11785.

User interface output devices 11720 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 11710 to the user or to another machine or computer system.

Storage subsystem 11724 stores programming and data constructs that provide the functionality of some or all of the modules and methods described herein. These software modules are generally executed by processor 11714 alone or in combination with other processors.

Memory 11726 used in the storage subsystem can include a number of memories including a main random-access memory (RAM) 11730 for storage of instructions and data during program execution and a read only memory (ROM) 11732 in which fixed instructions are stored. A file storage subsystem 11728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 11728 in the storage subsystem 11724, or in other machines accessible by the processor.

Bus subsystem 11712 provides a mechanism for letting the various components and subsystems of computer system 11710 communicate with each other as intended. Although bus subsystem 11712 is shown schematically as a single bus, alternative implementations of the bus subsystem may use multiple busses.

Computer system 11710 can be of varying types including a workstation, server, computing cluster, blade server, server farm, or any other data processing system or computing device. Due to the ever-changing nature of computers and networks, the description of computer system 11710 depicted in FIG. 117 is intended only as one example. Many other configurations of computer system 11710 are possible having more or fewer components than the computer system depicted in FIG. 117.

SOME PARTICULAR IMPLEMENTATIONS

Some particular implementations and features are described in the following discussion.

Some Particular Implementations—as You Type Error Identification

One implementation of our technology provides the user with as you type error checking that does not wait for the user to hit ENTER (or RETURN on a Mac) to evaluate the for formula and provides an error message identifying/emphasizing the token (character) or group of tokens (characters) that cause an error as shown in FIG. 7A identifying/emphasizing three different errors in the in-cell and formula bar formulas. Step by step as you type automatic displays of the error messaging identifications/emphases are shown in FIG. 10A through FIG. 11D for creating the formula in FIG. 7A. Those steps show both the creation of error messages and disappearance/resolution of some as the user types.

This method and other embodiments or implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features.

In another implementation of our technology the error message includes both identifications/emphases and error explanations. FIG. 7B through FIG. 9D show different embodiments of the combined error message identifications/emphases and error explanations. FIG. 12 through FIG. 16 contrast the post-formula evaluation broad category error messages of the current spreadsheet error explanations with the specificity of our technology as you type error explanations. FIG. 12 compares six error value and two formula completion error message examples in Microsoft Excel with examples the same formula outputs of our technology. Our technology specifically identifies/emphasizes each error and provides a specific error explanation identifying the token or group of tokens that create the error and explaining specifically why it is an error. Not the broad Microsoft Excel error value categories (exampled in FIG. 13A through FIG. 14) or the similarly broad categories shown in Google Sheets for the same eight formulas (FIG. 16).

An implementation of our technology automatically visibly traces cell references in our error explanations so the user can read the explanation 'A6 is dog not a number—Algebraic error' (see FIG. 12 1238) and see the traced data value 'dog' that is in 'A6' (see FIG. 12 1241). They avoid having to do multiple clicks to manually trace the value in Excel (FIG. 15 and FIG. 15C) and in Google Sheets would simply need to look for the cell (which becomes hard if it is not in the visible part of the spreadsheet).

Implementations of our technology automatically display the different combinations of our error message error identifications/emphases and error explanations shown in FIG.

7B through FIG. 9D for algebraic formulas, FIG. 27A and FIG. 27B for FUNCTION formulas, FIG. 30A through FIG. 31B for formulaic data formulas and FIG. 36 for formulas combining all three types. Those combined error messages would be generated as you type paralleling what was shown in FIG. 10A through FIG. 11D. Those different implementations include embodiments where the error identification/emphasis is in; the in-cell formula and/or formula bar formula; where they are in a UI visual showing both the error identification/emphasis and the error explanations; or in all of them.

In one embodiment of our technology the error explanation is automatically displayed in a UI visual as exampled in FIG. 27B. In another embodiment the error identification/emphasis and error explanation are automatically displayed in a UI visual as exampled in FIG. 7B through FIG. 9B, FIG. 27A, FIG. 30A through FIG. 31B, and FIG. 36. In a related embodiment the error identification is automatically generated in the in-cell and/or the formula bar formulas as exampled in FIG. 7B through FIG. 8A, FIG. 9C through FIG. 11D, FIG. 27A, FIG. 27C, FIG. 30A through FIG. 31A, and FIG. 36.

As we discussed previously there are numerous technical reasons why current spreadsheet technologies do not identify more than one error. And why broader programming technologies do not identify more than one error caused by the values of the data (i.e., requiring running the data). An implementation of our technology analyses the formula using the data and thereby provides error messages separately for more than one error as shown in FIG. 7A through FIG. 9B, FIG. 30 through FIG. 31B, and FIG. 36.

Some users may find every character as you type changing of the error messages distracting, so another implementation would deliver as you type changes at set intervals of characters. This interval could be set by every so many typed characters or it could be set by algebraic, function or formulaic data arguments that determine the interval of refresh. Thereby retaining the ability to see errors as you type before you complete a cell formula but at a rate of refresh that is not distracting to a particular user.

Another implementation of our technology helps differentiate different categories of errors which potentially require different resolution actions by users. FIG. 37B and FIG. 38B show an embodiment where error identifications/emphases are color differentiated. The yellow colored category are errors where additions or changes to the formula after the error identification/emphasis could resolve the problem so it is more of a warning than a for-sure error. The red colored category is errors which no change after the identified/emphasized token will fix (a for sure error) and therefore colored to more catch the eye of the user. This is only one of the ways our technology supports differentiating different categories of errors with different error messages.

Implementations of our technology apply to algebraic formulas, shown in FIG. 7B through FIG. 9D, to FUNCTION formulas as shown in FIG. 27A and FIG. 27B, to formulaic data formulas as shown in FIG. 30A through FIG. 31B, and to formula combinations of the three types, as exampled in FIG. 36.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Some Particular Implementations—Post Evaluation Error Identification

Our technology also improves on the post formula evaluation errors in that it separately identifies one or more errors with an error message that specifically identifies/emphases the token (character) or group of tokens (characters) that cause each error and includes an error explanation describing each error. That error explanation is specific to the error not a broad category of errors. Examples of these error messages are shown for: algebraic formulas, FIG. 17A through FIG. 18B; for FUNCTION formulas, FIG. 28A through FIG. 29; for formulaic data formulas, FIG. 34A through FIG. 35; and work for formulas combining the different formula types.

This method and other embodiments or implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features.

A further implementation of our technology visibly traces cell references and cell values involved in an error. FIG. 17B examples this for one of our after-evaluation formula completion popup error messages 1787 where the error explanation 'CS 0 in C5 causing # DIV/0 error' visually traces the C5 cell value of 0 and places it in the explanation so the user doesn't have to do anything more than read the explanation to specifically understand the cause of the error. FIG. 35 examples this for one of our after-evaluation error value error messages 3575, in this embodiment shown in the lower left-hand corner of the spreadsheet status bar. The error explanation 'should be text but instead is a date 1/1/19' 3574 did the cell reference tracing automatically for the user putting it all in the error explanation. These error explanations have also further exampled the specificity of our error explanations opposed to the existing spreadsheet error category explanations lacking specific error identification/emphasis.

FIG. 18A, FIG. 29 and FIG. 35 example implementations of our technology where formulas that evaluate to error values, e.g., #VALUE!' 1824 in FIG. 18A, in the cell while automatically displaying the error explanation(s) in a status/error bar visual. In these embodiments that happens to be in the lower left corner of the spreadsheet but could be positioned elsewhere.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Some Particular Implementations—Selection of Formulaic Data Fields for Evaluation In a spreadsheet where users have access to many formulaic data fields, they need a way to easily find the field they want to use in formula. The selection of that field to evaluated as the object of a formula starts entirely unconstrained (i.e., it could be any field the user has access to). So, for users who don't start knowing the exact field that they want, they need to see the fields and additional information in a way which will allow them to decide what formulaic data field to select. Our implementations give users different ways to see lists of the formulaic data fields and different sets of the field's other information to make that selection decision while retaining the ability to automatically populate their selection into the spreadsheet cell formula.

This method and other embodiments or implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features.

An implementation of our technology for selecting and populating into the spreadsheet formula a formulaic data field to be evaluated that starts from the position in the spreadsheet formula where the formulaic data field to be evaluated is to be populated, as shown in FIG. 41A and FIG. 47A. It then responds to typed inputs (see FIG. 40A, FIG. 41B, FIG. 50A and FIG. 50B) and/or UI selection (see FIG. 47A 4734 delivering FIG. 47B and FIG. 95 9536 delivering FIG. 96A and FIG. 96B) to display a list of selectable formulaic data fields with additional information, where the additional information contains some (non-data derived) human generated values (e.g., 4064 in FIG. 40A, 4177 in FIG. 41B and 4773 in FIG. 47B). Where upon selection the formulaic date field automatically populates into the starting position in the spreadsheet formula, as shown in FIG. 40B 4085 and FIG. 42B 4295.

In an implementation of our technology the typed inputs trigger character searches of the formulaic data fields to display the list of selectable formulaic data fields and their related additional information, as shown in FIG. 40A 4065 and FIG. 50A 5054.

In another implementation of our technology the typed inputs trigger character/token searches of the formulaic data fields and some of the non-data derived human generated additional information to display the list of selectable formulaic data fields and their related additional information, as shown in FIG. 41B, FIG. 44 and FIG. 50B. Thereby giving users a broader set of information included in their character/token search.

In an implementation of our technology some of the additional information presents a selectable option (e.g., 4367 in FIGS. 43 and 4488 in FIG. 44) to move to another list of selectable formulaic data fields. In an implementation of our technology that other list of selectable formulaic data fields are the formulaic data field column headings in a table configuration showing some of the data, as shown in FIG. 45. Although that selectable option could take users to other UIs presenting them with information and the ability to select a field.

In an implementation of our technology some of additional information (non-data derived) human generated values are generated by human overriding of data generated values as would be exampled in FIG. 44 'DATA EXAMPLES' '75 . . . 1900' 4447 were the user or admin elected to override that algorithmic data generated value with 'USD' to tell the user the currency the value is in. Such as what is exampled in FIG. 108A 10847 and FIG. 108B 10877. There are many reasons why it would be preferable to replace data examples with human generated information and as we will describe later when we explain that data setup/intake. However, there are also reasons why the user/admin doing that might only want to do it in some of the field situations thus yielding a set of additional information which is a blend of human and data generated values.

In another implementation of our technology the displayed list of selectable formulaic data field is screened to only include the data types required by the argument usage in an algebraic formula (e.g., see FIG. 53B versus FIG. 53A) or a function (e.g., see FIG. 55B versus FIG. 55A). Thereby situationally eliminating those selections that would result in an error.

Another implementation of our technology supports the user who has less idea about the data they want and therefore would like to see a more wholistic view of what they have before selecting a formulaic data field. For that situation our technology has a UI selection trigger, in this example the 'View Data' button FIG. 47A 4734, that displays a list of selectable formulaic data fields organized by their tables as shown in FIG. 47B. This could have been just an organized list but in this example allows the user to expand and collapse the list of the fields which is very convenient in situations where the user has a large number of formulaic data fields available to them. In this example it was triggered by a click but could have been triggered by a shortcut or other mode.

In a further implementation of the preceding data view list option, the organizing tables information includes (non-data derived) human generated values and a selectable option to move to another list of selectable formulaic data fields, as shown in FIG. 47B. In this example the 'DESCRIPTION' for each of the tables is (non-data derived) human generated values telling the user what the table is. The purple 'TABLE' names 'donations' and 'donors' in 4764 are clickable to move to those tables as clicking 'donors' would take the user to the list 4555 shown in FIG. 45. Where the ability to select a formulaic data field remains active as described in the instruction line 'Select the table desired and click the field you want in blue' 4536. FIG. 45 examples the other listing of selectable formulaic data fields 4545 which are the formulaic data field column headings in a table configuration showing some of the data 4565.

In another implementation of our technology the table organized list of formulaic data fields is screened to only include the data types required by the argument usage in a function (e.g., see FIG. 57B versus FIG. 57A). The same type of screening would apply for an algebraic formula where its impact would be the same as SUM, limited to numeric formulaic data fields.

Another implementation of our technology is for users who will gain confidence in their selection of a formulaic data field by seeing some of the data. As previously exampled, selecting and populating the formulaic data field starts from the position in the spreadsheet where the formulaic data field is to be populated. It responds to a UI selection, like clicking 4735 in FIG. 47A. or other action to open a list of selectable formulaic data fields with additional information as shown in FIG. 45. Where the list of selectable formulaic data fields are the column headings of a table (e.g., 4545 in FIG. 45) and the additional information contains data rows (e.g., 4565 in FIG. 45) for the formulaic data column headings. And where upon selection the formulaic date field automatically populates into the starting position in the spreadsheet formula, as shown in 4634 in FIG. 46A populating 4695 in FIG. 46B. If the first table viewed does not have the data desired, the user can select and load any desired table (4533 in FIG. 45) which will load additional lists with selectable formulaic data fields.

In another implementation of our technology for users who will gain confidence in their selection of a formulaic data field by seeing some of the data. The selectable formulaic data field column headings are screened to only include the data types required by the argument usage in a function (e.g., see FIG. 56B versus FIG. 56A). The same type of screening would apply for an algebraic formula where its impact would be the same as SUM, limited to numeric formulaic data fields.

Once the user has selected the formulaic data field to be evaluated in the formula, they move into option selection hints where there is a much smaller number of selection options which can be automatically displayed for the user. From this point forward in our technology a user can use our hints to eliminate typos, incorrect syntax, and incorrect inputs leaving them to focus entirely on making sure the logic of their formula is correct.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Some Particular Implementations—Selection of Formulaic Data Field Filters

With a formulaic data field selected for evaluation our app is ready to provide the user with a very tailored hint displaying their formula options and allowing them to point and click one selection repeating the process with new tailored hint until they are done with the formula or that formulaic data field evaluation within the formula. As previously described our technology tailors those hint option displays employing many different analyzer technologies.

This method and other embodiments or implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features.

One implementation uses direct and indirect formulaic data field filters to determine the options to be displayed in the hint. The hint displays selectable options limited by the formulaic data field for which it is being displayed. Those options include direct and indirect filter options for the formulaic data field where the direct filter options are limited to those of the formulaic data field itself. FIG. 64A examples the direct filter as 'RETRIEVERS' 6424 while FIG. 64B examples two forms of direct filters 'RETRIEVERS' 6474 and 'VALUES' 6464 and in both situations the values are limited to the field for which the hint is displayed 'donor_num' (6411 and 6452). The indirect filter options are limited to fields from the same table as the formulaic data field and/or match/join fields for that formulaic data field. FIG. 64A examples the indirect filter options labelled 'CONSTRAINT' 6435 that are limited to the fields from the same table as the field for which the hint 6425 is displayed 'donor_num' 6411. FIG. 64B examples the indirect filter options labelled 'MATCH FIELDS' 6495 that are limited to the match/join fields for that formulaic data field 'donor_num' 6452 for which the hint 6475 is displayed. The app then supports selection of an option from the display into the spreadsheet formula as exampled in FIG. 60B delivering the result and hint in FIG. 61B which then delivers the result and hint in FIG. 62B which then delivers the result and hint in FIG. 63B. Then finally populating all the selections into the spreadsheet formula as exampled in FIG. 63C.

In an implementation of our technology the evaluated formulaic data field indirect constraints are only limited to fields from the same table as the formulaic data field. This is exampled in FIG. 64A where the only indirect filters shown are formulaic data field names displayed in the 'CONSTRAINT' 6435 section, that are from the same table as the evaluated formulaic data field 'donor_num' 6411 for which the hint is displayed.

In another implementation of our technology, the indirect filter formulaic data fields are limited to match/join fields for that formulaic data field. This is exampled in FIG. 64B where the only indirect filters shown are formulaic data field names displayed in the 'MATCH FIELDS' 6495 section, that are limited to the match/join fields for that formulaic data field 'donor_num' 6452 for which the hint 6475 is displayed. These match/join fields can be determined many different ways, as previously discussed, and are field specific (i.e., 'donor_num" specific in this example).

In an implementation of our technology the match/join formulaic data field indirect constraints are limited to fields from the same table as the match/join formulaic data field. This is exampled in FIG. 87 where the only indirect filters shown are formulaic data field names displayed in the 'CONSTRAINT' 8775 section, that are from the same table as the match/join formulaic data field 'donor_num' 8737 for which the hint is displayed.

In our spreadsheet the same formulaic data field evaluation can be very different based on whether it is in a situation where the result is a single value (e.g., in a cell or in an algebraic formula) or a range of values (e.g., in functions like SUM, MAX, AVERAGE). Therefore in an implementation of our technology the options displayed differ by whether the evaluated field yields a single value or range value as exampled in FIG. 65A and FIG. 65B. In an implementation of our technology those options can further differ between spreadsheet range functions because various direct filters are inapplicable for some functions. Therefore, the indirect filter options differ as exampled in FIG. 66A for SUM versus FIG. 66B for MAX evaluating the same formulaic data field.

In another implementation of our technology the hint options displayed differ by whether the evaluated field in this particular situation is limited to providing only a single value or can provide either a single or multiple values (range values) as exampled in FIG. 65A and FIG. 65B. Where the field 'amount_gross{ } in the formula 6512 in FIG. 65A is limited to evaluating to single value and therefore has a hint 6535 that only has single value 'RETRIEVERS' 6524 displayed and in its 'See more . . . '. Where the same field 'amount_gross{ } in the formula 6552 in FIG. 65B is used as an indirect constraint/filter which is not limited to evaluating to single value and can evaluate to either a single or multiple values. Therefore, in this embodiment it has a hint 6585 that displays multiple value 'RETRIEVERS' 6574 (as those are the most frequently used ones) and in its 'See more . . . ' will have both single and multiple value retrievers.

In another implementation of our technology the hint options displayed differ by usage in different spreadsheet function formula as exampled in FIG. 66A and FIG. 66B. Because built-in spreadsheet functions do very different calculations, even spreadsheet functions that require the same data type can have different hints in our technology. FIG. 66A and FIG. 66B examples two functions (SUM and MAX) that work for numeric data but because of what they do are supported by differently tailored hints in our technology when evaluating the exact same formulaic data field.

Two dimensions of difference are exampled with the 'SUM' hint in FIG. 66A displaying some different 'RETRIEVERS' 6633 because summing all the 'amount_gross' values greater than a value is something users frequently do (e.g., summing all the amount_gross donations over $1000). However, finding the maximum value greater than a value is not something frequently done as it is either the maximum value or no value. The second difference is the inclusion of the 'VALUES' 6643 in the 'SUM' hint, as users would consider doing this (e.g., summing the total of all the $100 amount_gross donations). However, find the max of a value is simply the value and so there is no reason to give users that option. This is just one example of why our technology delivers hints that are function tailored. We will example an additional reason later, the data type or types differences resulting in different hints.

In another implementation of our technology the hint options displayed differ based on prior arguments as exampled in FIG. 67A through FIG. 70C. The inclusion of the prior argument '!1' in formula 6572 in FIG. 67B eliminates the direct filter section 'RETRIEVERS' 6723 of the hints shown in FIG. 67A for the same formulaic data field formula 6712 without the '!1'. FIG. 67A through FIG. 69B example the impact of prior arguments on the option displayed for evaluated formulaic data field hints while FIG. 70A through FIG. 70C example the impact of prior arguments on the option displayed for filter formulaic data field hints.

In another variant of our prior argument impact technology, the prior argument impact alters the display so that the prior argument used options are displayed for the user to see but not selectable (i.e., disabled) as exampled in FIG. 67C and FIG. 68B through FIG. 69B. In another implementation of our technology the prior argument used option differences vary by whether a function is involved or not in the evaluation, as exampled in FIG. 71A and FIG. 71B.

In another implementation of our technology the hint display options vary by data type, as exampled in FIG. 72A through FIG. 72C. There are many dimensions to those variations. One implementation of our technology alters, as needed, the data value displays to include the syntax required in the formula for different data types, e.g., double quotes surrounding text and single quotes surrounding dates. Another implementation alters the 'DESCRIPTION' wording describing the input selections to tailor the words used to match the data type, e.g., lowest and highest for numerics (see 7223 in FIG. 72A), first and last AZ sorted for text (see 7253 in FIG. 72B), and earliest and latest for dates (see 7283 in FIG. 72C).

Another implementation of our technology tailors the data values displayed in the hints to the values for each formulaic data field, as shown in FIG. 72A through FIG. 73B. Where the values displayed are specific to the data field and also specific to the filtering by any previous filters. This creates a large number of tailored hints in use, given each type of hint displaying data values has as many variations as the user has formulaic data fields and then combinations of data fields when used in filters.

When a user moves from creating a formula to editing a formula in our technology the hint displayed at the same point in the formula can be different, as our technology sees what follows that point in the formula. Therefore, in our technology editing an argument in a formula with additional arguments can result in different options displayed versus what would be displayed at the same argument originally creating the formula, as shown in FIG. 74A versus FIG. 74B.

In many situations other types of actions or options selections are useful for users. Therefore, in an implementation of our technology the hint options displayed include other formula actions finishing the formula or part of the formula and/or adding tokens to complete or bypass arguments, as shown in FIG. 76 7684 and FIG. 77A 7763.

In another embodiment of our technology the values in the prior arguments of a function alter the hint options displayed for a later argument. FIG. 77A examples this with the 'NO_BLANKS' option 7745 which is only displayed one of the previous 'WRITE_V' function arguments contains a field with blanks/database nulls. If none of field arguments have blanks/nulls then the 'OPTIONS' 7744 would not include the 'NO_BLANKS' option 7745 as well as the next two options 'BLANKS_AS_0' and 'BLANKS_AS_DASH'. Illustrating one of many functions and situations in our technology where the hint options displayed is dependent on the previous argument formulaic fields or input values.

Figure 61B:
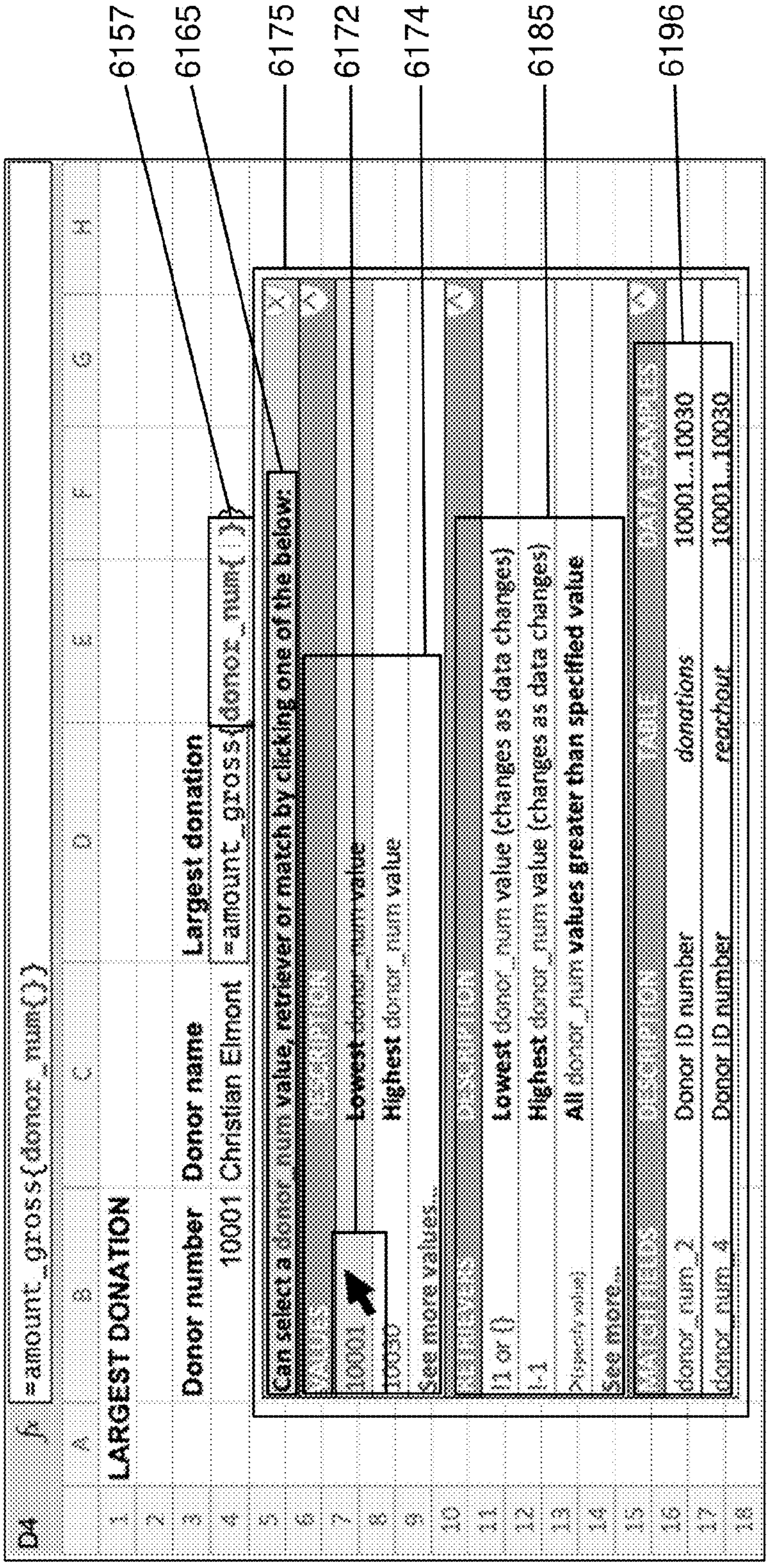

One large benefit to our technology is that option selections take care of correctly inserting the selection into the formula. In an implementation of our technology the option selections automatically complete argument syntax, adding additional tokens as needed to make the formula correct. One example of that in many of our examples is when our technology adds a formulaic data field it adds both curly brackets. The more important capability to make that work is our technology then automatically moves beyond the closing bracket once a filter is completed as shown in FIG. 61B resulting in FIG. 62B where the cursor 'I' ends up beyond the argument just completed "donor_num{10001}|" 6258 rather than inside the '{10001}'. The next action in that sequence, FIG. 62B resulting in FIG. 63B, of inputting the '!-1' token automatically inputs the comma needed before it as shown in 6357. Additionally, our technology will add syntax that was left out because the user was typing the formula when they then decide to click a selection as shown in FIG. 79A and FIG. 79B. Where our technology automatically adds the closing curly bracket and places the cursor after it thus correctly finishing the date input and leaving the user ready to correctly proceed with the formula.

As previously described, an implementation of our technology adds the formula syntax needed to the date and text formulaic data values displayed so the user sees what will be needed in the formula. Namely, text surrounded by double quotes (see FIG. 78A 7832 '"West" ') and dates surrounded by single quotes (see FIG. 79A 7932 ' '1/3/19' '). Selecting any one of those options then automatically adds the single or double quote syntax to the data as it is inserted into the formula as exampled in FIG. 78A and FIG. 78B 7864 for text and exampled in see FIG. 79A and FIG. 79B 7964 for dates. It also tailors the addition of the selection to the FUNCTION argument, as exampled in FIG. 80 delivering FIG. 81 for a selection into our WRITE function where the field values (e.g., 'amount_gross_4' 8126) go in as names only (without the curly brackets to stop users from trying to add a filter there).

Our technology also makes editing formulas easier by more intelligently replacing formulaic data fields and their filter values. In an implementation of our technology editing actions replace a formulaic data field name (as exampled in FIG. 82A 8231 resulting in FIG. 82B 8243), or filter value (as exampled in FIG. 84A 8431 resulting in FIG. 84B 8463). However, our technology's analyzer is intelligent enough to differentiate settings where the editing replacement should go further, replacing not only the formulaic data field name but also its filters as shown in FIG. 82A 8221 resulting in FIG. 82C 8272 and in FIG. 83A 8341 resulting in FIG. 83B 8374.

Figure 62B:
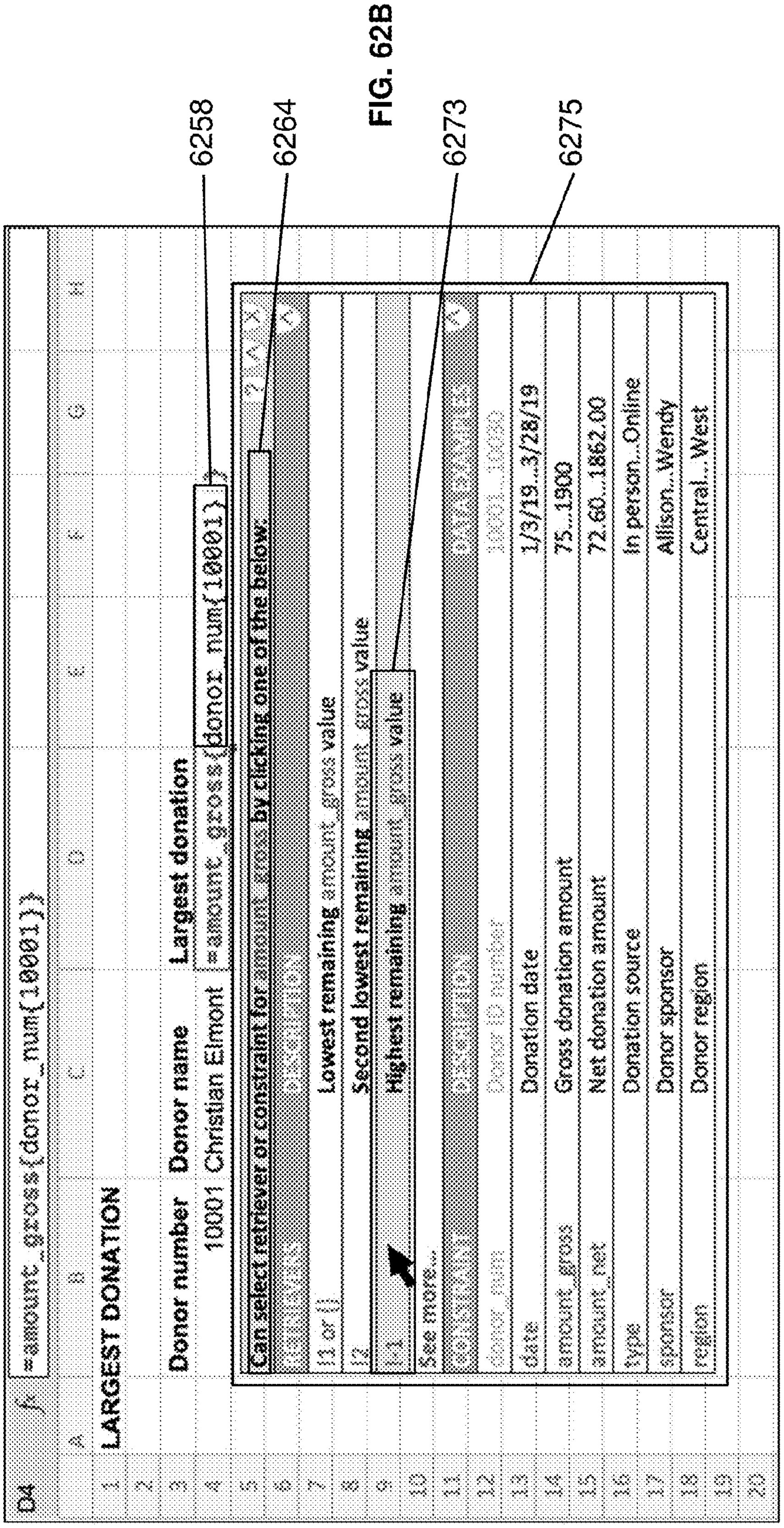

To help guide users as to what to do in each hint our technology includes one or more instructions accompanying the displayed options, as shown in different variants in FIG. 60B 6064, in FIG. 61B 6165 and in FIG. 62B 6264. To further help guide the option selection decisions the hints contain machine or human generated additional information, as exampled in various 'DESCRIPTION' (human generated) and 'DATA EXAMPLES' (machine generated FIG. 108A 10847 or human generated FIG. 108B 10877) displayed in the hints.

Should users opt to type some part of their formulaic or formulaic and function formulas in an implementation of technology the hints contain the error messages as you type, as shown in FIG. 88A through FIG. 89. That technology also includes results as you type or select options so the users can see the results of their formulas or parts of formulas as they step-by-step create it, as shown in FIG. 90A through FIG. 93. As we discussed previously, the refresh rate on the errors and results, particularly when users are typing, can be some interval other than every typed character.

As a final dimension to helping users create the right formula, an implementation of our technology creates a plain language recitation of successful results for an evaluated formulaic data field or an evaluated date field FUNCTION combination, as exampled in FIG. 90A through FIG. 93. An example of them going step-by step is shown in FIG. 97 through FIG. 101. This allows users to check whether the logic the wrote in their formulas is actually the logic they are getting.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Some Particular Implementations—Formulaic Data Setup from Spreadsheet Cells

An implementation of our technology can setup the data from spreadsheet cells to operate like our Non-spreadsheet Cell (NSC) formulaic data from external data sources. That way spreadsheet cell data can support all our hint technology capabilities previously discussed.

An implementation of our technology that supports our hints from columnar spreadsheet cell data setup by our technology (as exampled in FIG. 103 supplying data for intake in FIG. 104 through FIG. 114). Where the formulaic data field name equivalents are sourced from the first row of the intake data (as exampled in FIG. 106 10684), user input of names or a combination of intake and user input (as exampled in FIG. 111 11174). It supports assignment of table name equivalents (as exampled in FIG. 107 10744) to the datasets and supports the algorithmic (as exampled in FIG. 106 10676) or human generated (as exampled in FIG. 107 10776) additional information. And it supports unique identification of the formulaic data fields (as exampled in FIG. 111 11174 and FIG. 113 11384).

This method and other embodiments or implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features.

In another implementation of technology, the algorithmic generated (machine generated) additional information can be replaced by human generated information, as exampled in FIG. 108A and FIG. 108B.

An implementation of our technology automatically updates the data intake when contiguous rows of additional data are added to the spreadsheet cells used in the setup.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the claims that follow our clauses.

Clauses for Continuation Claims

As You Type Error Correction

1. A computer-implemented method of as you type error checking of a spreadsheet formula as a user types the spreadsheet formula in a cell, including:

analyzing, as the user types, the cell contents of the spreadsheet formula and throwing an error message when the cell contents are not valid in the formula being typed; and wherein the error message identifies/emphasizes a token or group of tokens that cause the error.

2. The method of clause 1, wherein the error message is accompanied by an error explanation.

3. The method of clause 2, wherein the error explanation identifies the specific error not a broad category of errors.

4. The method of clause 3, wherein the error explanation visibly traces cell references and cell values involved in an error.

5. The method of clause 2, wherein the error explanation is automatically displayed in a UI visual.

6. The method of clause 2, wherein error identification/emphasis and error explanation are automatically displayed in a UI visual.

7. The method of clause 1, wherein error identification/emphasis is in the in-cell formula and/or formula bar formula.

8. The method of clause 1, wherein more than one error is separately messaged.

9. The method of clause 1, wherein the interval of error messaging as the user types is each character typed.

10. The method of clause 1, wherein there are two or more categories of error messages.

11. The method of clause 1, wherein the error categories are differentiated by differences in the error identifications/emphases.

12. The method of clause 1, wherein one error category represents errors requiring a change to the token or tokens causing the error and the second where the error can be fixed by adding or altering a token or tokens in the formula following the error.

13. The method of clause 1, wherein the formula is algebraic.

14. The method of clause 1, wherein the formula contains a predefined spreadsheet function.

15. The method of clause 1, wherein the formula contains formulaic data.

16. The method of clause 1, wherein the formula contains a combination of algebra, predefined function(s) and/or formulaic data.

17. A method of creating a post evaluation spreadsheet formula error message, including:

separately messaging multiple errors;

wherein each error message identifies/emphasizes a respective token or group of tokens that caused each respective error; and wherein each error message includes an error explanation for one of the respective tokens or groups of tokens causing the respective error.

18. The method of clause 17, wherein each error explanation describes the specific error not a broad category of errors.

19. The method of clause 18, wherein the error explanation visibly traces cell references and cell values involved in the respective error.

20. The method of clause 18, wherein the spreadsheet error value evaluating formulas automatically display the error explanation(s) in status/error bar UI visual.

21. A non-transitory computer readable medium impressed with instructions that, when executed on a processor, implement as you type error checking actions, applied to a spreadsheet formula as a user types the spreadsheet formula in a cell, including:

analyzing, as the user types, the cell contents of the spreadsheet formula and throwing an error message when the cell contents are not valid in the formula being typed; and wherein the error message identifies/emphasizes a token or group of tokens that cause the error.

22. A computer system including a processor coupled to memory, wherein the memory includes the non-transitory computer readable medium of clause 22 impressed with instructions that, when executed on the processor, implement as you type error checking actions, applied to a spreadsheet formula as a user types the spreadsheet formula in a cell.

23. A non-transitory computer readable medium impressed with instructions that, when executed on a processor, implement as you type error checking actions, applied to a spreadsheet formula as a user types the spreadsheet formula in a cell, including:

separately messaging multiple errors;

wherein each error message identifies/emphasizes a respective token or group of tokens that caused each respective error; and wherein each error message includes an error explanation for one of the respective tokens or groups of tokens causing the respective error.

24. A computer system including a processor coupled to memory, wherein the memory includes the non-transitory computer readable medium of clause 23 impressed with instructions that, when executed on the processor, implement as you type error checking actions, applied to a spreadsheet formula as a user types the spreadsheet formula in a cell.

Spreadsheet Formula Hints

25. The method of creating a spreadsheet formula hint, including:

using the formulaic data field for which the hint is being displayed to select the formula options displayed;

wherein the options include direct and indirect filter options for the formulaic data field where:

the direct filter options are limited to those of the formulaic data field itself;

the indirect filter options are limited to fields from the same table as the formulaic data field and/or match/join fields for that formulaic data field; and the app supporting selection of an option from the display for population into the spreadsheet formula.

26. The method of clause 25, wherein the evaluated formulaic data field indirect constraints are only limited to fields from the same table as the formulaic data field.

27. The method of clause 25, wherein the filter formulaic data field indirect constraints are limited to match/join fields for that formulaic data field.

28. The method of clause 25, wherein the match/join formulaic data field indirect constraints are only limited to fields from the same table as the match/join field.

29. The method of clause 25, wherein the options displayed differ by whether the evaluated field yields a single value or range value.

30. The method of clause 29, wherein options displayed differ for some spreadsheet range functions.

31. The method of clause 25, wherein the options displayed differ based on prior arguments.

32. The method of clause 31, wherein prior argument used options are displayed but not selectable.

33. The method of clause 30, wherein prior argument option differences vary by whether a function is involved or not in the evaluation.

34. The method of clause 25, wherein the options vary by data type.

35. The method of clause 25, wherein the filter value appearance is varied for some data types.

36. The method of clause 25, wherein the filter value other information wording is varied for some data types.

37. The method of clause 25, wherein the options displaying formulaic data values vary by formulaic data field.

38. The method of clause 25, wherein the editing an argument in a formula with additional arguments can result in different options displayed versus what would be displayed at the same argument originally creating the formula.

39. The method of clause 25, wherein the hint options displayed include other formula actions finishing the formula or part of the formula and/or adding tokens to complete or bypass arguments.

40. The method of clause 37, wherein within a spreadsheet FUNCTION the options displayed in later arguments are altered by previous formulaic data field arguments.

41. The method of clause 25, wherein the option selections automatically complete argument syntax.

42. The method of clause 25, wherein the options selections automatically supply data type specific syntax and function specific syntax.

43. The method of clause 25, wherein editing actions replace a formulaic data field name, or filter value.

44. The method of clause 25, wherein editing actions replace a formulaic data field and its filters.

45. The method of clause 25, wherein the displayed options are accompanied by one or more instructions regarding the options.

46. The method of clause 25, wherein the options have machine or human generated additional information.

47. The method of clause 25, wherein the displayed options are accompanied by error messages or results.

48. The method of clause 25, wherein the error messages or results are generated as selections are made or as you type.

49. The method of clause 25, wherein the as you type refreshes are done at an interval other than every character. wherein the error messages or results are generated as selections are made or as you type.

50. The method of clause 47, wherein the results are accompanied by a plain language recitation of the evaluated formulaic data field or evaluated formulaic data field FUNCTION combination.

51. A non-transitory computer readable medium impressed with instructions that, when executed on a processor, implement actions for creating a spreadsheet formula hint, including:

using the formulaic data field for which the hint is being displayed to select the formula options displayed;

wherein the options include direct and indirect filter options for the formulaic data field where:

the direct filter options are limited to those of the formulaic data field itself;

the indirect filter options are limited to fields from the same table as the formulaic data field and/or match/join fields for that formulaic data field; and the app supporting selection of an option from the display for population into the spreadsheet formula.

52. A computer system including a processor coupled to memory, wherein the memory includes the non-transitory computer readable medium of clause 47 impressed with instructions that, when executed on the processor, implement actions for creating the spreadsheet formula hint.

Formulaic Data Setup

53. A method for formulaic data setup, including:

supporting hints to users derived from spreadsheet cells, further including:

receiving spreadsheet cell data from spreadsheet cell sources;

maintaining a cross-reference of assignment of table name equivalents to fields in datasets, including supporting more than one dataset at one time and supporting assignment of formulaic data field name equivalents to the columns extracted from the datasets;

supporting algorithmic and human generated informative descriptions of the data field content of the formulaic data fields in the datasets; and enforcing unique identification of the formulaic data fields across the datasets.

54. The method of clause 53, wherein algorithmic generated additional information can be replaced by human generated additional information.

55. The method of clause 53, wherein the formulaic data automatically updates upon the addition of additional contiguous rows of data.

56. A non-transitory computer readable medium impressed with instructions that, when executed on a processor, implement actions for formulaic data setup, including:

supporting hints to users derived from spreadsheet cells, further including:

receiving spreadsheet cell data from spreadsheet cell sources;

maintaining a cross-reference of assignment of table name equivalents to fields in datasets, including supporting more than one dataset at one time and supporting assignment of formulaic data field name equivalents to the columns extracted from the datasets;

supporting algorithmic and human generated additional information regarding the formulaic data fields in the datasets; and enforcing unique identification of the formulaic data fields across the datasets.

57. A computer system including a processor coupled to memory, wherein the memory includes the non-transitory computer readable medium of clause 56 impressed with instructions that, when executed on the processor, implement actions for formulaic data setup.

I claim as follows:

1. A method for selecting and populating into a spreadsheet formula an argument in a formulaic data field to be evaluated, including:

starting from a position to be populated in an argument list of the formulaic data field in the spreadsheet formula to be evaluated, wherein:

the formulaic data field is a named data field within the a source of the formulaic data; and formulaic data is sourced from either non-spreadsheet cells (NCS) or from spreadsheet cells, both sources being organized by named data fields;

responding to typed inputs and/or UI selection for the starting position to be populated by displaying a list of selectable options, the selectable options including direct and indirect filter options for the formulaic data field, wherein:

the direct filter options include values and retrievers that apply to the formulaic data field itself; and the indirect filter options include constraints on fields from a same table as the formulaic data field; and upon selection among the selectable options, automatically populating a selected direct or indirect filter applicable to formulaic data field into the starting position.

2. The method of claim 1, further including responding to the typed inputs and/or UI selection with additional information for the list of selectable options, including informative descriptions of data field content of the formulaic data fields in the list, and informative and descriptive information beyond data field names.

3. The method of claim 1, further including displaying the direct and indirect filter options in separate selection list buckets.

4. The method of claim 1, wherein the direct filter list of selectable options displayed is context sensitive to whether the formulaic data field in the spreadsheet formula can populate into the starting position multiple values, as opposed to a single value.

5. The method of claim 1, wherein direct filter list of selectable options displayed is context sensitive to a prebuilt spreadsheet function being applied to the formulaic data field in the spreadsheet formula being evaluated.

6. The method of claim 1, wherein the direct and/or indirect filter list of selectable options displayed are context sensitive to and limited by prior argument values of the formulaic data field in the spreadsheet formula being evaluated.

7. The method of claim 1, wherein, in the indirect filter list of selectable options, indirect filter option(s) already in use for the formulaic data field are visually differentiated from the unused indirect filter options.

8. The method of claim 1, wherein, in the indirect filter list of selectable options, one or more indirect filter option(s)

already in use for the formulaic data field are disabled from selection in the indirect filter options.

9. The method of claim 1, wherein the direct and indirect filter lists of selectable options displayed are context sensitive to the data type of the formulaic data field.

10. The method of claim 1, wherein the direct and/or indirect filter list of selectable options displayed are context sensitive to values present in the formulaic data field.

11. The method of claim 2, wherein additional information in the direct and/or indirect filter list of selectable options displayed is context sensitive to the data type of the formulaic data field.

12. The method of claim 1, wherein the selection of the option automatically populates a text or date data type into a direct filter selection with a proper text or date syntax.

13. The method of claim 1, wherein the indirect filter options further include fields from a different table than the formulaic data field.

14. The method of claim 1, wherein selection of an indirect formulaic data field for the indirect filter causes display a context-sensitive list of selectable indirect filter options.

15. The method of claim 1, wherein selection of a second indirect filter to replace a first indirect filter automatically eliminates direct filter options specified for the first indirect filter.

16. The method of claim 1, further including causing display a hint for the selection, wherein the hint includes non-selectable instructional text, selection options, and non-selectable headers.

17. A non-transitory computer readable medium impressed with instructions that, when executed on a processor, implement actions for selecting and populating into a spreadsheet formula an argument in a formulaic data field to be evaluated, including:

- starting from a position to be populated in an argument list of the formulaic data field in the spreadsheet formula to be evaluated, wherein:
  - the formulaic data field is a named data field within a source of the formulaic data; and
  - formulaic data is sourced from either non-spreadsheet cells (NCS) or from spreadsheet cells, both sources being organized by named data fields;
- responding to typed inputs and/or UI selection for the starting position to be populated by displaying a list of selectable options, the selectable options including direct and indirect filter options for the formulaic data field, wherein:
  - the direct filter options include values and retrievers that apply to the formulaic data field itself; and
  - the indirect filter options include constraints on fields from a same table as the formulaic data field; and
- upon selection among the selectable options, automatically populating a selected direct or indirect filter applicable to formulaic data field into the starting position.

18. The non-transitory computer readable medium of claim 17, wherein, in the indirect filter list of selectable options, indirect filter option(s) already in use for the formulaic data field are visually differentiated from the unused indirect filter options.

19. The non-transitory computer readable medium of claim 17, wherein the direct and/or indirect filter list of selectable options displayed are context sensitive to values present in the formulaic data field.

20. The non-transitory computer readable medium of claim 17, wherein the argument list begins and ends with curly brackets.

21. The non-transitory computer readable medium of claim 17, wherein the selection of the option automatically populates a text or date data type into a direct filter selection with a proper text or date syntax.

22. A computer-implemented system including at least one processor and memory coupled to the processor, the memory holding program instructions that implements a method for selecting and populating into a spreadsheet formula an argument in a formulaic data field to be evaluated, including:

- starting from a position to be populated in an argument list of the formulaic data field in the spreadsheet formula to be evaluated, wherein:
  - the formulaic data field is a named data field within a source of the formulaic data; and
  - formulaic data is sourced from either non-spreadsheet cells (NCS) or from spreadsheet cells, both sources being organized by named data fields;
- responding to typed inputs and/or UI selection for the starting position to be populated by displaying a list of selectable options, the selectable options including direct and indirect filter options for the formulaic data field, wherein:
  - the direct filter options include values and retrievers that apply to the formulaic data field itself; and
  - the indirect filter options include constraints on fields from a same table as the formulaic data field; and
- upon selection among the selectable options, automatically populating a selected direct or indirect filter applicable to formulaic data field into the starting position.

23. A computer system of claim 22, wherein the direct filter list of selectable options displayed is context sensitive to whether the formulaic data field in the spreadsheet formula can populate into the starting position multiple values, as opposed to a single value.

24. A computer system of claim 22, wherein direct filter list of selectable options displayed is context sensitive to a prebuilt spreadsheet function being applied to the formulaic data field in the spreadsheet formula being evaluated.

25. A computer system of claim 22, wherein the direct and/or indirect filter list of selectable options displayed are context sensitive to and limited by prior argument values of the formulaic data field in the spreadsheet formula being evaluated.

* * * * *